(12) United States Patent
Espinosa

(10) Patent No.: US 11,788,274 B2
(45) Date of Patent: Oct. 17, 2023

(54) COMPRESSION AND TENSION REINFORCED WALL

(71) Applicant: CETRES HOLDINGS, LLC, Jackson, WY (US)

(72) Inventor: Thomas M. Espinosa, Snohomish, WA (US)

(73) Assignee: CETRES HOLDINGS, LLC, Jackson, WY (US)

(*) Notice: Subject to any disclaimer, the term of this patent is extended or adjusted under 35 U.S.C. 154(b) by 0 days.

(21) Appl. No.: 17/882,832

(22) Filed: Aug. 8, 2022

(65) Prior Publication Data

US 2023/0064212 A1    Mar. 2, 2023

Related U.S. Application Data

(62) Division of application No. 16/415,595, filed on May 17, 2019, now Pat. No. 11,603,656.

(60) Provisional application No. 62/672,809, filed on May 17, 2018.

(51) Int. Cl.
| | |
|---|---|
| *E04B 1/41* | (2006.01) |
| *E04B 1/26* | (2006.01) |
| *E04C 5/16* | (2006.01) |
| *E04B 2/56* | (2006.01) |

(52) U.S. Cl.
CPC .......... *E04B 1/4157* (2013.01); *E04B 1/2604* (2013.01); *E04B 2/56* (2013.01); *E04C 5/16* (2013.01); *E04B 2001/268* (2013.01)

(58) Field of Classification Search
CPC ........ E04B 1/4517; E04B 1/2604; E04B 2/56; E04B 2001/268; E04C 5/16
See application file for complete search history.

(56) References Cited

U.S. PATENT DOCUMENTS

| | | |
|---|---|---|
| 3,782,061 A | 1/1974 | Minutoli |
| 4,812,096 A | 3/1989 | Peterson |
| 4,875,314 A | 10/1989 | Boilen |
| 7,971,411 B2 | 7/2011 | Commins |

(Continued)

FOREIGN PATENT DOCUMENTS

| | | |
|---|---|---|
| EP | 328205 A1 | 2/2018 |
| WO | WO 2008/033357 A2 | 3/2008 |

OTHER PUBLICATIONS

Notification of Transmittal of the International Search Report and the Written Opinion of the International Searching Authority, or the Declaration for PCT/US19/32918.

(Continued)

*Primary Examiner* — Beth A Stephan
(74) *Attorney, Agent, or Firm* — FRESH IP PLC

(57) ABSTRACT

A reinforced building wall includes a foundation and an anchor rod anchored to the foundation; a first stud wall disposed above the foundation; the first stud wall having a first bottom plate, a first top plate and first and second vertical studs operably joined to the first bottom plate and the first top plate; a horizontal first bridge member disposed between the first stud and the second stud, the first bridge member having a first vertical opening; a rod post having one end operably connected to the anchor rod and operably connected to the first bridge member to transfer downward forces from the first bridge member and the second bridge member to the rod post; the anchor rod is attached to an anchor; and the anchor is disposed in an upper portion of the foundation.

18 Claims, 155 Drawing Sheets

(56) References Cited

U.S. PATENT DOCUMENTS

| | | |
|---|---|---|
| 8,689,518 B2 | 4/2014 | Gridley |
| 8,943,777 B2 | 2/2015 | Espinosa |
| 9,097,000 B2 | 8/2015 | Espinosa |
| 9,874,009 B2 | 1/2018 | Espinosa |
| 2006/0265274 A1 | 11/2006 | Commins |
| 2010/0115866 A1 | 5/2010 | Espinosa |
| 2012/0304589 A1 | 12/2012 | Commins |
| 2014/0123574 A1 | 5/2014 | Paone et al. |
| 2014/0260067 A1 | 9/2014 | Pryor |
| 2016/0244960 A1 | 8/2016 | Espinosa |
| 2017/0089063 A1 | 3/2017 | Espinosa |

OTHER PUBLICATIONS

Notification of Transmittal of the International Search Report and the Written Opinion of the International Searching Authority, or the Declaration of PCT/US19/32918.

European Search Report and Opinion for European Patent Application No. 19803514.9 dated May 19, 2021.

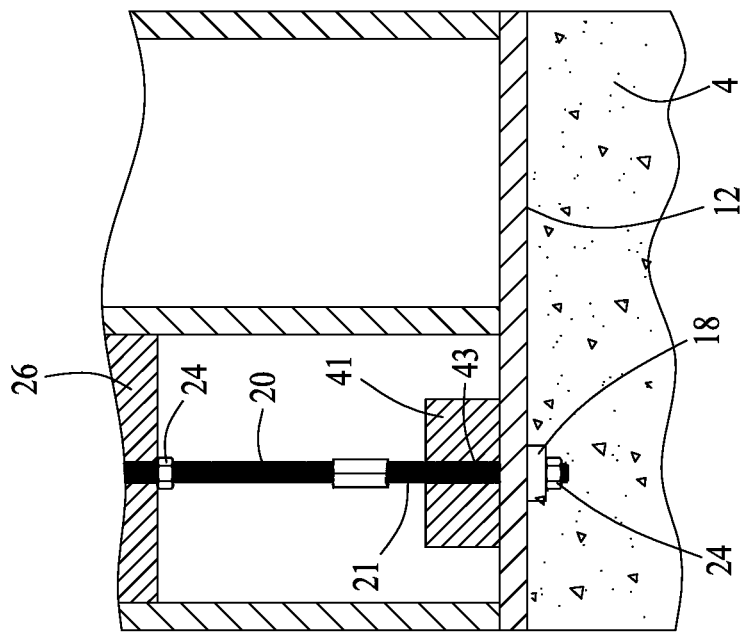
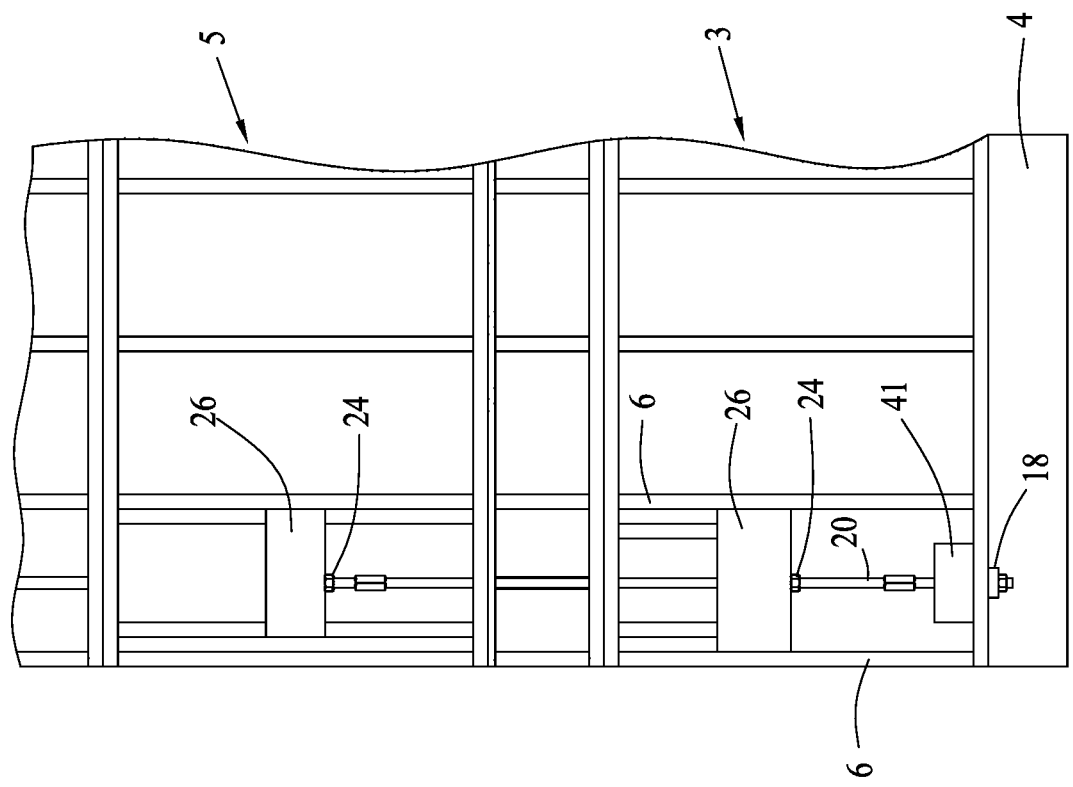

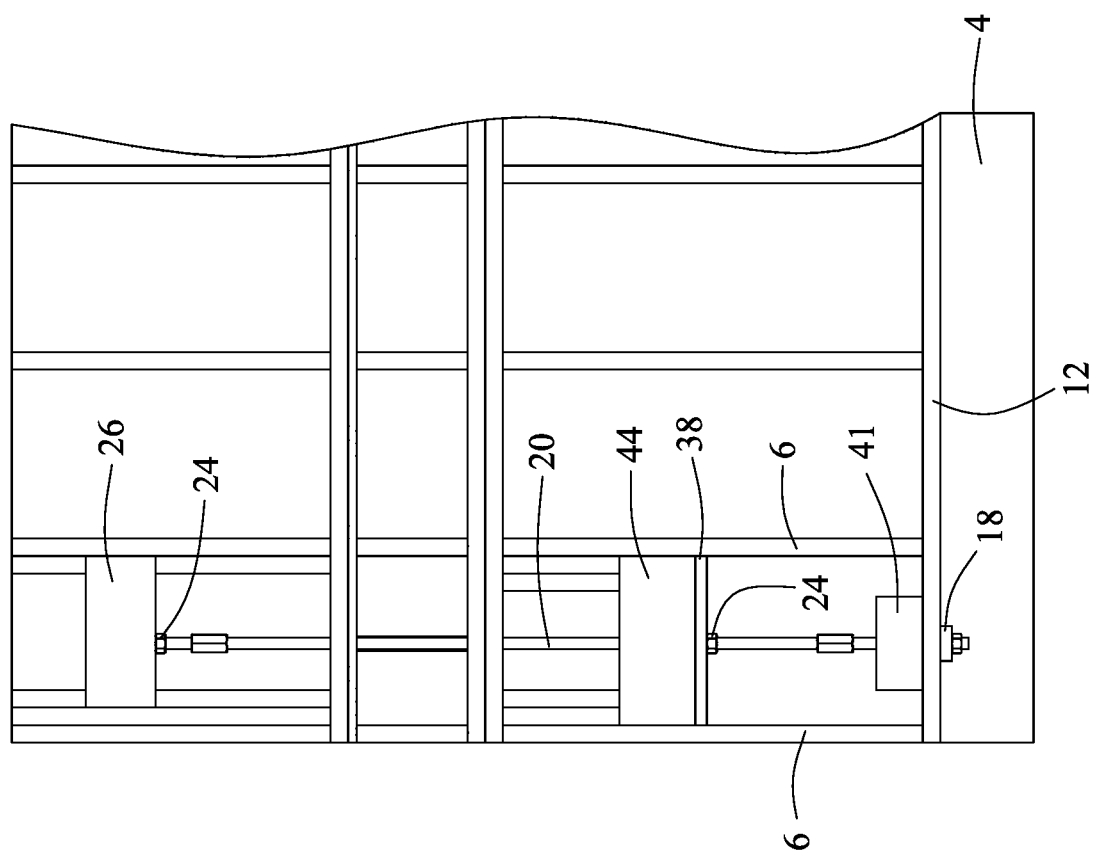

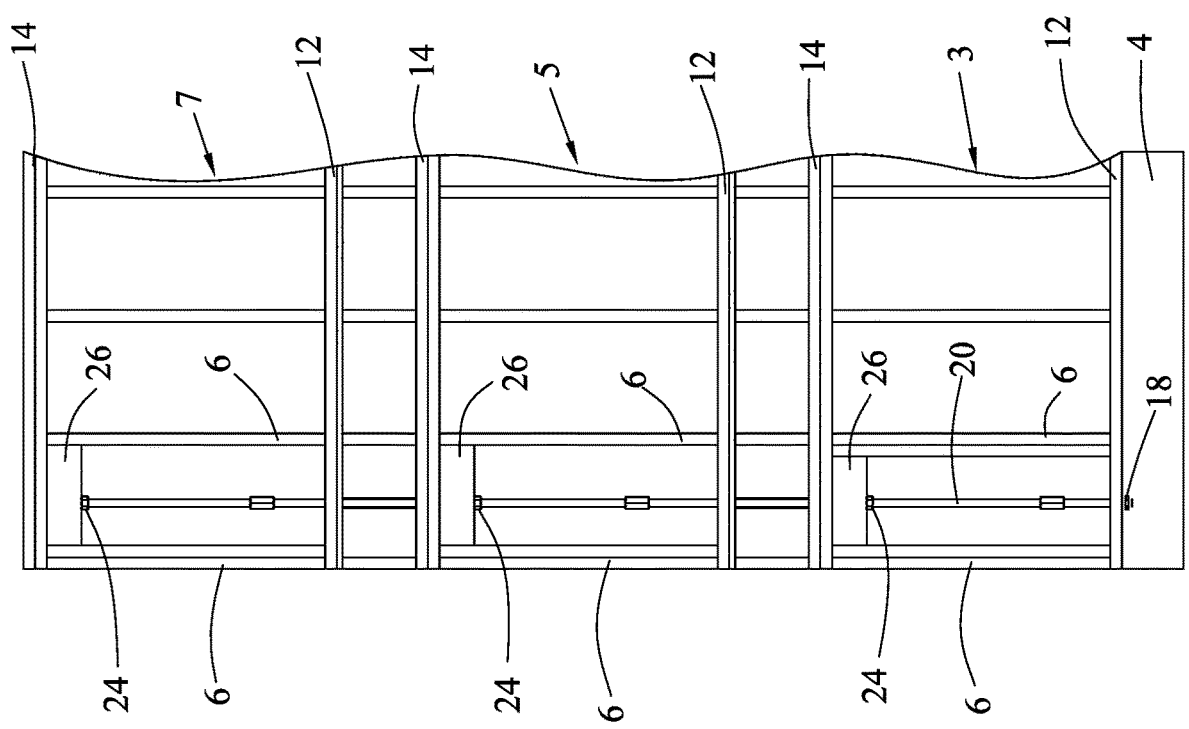

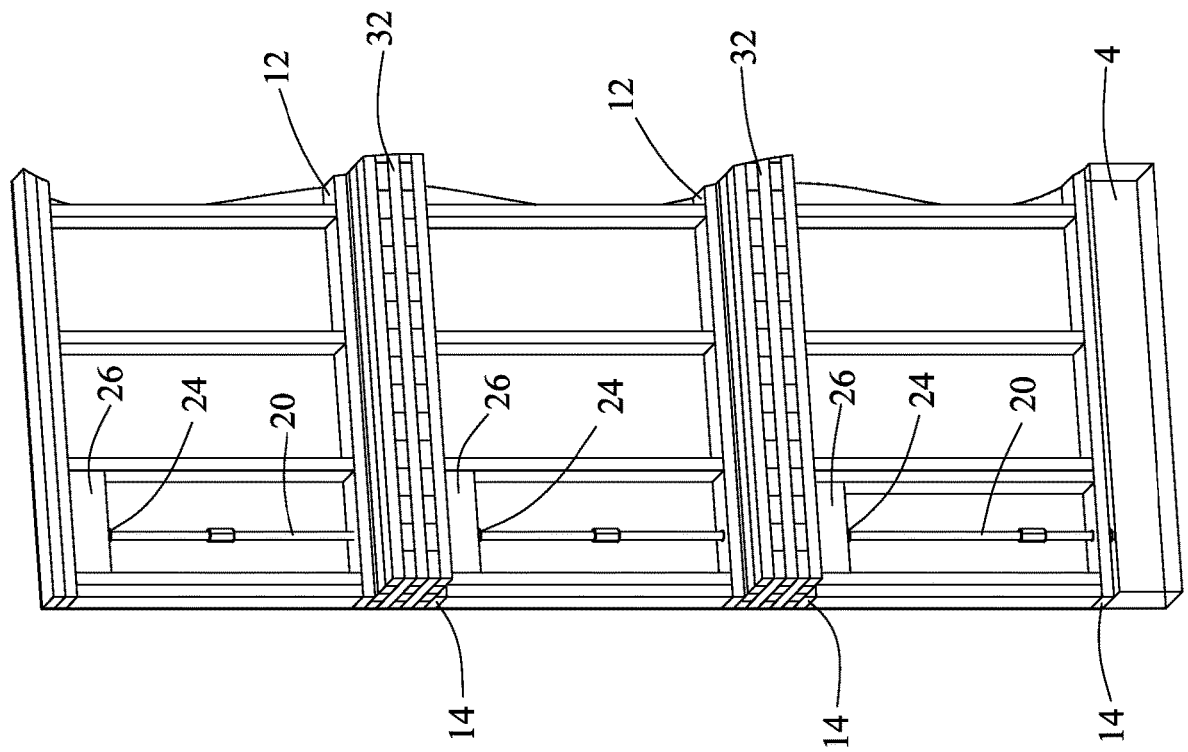

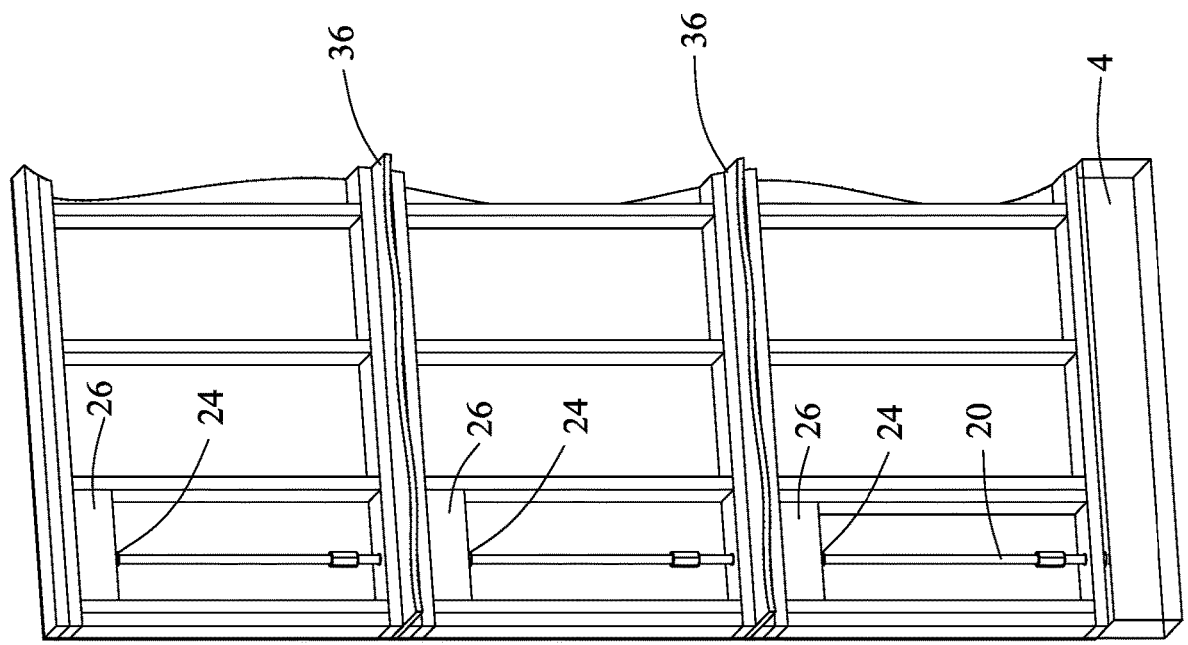

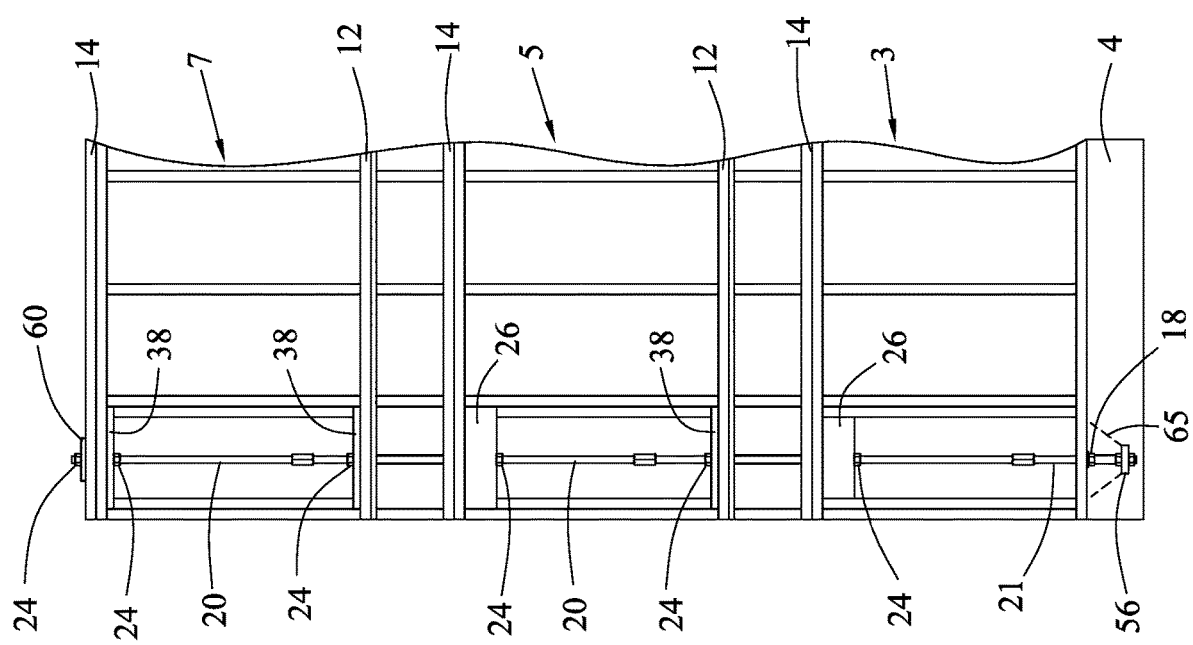

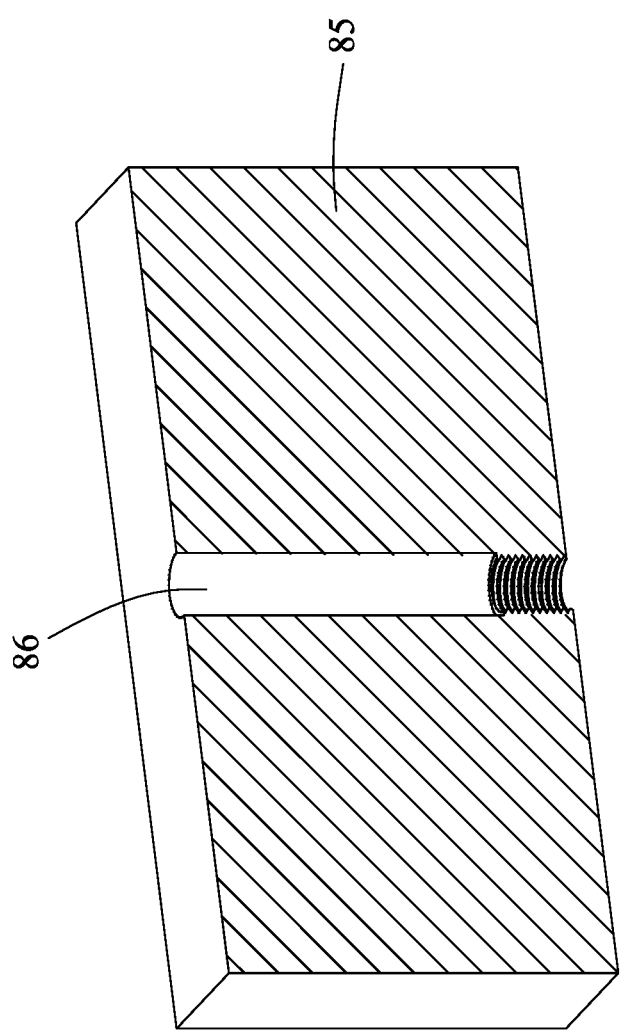
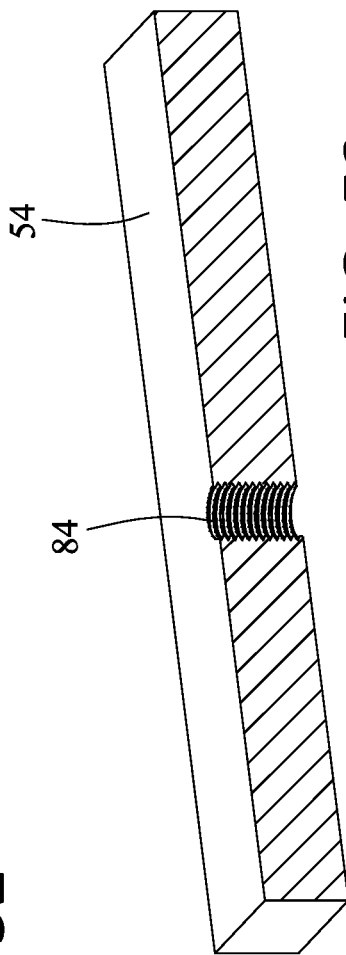

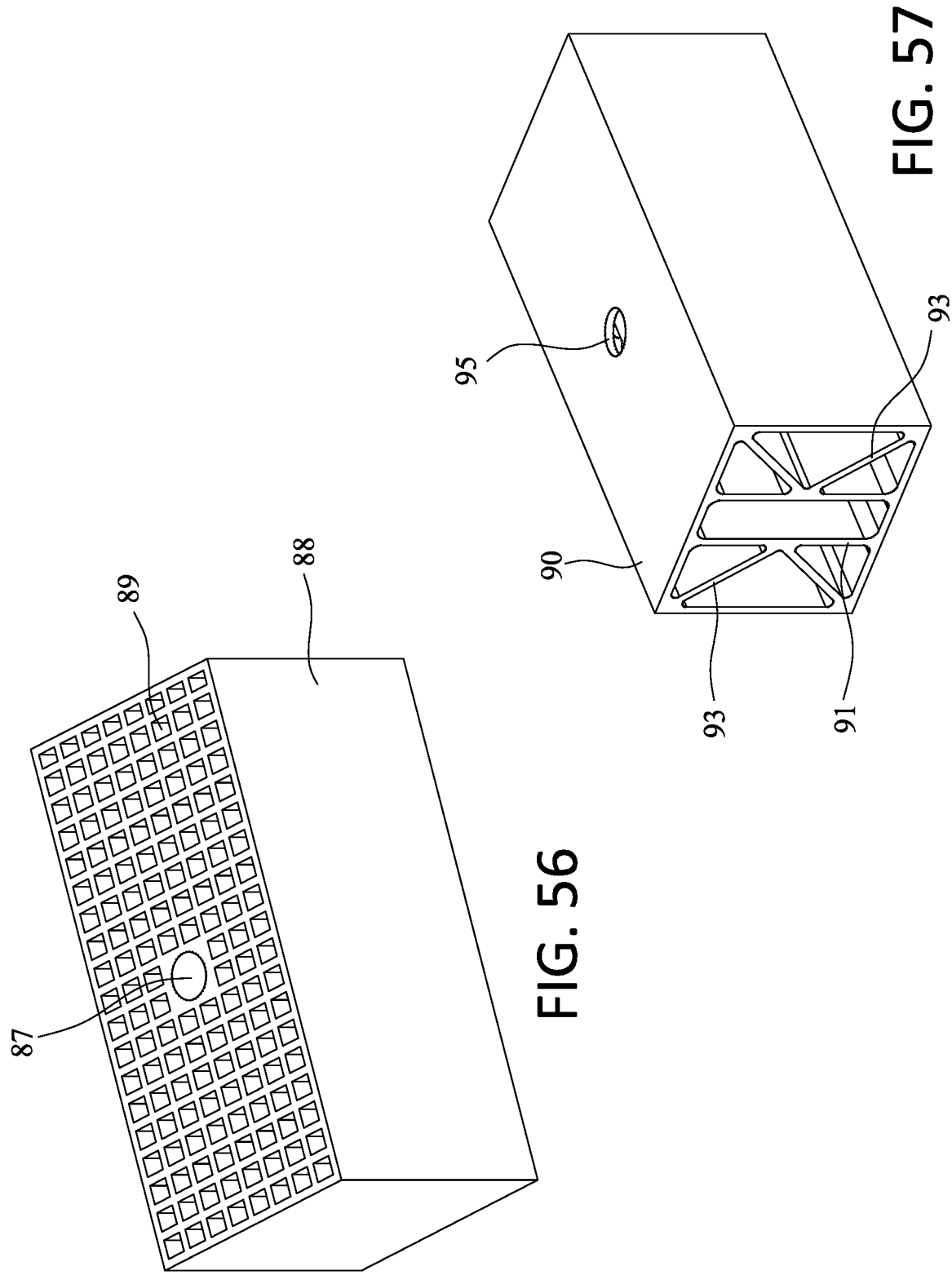

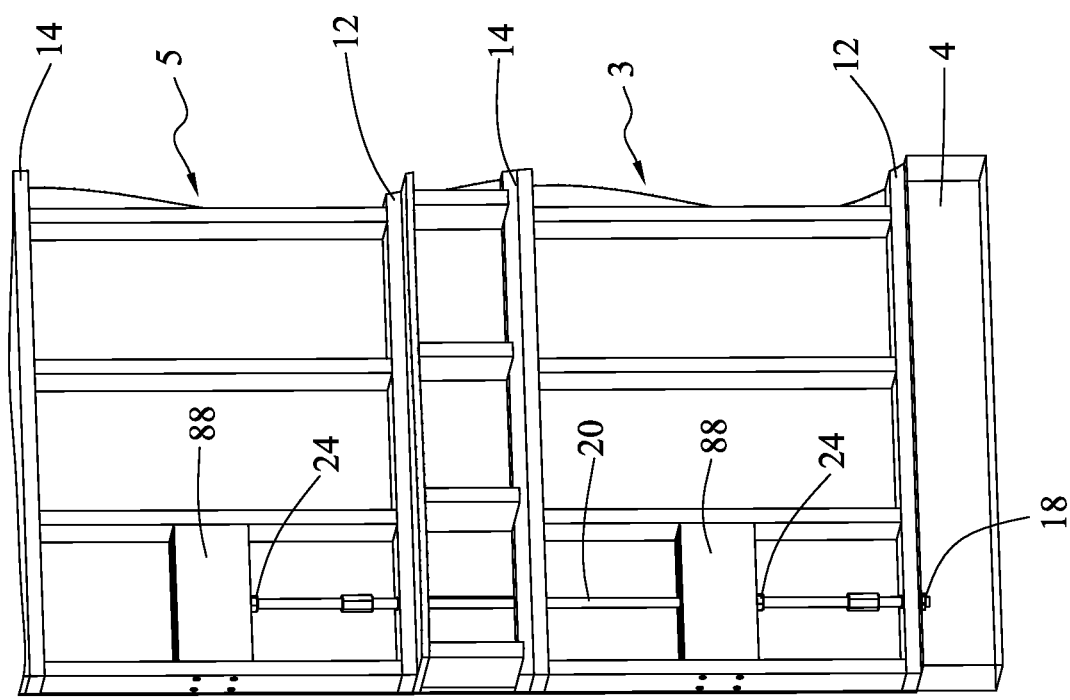

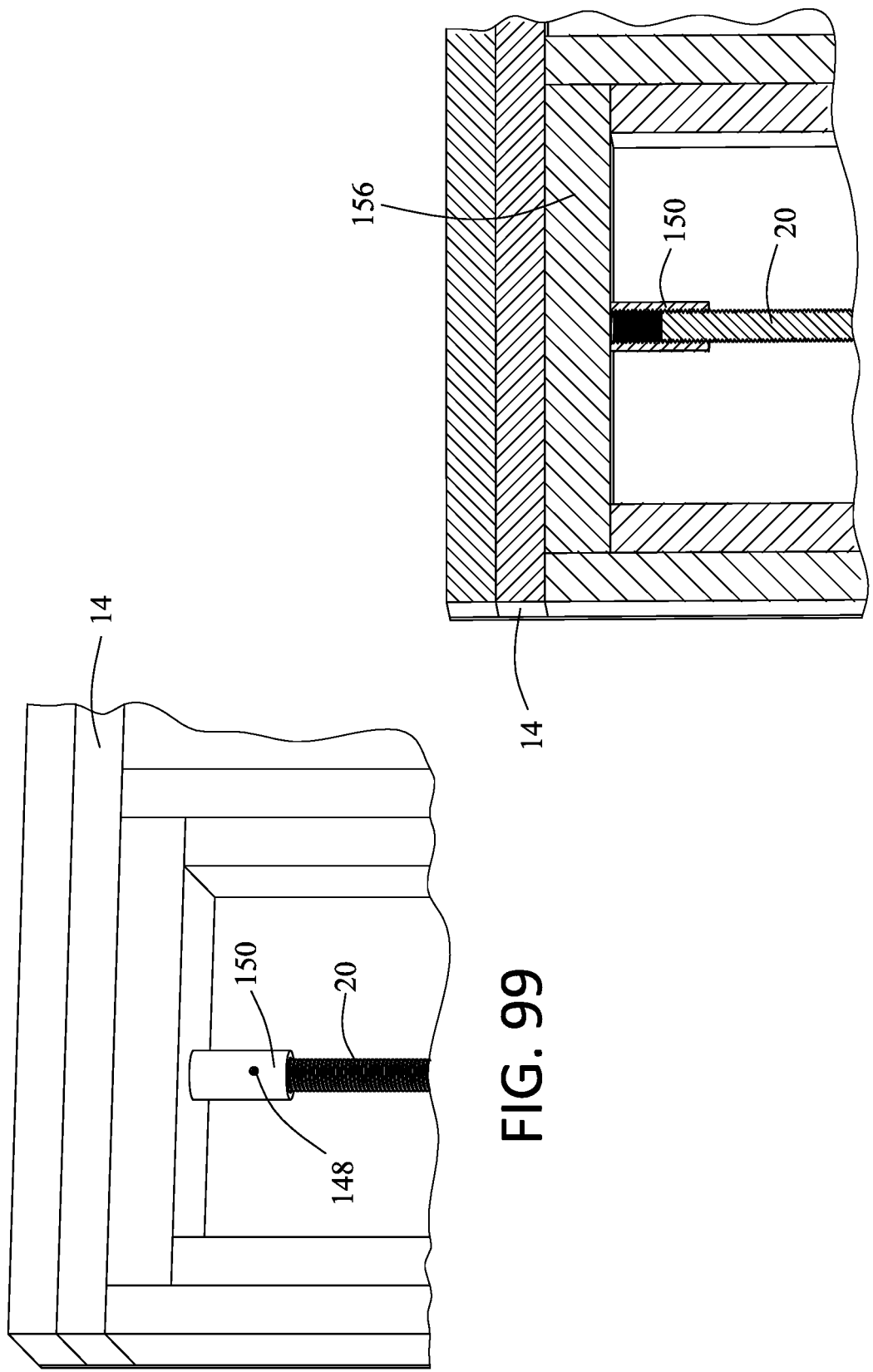

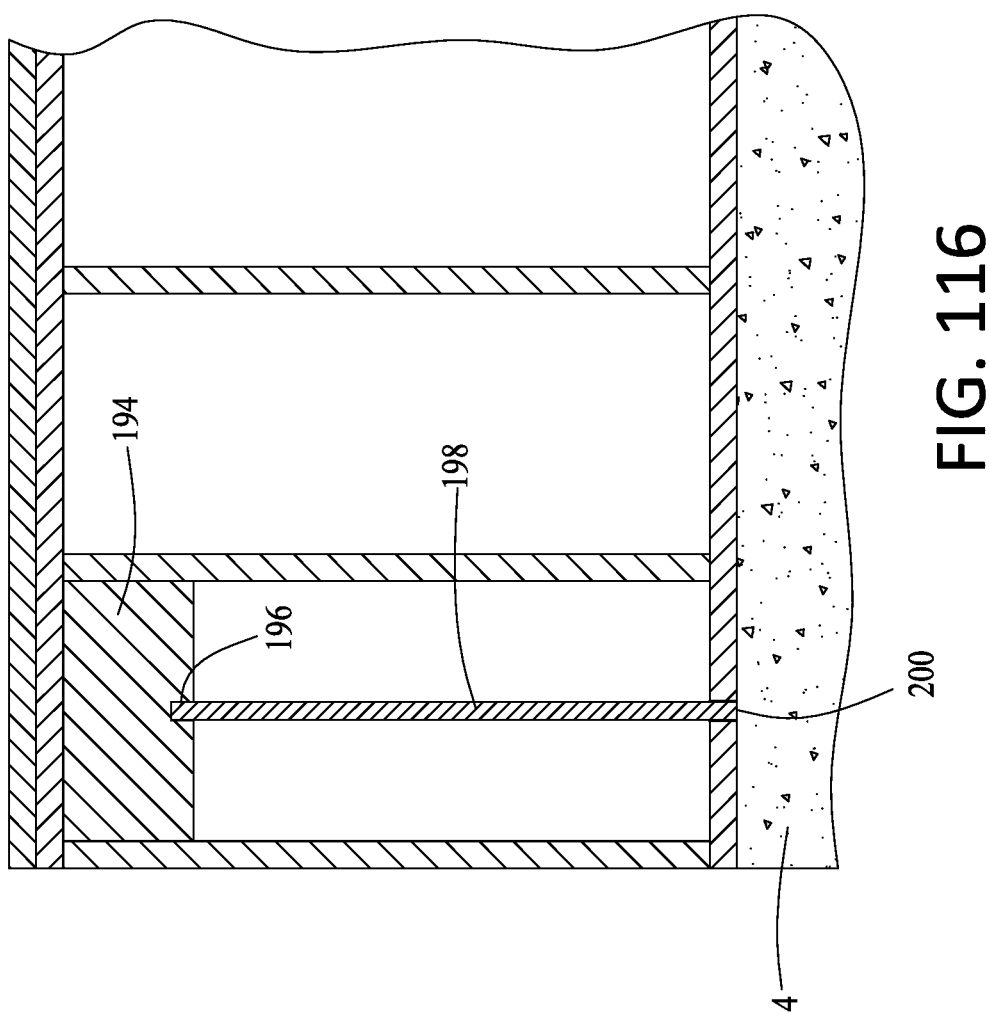

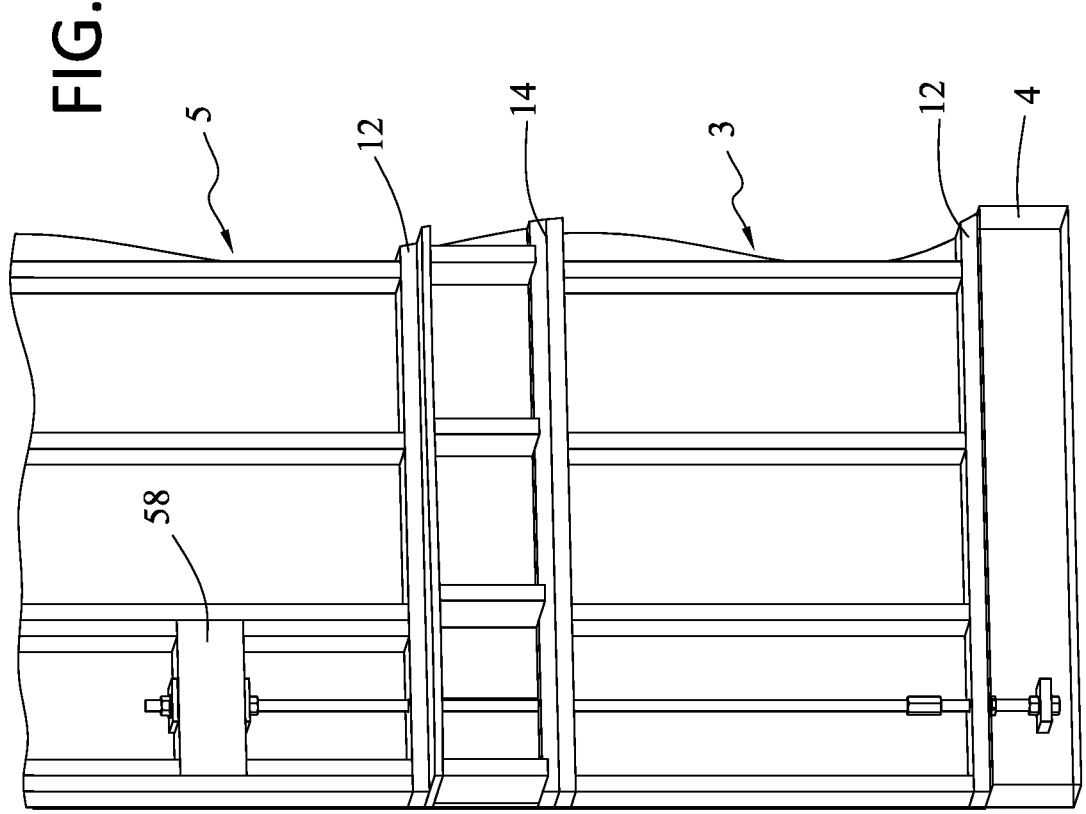

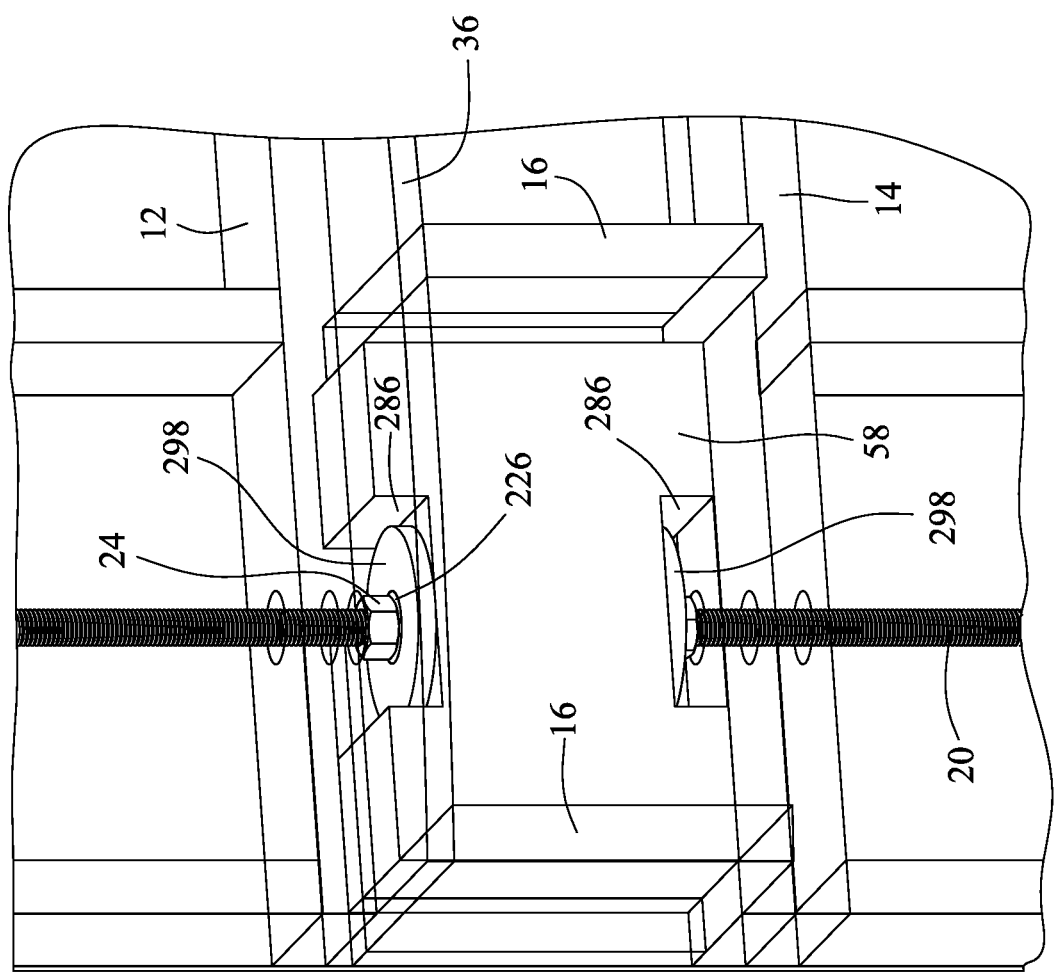

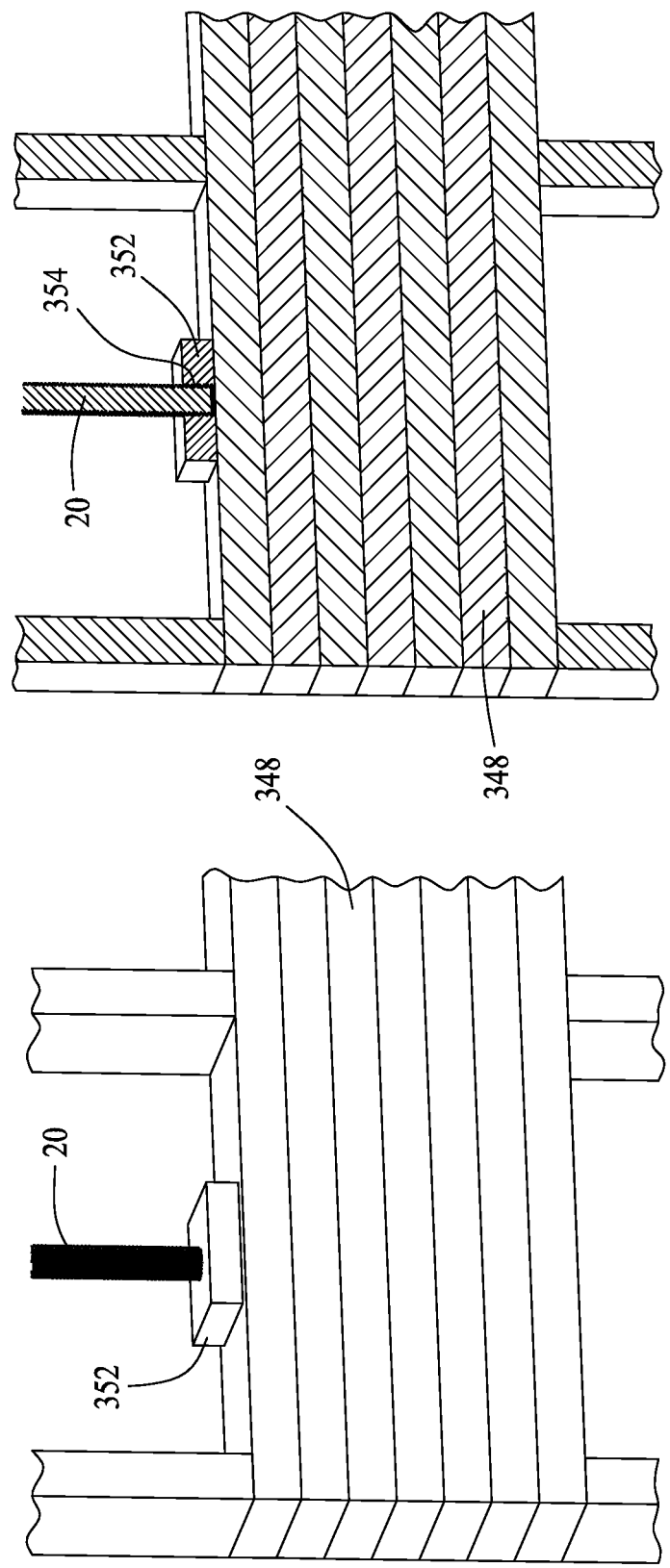

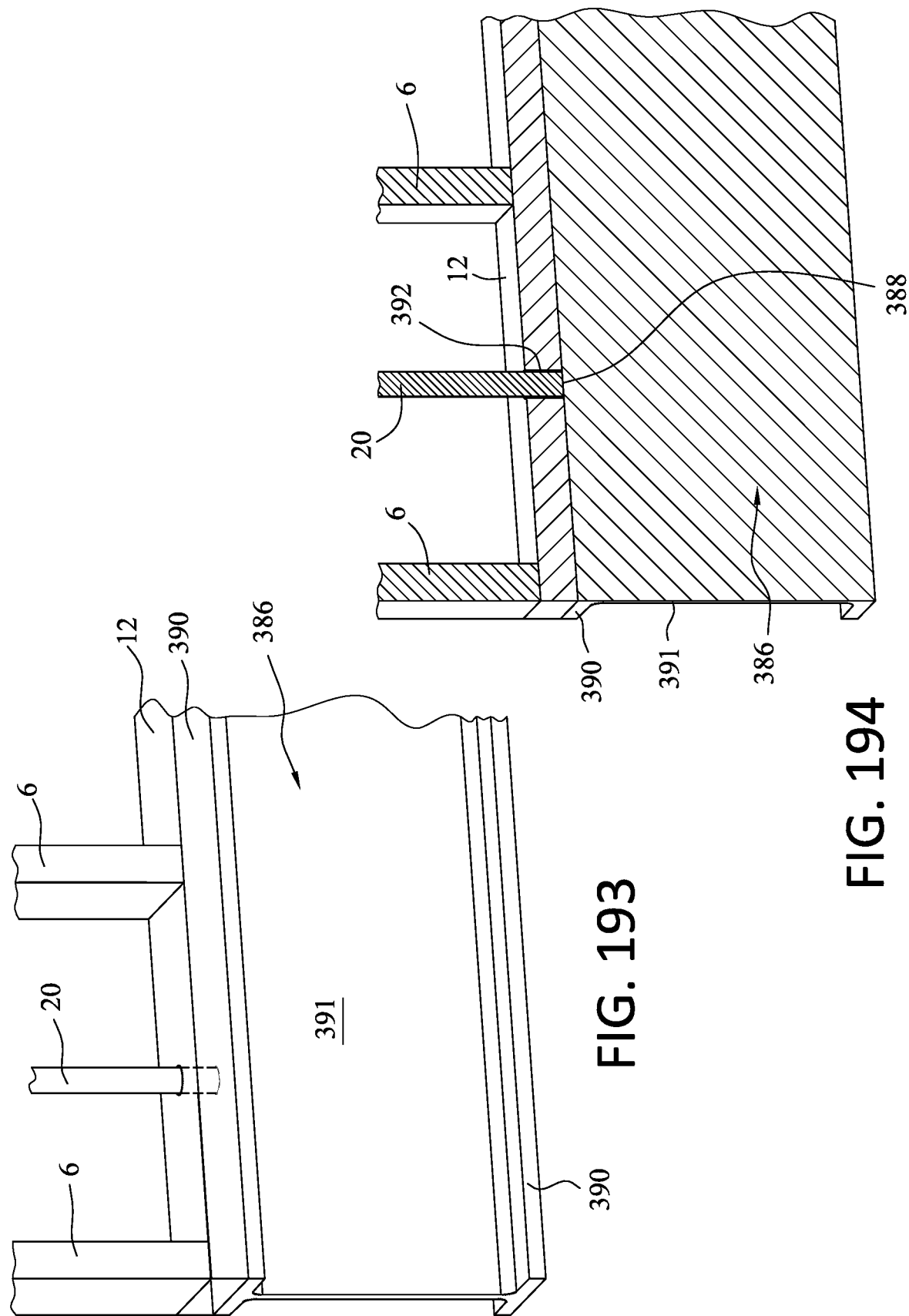

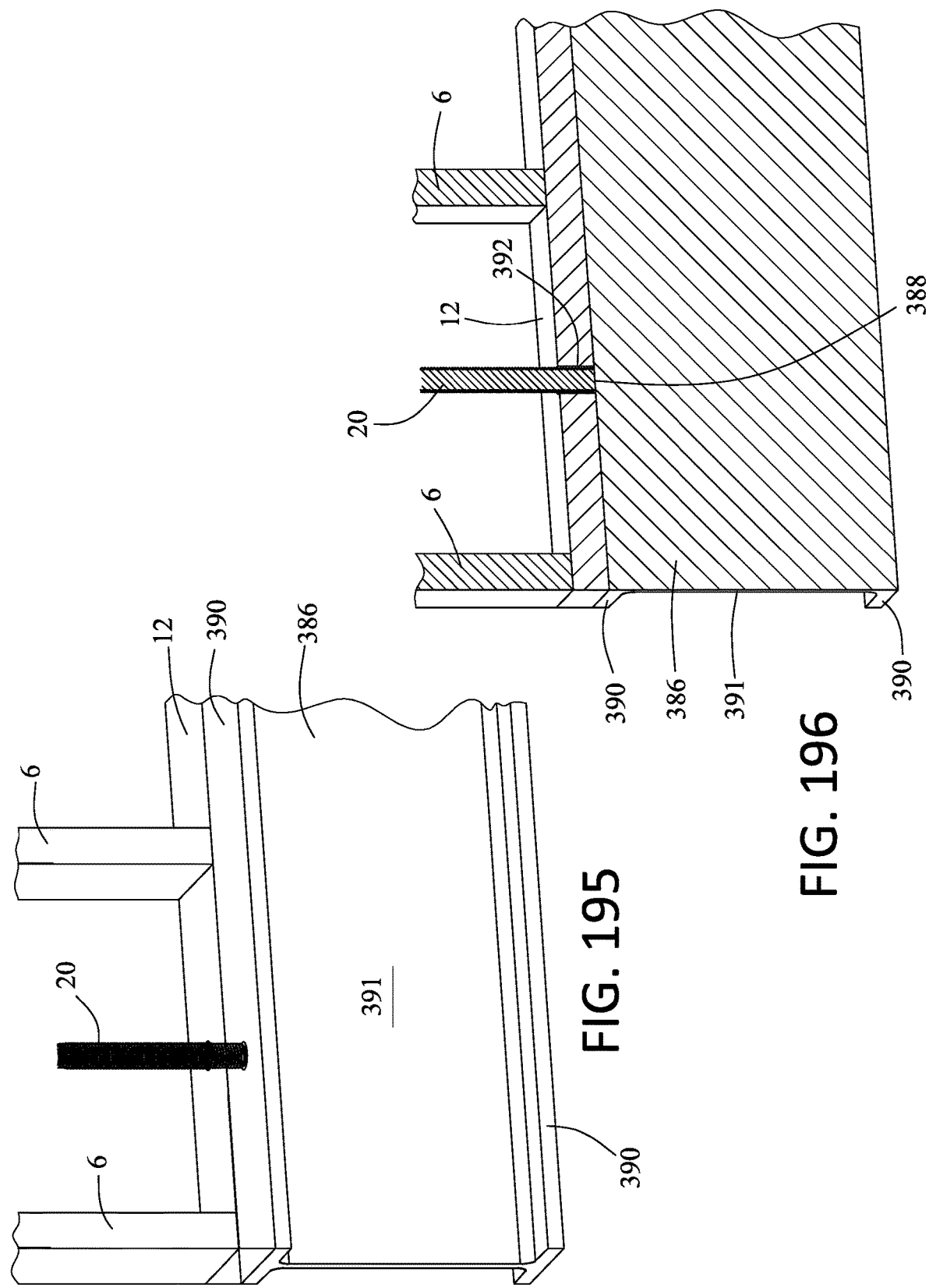

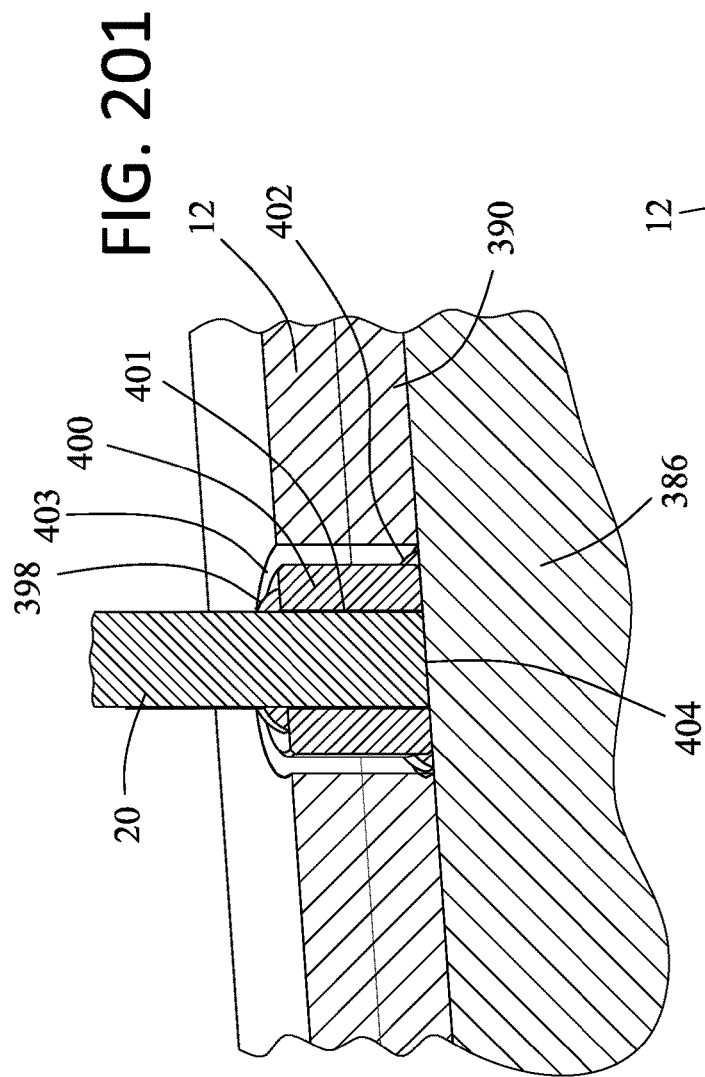
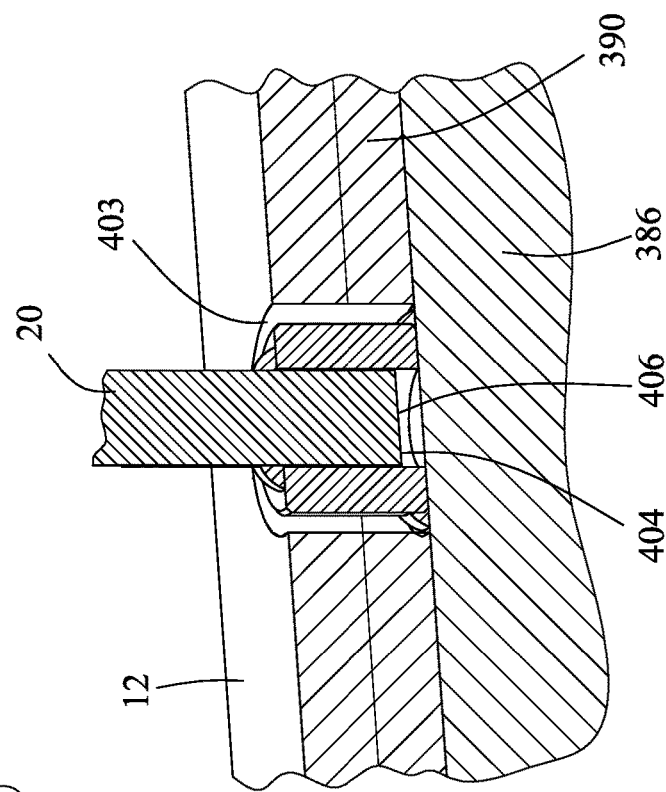
FIG. 201
FIG. 202

COMPRESSION AND TENSION REINFORCED WALL

RELATED APPLICATION

This is a divisional application of Nonprovisional application Ser. No. 16/415,595, filed May 17, 2019, claiming the priority benefit of Provisional Application Ser. No. 62/672,809, filed May 17, 2018, both applications being hereby incorporated herein by reference.

FIELD OF THE INVENTION

The present invention is generally directed to reinforced building walls designed to resist static and dynamic compression and tension forces.

BACKGROUND OF THE INVENTION

Reinforced building walls using threaded rods anchored to the foundation are disclosed in the prior art. For example, see U56951078, U57762030, U58136318, U.S. Pat. No. 8,943,777, U59097000, U59097001, U59416530 and U59874009, hereby incorporated herein by reference. These walls are designed to hold the walls against tension loads or forces caused by earthquakes and/or high winds.

SUMMARY OF THE INVENTION

The present invention discloses the use of rods as posts in building wall to transfer compression loads to the foundation. The present invention advantageously reduces the amount of material used in shear walls. The present invention uses rods anchored to the foundation as posts, allowing compression forces to be shifted from the framing members to the rods, thereby reducing the number of framing members to carry the same load.

Compression forces are both static and dynamic. Static compression comes from weight of the wall above. Dynamic compression comes from added load when one corner of a shear wall is lifted, shifting load to the opposite corner. Load on the wall comes from downward force in a particular place of the building, wood beam load, etc. Short term duration loading comes from earthquake or high winds. Dynamic compression loading comes from movement of the wall.

By using rods with larger diameter than typically used for holding down a wall for tension forces as when the wall is lifted up due to earthquakes or high winds, the same rods advantageously function as posts to provide a direct path to the foundation for compression forces.

The present invention provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal first bridge member disposed between the first stud and the second stud, the first bridge member having a first vertical opening; a rod post having one end operably connected to the anchor rod and operably connected to the first bridge member to transfer downward forces from the first bridge member and the second bridge member to the rod post; the anchor rod is attached to an anchor; and the anchor is disposed in an upper portion of the foundation.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal first bridge member disposed between the first stud and the second stud, the first bridge member having a first vertical opening; a second stud wall disposed above the first stud wall; the second stud wall having a second bottom plate, a second top plate and third and fourth vertical studs operably joined to the second bottom plate and the second top plate; a horizontal second bridge member disposed between the third stud and the fourth stud, the second bridge member having a second vertical opening; a rod post having one end operably connected to the anchor rod and an opposite end received within the second vertical opening, the rod post extending through the first vertical opening, the first top plate and the second bottom plate; and the rod post is operably connected to the first bridge member and the second bridge member to transfer downward forces from the first bridge member and the second bridge member to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; first floor joists supported by the first top plate; a first subfloor supported by the floor joists; a first horizontal compression plate disposed between the first top plate and the first subfloor, the first horizontal compression plate having a first opening; a second stud wall disposed above the first stud wall; the second stud wall having a second bottom plate, a second top plate and third and fourth vertical studs operably joined to the second bottom plate and the second top plate; second floor joists supported by the second top plate; a second subfloor supported by the second floor joists; a second horizontal compression plate disposed between the second top plate and the second subfloor, the second horizontal compression plate having a second opening; a rod post having one end operably connected to the anchor rod and an opposite end received within the second opening, the rod post extending through the first top plate, the first opening, the first subfloor and the second bottom plate; and the rod post is operably connected to the first compression plate and the second compression plate to transfer downward forces from the first compression plate and the second compression plate to the rod post.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a first horizontal bridge member disposed between the first stud and the second stud, the first horizontal bridge member having a first vertical opening; a second stud wall disposed above the first stud wall; the second stud wall having a second bottom plate, a second top plate and third and fourth vertical studs operably joined to the second bottom plate and the second top plate; a second horizontal bridge member disposed between the third stud and the fourth stud, the second horizontal bridge member having a vertical second opening; a coupling having first threaded end and a second threaded end, the first threaded end being operably connected to the anchor rod, the second threaded end bearing on an underside of the first bridge member; a rod having one end operably attached to the first threaded end and an opposite end received within the second opening, the rod extending through the first vertical opening, the first top plate and the second bottom plate; and the rod post is operably connected to the second bridge member to transfer downward forces from the second bridge member to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a second stud wall disposed above the first stud wall; the second stud wall having a second bottom plate, a second top plate and third and fourth vertical studs operably joined to the second bottom plate and the second top plate; a first coupling having a first internal threaded end and a second internal threaded end, the first internal threaded end being operably connected to the anchor rod; a first rod extending through between the first stud wall and the second stud wall, the first rod having a first end and a second end, the first end is threaded to the second internal threaded end; and a second coupling disposed in the second stud wall, the second coupling having a third internal threaded end and a fourth end, the third internal threaded end is connected to the second end of the rod, the fourth end is operably connected to the second stud wall.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal first bridge member disposed between the first stud and the second stud, the first bridge member having a vertical first opening; a second stud wall disposed above the first stud wall; the second stud wall having a second bottom plate, a second top plate and third and fourth vertical studs operably joined to the second bottom plate and the second top plate; a horizontal second bridge member disposed between the third stud and the fourth stud, the second bridge member having a vertical second opening; a first coupling having a first internal threaded end and a second internal threaded end, the first internal threaded end being operably connected to the anchor rod, the second internal threaded end bearing on a bottom of the first bridge member; a first rod extending through the first opening, the threaded rod having a third end and a fourth end, the third end is connected to the second internal threaded end; a second coupling having a fifth internal threaded end and a sixth internal threaded end, the fifth internal threaded end is connected to the fourth end, the fifth internal threaded end bearing on top of the first bridge member; a second rod having a seventh end and a eighth end, the seventh end is connected to the sixth threaded end one end and the eight end is received in the second opening, the second rod extending through the first top plate and the second bottom plate; and a nut threaded to the second rod and operably bearing on a bottom of the second bridge member for transferring downward forces from the first bridge member to the second rod.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal first bridge member disposed between the first stud and the second stud, the first bridge member having a vertical first opening; a second stud wall disposed above the first stud wall; the second stud wall having a second bottom plate, a second top plate and third and fourth vertical studs operably joined to the second bottom plate and the second top plate; a first coupling having a first internal threaded end and a second internal threaded end, the first internal threaded end being operably connected to the anchor rod, the second internal threaded end bearing on a bottom of the first bridge member; a headless bolt extending into the first opening, the threaded rod having a third end and a fourth end, the third end is connected to the second internal threaded end; a second coupling having a fifth internal threaded end and a sixth internal threaded end, the fifth internal threaded end is connected to the fourth end, the fifth internal threaded end is disposed inside the first vertical opening, the fifth internal threaded end bearing on top of the first coupling; and a second rod having a seventh end and a eighth end, the seventh end is connected to the sixth threaded end one end and the eight end is operably attached to the second stud wall.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal bridge member disposed between the first stud and the second stud; and a rod post having a first end and a second end, the first end is operably connected to the anchor rod, the second end is operably connected to the bridge member to transfer downward forces from the bridge member to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a second stud wall disposed above the first stud wall; the second stud wall having a second bottom plate, a second top plate and third and fourth vertical studs operably joined to the second bottom plate and the second top plate; a horizontal bridge member disposed between the third stud and the fourth stud, the bridge member having a threaded vertical opening; and a rod post having one end operably connected to the anchor rod and an opposite end threaded to the threaded vertical opening of the bridge member to transfer downward forces from the bridge member to the rod post.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; floor joists supported by the first top plate; a subfloor supported by the floor joists; a second stud wall disposed above the first stud wall; the second stud wall having a second bottom plate, a second top plate and third and fourth vertical studs operably joined to the second bottom plate and the second top plate; a compression plate bearing on an underside of the subfloor, the compression plate having a threaded opening; and a rod post having one end operably connected to the anchor rod and an opposite end threaded to the threaded opening of the compression plate to transfer downward forces from the compression plate to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a second stud wall disposed above the first stud wall; the second stud wall having a second bottom plate, a second top plate and third and fourth vertical studs extending between the second bottom plate and the second top plate, the third and fourth studs having bottom ends; a compression plate having an opening and disposed on the second bottom plate, the bottom ends of the third and fourth studs bearing on the compression plate; and a rod post having one end operably connected to the anchor rod and an opposite end operably connected to the opening of the compression plate to transfer downward forces from the compression plate to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a second stud wall disposed above the first stud wall; the second stud wall having a second bottom plate, a second top plate and third and fourth vertical studs extending between the second bottom plate and the second top plate, the third and fourth studs having bottom ends; a third stud wall disposed above the second stud wall; the third stud wall having a third bottom plate, a third top plate and fifth and sixth vertical studs operably joined to the third bottom plate and the third top plate; a compression plate having a first opening and disposed on the second bottom plate, the bottom ends of the third and fourth studs bearing on the compression plate; a bridge member disposed on the third bottom plate, the bridge member having a second opening; and a rod post extending through the first opening of the compression plate, the rod post having one end operably connected to the anchor rod and an opposite end operably connected to the second opening of the bridge member to transfer downward forces from the bridge member to the rod post.

The present invention also provides a reinforced building wall, comprising a stud wall disposed above a foundation; the stud wall having a bottom plate, a top plate and first and second vertical studs operably joined to the bottom plate and the top plate; a compression plate bearing on an underside of the top plate, the compression plate is disposed between the first stud and the second stud, the compression plate having an opening; and a rod post having one end operably anchored to the foundation and an opposite end operably attached to the compression plate to transfer downward forces from the compression plate to the rod post.

The present invention further provides a reinforced building wall, comprising a foundation; a first stud wall disposed above the foundation; the first stud wall having a first bottom plate, a first top plate and first and second vertical studs operably joined to the bottom plate and the top plate; a horizontal first bridge member disposed between the first stud and the second stud; and a first rod post having a first end and a second end, the first end bears directly on the foundation, the second end is operably connected to the bridge member to transfer downward forces from the bridge member to the first rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a horizontal bridge member disposed between the first stud and the second stud, a vertical opening extending from top to bottom of the bridge member; a cylindrical body disposed in the vertical opening with a first threaded end extending past the top and a second threaded end extending past the bottom of the bridge member, the cylindrical body including a central opening; a first bearing plate with a first threaded opening threaded to the first threaded end to bear on the top of the bridge member; a second bearing plate with a second threaded opening threaded to the second threaded end to bear on the bottom of the bridge member; and a first rod post having a first end and a second end, the first end is operably connected to the anchor rod, the second end is operably attached to the cylindrical body.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; first floor joists supported by the first top plate; a first subfloor supported by the first floor joists; a first horizontal bridge member disposed between the first top plate and the first subfloor, the first horizontal bridge member having a first opening, the first bridge member extending between the first top plate and the first subfloor; and a rod post is operably connected to the anchor rod and the first bridge member to transfer downward forces from the first bridge member to the rod post.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; first floor joists supported by the first top plate; a first subfloor supported by the first floor joists; a first horizontal bridge member disposed between the first top plate and the first subfloor, the first horizontal bridge member having a first opening, the first bridge member extending between the first top plate and the first subfloor; a first cylindrical body disposed in the first opening with a first end extending past a top and a second end extending past a bottom of the first horizontal bridge member, the first end including a first exterior thread and a first threaded bore, the second end including a second exterior thread and a second threaded bore; a first bearing plate with a first threaded opening threaded to the first exterior thread end to bear on the top of the first horizontal bridge member; a second bearing plate with a second threaded opening threaded to the second exterior thread to bear on the bottom of the first horizontal bridge member; and a rod post is operably connected to the anchor rod and the second bore to transfer downward forces from the first bridge member to the rod post.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; first floor joists supported by the first top plate; a first subfloor supported by the first floor joists; a first cylindrical body disposed between the first top plate and the first subfloor; and a rod post is operably connected to the anchor rod and threaded to the first central opening.

The present invention further provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a cross-laminated timber (CLT) floor panel supported by the first top plate; a second stud wall disposed above the first stud wall; the second stud wall having a second bottom plate supported by the CLT floor panel, a second top plate and third and fourth vertical studs operably joined to the second bottom plate and the second top plate; a first cylindrical body disposed between the first top plate and the second bottom plate, the first cylindrical body extending through the CLT floor panel, the first cylindrical body including a first central opening with a first threaded portion; the first cylindrical body including a first threaded end and a second threaded end; a first bearing plate with a first threaded opening threaded to the first threaded end to bear against the CLT floor panel; a second bearing plate with a second threaded opening threaded to the second threaded end to bear against the CLT floor panel; and a rod post operably connected to the anchor rod and threaded to the first central opening.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a cross-laminated timber (CLT) floor panel supported by the first top plate; a second stud wall disposed above the first stud wall; the second stud wall having a second bottom plate supported by the CLT floor panel, a second top plate and third and fourth vertical studs operably joined to the second bottom plate and the second top plate; a body embedded in the CLT floor panel, the body including a threaded opening; and a rod post operably connected to the anchor rod and threaded to the threaded opening of the body.

The present invention also provides a reinforced building wall, comprising a foundation and an anchor rod anchored to the foundation; a first stud wall disposed above the foundation; the first stud wall having a first bottom plate, a first top plate and first and second vertical studs operably joined to the first bottom plate and the first top plate; a cross-laminated timber (CLT) floor panel supported by the first top plate; a second stud wall disposed above the first stud wall; the second stud wall having a second bottom plate supported by the CLT floor panel, a second top plate and third and fourth vertical studs operably joined to the second bottom plate and the second top plate; a first body bearing on the second bottom plate, the body including a first threaded opening; a rod post operably connected to the anchor rod and extending through the top plate, the CLT floor panel and the second bottom plate, the rod post is threaded to the threaded opening of the body; a second body including a second threaded opening threaded to the rod post to bear on an underside of the first top plate.

The present invention further provides a building wall, comprising a foundation made of a wood beam; studs extending upwardly from the wood beam; and a metal post having a bottom end operably bearing on the wood beam to transfer compression forces from the metal post to the wood beam.

The present invention also provide a building wall, comprising a foundation made of a wood beam having a first opening extending from a top surface to a bottom surface of the wood beam; studs extending upwardly from the wood beam; a first bearing plate disposed on a top surface of the wood beam, the first bearing plate including a second opening; a second bearing plate disposed on a bottom surface of the wood beam, the second bearing plate including a third opening; a rod post including a bottom end portion extending through the first opening, the second opening and the third opening; and the rod post is operably attached to the first bearing plate and the second bearing plate to transfer compression forces and tension forces from the rod post to the wood beam.

The present invention further provides a building wall, comprising a foundation made of a wood beam having a first opening extending from a top surface to a bottom surface of the wood beam; studs extending upwardly from the wood beam; a bearing plate disposed on a bottom surface of the wood beam, the bearing plate including a second opening; the rod post includes a first diameter and the bottom end portion of the rod post includes a second diameter smaller than the first diameter; the rod post includes a shoulder at a juncture where the bottom end portion with the second diameter meets the rod post with the first diameter; the bottom end portion extending through the first opening and the second opening, with the shoulder bearing on a top surface of the wood beam; and the second opening is threaded to the bottom end portion to bear on a bottom surface of the wood beam.

The present invention provides a building wall, comprising a foundation made of a steel beam including a first flange and a second flanged joined together by a web; a stud wall above the steel beam, the stud wall including a base plate disposed on the first flange; and a rod post having a bottom end portion extending through the bottom plate and bearing on the first flange.

BRIEF DESCRIPTION OF THE DRAWINGS

FIGS. 175-192 show connections of a rod post to a wood beam foundation.

FIGS. 193-210 show connections of a rod post to a metal beam foundation.

DETAILED DESCRIPTION OF THE INVENTION

Figure 1:
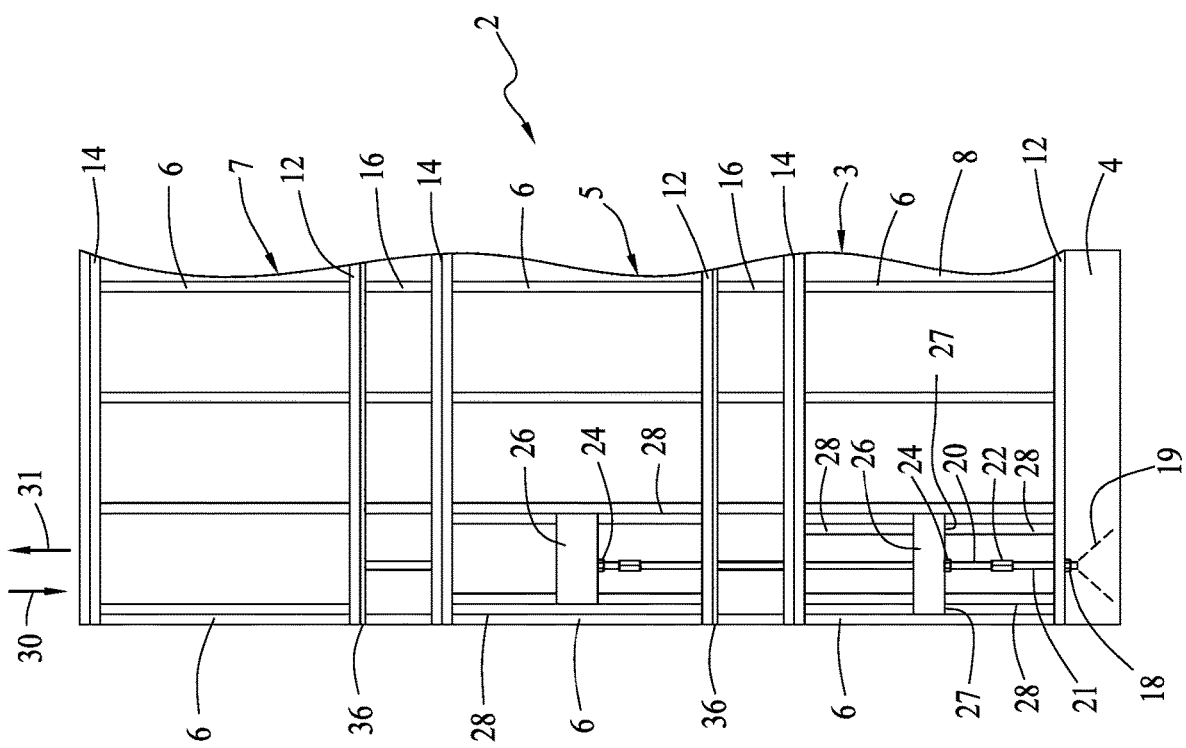
FIGS. 1-62 show several embodiments of attaching a bridge member to the building wall to transfer compression loads or forces directly to the foundation via a rod post.

Referring to FIG. 1, a shear wall 2 supported incorporating the present invention is disclosed. The shear wall 2 forms a part of a building. The wall 2 is shown is a 3-story wall, comprising a lower wall 3, a middle wall 5 and an upper wall 7. It should be understood that the wall 2 may be more or less than 3 stories, where the middle wall 5 may be made of one or more walls above the lower wall 3 and below the upper wall 7.

The wall 2 is supported on a concrete foundation 4. It should be understood that the foundation 4 can also be a steel I-beam, wood beam, concrete slab, or a concrete wall that is directly or indirectly anchored to the ground. The wall 2 is made of vertical studs 6, which may be wood or metal. Wall sheathing 8 is operably attached to the studs 6, such as with nails or screws. The studs 6 are operably attached to respective horizontal bottom plates 12 and horizontal top plates 14. Floor joists 16 are supported on the respective top plates 14. Subfloors 36 are supported by respective floor joists 16. Subfloors 36 are typically made of plywood sheets laid out over the floor joists 16.

An anchor 18 is embedded in concrete in the foundation 4 in the upper portion of the foundation 4. Depending on the size of the foundation 4, the anchor 18 may be able to handle both compression and tension forces with the appropriate location of the anchor 18 within the foundation 4. For example, if the anchor 18 is located in the upper portion of the foundation 4, the anchor 18 will be able to handle compression forces through the shear cone 19. If the anchor 18 is located deeper into the foundation 4, the anchor 18 will be able to handle both compression and tension forces through the shear cones 19 and 65 (see FIG. 27).

The anchor 18 may be a standard nut, a metal plate, a cylindrical body, or any of the anchors disclosed in U.S. Pat. Nos. 8,943,777, 9,097,001, 9,222,251, 9,416,530, 9,447,574, 9,702,139, 9,874,009, hereby incorporated herein by reference. The location of the anchor near the top of the foundation 4 advantageously provides a larger shear cone 19 as compared to a location of the anchor 18 toward the bottom of the foundation 4. The shear cone 19 is generated when the anchor 18 is subjected to compression loading from the wall 2. Further discussion of shear cones may be found, for example, in U.S. Pat. No. 8,943,777, and application Ser. No. 15/429,345, filed Feb. 10, 2017, both of which are hereby incorporated herein by reference.

A rod post 20 is operably attached to an anchor rod 21 with a coupling 22. The anchor rod 21 is operably attached to the anchor 18. The rod post 20 extends through openings in the compression bridge members 26 and through openings in the top plates 14 of the lower wall 3 and the bottom plate 12 of the middle wall 5. The rod post 20 may be threaded or unthreaded (except where needed as disclosed herein), as shown in the various drawings herein, of sufficient diameter, such as 2 inches or more, to prevent bowing or bending from compression loads. The rod post 20 is advantageously connected directly to the foundation 4 to provide a direct path for the loads to the foundation.

The diameter of the rod post 20 may change from floor to floor, depending on the number of walls being supported above each wall. For example, for the lower wall 3, the diameter of the rod post below the bridge member may be larger than the diameter of the rod post above. Coupling a larger diameter rod post to a smaller diameter is disclosed herein.

The openings through the bridge members 26 may be threaded or unthreaded. One compression bridge member is disposed in the lower wall 3 and the other compression bridge member 26 in the middle wall 5. The compression bridge members may be made of sawn lumber, engineered wood, metal, plastic, etc. The compression bridge members 26 are designed to transfer loading from the wall 2 to the rod post 20 and thence to the anchor 18 and the foundation 4. Where the openings in the compression bridge members are unthreaded, nuts 24 disposed below the bridge member and threaded to the rod post 20 advantageously transfer the compression or downward forces from the compression bridge members 26 to the rod post 20. Where the openings in the compression bridge members are unthreaded, nuts 24 disposed above the bridge member and threaded to the rod post 20 advantageously transfer the tension or upward forces from the compression bridge members 26 to the rod post 20. Where the openings are threaded and the rod post is threaded to the openings, the threaded connection between the bridge member and the rod post advantageously transfer the compression or downward forces or the tension forces or upward from the bridge member to the rod post 20 without the use of the nuts 24. The nuts 24 may be any metal body with a threaded hole, such as the threaded metal plate 228 shown, for example, in FIG. 147, or a circular metal plate 298 shown, for example, in FIG. 154.

Trimmer studs 28 extend from the underside of the respective bridge members 26 to the respective bottom plates 12 and from the top of the respective bridge members 26 to the respective top plates 14. Compression and tension forces in the wall 2 are advantageously transferred to the compression bridge members 26 from the studs 6 and trimmer studs 28. The trimmer studs 28 in the lower wall 3 are preferably doubled to advantageously provide a larger bearing surface 27 for the bridge member 26 to handle the expected larger loading from compression and tension forces at this location. The trimmer studs 28 in the middle wall 5 are preferably single to handle the reduced loading at that location. The bridge members 26 may also be attached directly to the studs 6, as will be disclosed herein. The studs 6 and the trimmer studs 28 with ends bearing on the bridge members 26 advantageously transfer compression or tension forces from the wall 2 to the bridge members 26. Connecting the bridge members 26 fixedly to the rod post 20 with the nuts 24 or the threaded connection advantageously transfer the compression or tension forces to the rod post 20 and thence to the foundation 4.

Compression or downward forces 30 are due to wall weight, shifting or racking of the wall 2 at the opposite end caused by earthquake or high winds. Tension or upward forces 31 are due to lifting of the wall 2 from earthquake or high winds.

Figure 2:
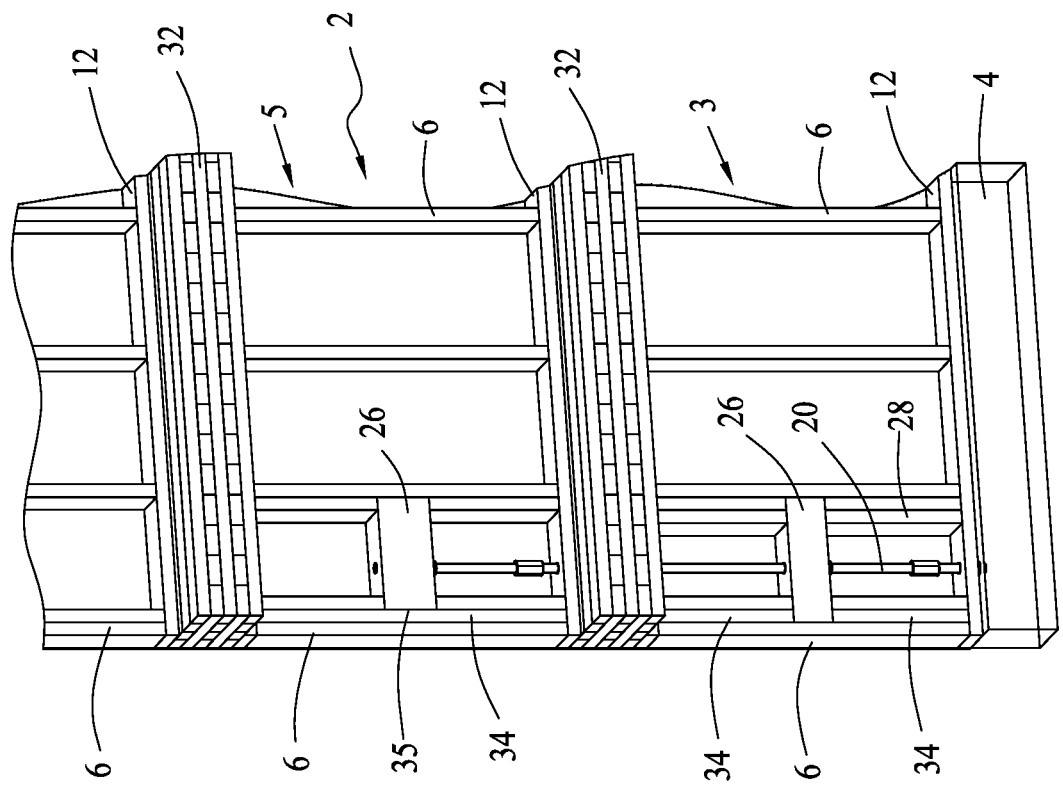

Referring to FIG. 2, the wall 2 is shown with a cross-laminated timber (CLT) floor panel 32. CLT is discussed in application Ser. No. 16/296,865, filed Mar. 8, 2019 and Provisional Application Ser. No. 62/800,966, filed Feb. 4, 2019, both of which are hereby incorporated herein by reference. The rod post 20 extends through an opening in the CLT floor panel 32.

The CLT floor panel 32 is lightweight yet very strong, with superior acoustic, fire, seismic, and thermal performance, proving to be a highly advantageous alternative to conventional materials like concrete, masonry, or steel, especially in multi-family and commercial construction. Finished CLT panels are typically 2 to 10 feet wide, with lengths up to 60 feet and thickness up to 20 inches. Widths up to 18 feet and lengths up to 98 feet are possible. For additional information, see, for example, https://www.apawood.org/cross-laminated-timer, hereby incorporated herein by reference.

Wood posts 34 replace some of the trimmer studs 28 at the far end of the wall 2. The use of the posts 34 advantageously provides greater load capacity for compression and tension loads. The wood posts 34 in the lower wall 3 extend from the underside of the bridge member 26 to the bottom plates 12 and from the top of the bridge member 26 to the top plates 14. The wood post 34 in the middle wall 5 includes a slot 35 for receiving an end portion of the bridge member 26. The wood posts 34 are typically 4×4, 4×6 or 6×6 inches, while the studs 6 or the trimmer studs 26 are typically 2×4 or 2×6 inches.

Figure 3:
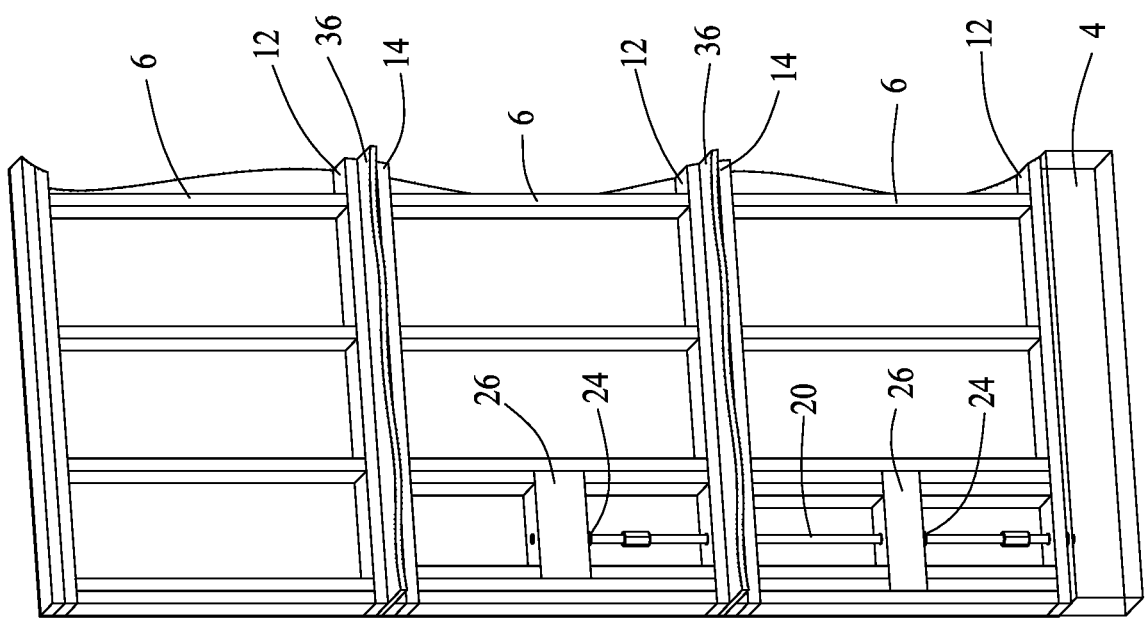

Referring to FIG. 3, a subfloor 36 in place of the CLT floor panel 32 is disposed between the respective top plates 14 and the respective bottom plates 12. Floor joists (not shown) are secured to other structural portions of the building.

Figure 4:
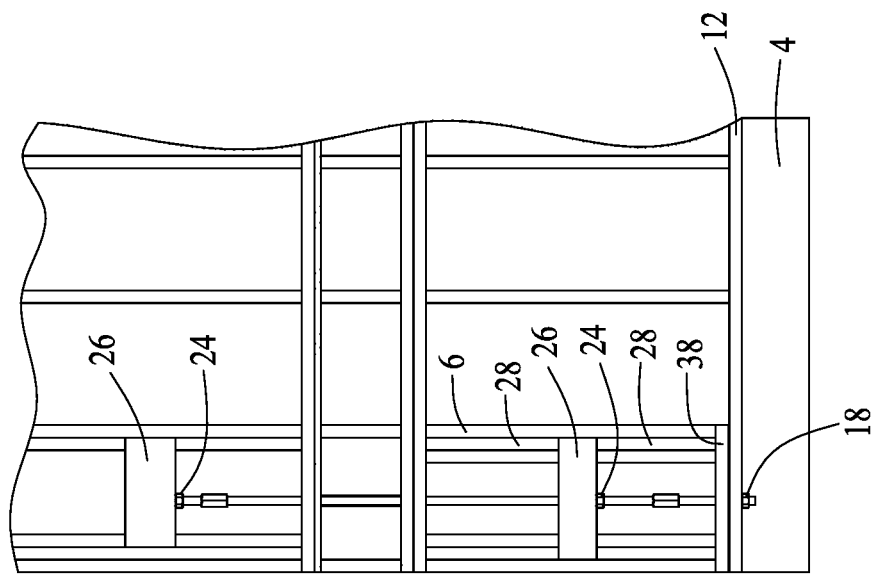

Referring to FIG. 4, a compression plate 38 is disposed between the bottom plate 12 and the bottom ends of the studs 6 and the trimmer studs 28. Compression plates are disclosed in application Ser. No. 16/296,865, filed Mar. 8, 2019, which is a nonprovisional of Provisional Application Ser. No. 62/641,142, filed Mar. 9, 2018, both of which are hereby incorporated herein by reference. The compression plate 38 is advantageously harder than the bottom plate 12 to spread the forces from the studs 6 and the trimmer studs 28 over a larger area on the bottom plate 12 to minimize crushing of the bottom plate 12. The compression plate 38 may be made of a harder species of wood than the bottom plate 12. The compression plate 38 may also be made of engineered wood, metal, plastic.

Figure 5:
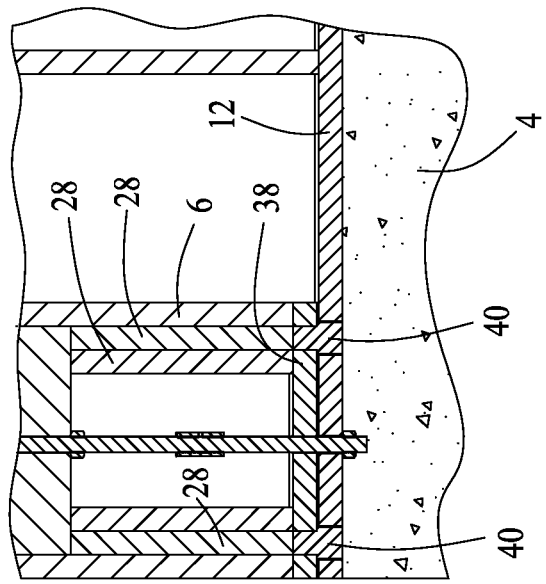

Referring to FIG. 5, the compression plate 38 and the bottom plate 12 may include openings in which inserts 40 may be placed to directly transfer the compression load from the studs to the foundation 4. The inserts 40 may be made of material with compressive strength greater than the compressive strength of the studs 6 or the trimmer studs 28, such as metal, plastic, engineered wood, hardwood, etc.

Referring to FIGS. 6 and 7, the bridge member 26 in the lower wall 3 is supported in the rod post 20 by a nut 24. A compression block 41, made of the same material as the bridge member 26, has a threaded opening 43 for threadedly receiving the anchor rod 21. Compression forces from the rod post 20 are transferred to the compression block 41, which spreads the forces over the bottom plate 12. The compression forces are also transferred to the anchor 18 and the foundation 4. No trimmer studs are disposed below the bridge member 26, since the nut 24 provides the load transfer from the bridge member 26 to the rod post 20. The bridge member 26 may be nailed or screwed to the studs 6.

The anchor 18 is preferably embedded in the upper portion of the foundation 4 to generate a larger shear cone 19 for compression forces. The anchor 18 may be located below the top surface of the foundation 4. The anchor 18 may also be flush with the top surface of the foundation 4 so that the bottom plate 12 can lay flat on the foundation 4. The anchor 18 is advantageously threaded to the anchor rod 21 transfer the compression forces from the rod post 20 to the foundation 4. The nut 24 underneath the anchor 18 advantageously provides a stop to properly position the anchor 18 on the anchor rod 21 so that the requirement amount of thread is engaged with the anchor 18. A checker nut as disclosed in U.S. Pat. No. 8,806,835, hereby incorporated herein by reference may also be used instead of a standard nut.

Figure 8:
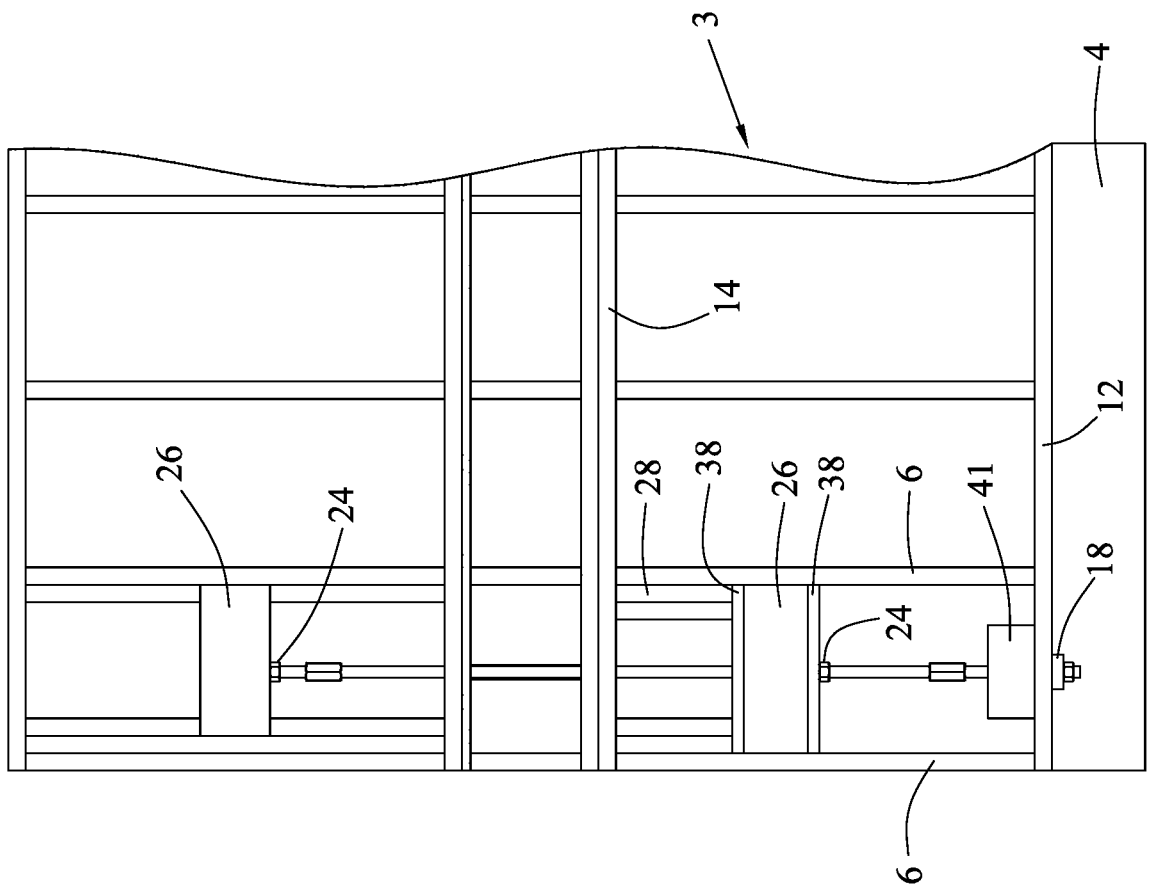

Referring to FIG. 8, the bridge member 26 in the lower wall 3 may be made of wood of the same species as the studs 6, in which case compression plates 38 are disposed below and above the bridge member 26 to advantageously increase the compressive capacity of the bridge member 26. The trimmer studs 28 extend from the top of the upper compression plate 38 to the underside of the top plate 14 to advantageously transfer compression forces from the wall to the upper compression plate 38 and the bridge member 26. The compression plates 38 are preferably as long and as deep as the bridge members 26

Referring to FIG. 9, a bridge member 44 made of engineered wood replaces the bridge member 26 in the lower wall 3 as shown in FIG. 8. A compression plate 38 is disposed on the bottom surface of the bridge member 44 to advantageously spread the compression forces on the nut 24. The bridge member 44 may be attached to the studs 6 with screws or nails. The rod post 20 extends through a hole in the bridge member 44.

Referring to FIG. 10, the bridge members 26 are disposed directly underneath the respective top plates 14 of the lower wall 3, the middle wall 5 and the upper wall 7. Compression loading from the wall is transferred from the respective top plates 14 to the respective bridge members 26 to the rod post 20 and thence to the foundation 4 via the anchor 18. The bridge members 26 and the rod post 20 advantageously provide a direct path for the compression forces to the foundation 4.

Referring to FIG. 11, the CLT floor panels 32 are disposed between the respective bottom plates 12 and the respective top plates 14. The rod post 20 extends through respective openings in the CLT floor panels 32.

Referring to FIG. 12, a subfloor 36 in place of the CLT floor panel 32 is disposed between the respective top plates 14 and the respective bottom plates 12. Floor joists (not shown) are secured to other structural portions of the building.

Figure 14:
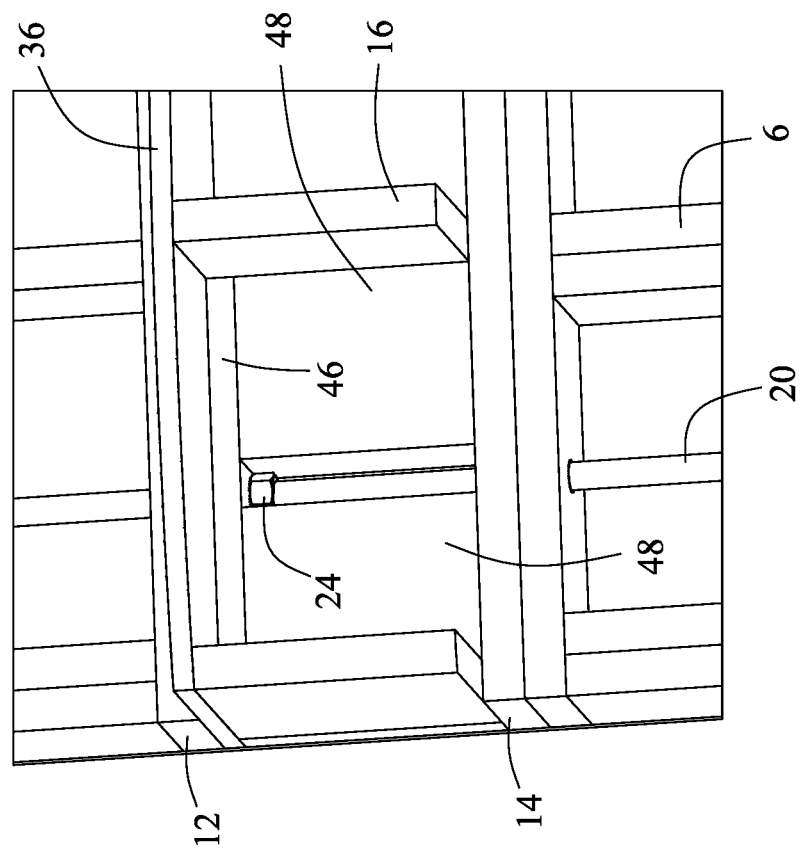
Figure 13:
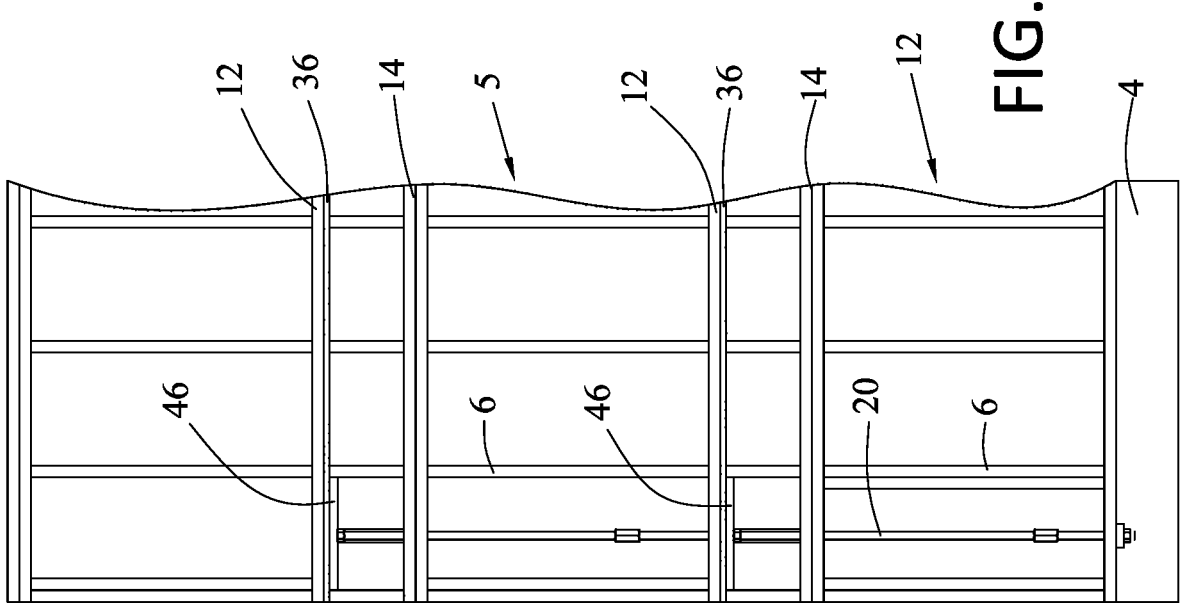

Referring to FIGS. 13 and 14, compression plates 46 are disposed directly below the subfloor 36 in the lower wall 3 and the middle wall 5. Blocking members 48 are disposed between the respective compression plates 46 and the top plates 14. The compression plates 46 are fully supported by the respective blocking members 48. Compression forces are transferred to the nuts 24 and thence to the rod post 20. The blocking members 48 advantageously transfer some of the compression forces on the compression plate 46 to the studs 6.

Figure 16:
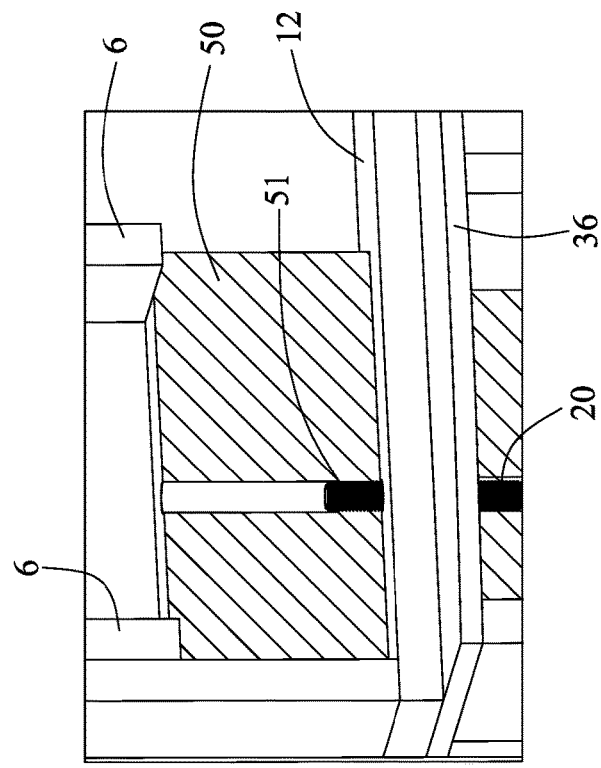
Figure 15:
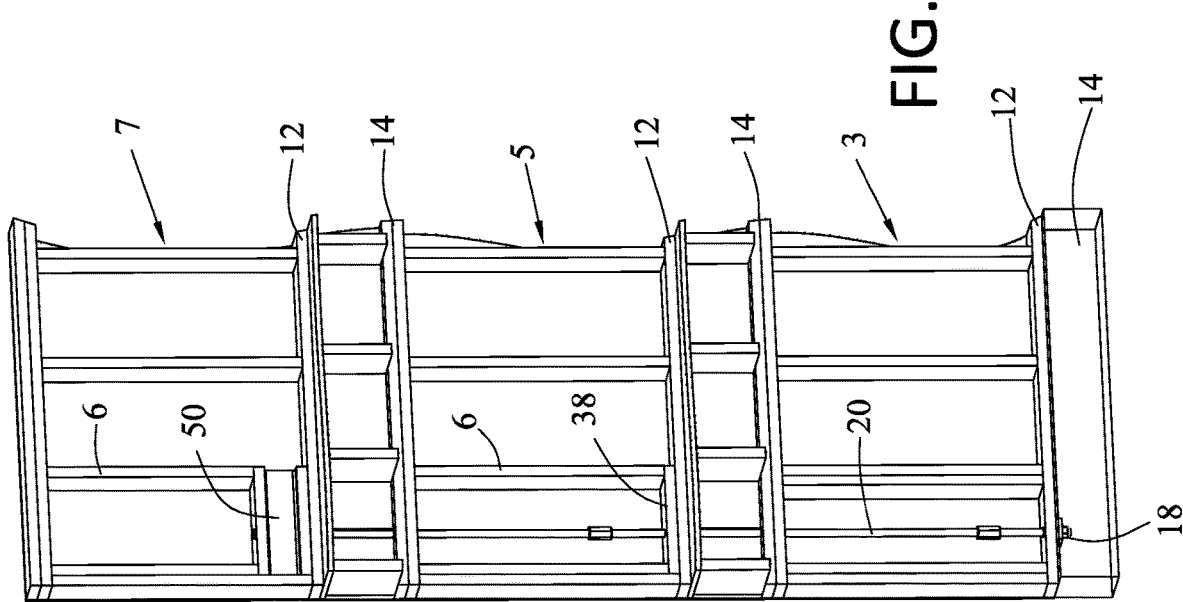

Referring to FIGS. 15 and 16, a compression bridge member 50, I-shaped as an I-beam and made of solid metal, is disposed on the bottom plate 12 of the upper wall 7. The bridge member 50 has a threaded hole 51 threadedly attached to the rod post 20. The threaded attachment advantageously provides for the transfer of compression forces directly to the rod post 20. The bottom ends of the studs 6 bear on the top side of the bridge member 50. Since the bridge member 50 has greater compressive strength than the studs 6 and the top plate 12, compressive forces are spread over a larger area than the actual footprint of the bottom ends of the studs 6, thereby to minimize crushing the bottom plate 12. The compression bridge member 50 is shown in detail in FIGS. 54 and 55.

The compression plate 38 in the middle wall 5 provides the same function as the bridge member 50. A nut (not shown but see FIG. 18 for the nut engaging the underside of the bridge member 52) threaded to the rod post 20 and engaging the underside of the compression plate 38 advantageously transfers compression loading on the compression plate 38 directly to the rod post 20. The rod post 20 extends through an unthreaded hole in the compression plate 38 to advantageously isolate the compression loading on the compression plate 38 from wall. The anchor 18 would be located at an appropriate depth within the foundation 4 to handle both compression and tension forces or another anchor 56 (see FIG. 27) may be added and located at an appropriate depth to handle tension forces.

Figure 18:
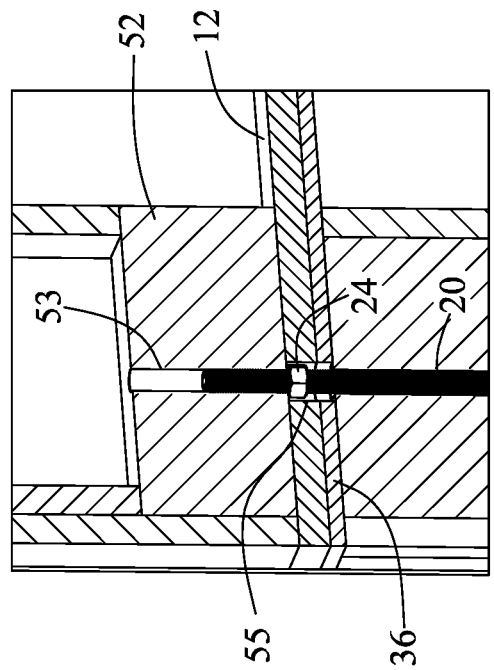
Figure 17:
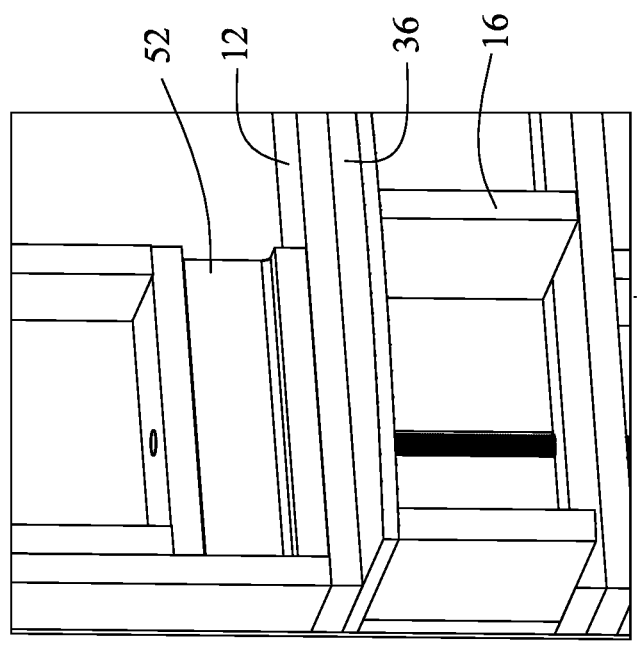

Referring to FIGS. 17 and 18, the compression bridge member 50 is modified as bridge member 52 with an unthreaded hole 53. The nut 24 connects the bridge member 52 to the rod post 20. An opening 55 in the bottom plate 12 and the subfloor 36 allows the nut 24 to reach the bottom of the bridge member 52.

Figure 19:
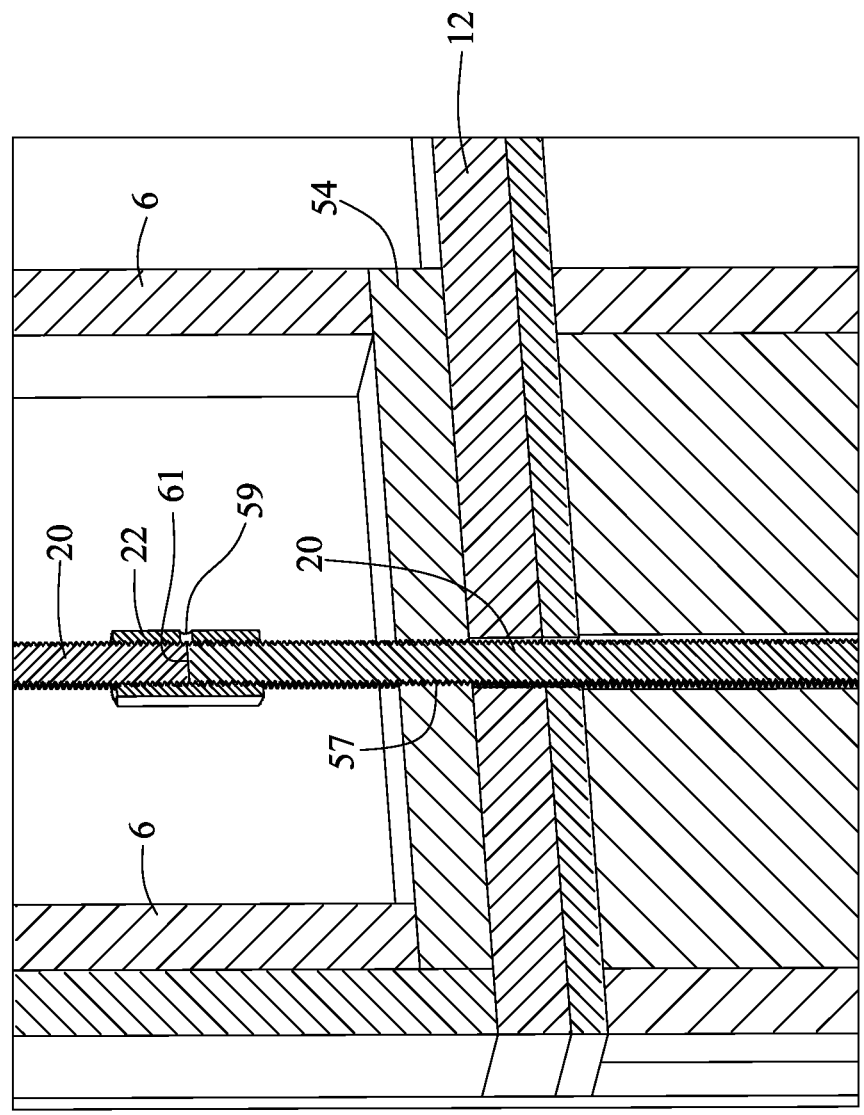

Referring to FIG. 19, a compression plate 54 made of solid metal is disposed on the bottom plate 12 with a threaded opening 57 for threadedly receiving the rod post 20. The compression plate 54 advantageously allows the transfer of compression (downward direction) or tension (upward direction) forces to the rod post 20 and thence to the foundation 4. The compression plate 54 advantageously spreads the compression forces at the bottom ends of the studs 6 over a larger area on the bottom plate 12.

The coupling 22 includes an inspection opening 59 preferably disposed halfway between the opposite ends of the coupling. The inspection opening 59 advantageously provides a visual check on the engagement of the end surfaces 61 of the rod posts 20 at the halfway point inside the coupling. This insures that the rod posts 20 are sufficiently attached to the coupling 22. The coupling 22 may have hexagonal outside surfaces to advantageously facilitate the use of a wrench or similar tool in the installation of the coupling.

Figure 20:
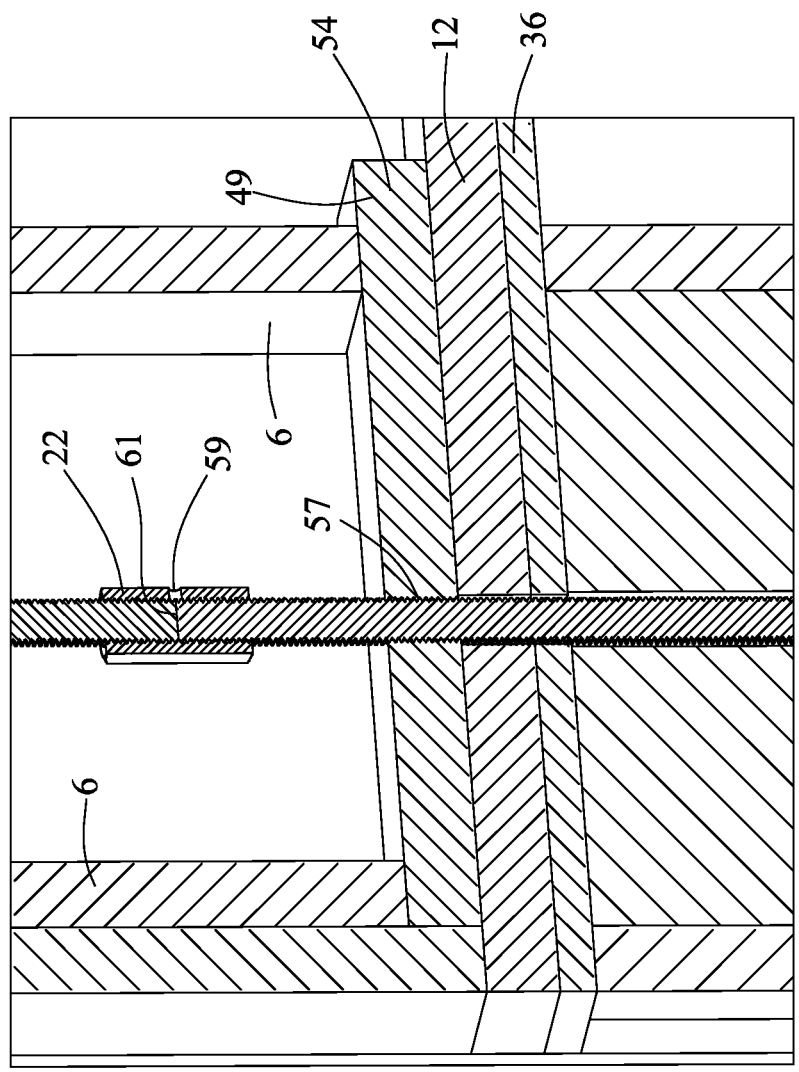

Referring to FIG. 20, one end 49 of the compression plate 54 is longer than a stud bay defined by the distance or space between the two outermost studs 6. The compression plate 54 extends outside the stud bay past the second stud 6 to advantageously allow the compression forces from the stud 6 bearing at that end to be spread over a larger area on the bottom plate 12. This is further discussed in co-pending application Ser. No. 16/296,865, hereby incorporated herein by reference. A stud bay is a distance or space between two outermost studs, typically 16 inches apart.

Figure 21:
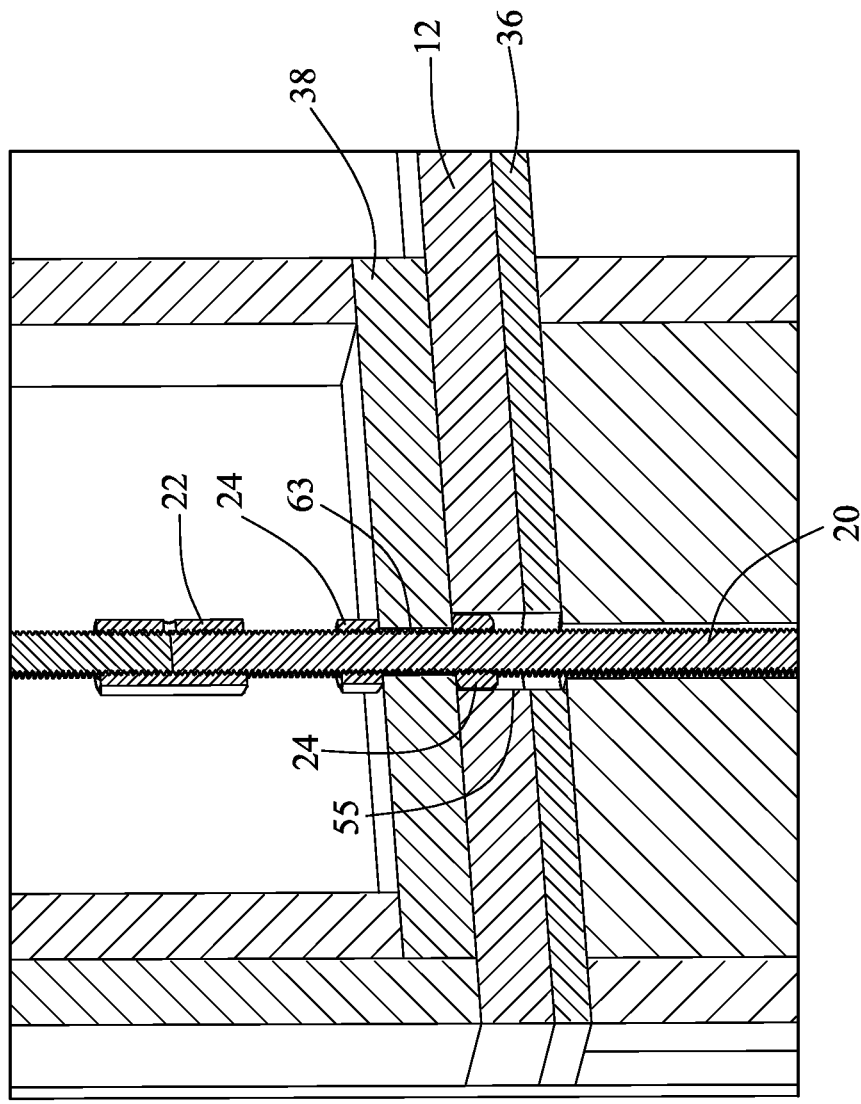

Referring to FIG. 21, the compression plate 38 has an unthreaded opening 63. Nuts 24 above and below the compression plate 38 attach the compression plate to the rod post 20. The opening 55 in the bottom plate 12 and the subfloor 36 advantageously provides room for the lower nut 24 to directly engage the bottom of the compression plate 38.

Figure 22:
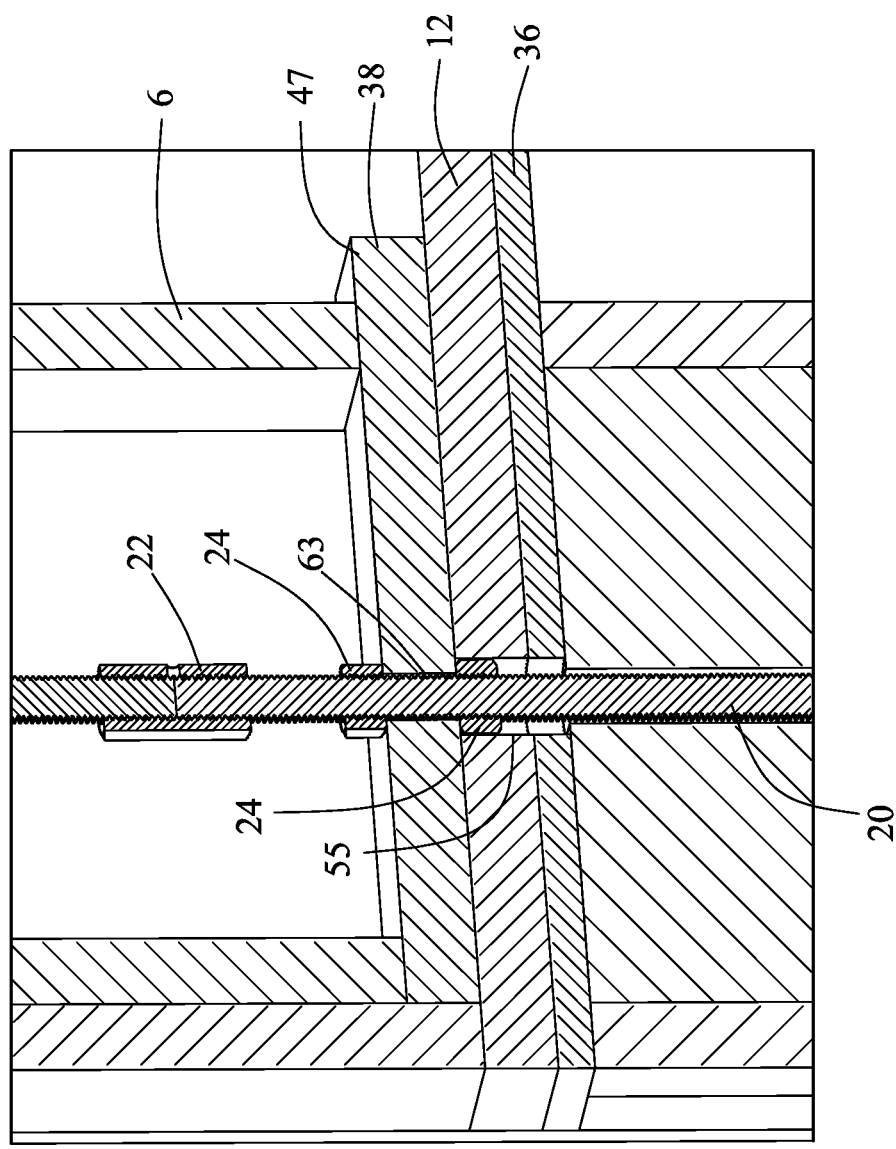

Referring to FIG. 22, one end 47 of the compression plate 38 extends outside the stud bay past the stud 6 to advantageously allow the compression forces from the stud 6 bearing at that end to be spread over a larger area on the bottom plate 12, as is the case with the end 49 in FIG. 20.

Figure 24A:
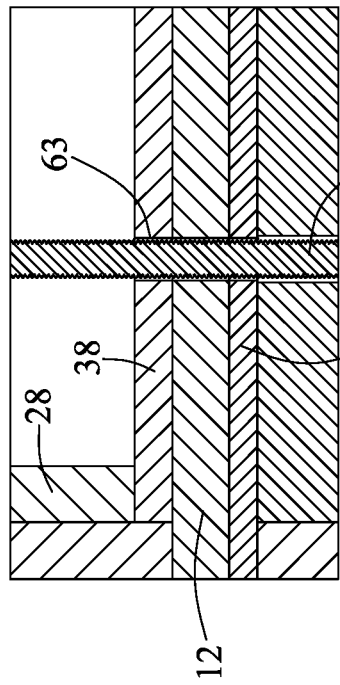
Figure 24B:
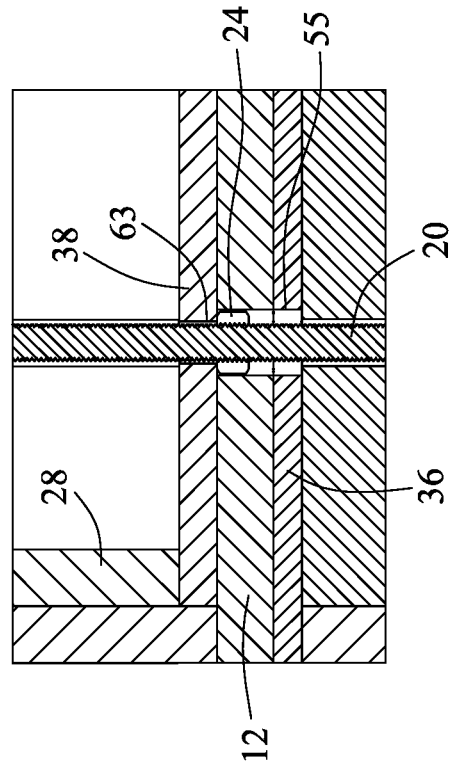
Figure 23:
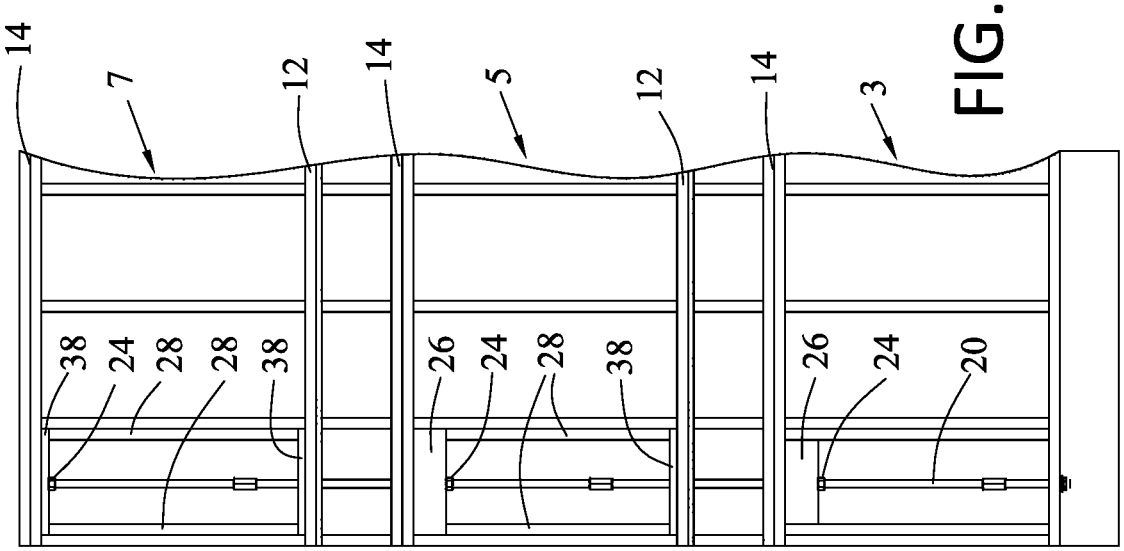

Referring to FIGS. 23, 24A and 24B, bridge members 26 are disposed against the respective top plates 14 in the lower wall 3 and the middle wall 5. The bridge members 26 have unthreaded openings through which the rod post 20 extends. Nuts 24 hold the respective bridge members 26 to the rod post 20 and provide transfer of the compression forces from the bridge members 26 to the rod post 20. Compression plates 38 are disposed on the respective bottom plates 12 in the middle wall 5 and the upper wall 7. The bottom ends of the trimmer studs 28 bear on the compression plates 38 disposed on the bottom plates 12.

A compression plate 38 is also attached to the top plate 14 in the upper wall 7. A nut 24 holds the compression plate 38 against the top plate 14 and to the rod post 20 so that compression forces from the wall is transferred to the compression plate 38 and the rod post 20. The compression plate 38 is supported by the top ends of the trimmer studs 28. The compression plate 38 has an unthreaded opening 63 through which the rod post 20 extends. Compression forces from the trimmer studs 28 pass through the compression plate 38 but are not transferred to the rod post 20 due to lack of connection between the compression plate 38 and the rod post 20 provided by the unthreaded opening 63, as shown in FIG. 24A.

The bridge member 26 in the middle wall 5 is supported by the top ends of the trimmer studs 28. The compression plate 38 connects with the rod post 20 with the nut 24 in the opening 55, as shown in FIG. 24B. The nut 24 serves to transfer the compression loading from the compression plate 38 to the rod post 20.

Figure 26A:
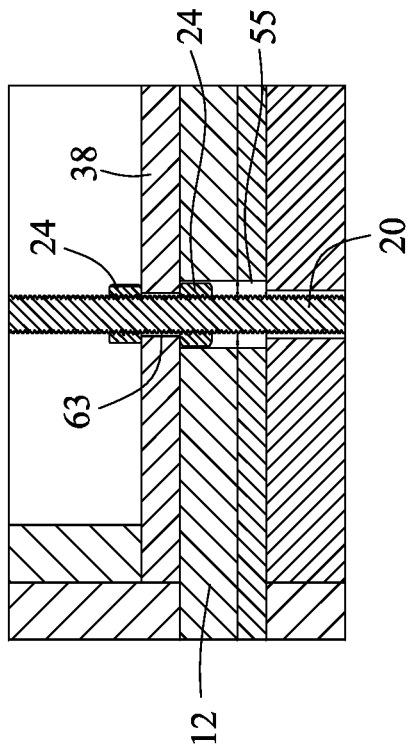
Figure 25:
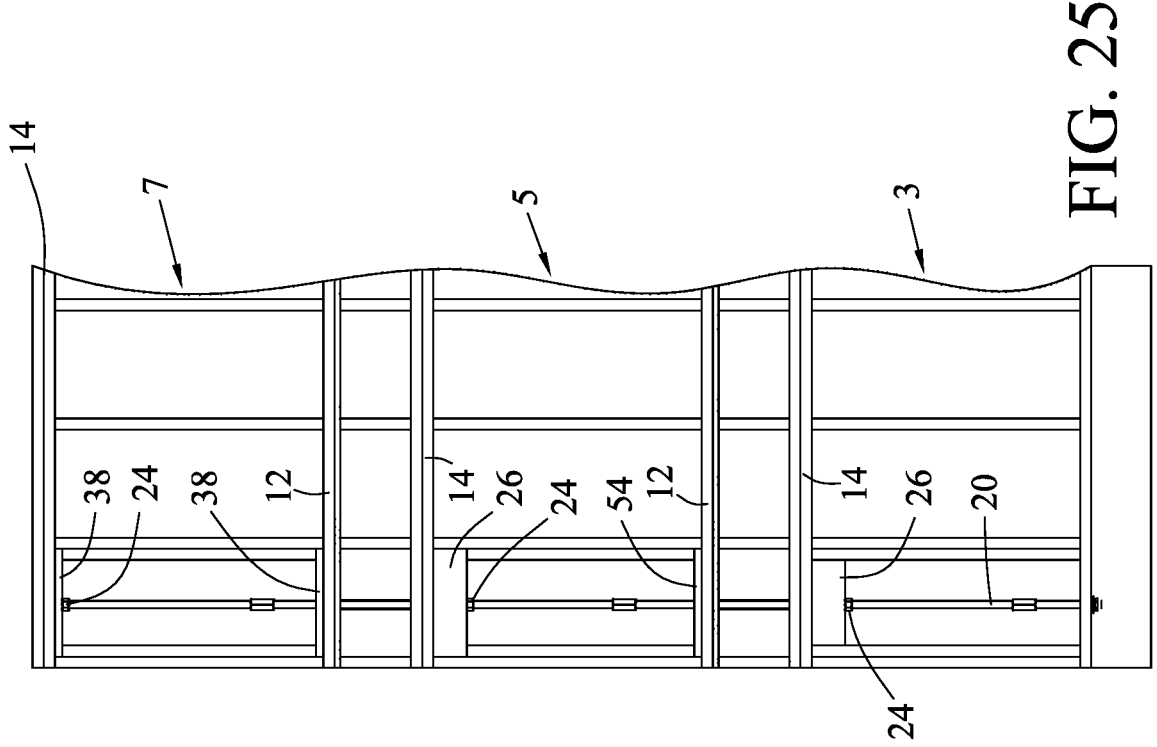

Referring to FIGS. 25 and 26A, the compression plate 38 on the bottom plates 12 in the upper wall 7 is attached to the rod post 20 via the nuts 24, as shown in FIG. 26A. The opening 63 is unthreaded so that the nuts 24 above and below the compression plate 38 are used to attach the compression plate to the rod post 20. The compression plate 38 as attached to the rod post 20 is able to transfer compression (downward direction) or tension (upward direction) forces to the rod post 20.

Figure 26B:
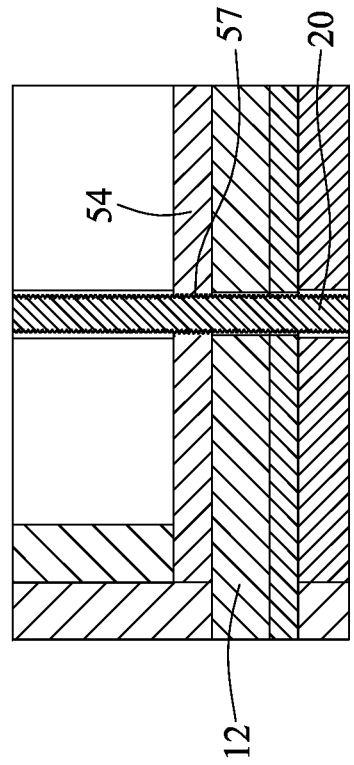

Referring to FIGS. 25 and 26B, the compression plate 54 on the bottom plate 12 in the middle wall 5 is threaded to the rod post 20 through the threaded opening 57. The compression plate 54 as attached to the rod post 20 is able to transfer compression (downward direction) or tension (upward direction) forces to the rod post 20.

Referring to FIG. 27, the compression plates 38 on the respective bottom plates 12 of the middle wall 5 and the upper wall 7 are used to transfer tension forces to the rod post 20. The bridge members 26 and the compression plate 38 engaging the top plate 14 of the upper wall 7 are used to transfer compression forces to the rod post 20. The wall is advantageously configured to resist upward (tension) and downward (compression) forces.

A bearing plate 60, preferably made of metal, engineered wood, or plastic with compressive strength greater than the compressive strength of the underlying lumber, is attached to the rod post 20 with the nut 24. Tension forces from the bearing plate 60 are effectively transferred to rod post 20.

An anchor 56 is embedded in the bottom portion of the foundation 4 below the anchor 18. The anchor rod 21 extends below the anchor 18 and the anchor 56 is operably attached to an end portion of the anchor rod 21. The location of the anchor 56 in the bottom portion of the foundation 4 advantageously provides a larger shear cone 65 as compared to a location of the anchor 56 in the upper portion of the foundation 4. The placement of the anchor 56 advantageously provides a larger shear cone 65 to resist tension forces on the rod post 20. The anchor 56 may be a metal plate, cylindrical body, a nut, or any of the anchors disclosed in U.S. Pat. Nos. 8,943,777, 9,097,001, 9,222,251, 9,416,530, 9,447,574, 9,702,139, 9,874,009, hereby incorporated herein by reference.

Figure 28:
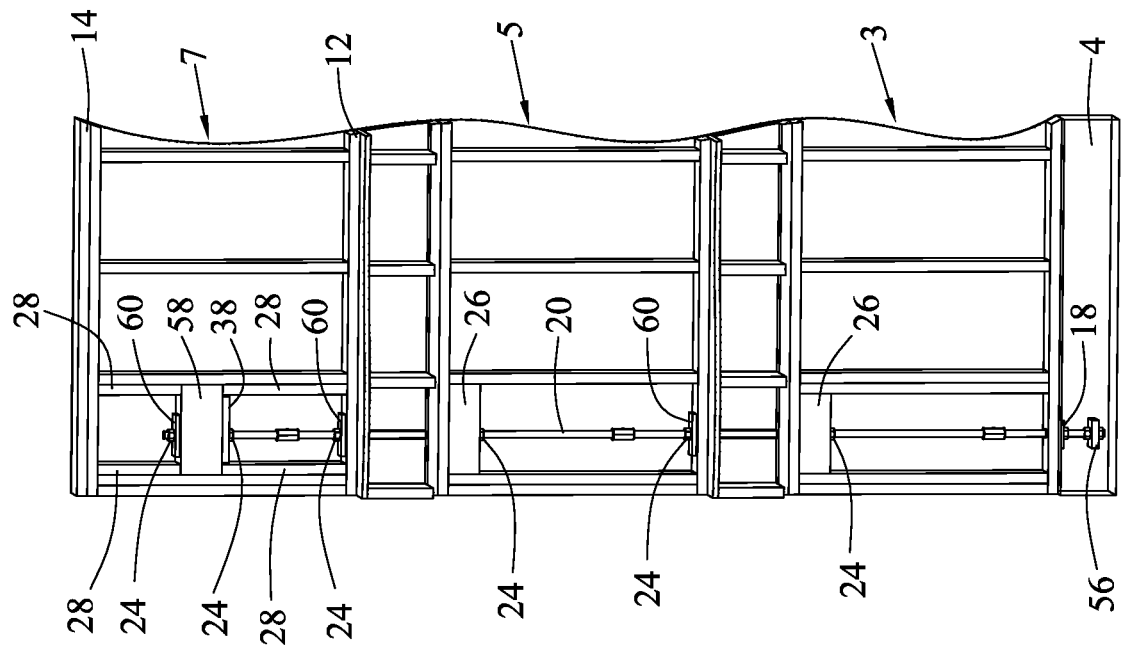

Referring to FIG. 28, the compression plates 38 disposed on the respective bottom plates of the middle wall 5 and the upper wall 7 have been replaced with the bearing plates 60. A bridge member 58 preferably made of sawn lumber is disposed in the upper wall 7. Trimmer studs 28 extend from the bottom plate 12 to the underside of the bridge member 58 and from the top of the bridge member 58 to the top plate 14. Compression forces on the compression plate 38 are transferred to the rod post 20 via the nut 24. Tension forces on the bearing plates 60 are transferred to the rod post 20 via the associated respective nuts 24. The wall is advantageously configured to resist upward (tension) and downward (compression) forces.

Figure 29:
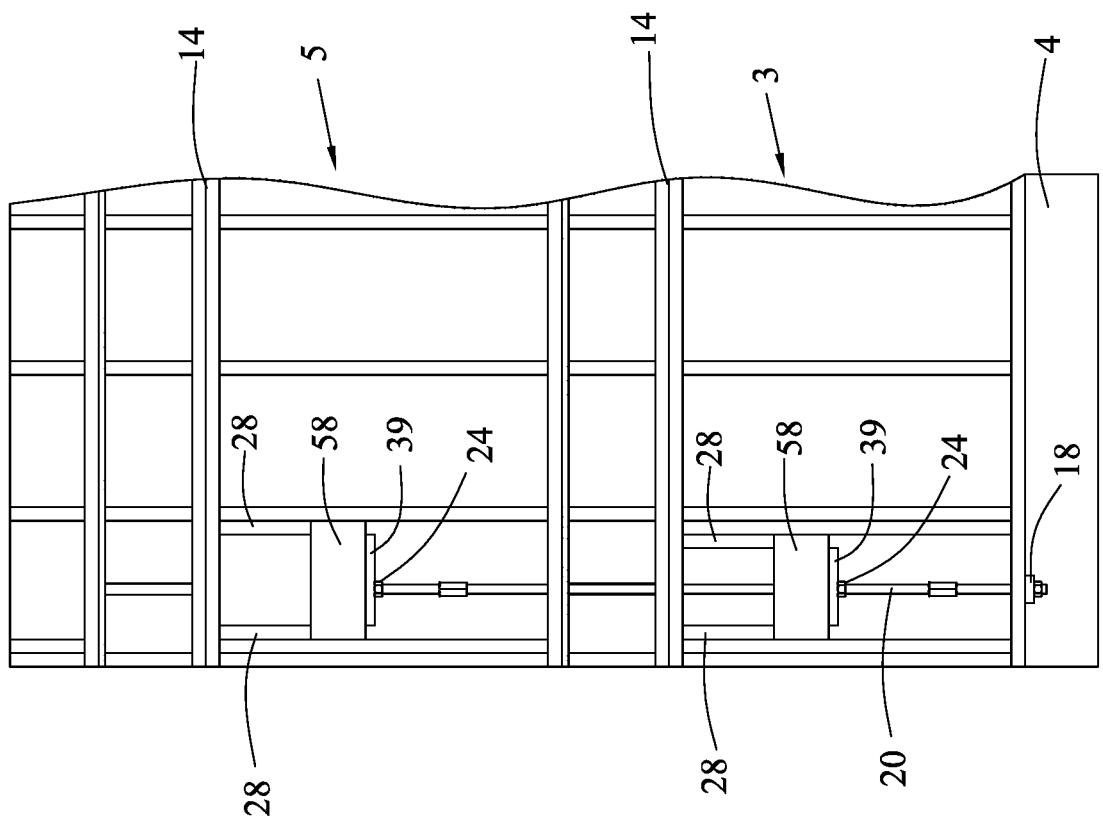

Referring to FIG. 29, bridge members 58 are disposed in the respective lower wall 3 and the middle wall 5. The bridge member 58 is preferably made of sawn lumber. Bearing plates 39 are disposed on the bottom of the respective bridge members 58. The bearing plates 39 are preferably shorter in length than the bridge members 58. Nuts 24 advantageously transfer compression forces on the bearing plates 39 to the rod post 20. Trimmer studs 28 extend from the top of the bridge members 58 to the respective top plates 14 of the lower wall 3 and the middle wall 5.

Figure 30:
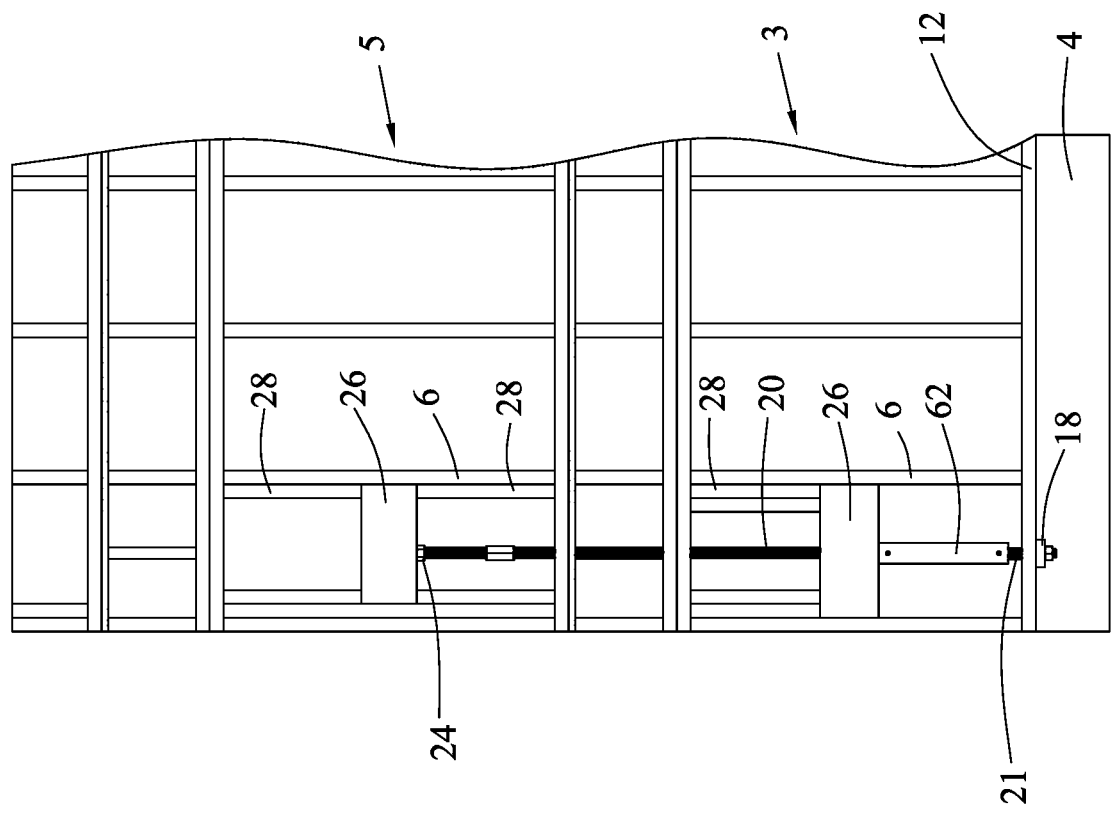
Figure 35:
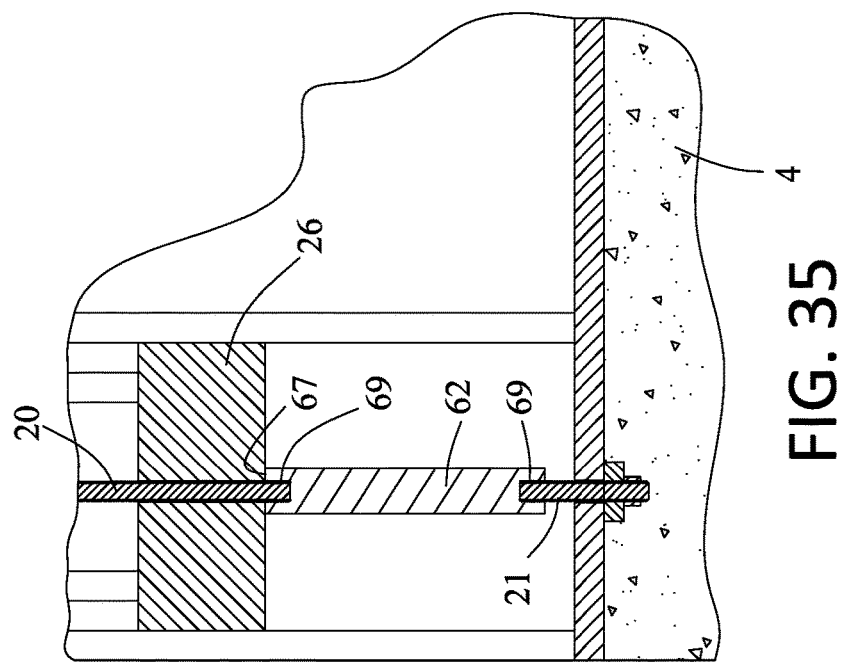

Referring to FIGS. 30 and 35, a large diameter solid metal coupling 62 attached to the anchor rod 21 and the rod post 20, which extends through an opening in the bridge member 26. The coupling 62 advantageously provides more loading capacity than the rod post 20. The coupling 62 has a top edge surface 67 that bears on the underside of the bridge member 26. Threaded bores 69 are threadedly attached to the respective ends of the rod post 20 and the anchor rod 21. The bridge member 26 is preferably metal to advantageously provide appropriate loading capacity around the edge surface 67. The bottom end of the coupling 62 is spaced from the bottom plate 12 so that compression forces are advantageously directly transferred to the anchor 18 and the foundation 4.

Figure 31:
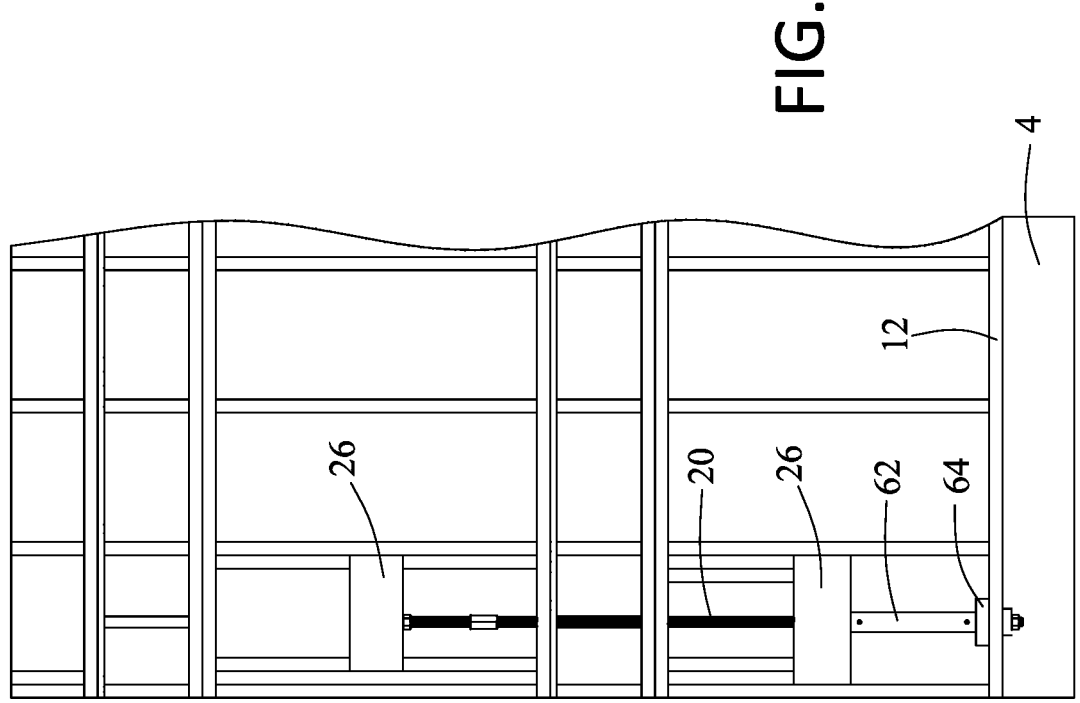

Referring to FIG. 31, a bearing plate 64 is disposed between the bottom end of the coupling 62 and the bottom plate 12. The bearing plate 64 is preferably made of metal, engineered wood, plastic with compressive strength greater than the compressive strength of the bottom plate 12 to distribute the compression forces from the bottom edge surface of the coupling 62 over a larger area on the bottom plate than the actual footprint of the coupling 62.

Figure 32:
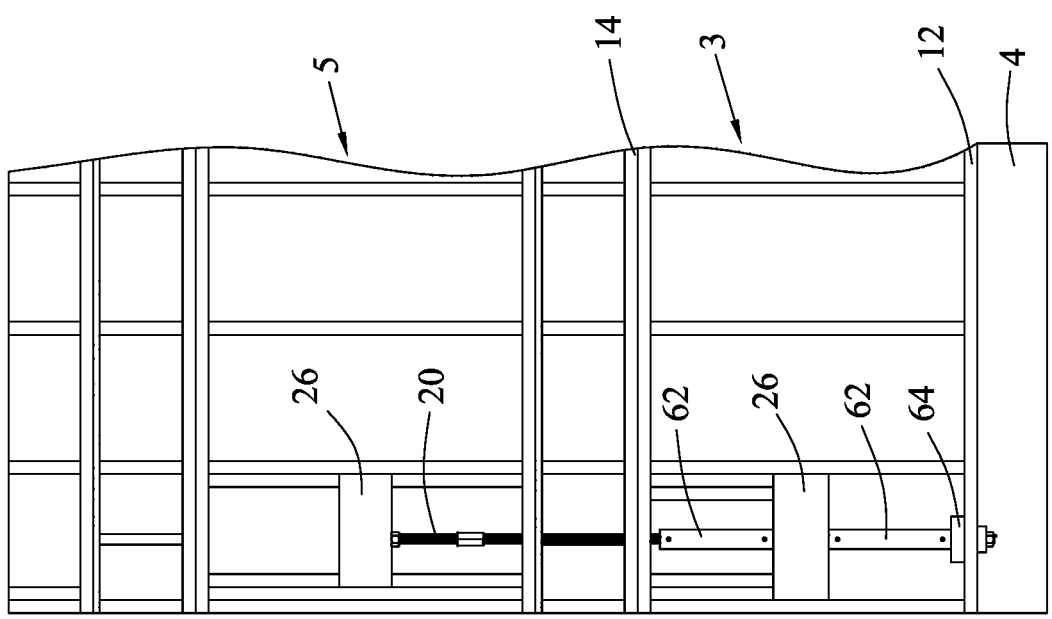

Referring to FIG. 32, another large diameter solid metal coupling 62 is disposed in the lower wall 3 between the bridge member 26 and the top plate 14. A short threaded rod post 20 (see FIG. 35) extends across the bridge member 26 to connect the lower and upper couplings 62 together.

Figure 33:
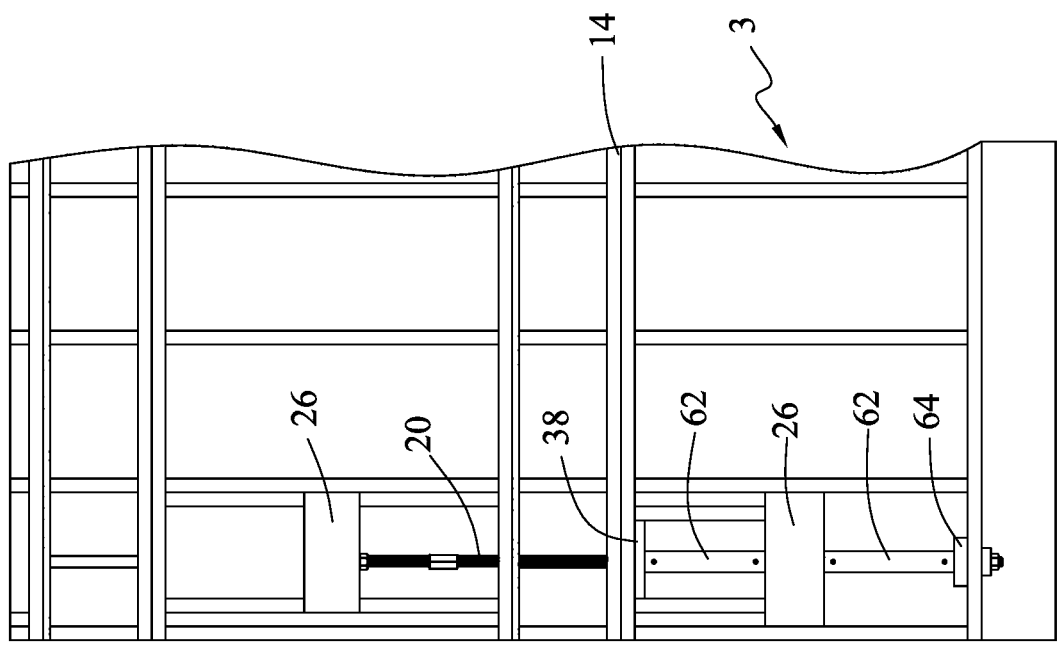

Referring to FIG. 33, a compression plate 38 is placed between the top end of the upper coupling 62 and the top plate 14 in the lower wall 3. Compression forces from the top plate 14 are transferred to the compression plate 38 and thence to the couplings 62. The lower end of the rod post 20 extends across the top plate 14 of the lower wall 3 to connect with the upper end of the upper coupling 62.

Figure 34:
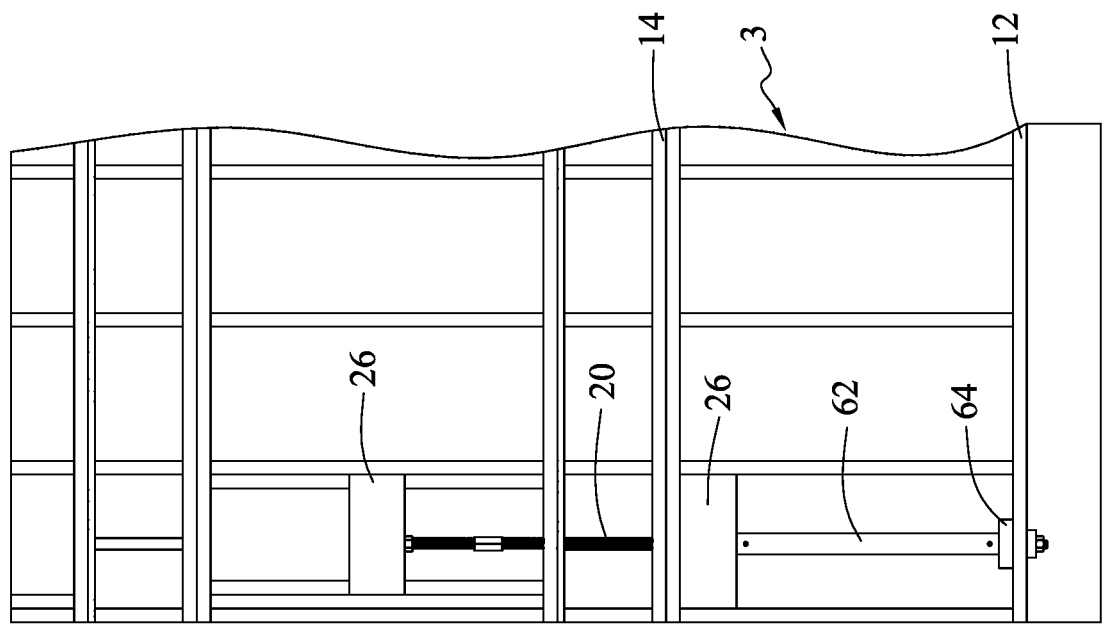

Referring to FIG. 34, the bridge member 26 in the lower wall 3 is disposed against the top plate 14 and the coupling 62 extends between the bottom plate 12 and the underside of the bridge member 26. The lower end of the rod post 20 extends across the bridge member and connects to the upper end of the coupling 62 (see FIG. 35).

Referring to FIG. 35, the coupling 62 is a solid rod with threaded bores 69 at each end for threaded connecting to the rod post 20 or the tie rod 21. Edge surface 67 around the upper threaded bore 69 provides a bearing surface for engaging against the bridge member 26 or the compression plate 38. The rod post 20 extends through an opening in the bridge member 26. The rod post 20 is not threaded to the bridge member 26 so that only compression forces are transferred to the coupling 62.

Figure 36:
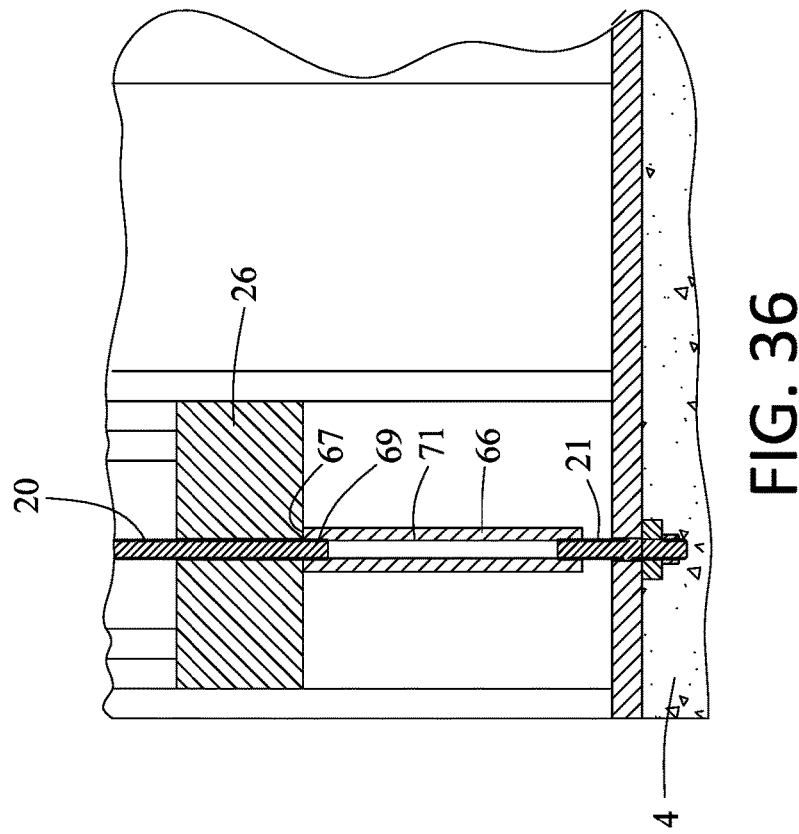

Referring to FIG. 36, the large diameter coupling 62 may be hollow or tubular as embodied in the coupling 66 with a through opening 71. The ends of the opening 71 are threaded for attachment to the end of the rod post 20 or the anchor rod 21. The rod post 20 is not threaded to the bridge member 26 so that only compression forces are transferred to the coupling 66.

Figure 37:
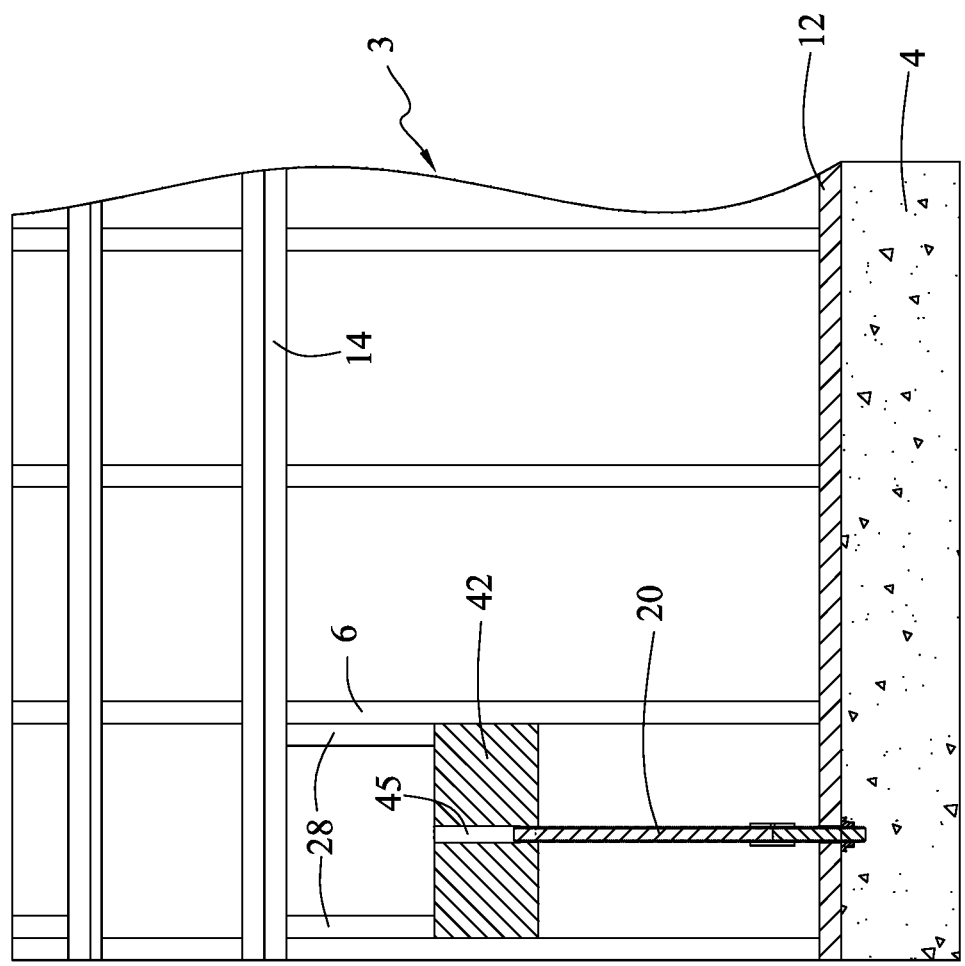

Referring to FIG. 37, a bridge member 42 with a partly threaded hole 45 is disposed in the lower wall 3. The rod post 20 is threadedly attached to the bridge member 42. Trimmer studs extend from the top of the bridge member 42 to the underside of the top plate 14.

Figure 38:
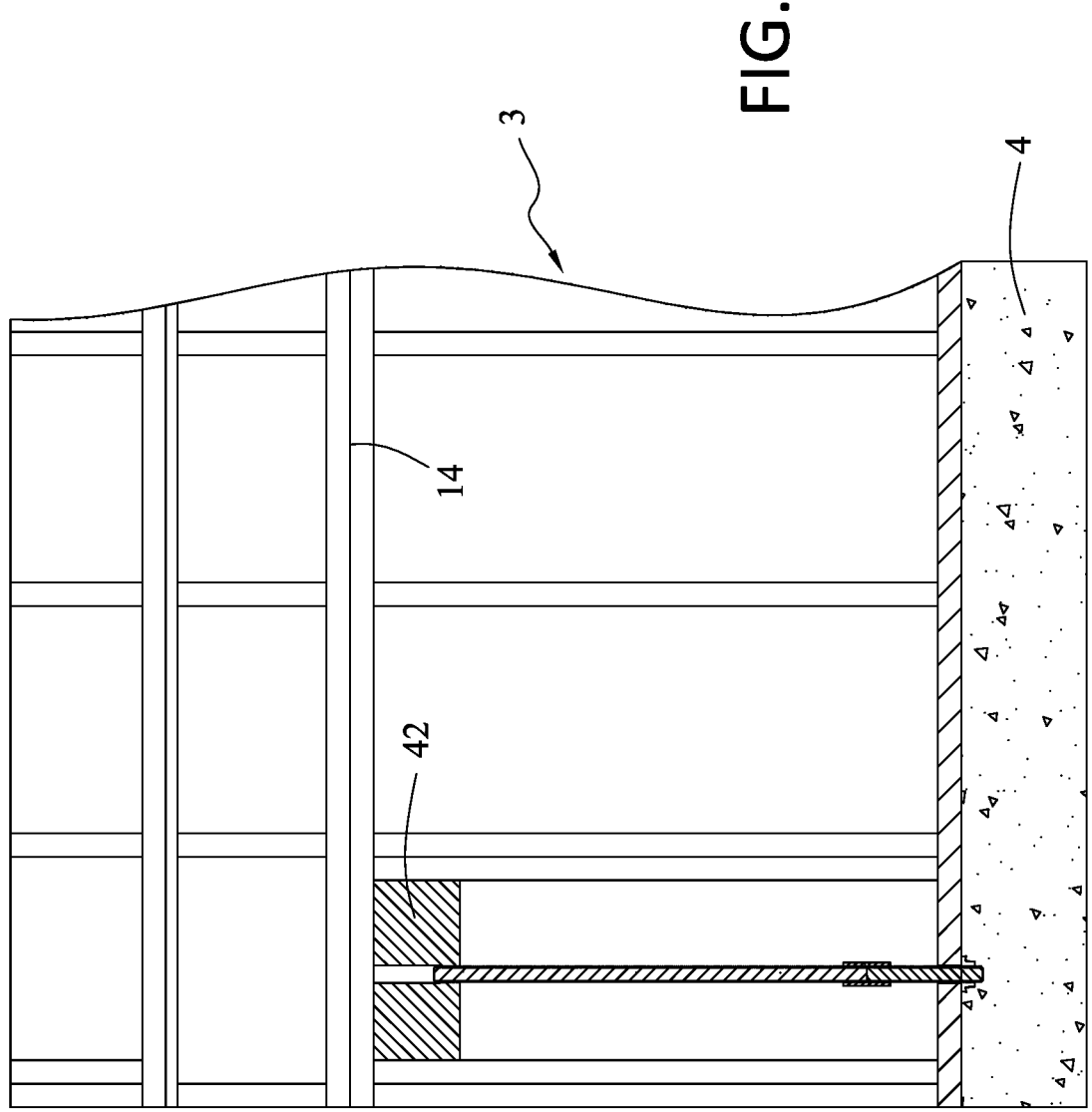

Referring to FIG. 38, the bridge member 42 engages the underside of the top plate 14.

Figure 39:
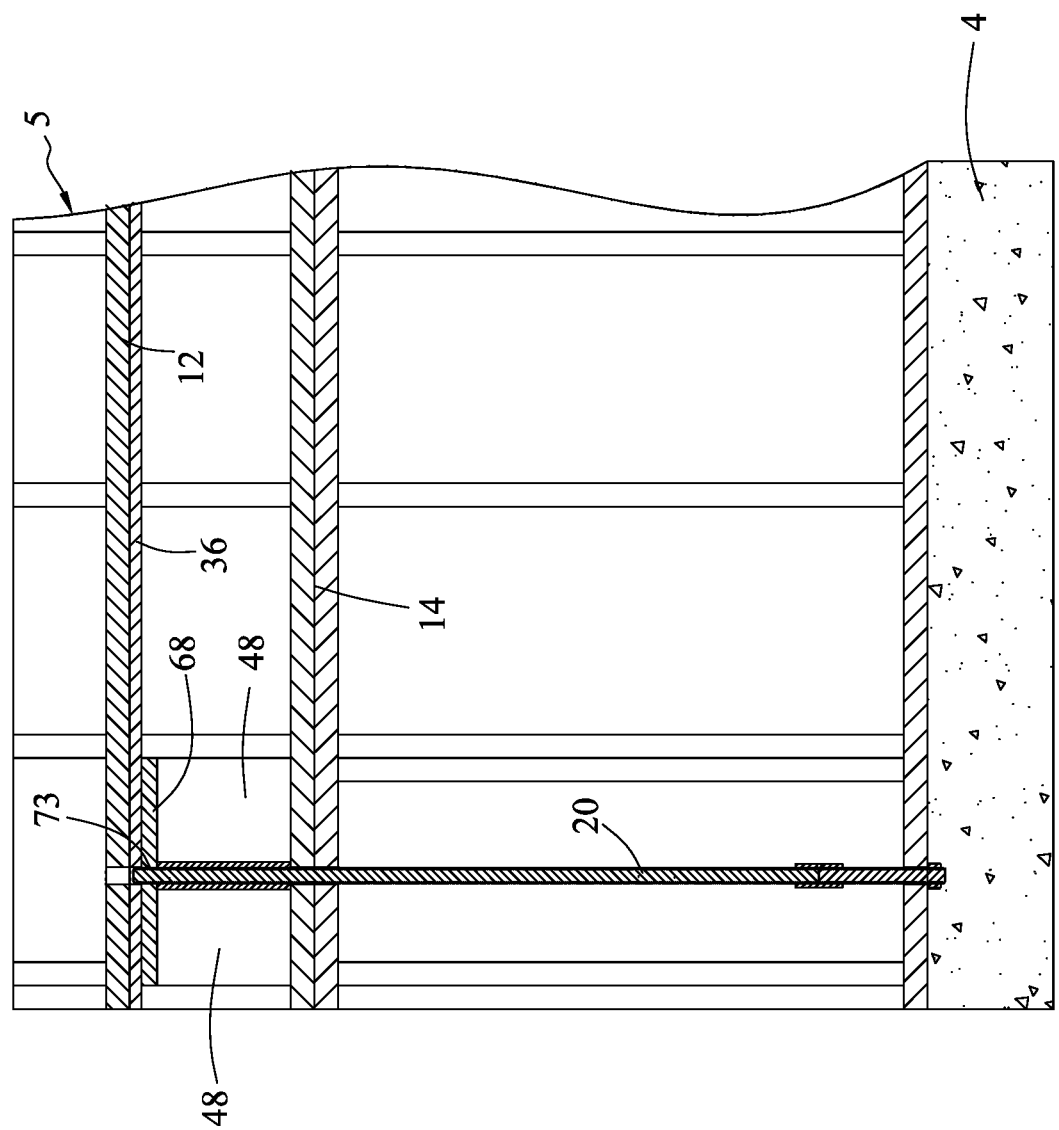

Referring to FIG. 39, a compression plate 68 with a threaded opening 73 is disposed against the underside of the subfloor 36 of the middle wall 5. The compression plate 68 is threadedly attached to the rod post 20 and supported by the blocking members 48.

Figure 40:
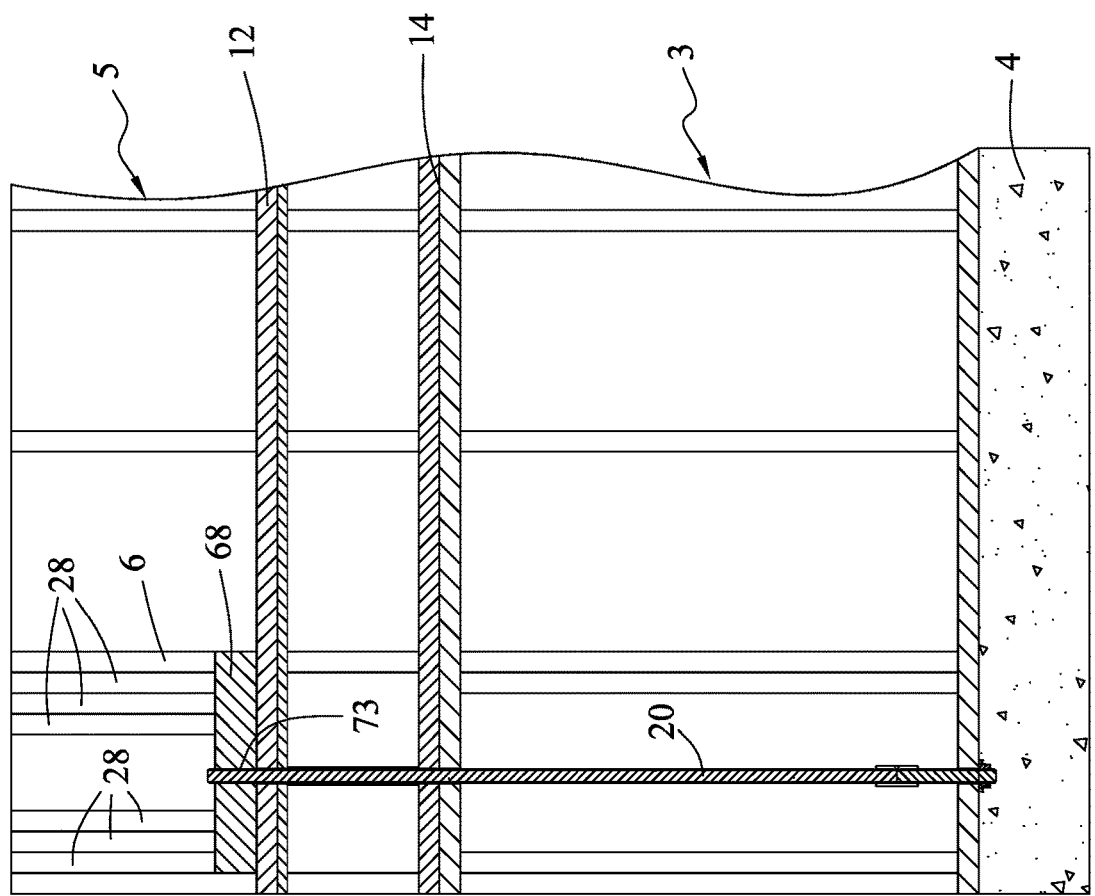

Referring to FIG. 40, the compression plate 68 is disposed on the bottom plate 12 of the middle wall 5. The bottom ends of the studs 6 and the trimmer studs 28 are supported on the compression plate 68.

Figure 41:
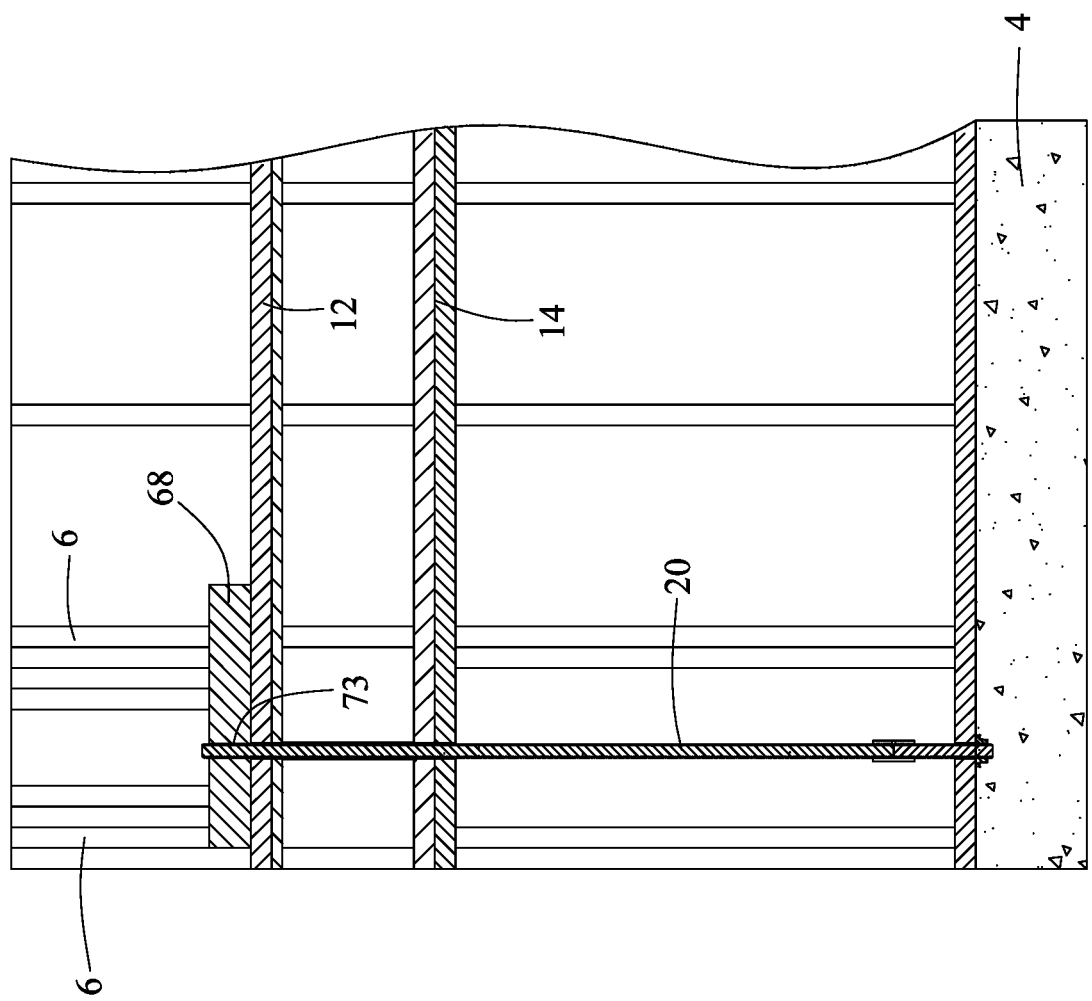

Referring to FIG. 41, one end of the compression plate 68 extends beyond the stud bay to allow the compression forces to be spread over a larger area of the bottom plate 12. This is further discussed in co-pending application Ser. No. 16/296,865, hereby incorporated herein by reference.

Figure 42:
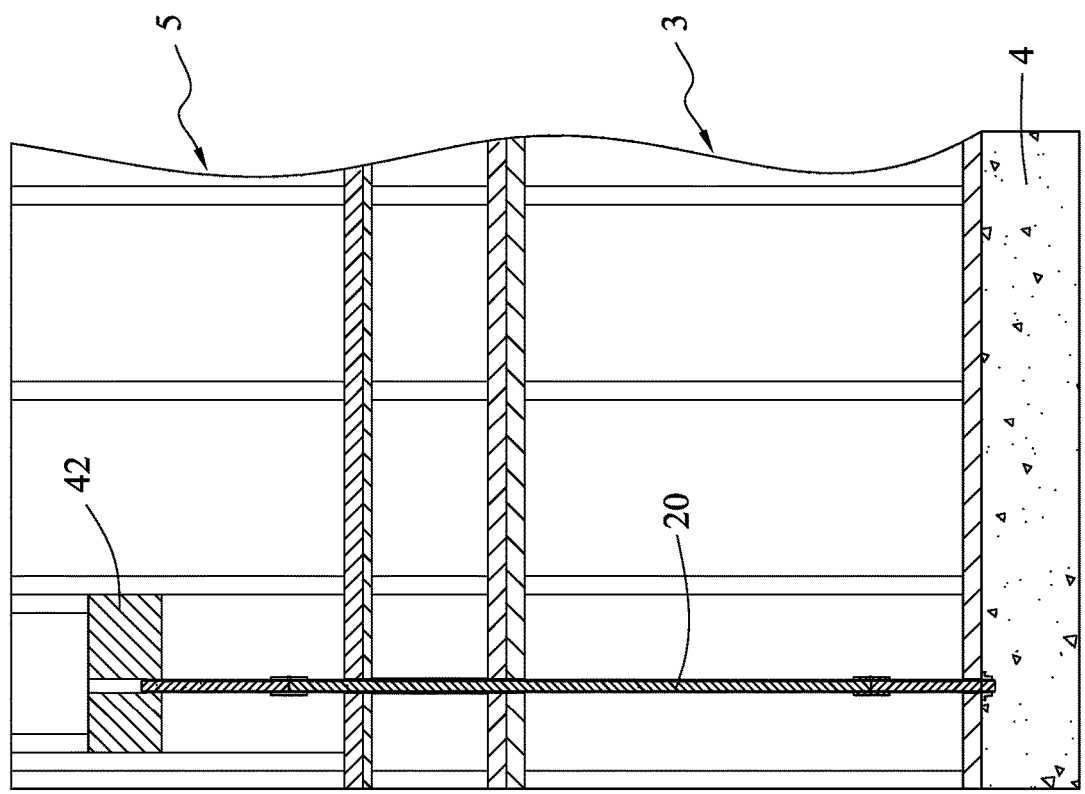

Referring to FIG. 42, the bridge member 42 is disposed in the middle wall 5. Trimmer studs extend from the top of the bridge member 42 to the underside of the top plate 14 (not shown).

Figure 43:
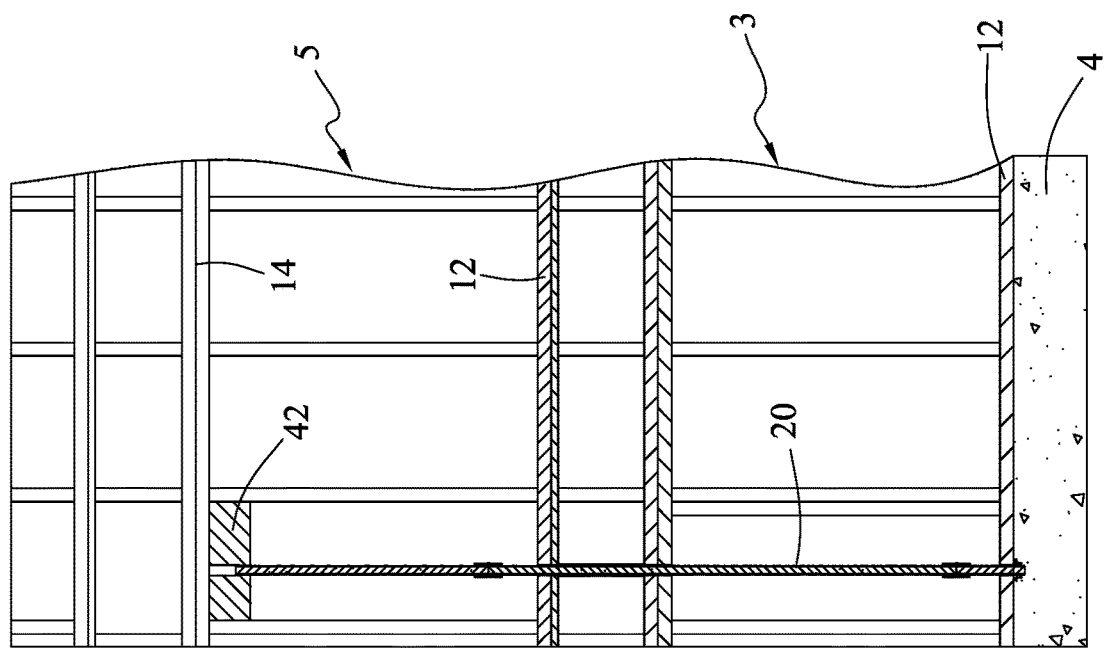

Referring to FIG. 43, the bridge member 42 engages the bottom of the top plate 14 of the middle wall 5.

Figure 44:
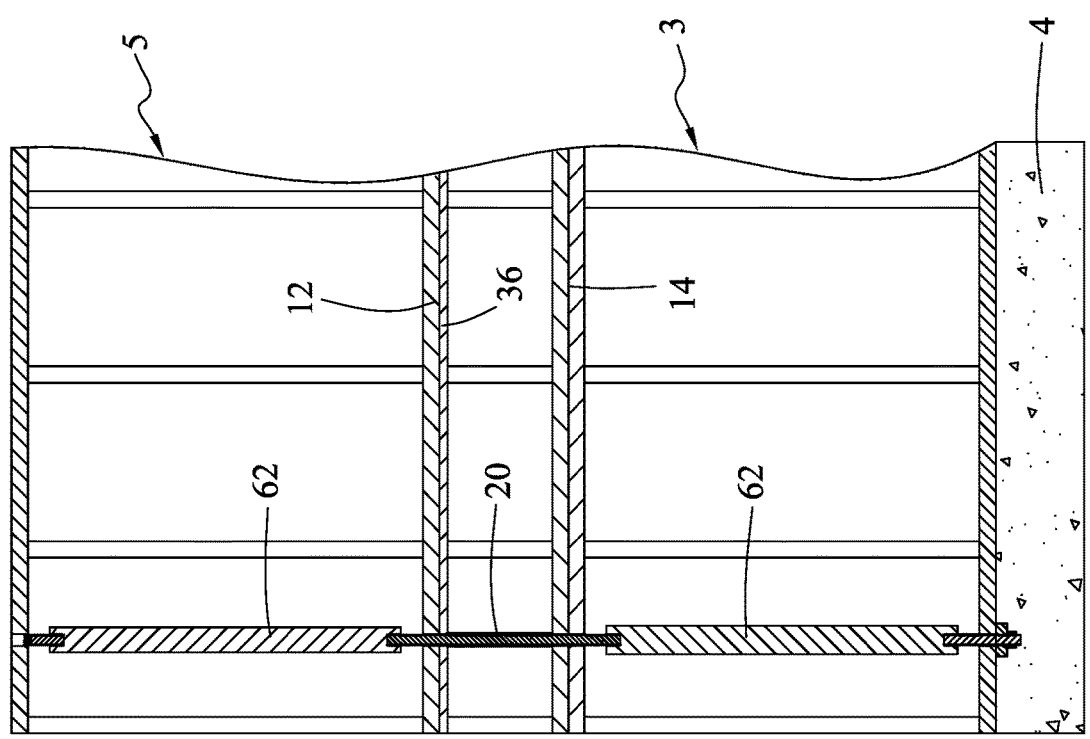
Figure 45:
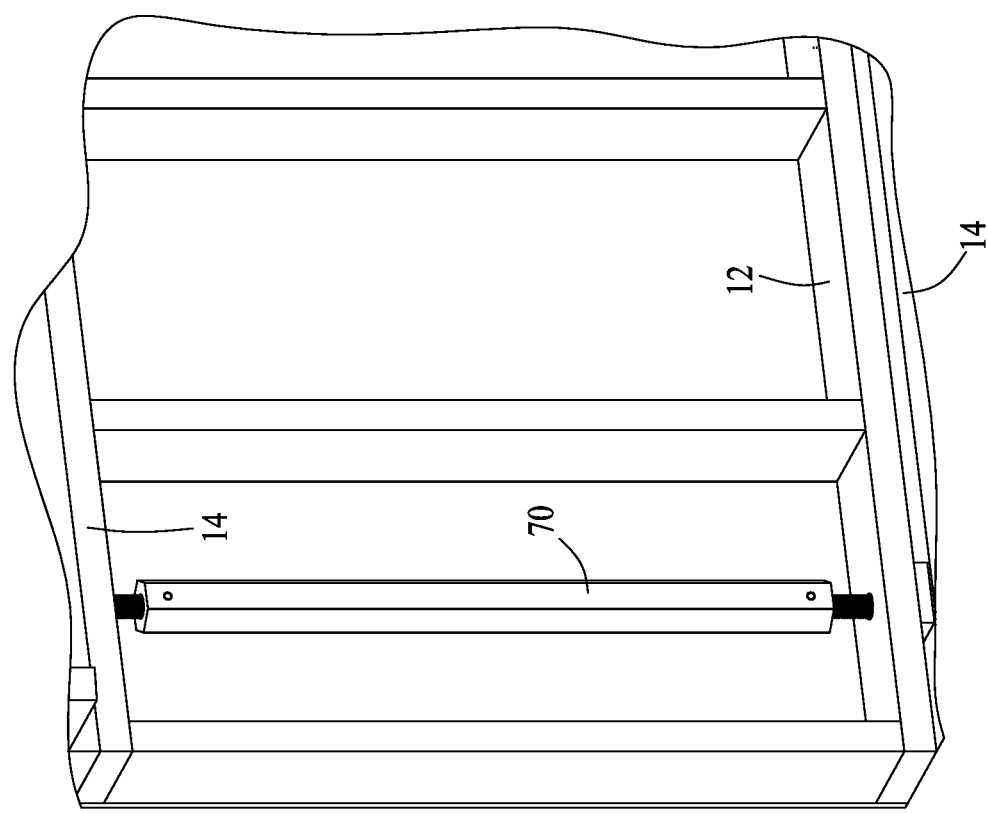

Referring to FIG. 44, the couplings 62 are installed in the respective lower wall 3 and the middle wall 5. The rod post 20 extends through the bottom plate 12 and the subfloor 36 of the middle wall 5 and through the top plate 14 of the lower wall 3 to connect the couplings 62 together. The upper end of the coupling 62 in the upper wall 5 is operably connected to the wall, such as with the bridge member 42 as shown in FIG. 43. The coupling 62 in the upper wall 5 replaces the rod post 20 shown in the upper wall Referring to FIG. 45, the coupling 62 may be modified as a coupling 70 with hexagonal outside surface in cross-section.

Figure 46:
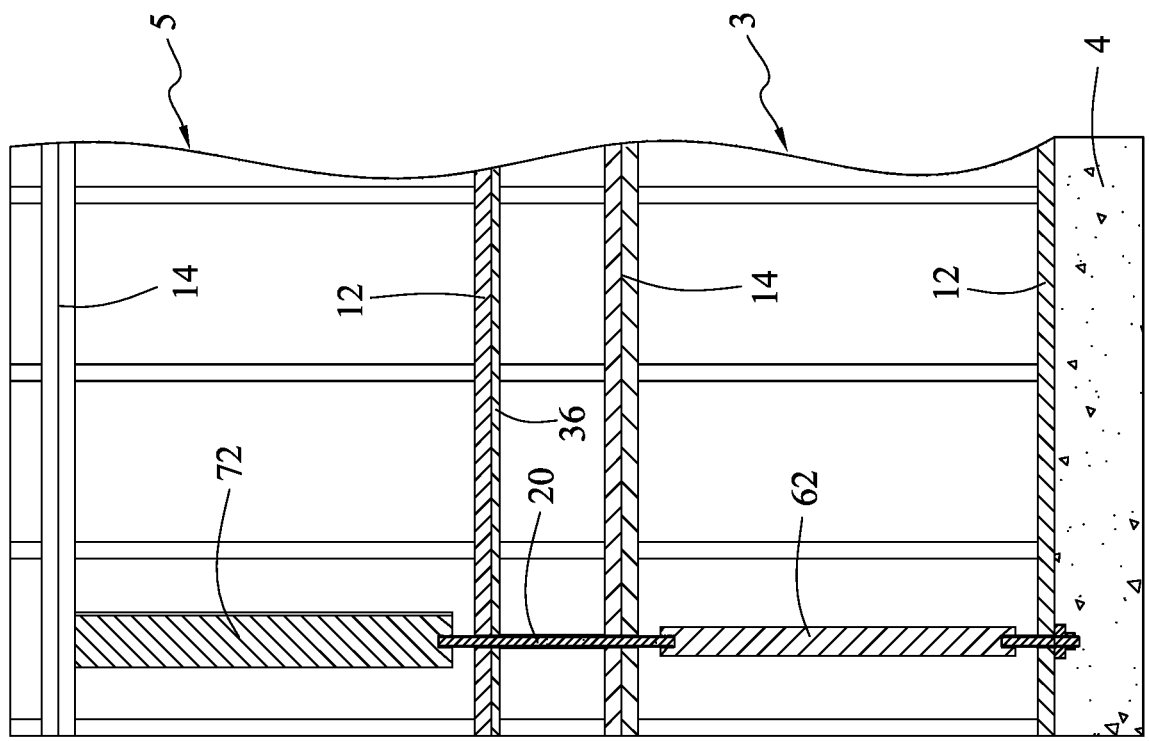
Figure 47:
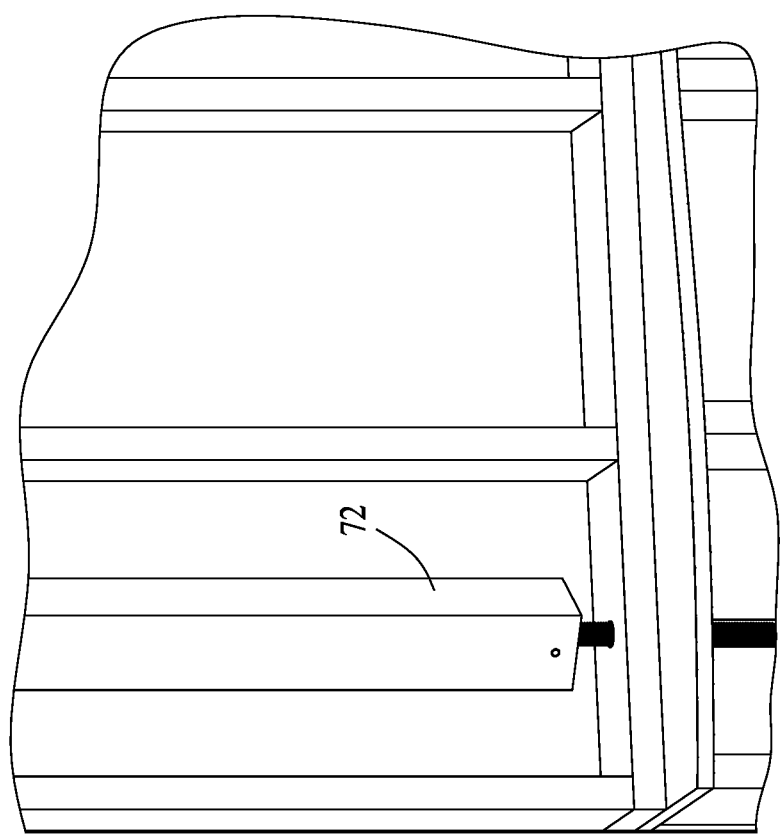
Figure 48:
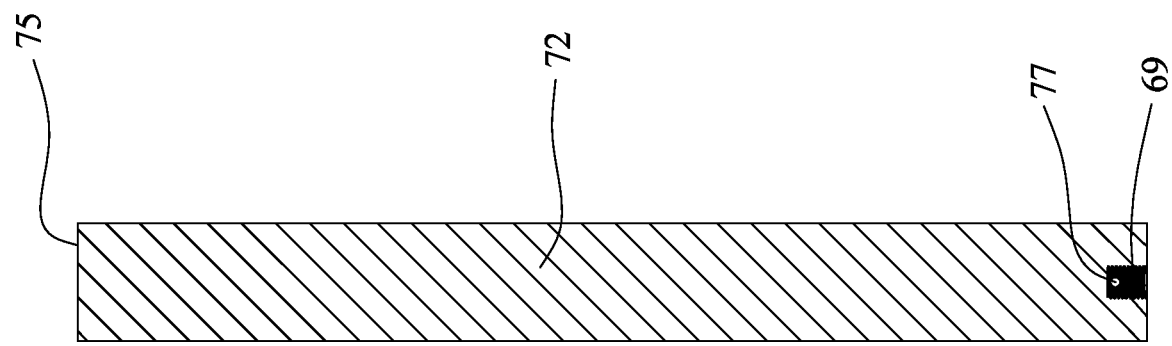

Referring to FIGS. 46, 47 and 47, a coupling 72 is disposed in the middle wall 5, in addition to the coupling 62 in the lower wall 3. A rod post 20 extending between the lower wall 3 and middle wall 5 connects the couplings 62 and 72 together. The coupling 72 has a rectangular outside surface in cross-section. The coupling 72 has an upper top surface 75 which engages the underside of the top plate 14. The threaded bore 69 includes a radial sight hole 77 to provide a visual check on the penetration of the rod post 20 into the threaded bore 69 to insure maximum thread engagement.

Figure 49:
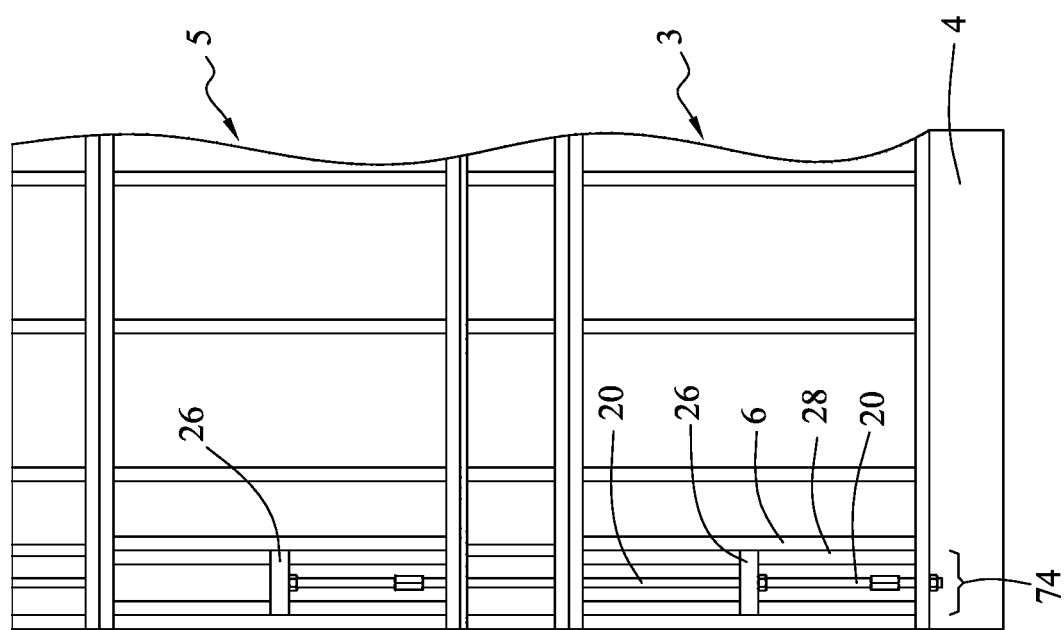

Referring to FIG. 49, the studs 6 and the trimmer studs 28 are shown disposed within a half-bay of a normal stud bay. For example, for a normal stud bay of 16 in. width, a half-bay is about 8 in. The half-bay advantageously provides additional strength to the rod post 20.

Figure 50:
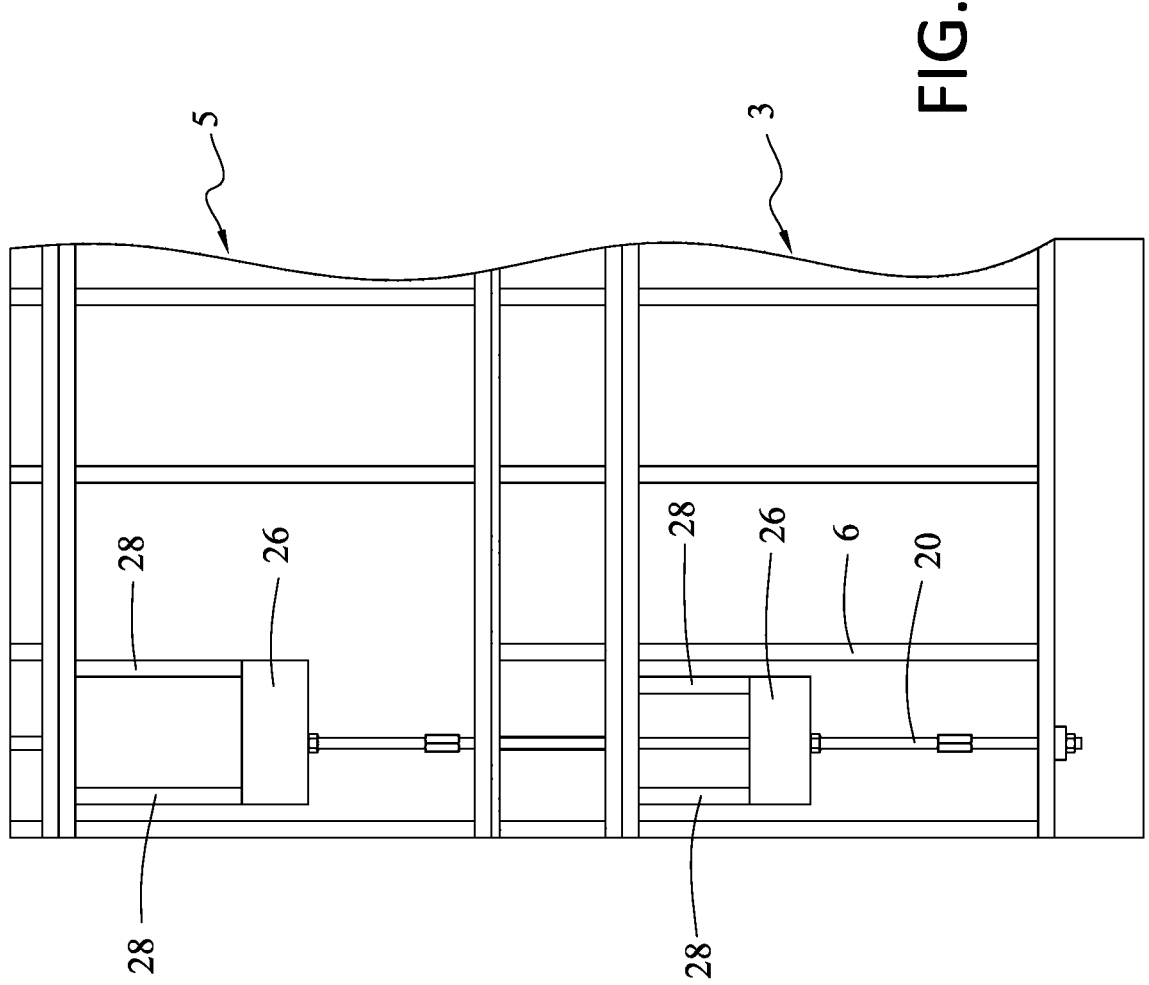

Referring to FIG. 50, the trimmer studs 28 are not attached to the adjacent studs 6. In the middle wall 5, the stud that would have been located in a normal stud bay is not used.

Figure 51:
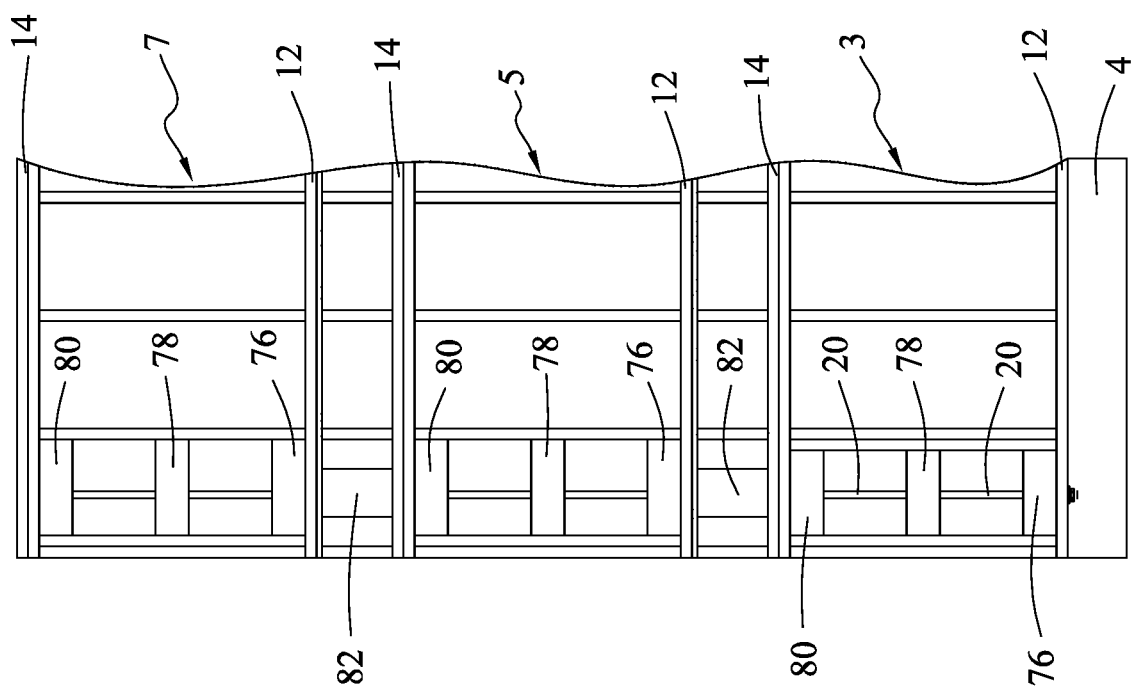

Referring to FIG. 51, various locations of compression bridge members within a wall are shown. Compression bridge members 76 may be placed on the respective bottom plates 12 of the respective bottom plates 12 of the lower wall 3, the middle wall 5 and the upper wall 7. Similarly, the compression bridge members 80 may be placed against the underside of the top plates of the respective lower wall 3, the middle wall 5 and the upper wall 7. The compression bridge members 78 may be placed between the bottom plate 12 and the top plate 14 in the lower wall 3, the middle wall 5 and upper wall 7. The compression bridge members 52 may be placed within the joist space between the top plate 14 of the wall below and the bottom plate 12 of the wall above.

Referring to FIG. 52, a cross-sectional view of a solid metal bridge member 85 is shown. A partly threaded opening 86 provides connection to the rod post 20.

Referring to FIG. 53, a cross-sectional view of a solid metal compression plate 54 is shown. The compression plate 54 is shown installed in the wall in FIG. 19.

Figure 54:
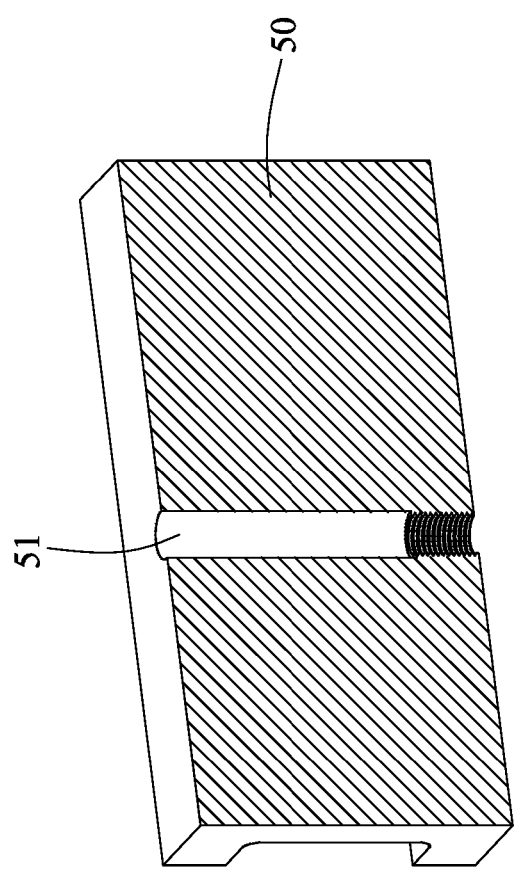
Figure 55:
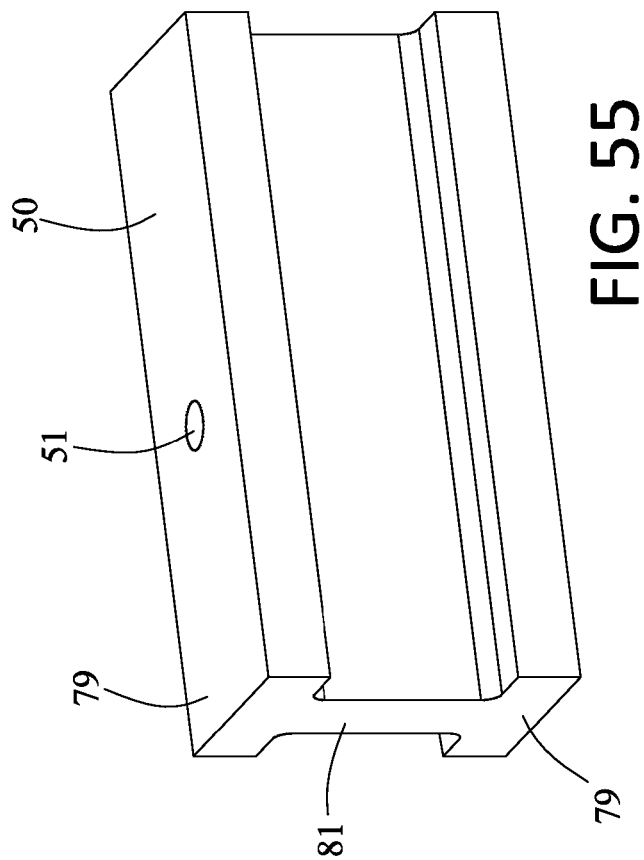

Referring to FIGS. 54 and 55, the bridge member 50 is shown in cross-section in FIG. 54. The opening 51 is partly threaded for attachment to the rod post 20. The bridge member 50 is shown installed in FIG. 16. The bridge member 50 is I-shaped, with upper and lower flanges 79 joined by a web 81. The web 81 is thick enough to accommodate the opening 51. The threaded portion of the opening 51 is advantageously disposed in the lower flange 79.

Referring to FIG. 56, a compression bridge member 88 made of extruded metal is shown. The bridge member 88 includes a matrix of rectangular openings 89 extending from top to bottom. An opening 87 extends from top to bottom for receiving the rod post 20.

Referring to FIG. 57, a compression bridge member 90 made of extruded metal is disclosed. The bridge member 90 is hollow, defined by a rectangular opening 91 extending from one end to the other end and a plurality of rectangular openings 93 on each side of the rectangular opening 91. An opening 95 at the top is aligned with an opening (not shown) at the bottom for receiving the rod post 20.

Figure 58:
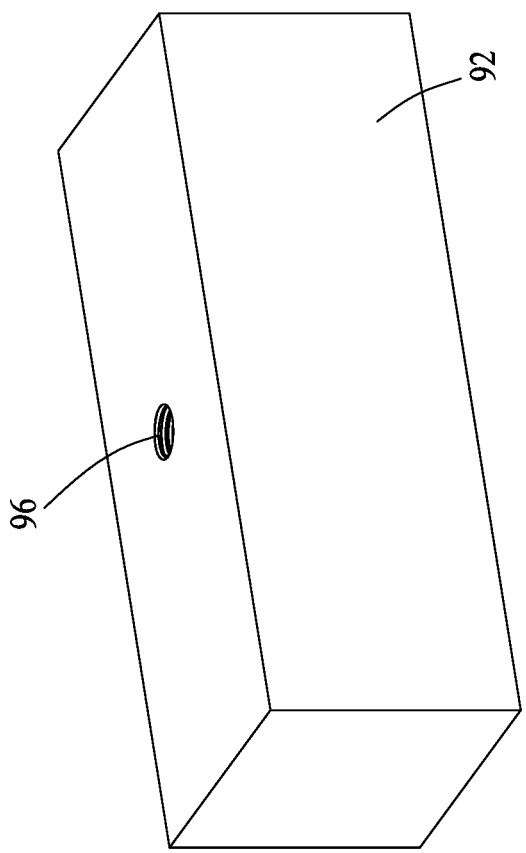

Referring to FIG. 58, a solid metal compression bridge member 92 is disclosed with a threaded opening 96 extending from top to bottom for receiving the rod post 20.

Figure 59:
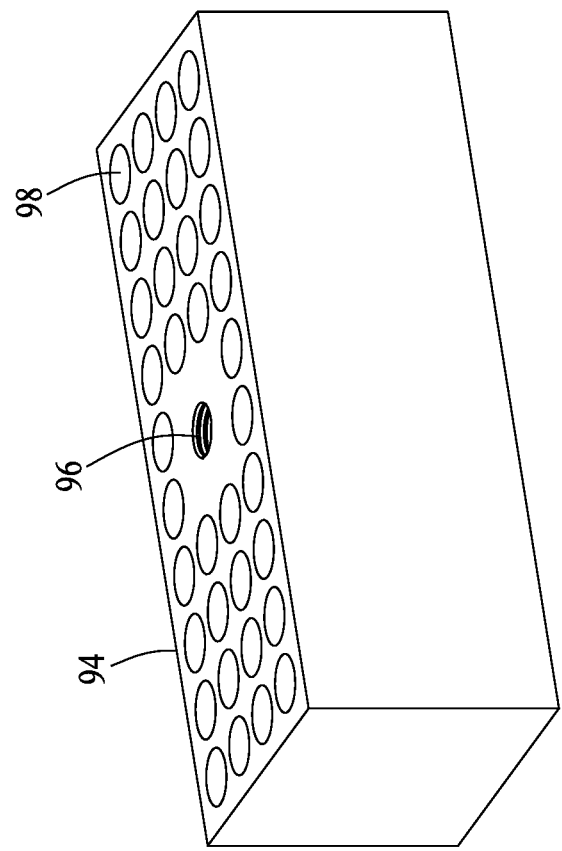

Referring to FIG. 59, a hollow metal compression bridge member 94 with a matrix of holes 98 with a common vertical direction extending from top to bottom is disclosed relative to the vertical direction of the rod post 20. The threaded opening 96 extends from top to bottom for receiving the rod post 20.

Figure 60:
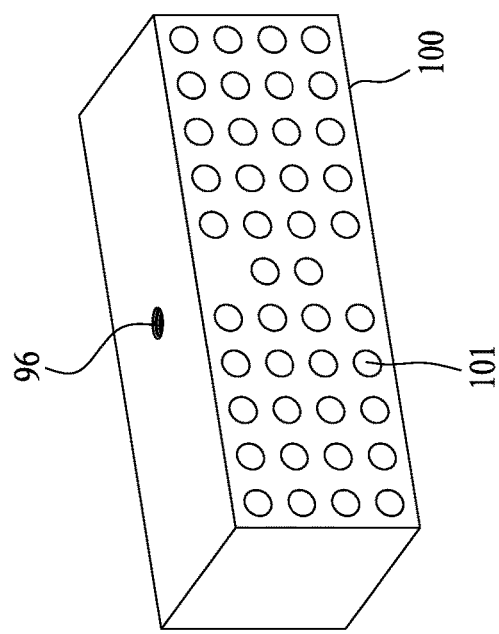

Referring to FIG. 60, a hollow metal compression bridge member 100 with a matrix of holes 101 with a common horizontal direction, extending from front to back is shown relative to the vertical direction of the rod post 20. The threaded opening 96 extends from top to bottom for receiving the rod post 20.

Figure 61:
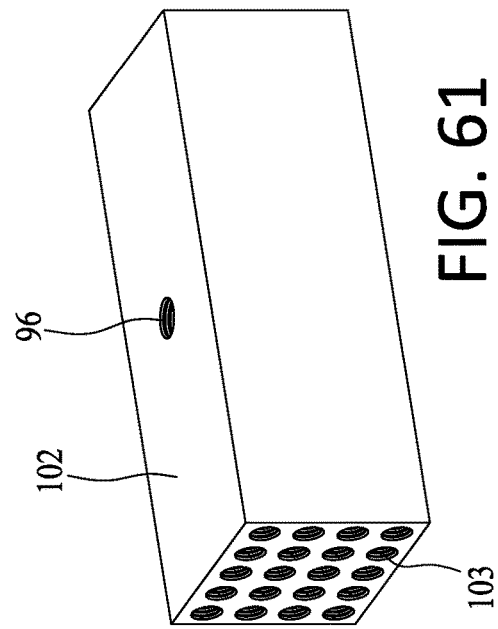

Referring to FIG. 61, a hollow metal compression bridge member 100 with a matrix of threaded holes 103 with a common horizontal direction, extending from left to right is shown relative to the vertical direction of the rod post 20. The threaded opening 96 extends from top to bottom for receiving the rod post 20.

Figure 62:
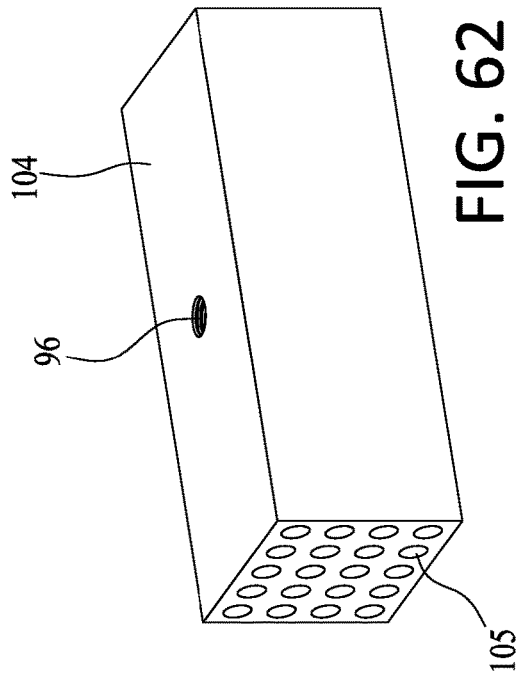

Referring to FIG. 62, a hollow metal compression bridge member 100 with a matrix of holes 105 with a common horizontal direction, extending from left to right is shown relative to the vertical direction of the rod post 20. The threaded opening 96 extends from top to bottom for receiving the rod post 20.

Figure 63:
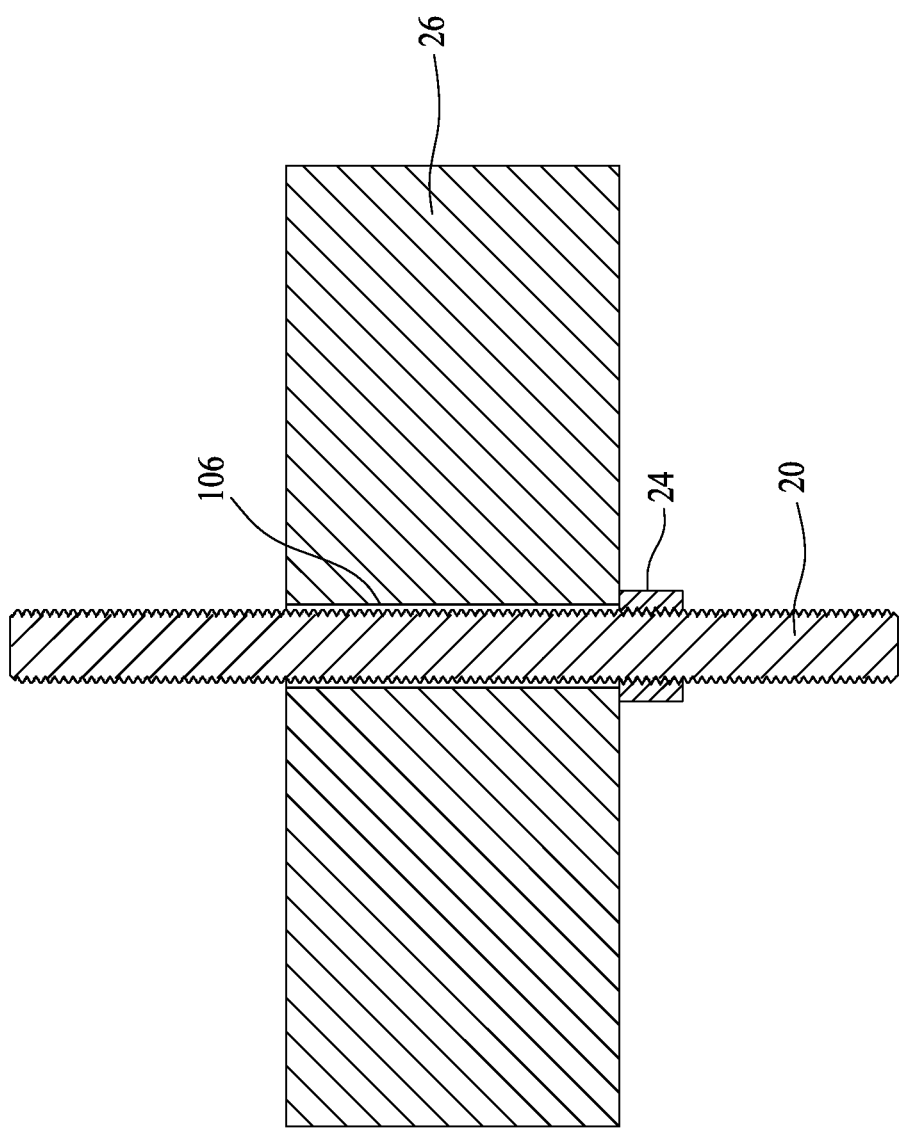
FIGS. 63-174 show various embodiments of connections of a rod post to the bridge member.

Referring to FIG. 63, the rod post 20 is shown extending through an unthreaded opening 106 and supporting the compression bridge member 26 with the nut 24. With this arrangement, the bridge member 26 is able to transfer compression forces to the rod post 20.

Figure 64:
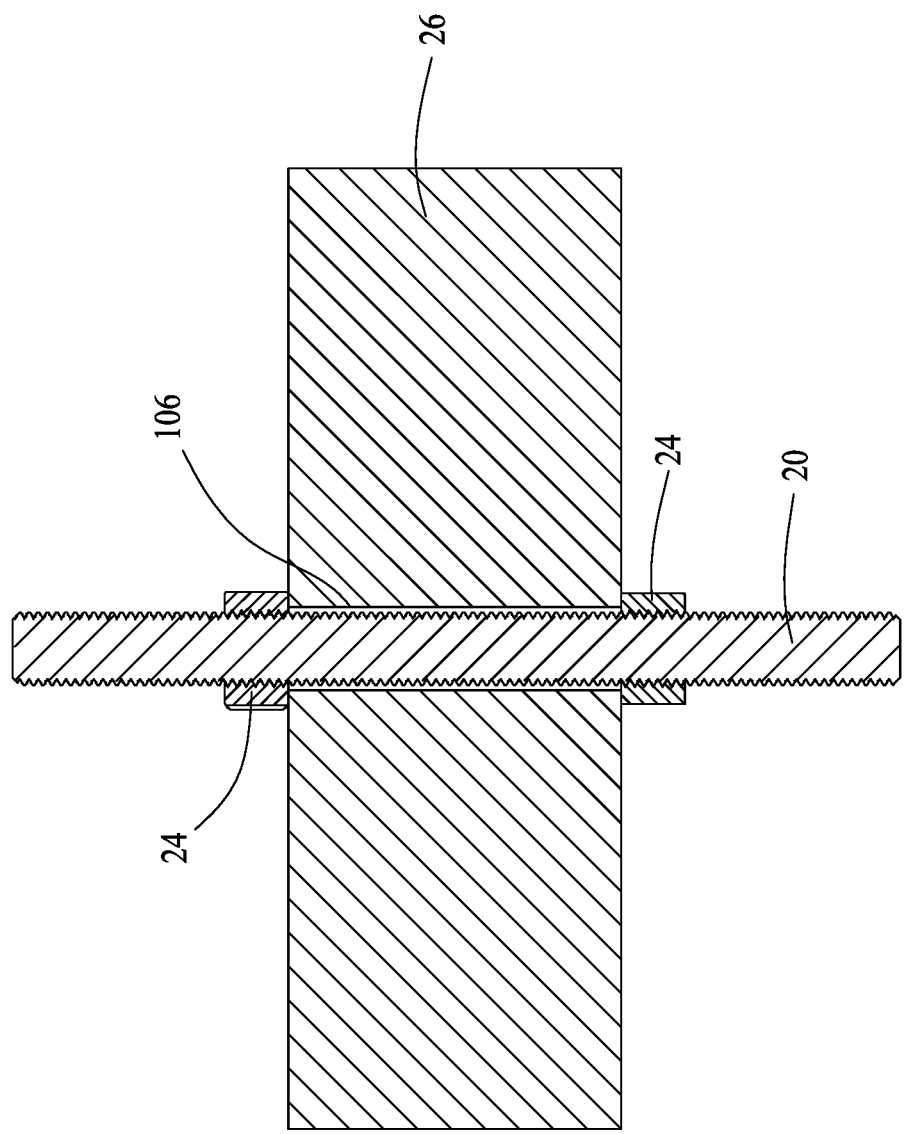

Referring to FIG. 64, the rod post 20 is shown extending through an unthreaded opening 106 and capturing the compression bridge member 26 with the nuts 24. The bridge member 26 is able to transfer compression and tension forces to the rod post 20.

Figure 65:
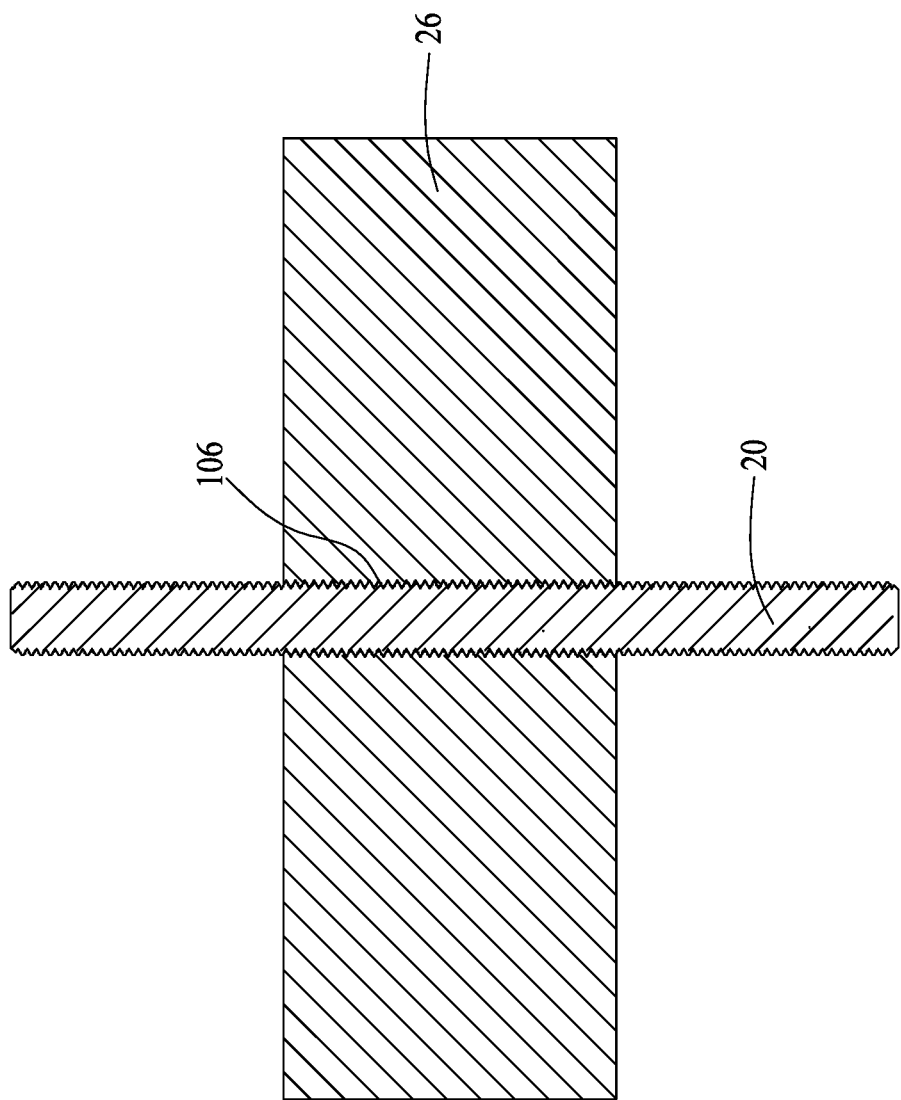

Referring to FIG. 65, the rod post 20 is shown threaded to a threaded opening 108 in the compression bridge member 26. The bridge member 26 is able to transfer compression and tension forces to the rod post 20.

Figure 66:
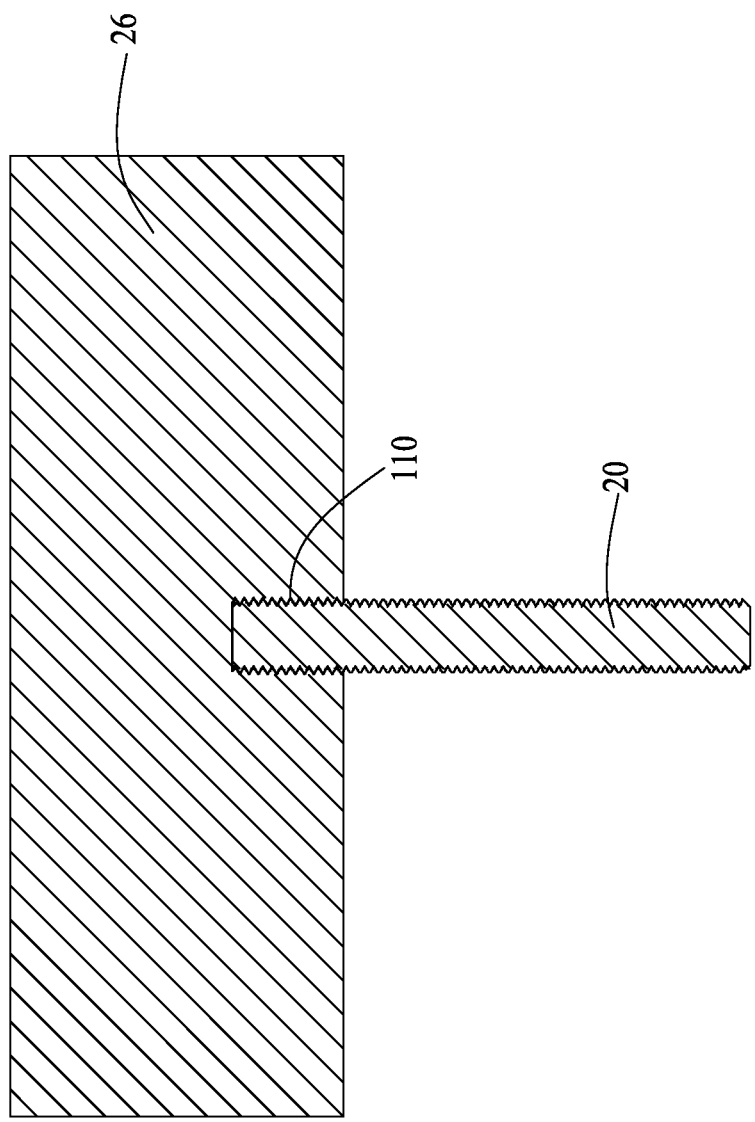

Referring to FIG. 66, the rod post 20 is shown threaded to a threaded bore 110 in the compression bridge member 26. The bridge member 26 is able to transfer compression and tension forces to the rod post 20.

Figure 67:
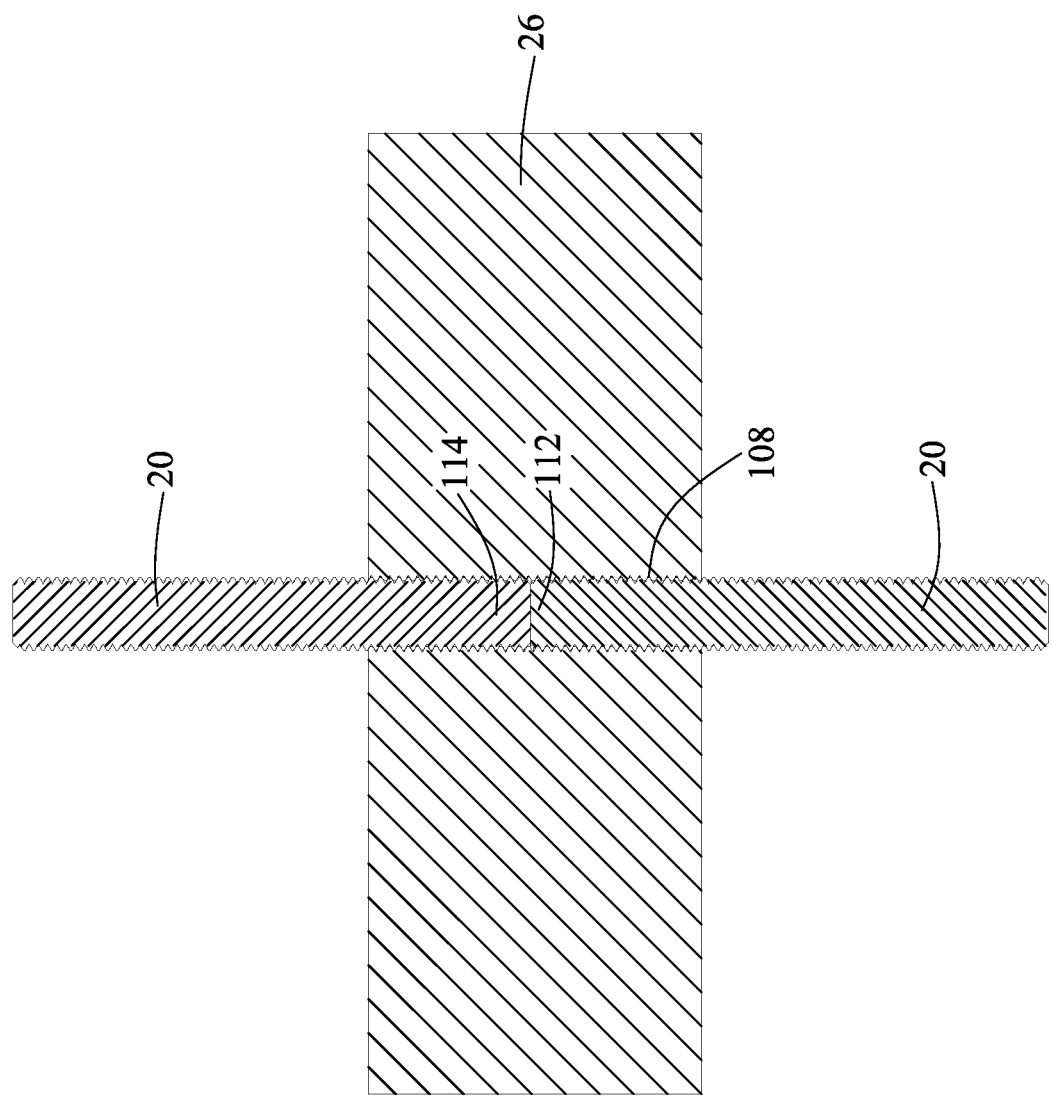

Referring to FIG. 67, the two rod posts 20 with their respective ends 112 and 114 are shown threaded to the threaded opening 108 in the compression bridge member 26. The bridge member 26 serves to couple the two rod posts 20 together. The bridge member 26 is able to transfer compression and tension forces to the rod posts 20.

Figure 68:
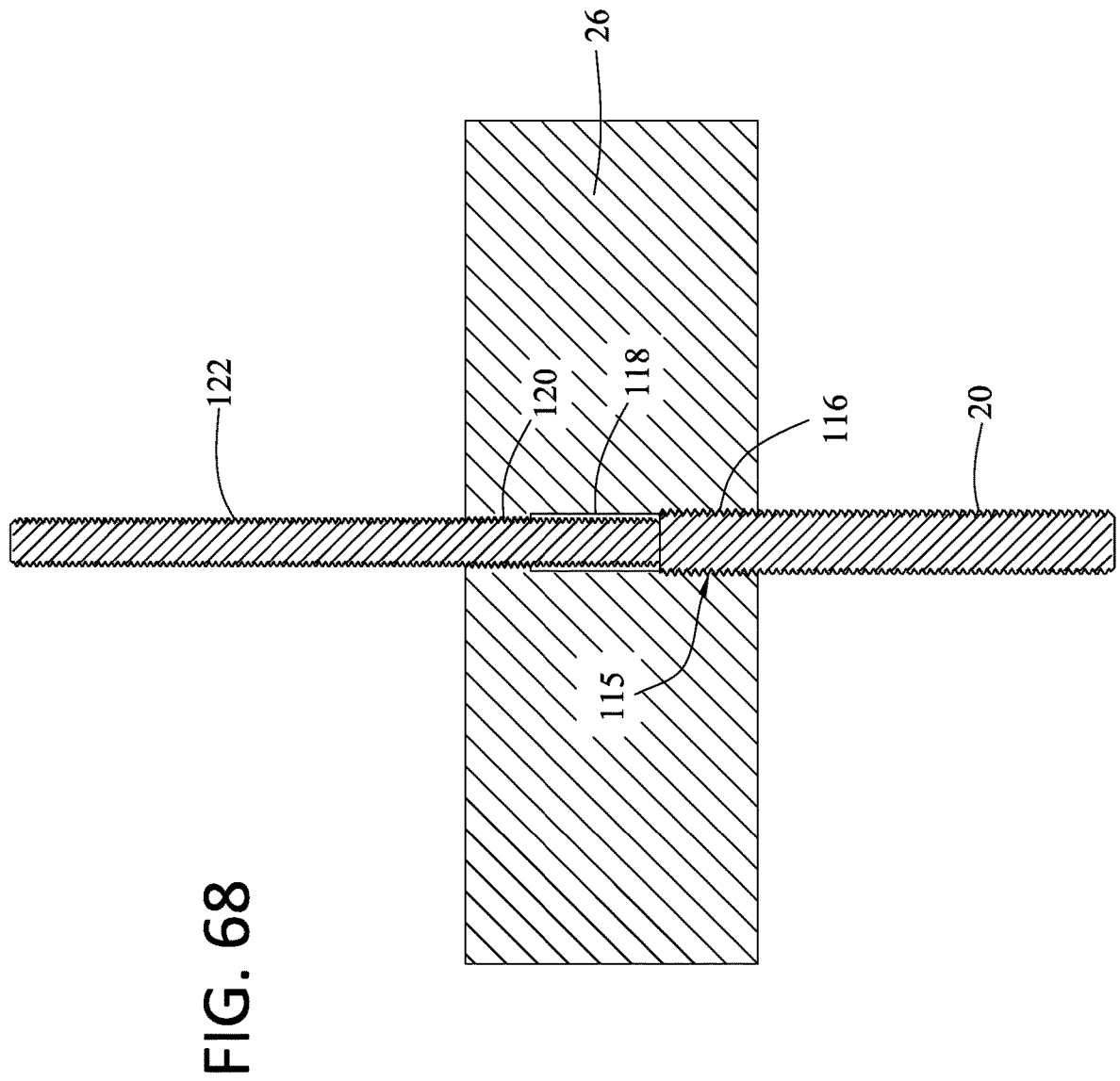

Referring to FIG. 68, a tie rod 122 is coupled to the rod post 20 within an opening 115 the bridge member 26. The opening 115 is multi-diameter, with a threaded opening 116 being of larger diameter than a threaded opening 120. The tie rod 122 is shown threaded to threaded opening 120 and the rod post 20 to a threaded opening 116 in the compression bridge member 26. The threaded opening 120 has a smaller diameter than the threaded opening 116. Between the threaded opening 116 and the opening 120 is an unthreaded portion 118 of the opening 115. The bridge member 26 is able to transfer compression and tension forces to the rod post 20.

Figure 69:
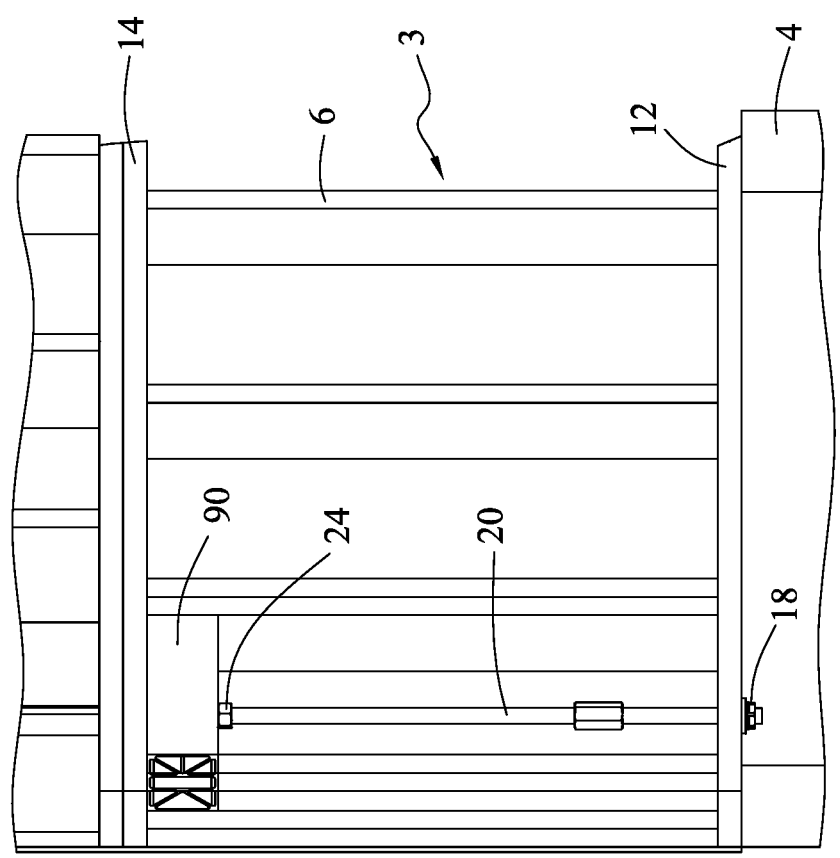

Referring to FIG. 69, the bridge member 90 is shown installed in the lower wall 3, engaging the underside of the top plate 14. The nut 24 transfers compression forces from the bridge member 90 to the rod post 20.

Figure 70:
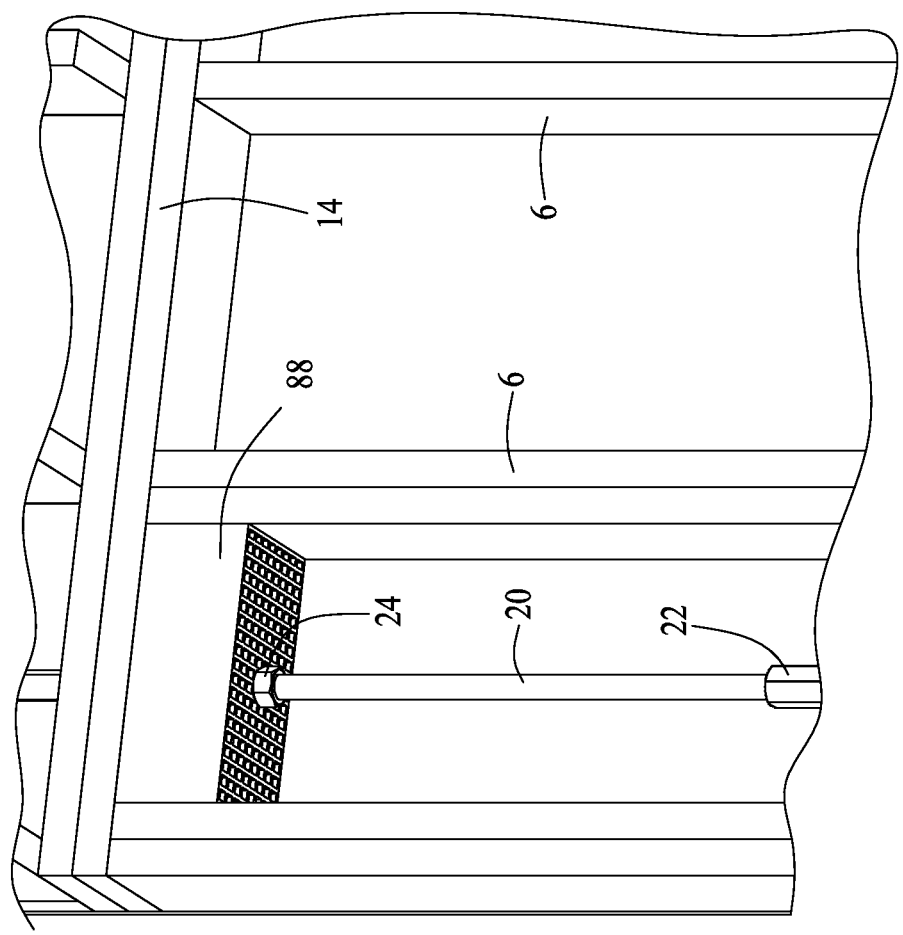

Referring to FIG. 70, the bridge member 88 is shown installed in the lower wall 3, engaging the underside of the top plate 14. The nut 24 transfers compression forces from the bridge member 90 to the rod post 20.

Figure 72:
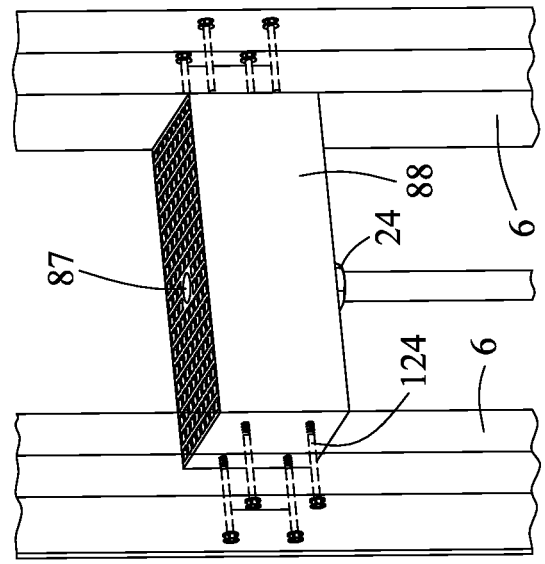
Figure 71:
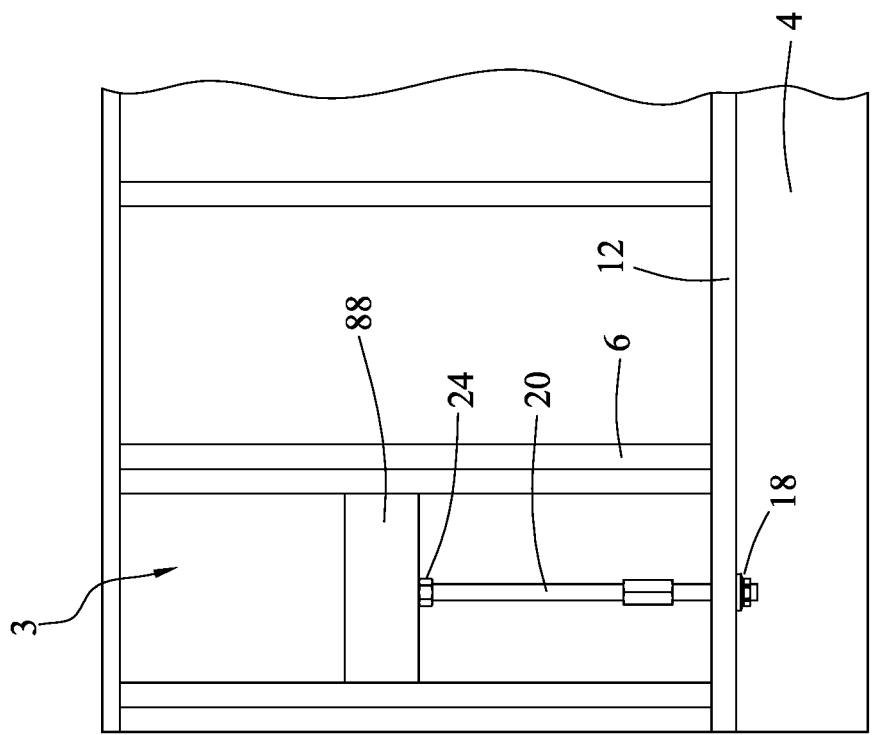

Referring to FIGS. 71 and 72, the bridge member 88 is shown attached in the middle of the wall 3. Screws 124 attach the bridge member 88 to the studs 6. The nut 24 transfers compression forces from the bridge member 88 to the rod post 20. The studs 6 are preferably doubled up to handle the expected load.

Figure 74:
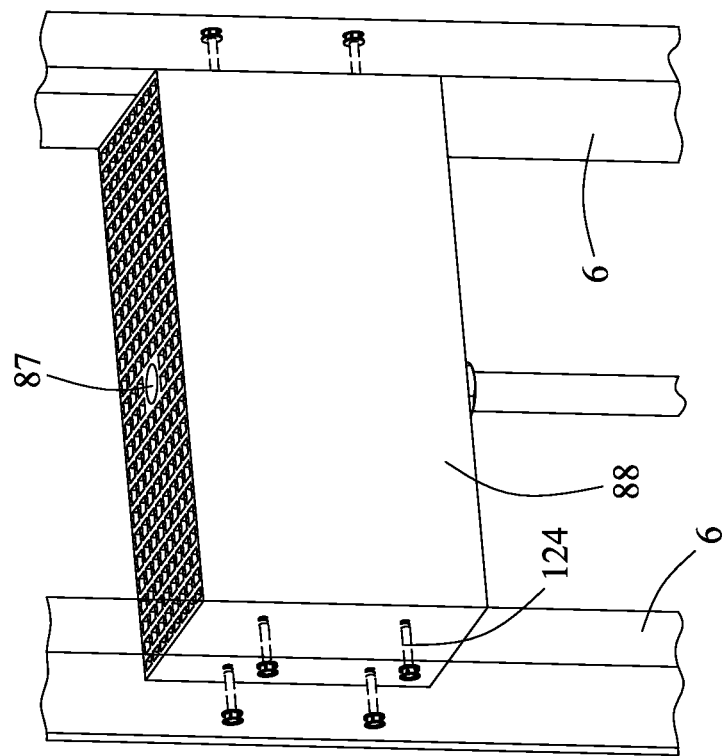
Figure 73:
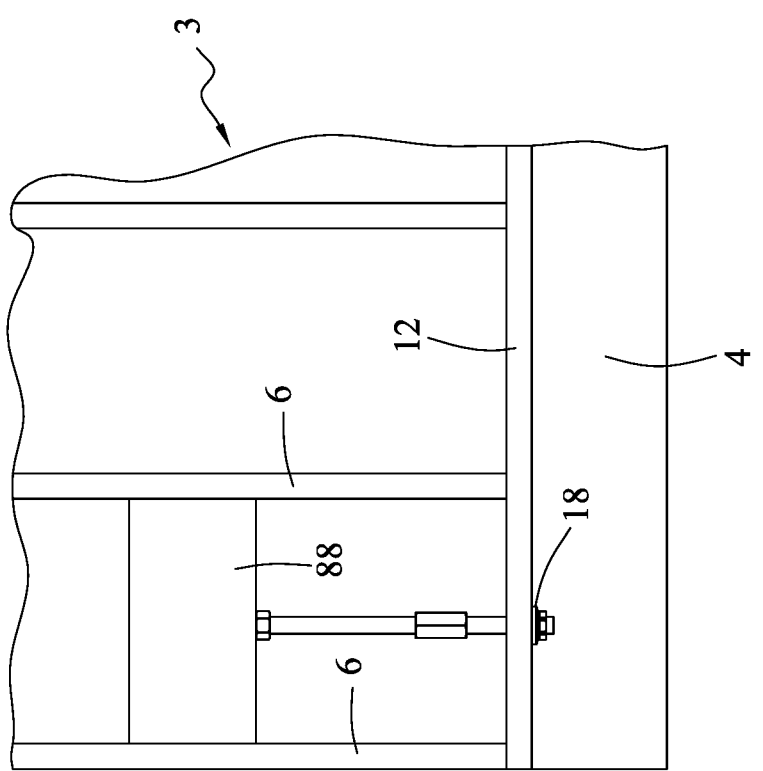

Referring to FIGS. 73 and 74, the bridge member 88 is shown attached in the middle of the wall 3. Screws 124 attach the bridge member 88 to the studs 6. The nut 24 transfers compression forces from the bridge member 88 to the rod post 20. The studs 6 are preferably not doubled due to a lesser amount of load expected than the arrangement shown in FIGS. 71 and 72.

Figure 76:
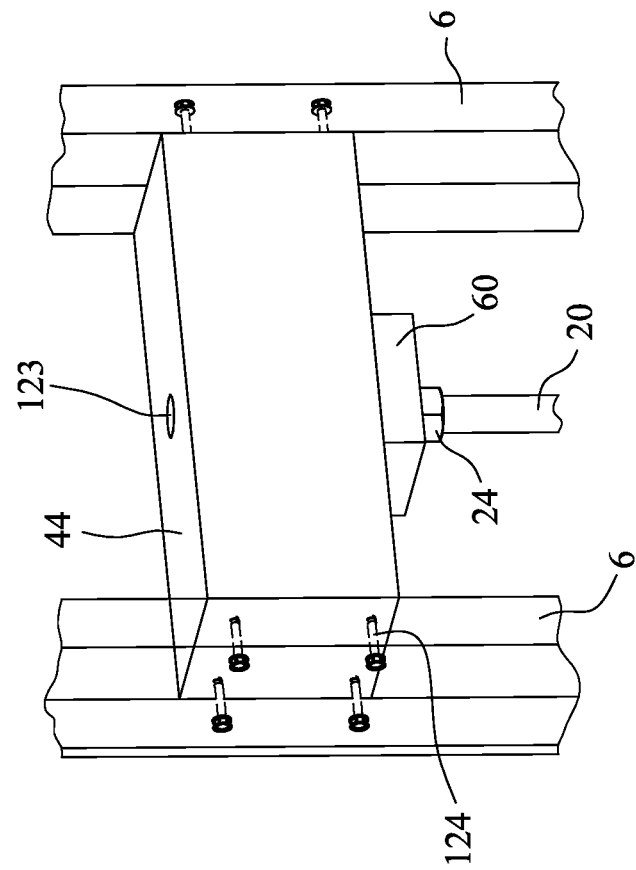
Figure 75:
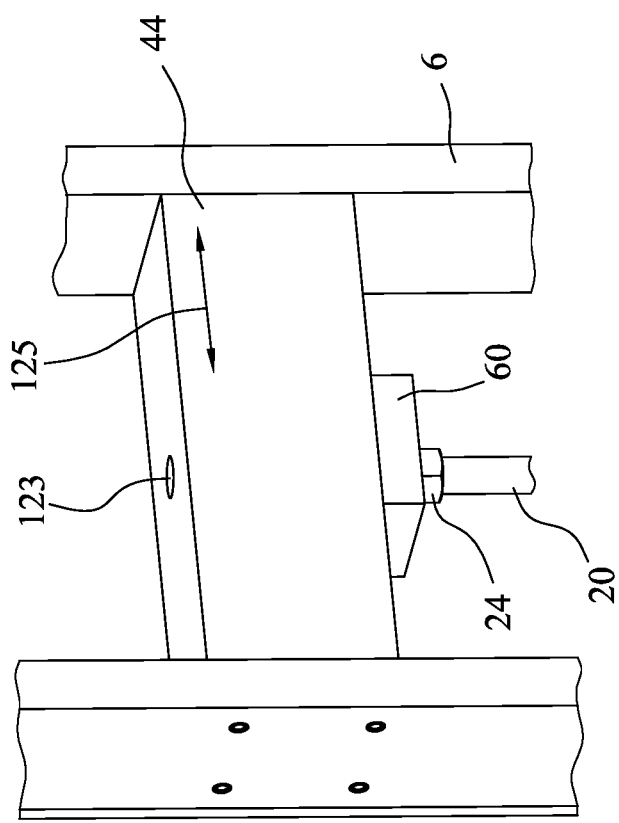

Referring to FIGS. 75 and 76, the bridge member 44 is shown attached in the middle of the wall 3. Screws 124 attach the bridge member 88 to the studs 6. The nut 24 transfers compression forces from the bridge member 88 to the rod post 20. The bearing plate 60, preferably metal with higher compressive strength than the bridge member 44, advantageously spreads the compressive forces over a larger area than the actual footprint of the nut 24. The rod post 20 extends inside the bridge member 44 through an opening 123. The bridge member 44 is made of engineered wood with the wood grain 125 running left to right, perpendicular to the rod post 20 and the direction of the compression forces.

Figure 78:
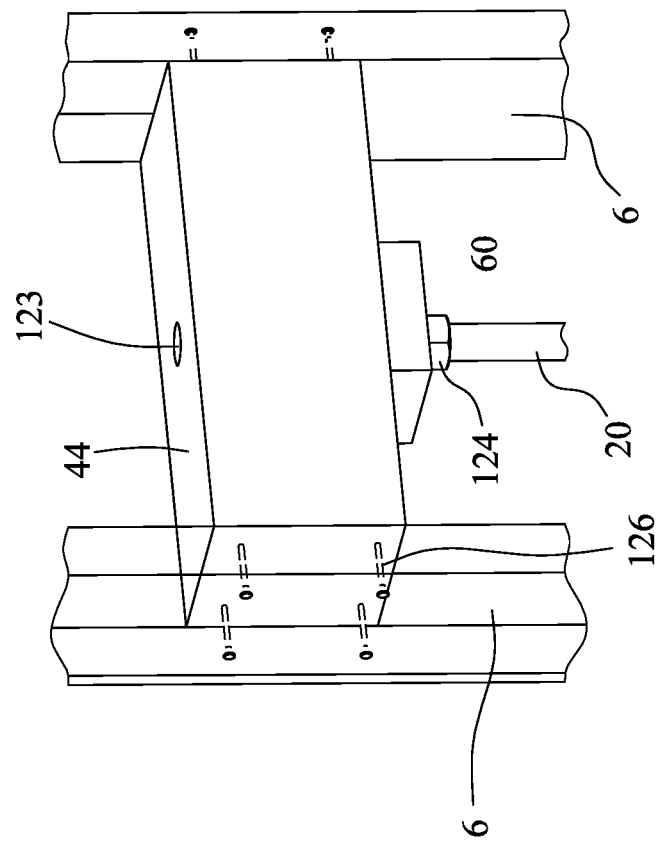
Figure 77:
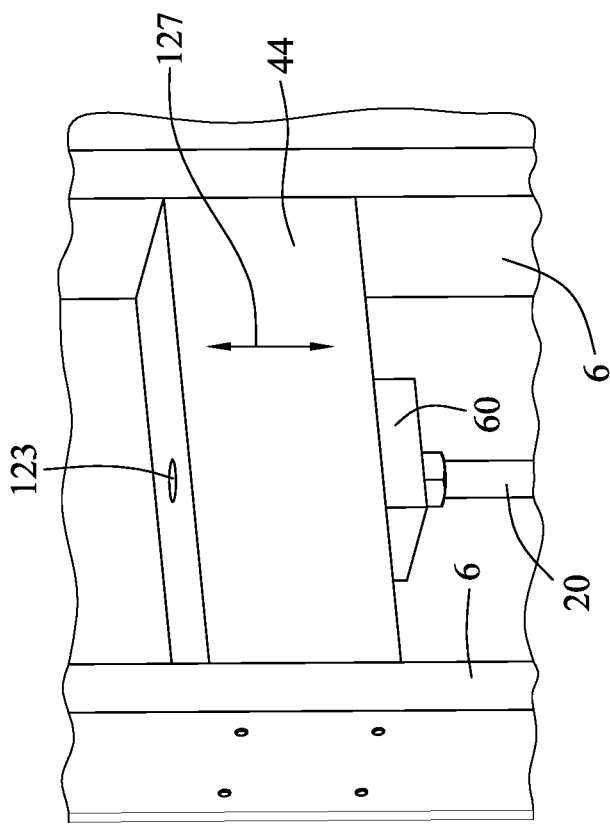

Referring to FIGS. 77 and 78, the bridge member 44 has wood grain 127 running vertically, parallel to the rod post 20 and the direction of the compression forces. The bridge member 44 with the wood grain running parallel to the direction of the compression forces has higher compressive strength than one with the wood grain running perpendicular to the direction of the compression forces.

Referring to FIG. 79, bridge members 88 are installed in the respective lower wall 3 and middle wall 5. The arrangement is designed for compression forces only since the bridge members 88 are not attached to the rod post 20 to handle tension forces (upward direction).

Figure 80:
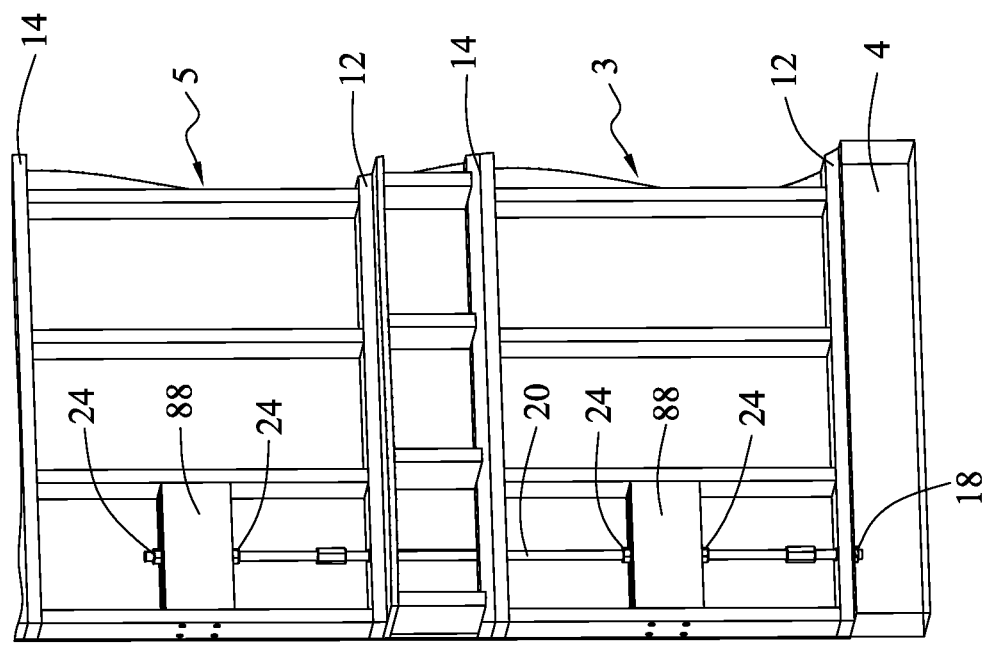

Referring to FIG. 80, the bridge members 88 are installed for compression and tension forces. The nuts 24 above the respective bridge members 88 transfer the tension forces from the bridge members 88 to the rod post 20. The nuts 24 below the bridge members 88 transfer the compression forces from the bridge members 88 to the rod post 20.

Figure 82:
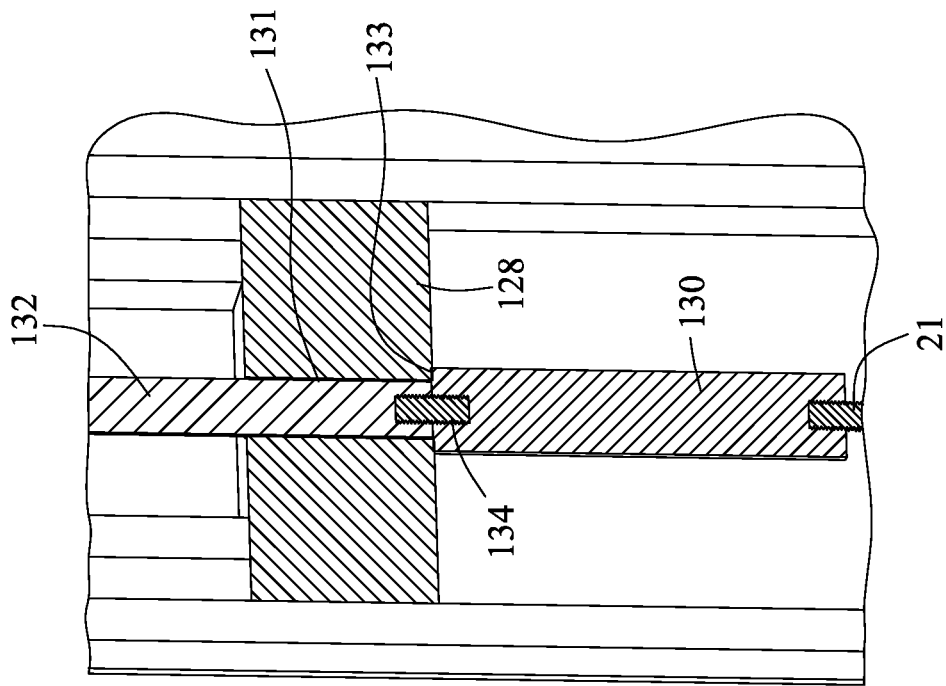
Figure 81:
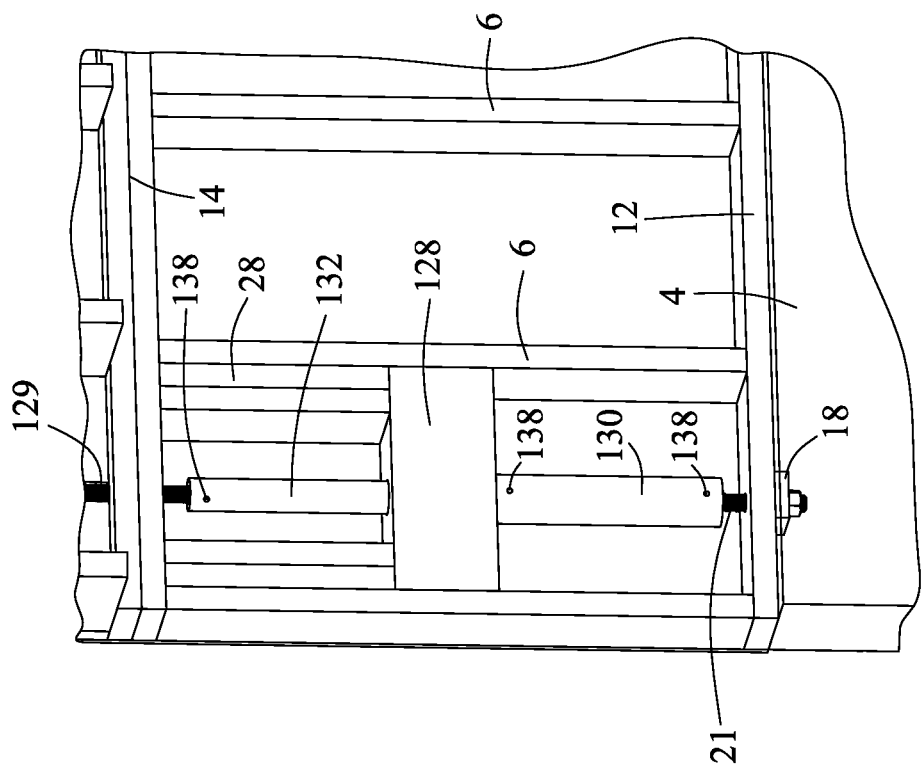

Referring to FIGS. 81 and 82, a metal compression bridge member 128 is disposed inside the wall 3 between the base plate 12 and the top plate 14. Trimmer studs 28 extend from the top of the bridge member 128 to the underside of the top plate 14. A large diameter coupling 130 extends from the anchor rod 21 to the underside of the bridge member 128. A smaller diameter coupling 132 extends from the top of the bridge member 128 to a threaded rod 129. The coupling 132 has a smaller diameter than the coupling 130. The coupling 132 extends through an opening 131 to bear on a top end surface 133 of the coupling 130. In this manner, compression forces from the upper rod post 132 are advantageously transferred directly to the lower rod post 130. A headless bolt or setscrew 134 joins the coupling 132 to the coupling 130. There is no connection between the bridge member 128 and the coupling 132 so that compression forces from the coupling 132 are transferred directly to the coupling 130. Compression forces from the coupling 132 do no transfer to the bridge member 128. Inspection holes 138 communicate with the threaded bore holes inside the respective ends of the couplings 130 and 132 to advantageously provide a visual check of the engagement of the set screw 134, the anchor rod 21 and the threaded rod 129 in the respective threaded bore holes.

The attachment of the compression plate 38 to the underside of the top plate 14 in the upper wall 7 as shown in FIG. 23 may be modified as shown in FIGS. 83-94 to allow for tensions forces to be transmitted to the rod post 20.

Figure 83:
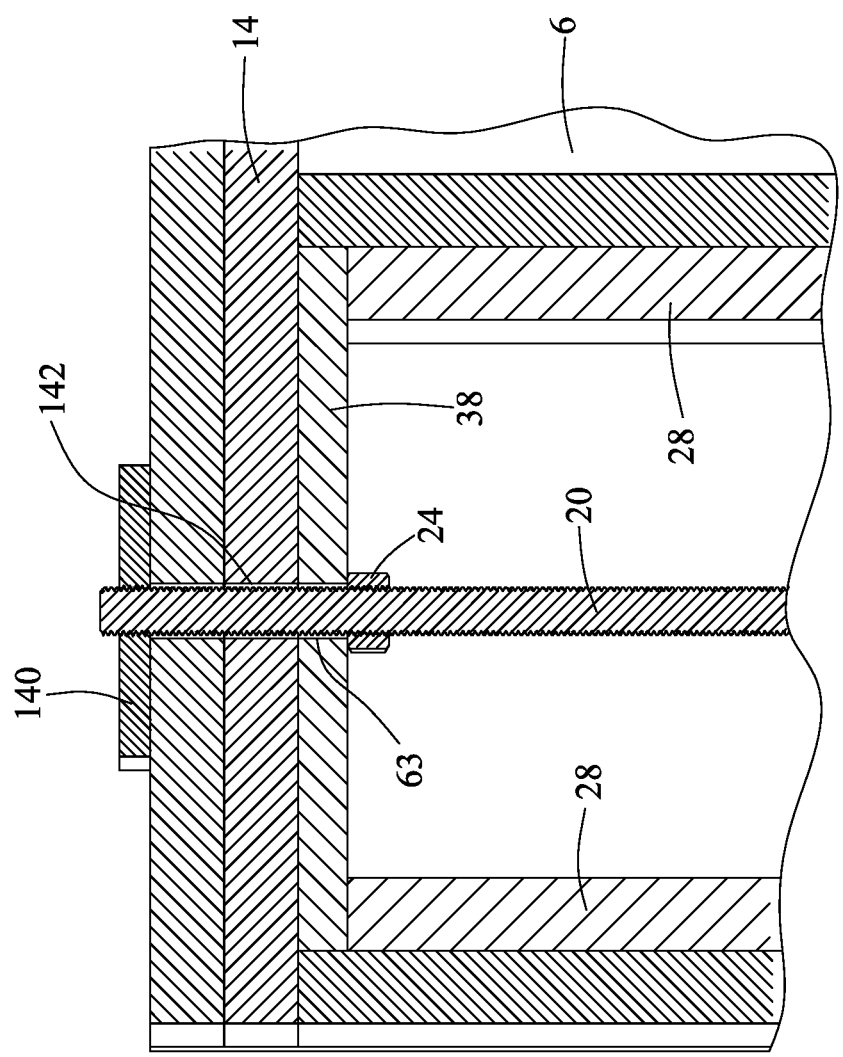

Referring to FIG. 83, the compression plate 38 is supported by the top ends of the trimmer studs 28 and engages the bottom of the top plate 14. The rod post 20 extends through the unthreaded opening 63 and the opening 142 and is threaded to a bearing plate 140 disposed on the top of the top plate 14. The nut 24 transfers compression forces from the compression plate 38 to the rod post 20. The bearing plate 140 transfers tension forces from the top plate 14 to the rod post 20.

Figure 84:
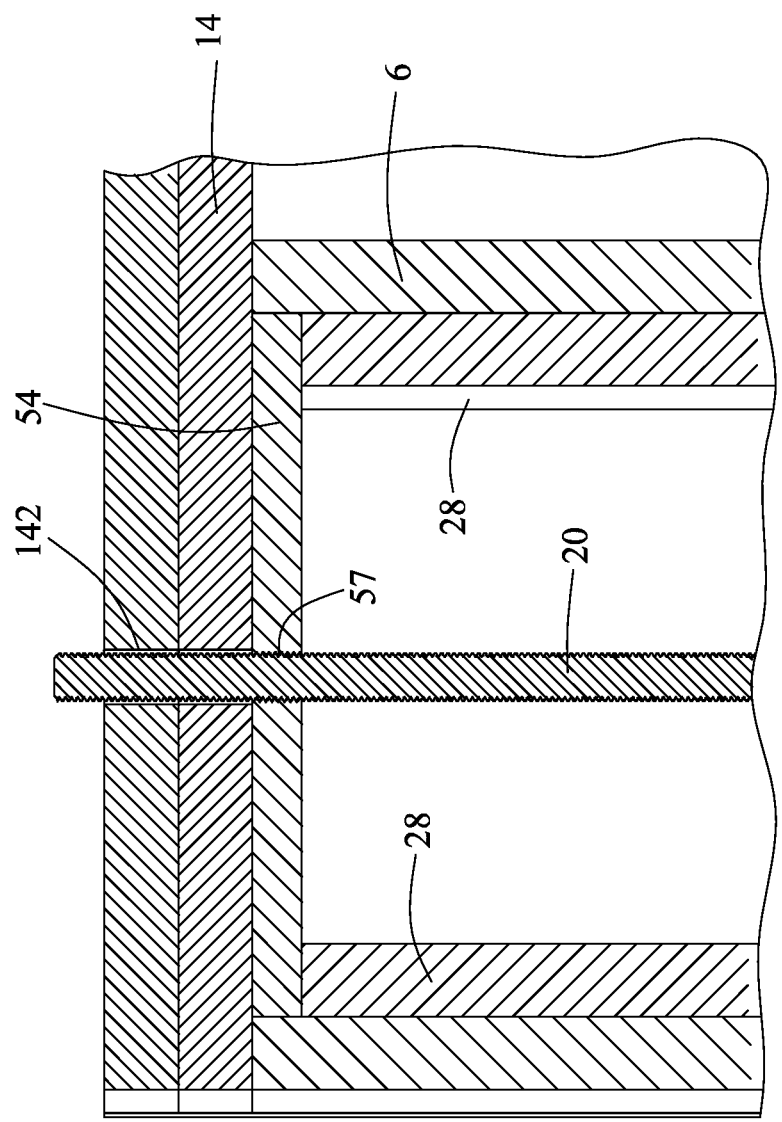

Referring to FIG. 84, the compression plate 54 is supported by the top ends of the trimmer studs 28 and engages the bottom of the top plate 14. The compression plate 54 is threaded to the rod post 20 via the threaded hole 57 and extends through the opening 142 past the top of the top plate 14. The compression plate transfers compression and tension forces to the rod post 20.

Figure 85:
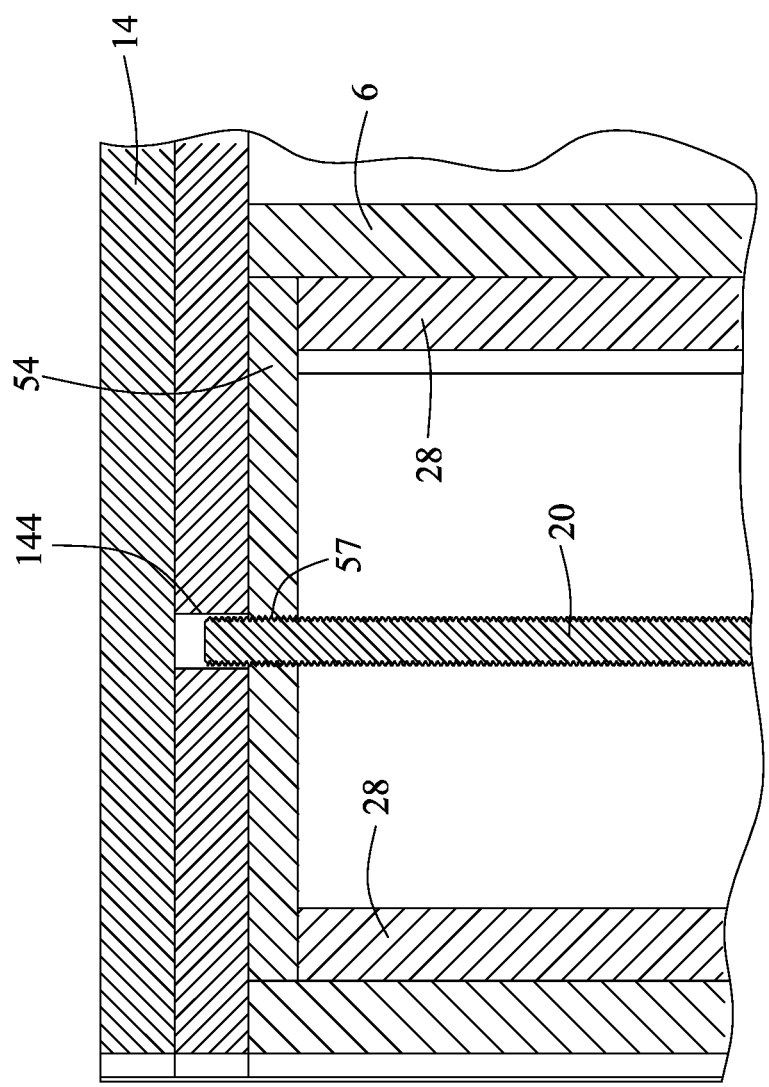

Referring to FIG. 85, the compression plate 54 is threaded to the rod post 20 via the threaded hole 57 and extends partway into a blind opening 144 in the top plate 14. The compression plate transfers compression and tension forces to the rod post 20.

Figure 86:
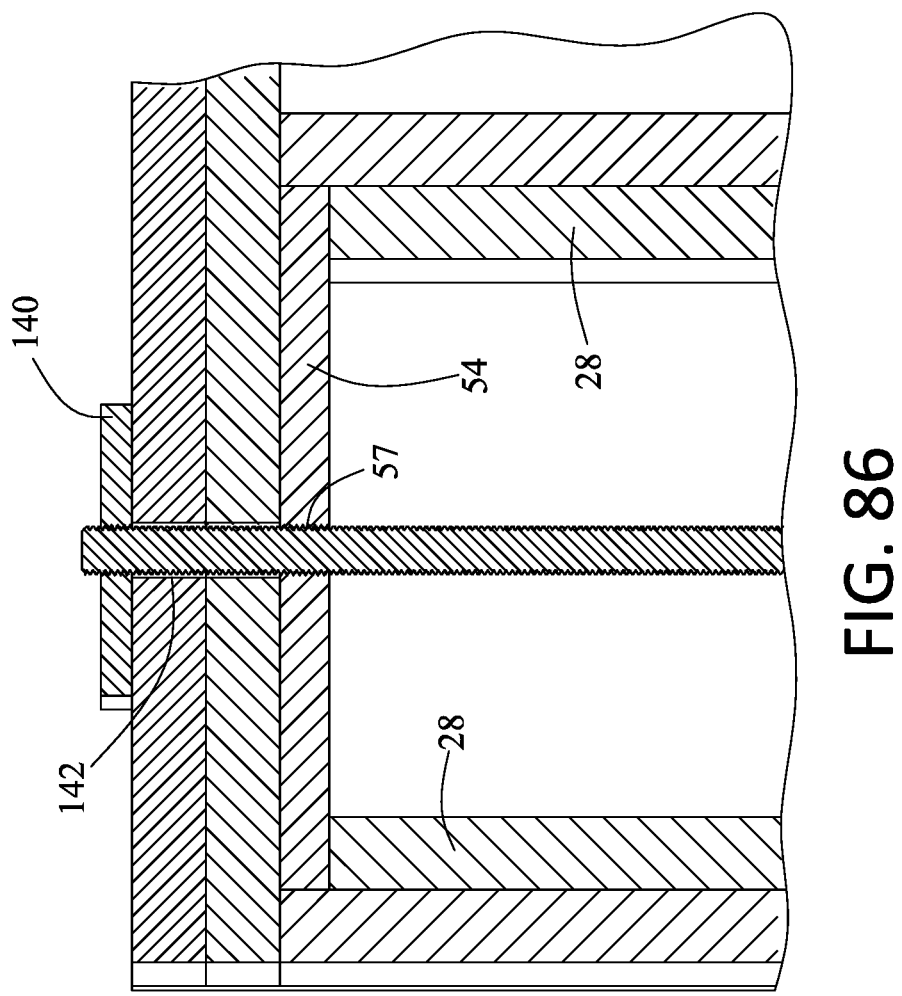

Referring to FIG. 86, the rod post 20 is threaded to the threaded opening 57 in the compression plate 54. The rod post 20 extends through the opening 142 and is threaded to the bearing plate 140 disposed on the top of the top plate 14. The threaded connection of the rod post 20 with the compression plate 54 transfers compression forces from the compression plate 54 to the rod post 20. The bearing plate 140 transfers tension forces from the top plate 14 to the rod post 20.

Figure 88:
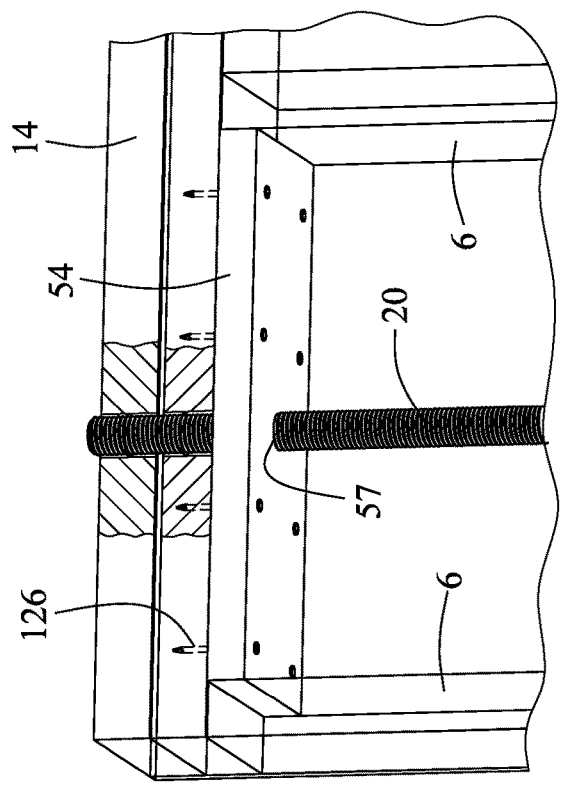
Figure 87:
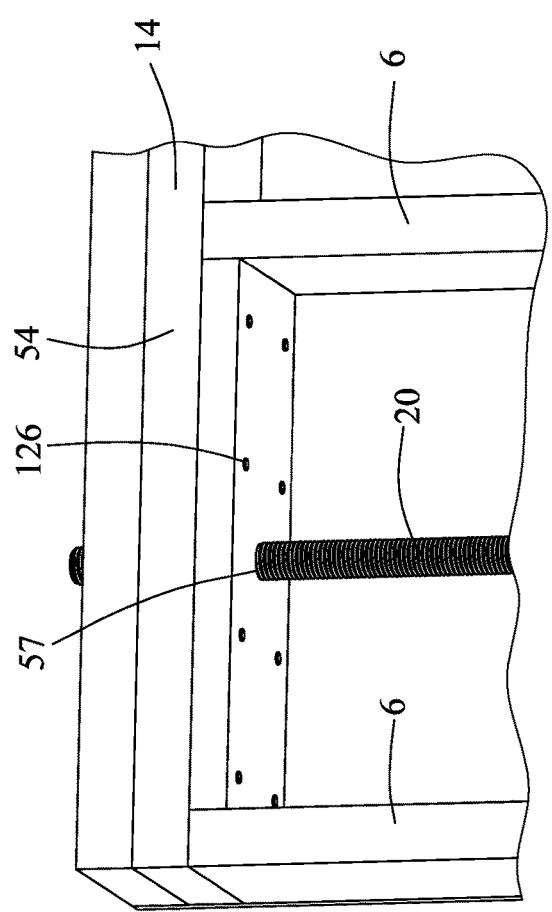

Referring to FIGS. 87 and 88, the rod post 20 is threaded to the opening 57. Nails 126 are used to attach the compression plate 54 to the underside of the top plate 14. The nails 126 advantageously eliminate the use of the trimmer studs 28 for stabilizing the compression plate 54 when subjected to compression or tension loading.

Figure 89:
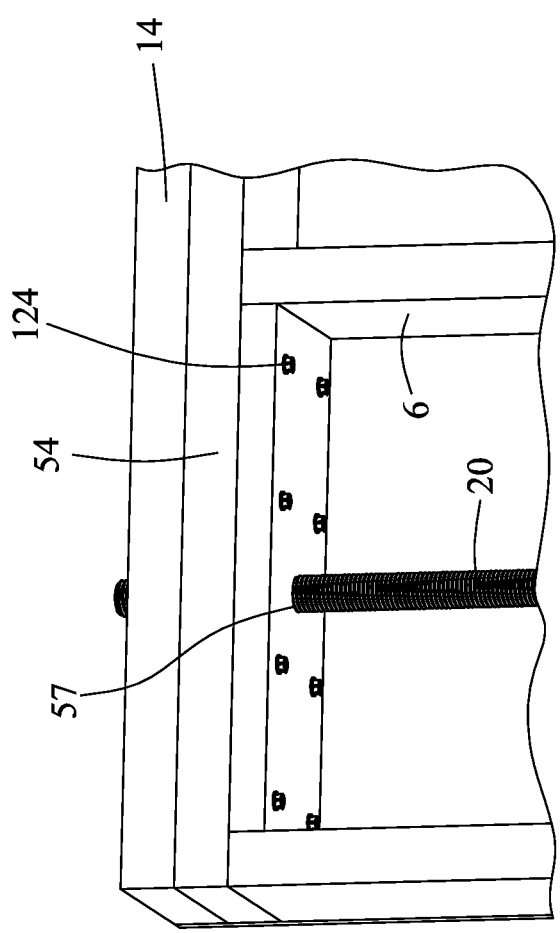
Figure 90:
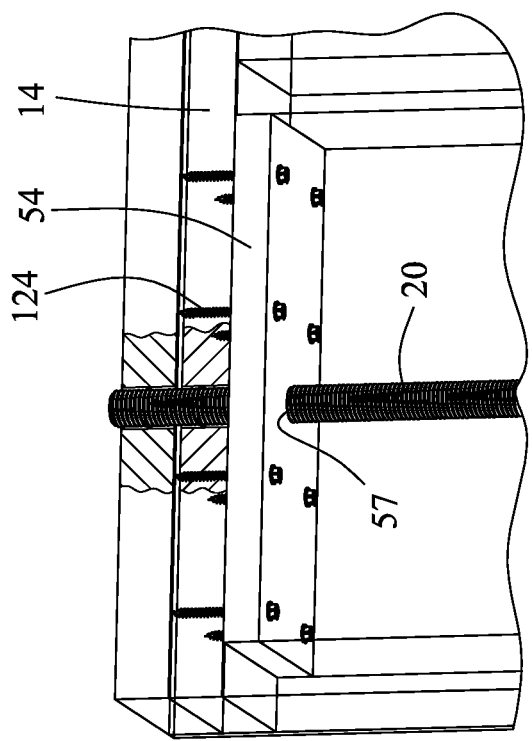

Referring to FIGS. 89 and 90, screws 124 are used to attach the compression plate 54 to the underside of the top plate 14.

Figure 91:
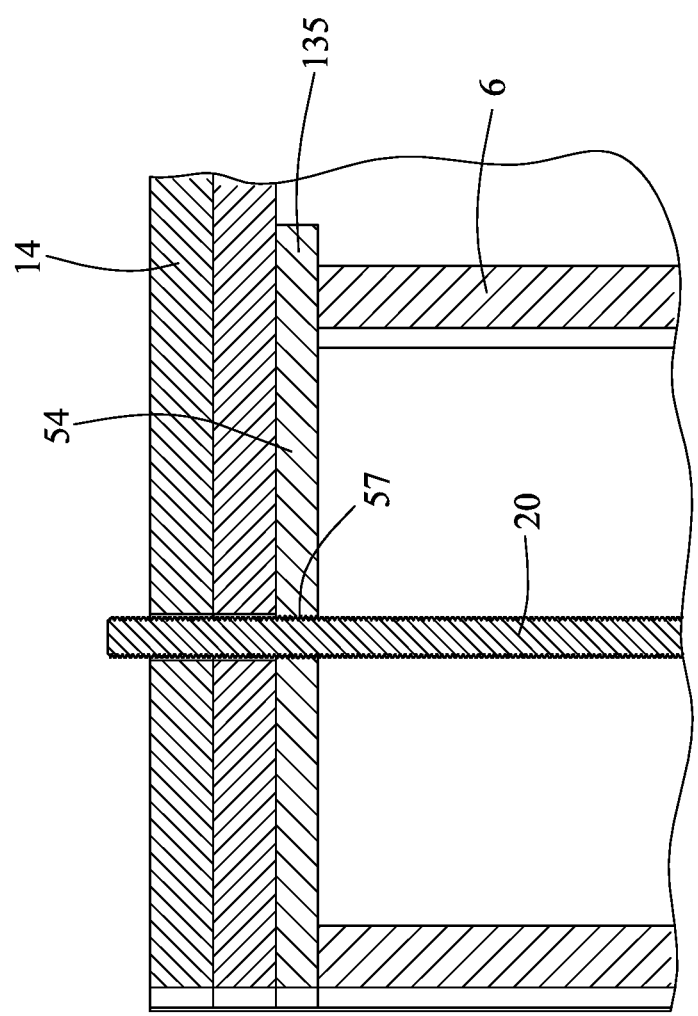

Referring to FIG. 91, one end 135 of the compression plate 54 extends beyond the stud 6 in the stud bay to allow the compression forces exerted by the top end of the stud 6 to be spread over a larger area of the top plate 14. The principle is the same as with the ends 49 and 47, shown in FIGS. 20 and 22.

Figure 92:
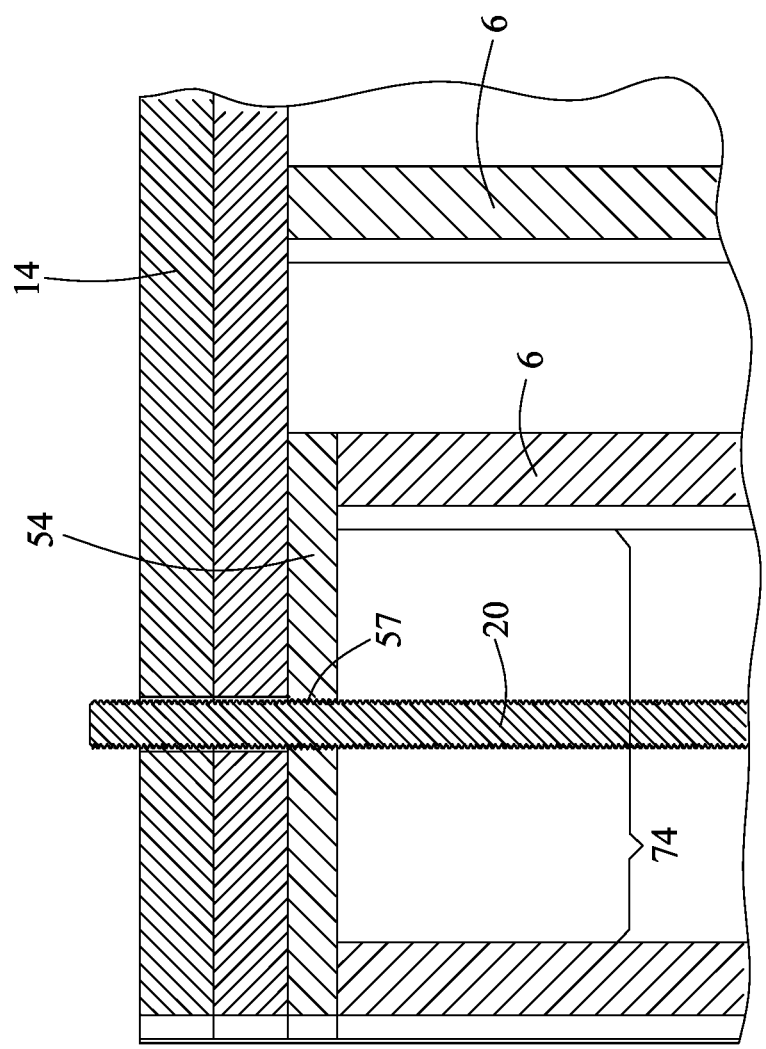

Referring to FIG. 92, the compression plate 54 spans only a part 74 of a typical stud bay.

Figure 93:
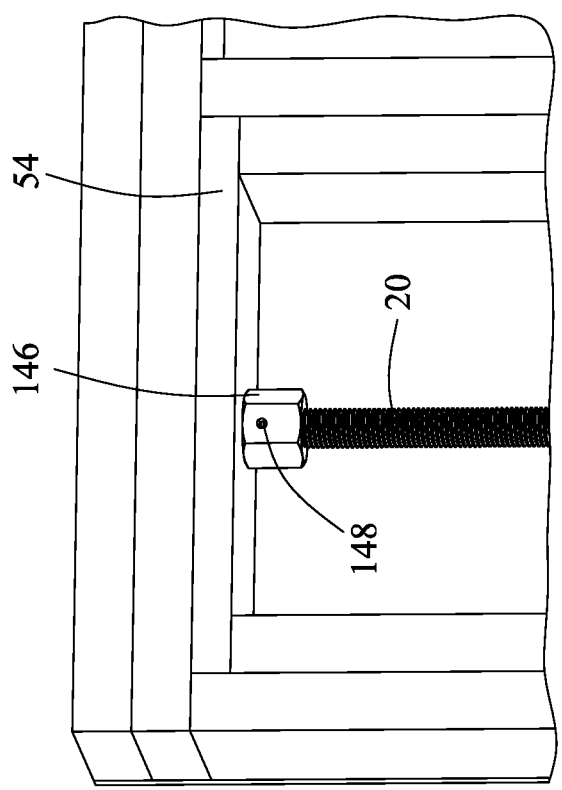
Figure 94:
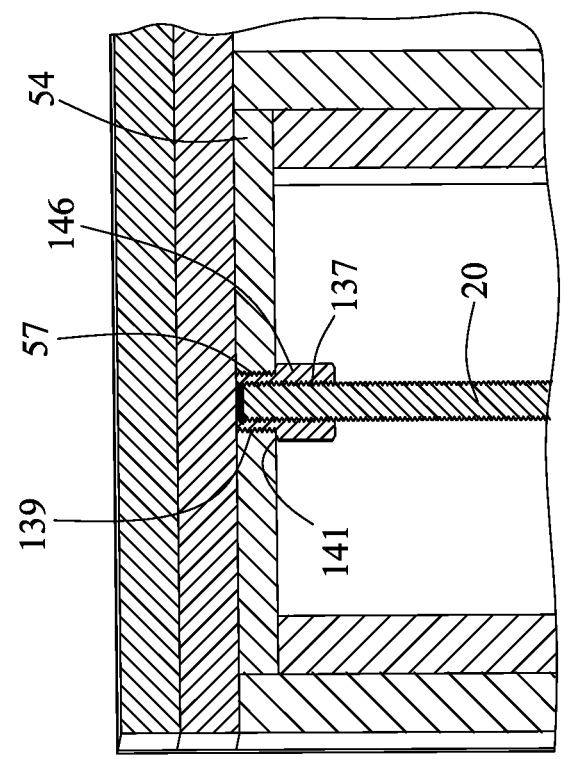

Referring to FIGS. 93 and 94, the rod post 20 may be attached to the compression plate 54 with a coupling nut 146 having a threaded opening 137 for attaching to the rod post 20 and a threaded projection 139 for threading into the threaded opening 57. A shoulder 141 is formed around base of the projection 139 for engaging against the underside of the compression plate 54. A radial sight hole 148 communicates with the opening 137 to provide a visual check on the required thread engagement of the coupling nut 146 with the rod post 20. The projection 139 preferably extends through the thickness of the compression plate. The coupling nut 146 transfers both compression and tension forces from the compression plate 54 to the rod post 20. The coupling nut 146 preferably has exterior hexagonal flat surfaces for engaging a wrench or similar tool.

Figure 95:
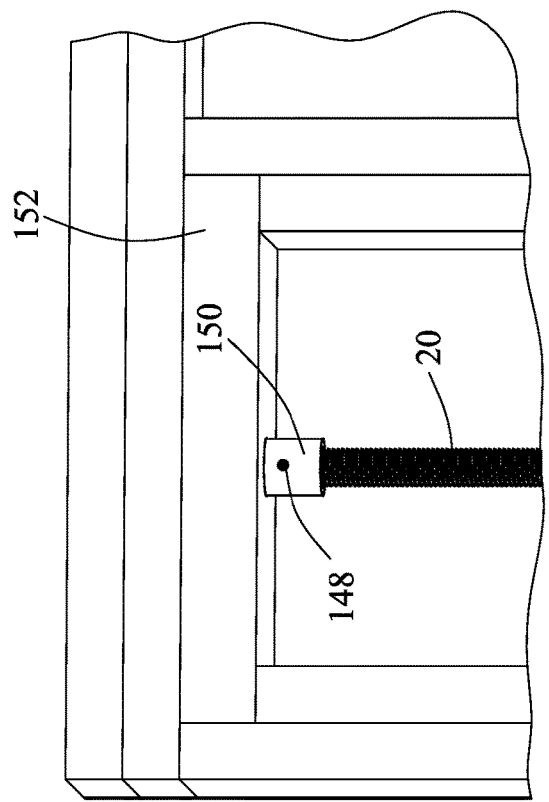
Figure 96:
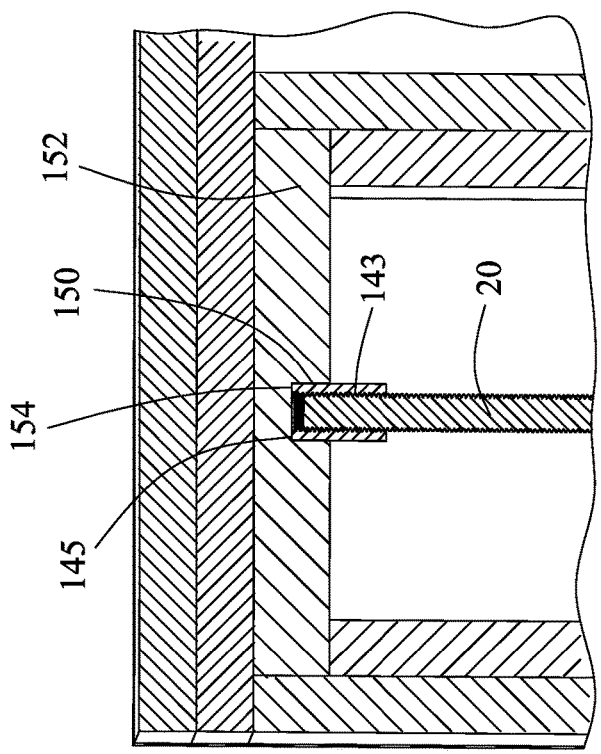

Referring to FIGS. 95 and 96, a compression plate 152 is attached to the rod post 20 with a sleeve 150 having a threaded opening 143 threadedly attached to the rod post 20. A blind hole 154 receives a portion of the sleeve 150. The sleeve 150 is advanced into the blind hole 154 until it engages the bottom surface 145 of the blind hole 154. The radial sight hole 148 communicates with the opening 143 to provide a visual check on the required thread engagement of the sleeve 150 with the rod post 20. The sleeve 150 transfers compressive forces from the compression plate 152 to the rod post 20.

Figure 98:
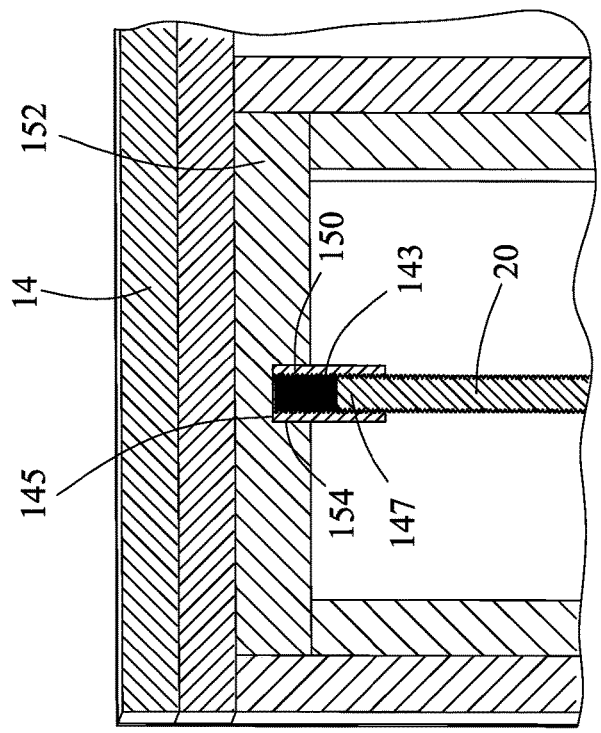
Figure 97:
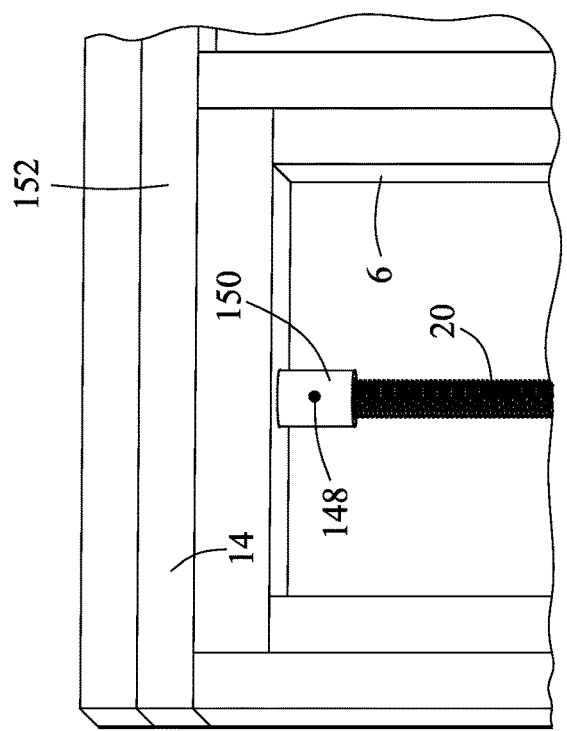

Referring to FIGS. 97 and 98, the sleeve 150 may be long enough and the end 147 of the rod post 20 may be short of or spaced from the underside of the compression plate 152 to facilitate in connecting the rod post 20 to the compression plate 152. As can be understood from the drawings, the sleeve 150 is initially positioned so that the top end of the sleeve 150 is some distance from the bottom of the compression plate 152. The sleeve 150 is then advanced into the blind hole 154 until it engages the bottom surface 145.

Referring to FIGS. 99 and 100, the sleeve 150 engages the bottom surface of a compression plate 156, which does not have the blind hole 154 found in the compression plate 152. The sleeve 150 is turned around the rod post 20 until the top end of the sleeve 150 presses on the underside of the compression plate 156. The compression plate 156 transfers compression forces to the rod post 20 through contact with the top end of the sleeve 150.

Figure 102:
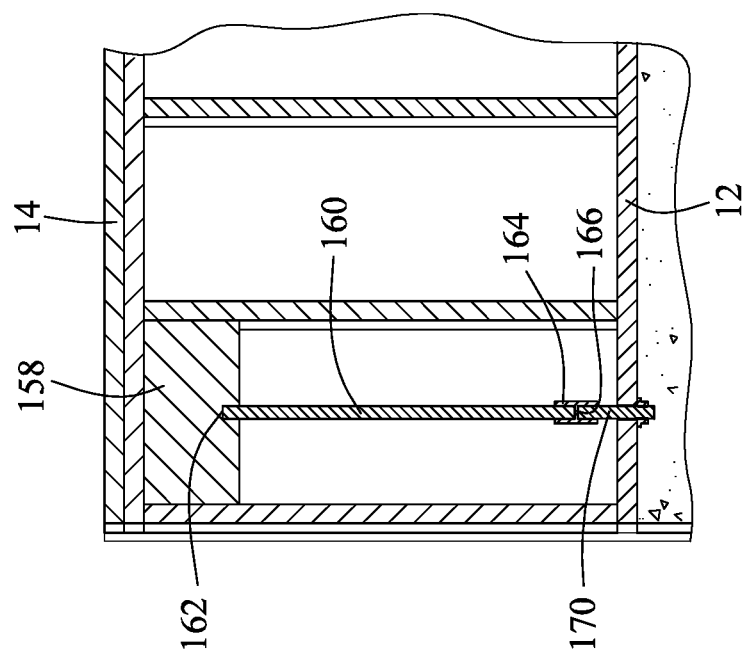
Figure 101:
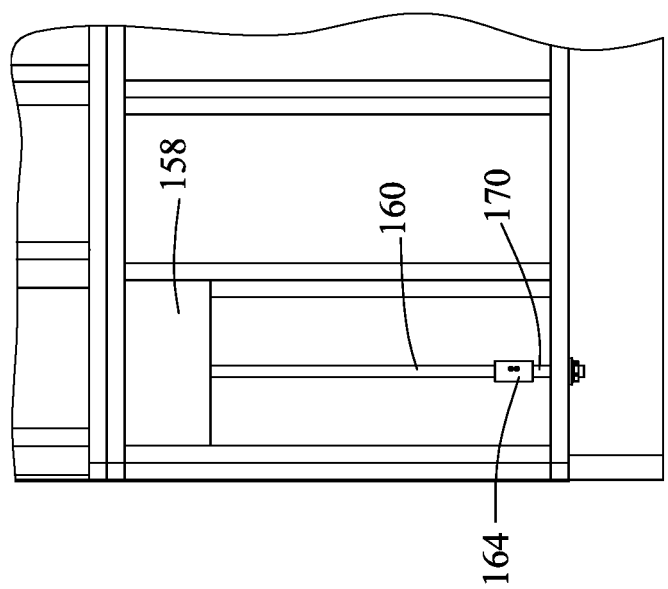

Referring to FIGS. 101 and 102, an unthreaded rod post 160 is attached to an unthreaded anchor rod 170 via an unthreaded coupling 164. The upper end of the rod post 160 is disposed inside an unthreaded blind hole 162 in the compression bridge member 158. The lower end of the rod post 160 is disposed inside the coupling 164. The coupling 164 includes a radial internal wall 166. The bottom end of the rod post 160 is inside the coupling 164 and engages the internal wall 166. The upper end of the anchor rod 170 is disposed inside the coupling 164 and engages the other side of the internal wall 166. Compression forces transferred from the compression bridge member 158 to the rod post 160 are transferred directly to the anchor rod 170 via the internal wall 166.

Figure 104:
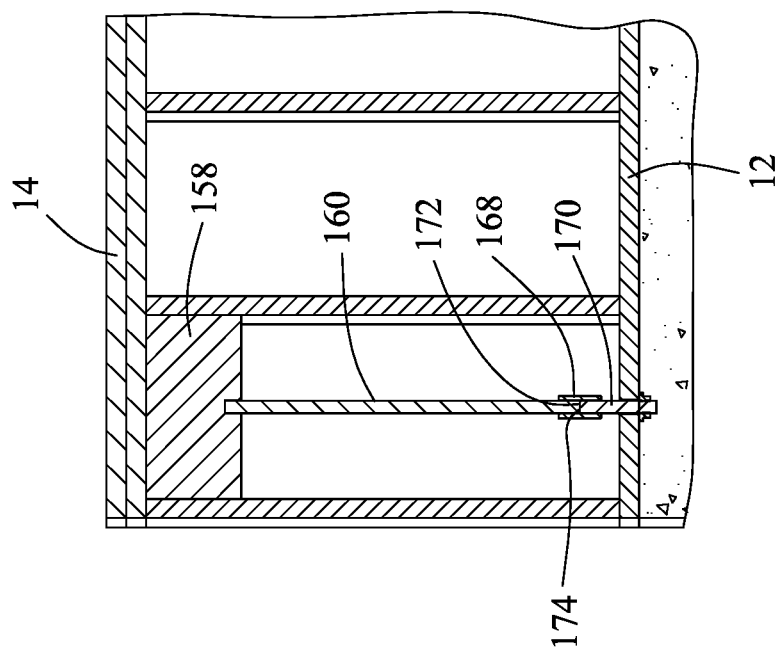
Figure 103:
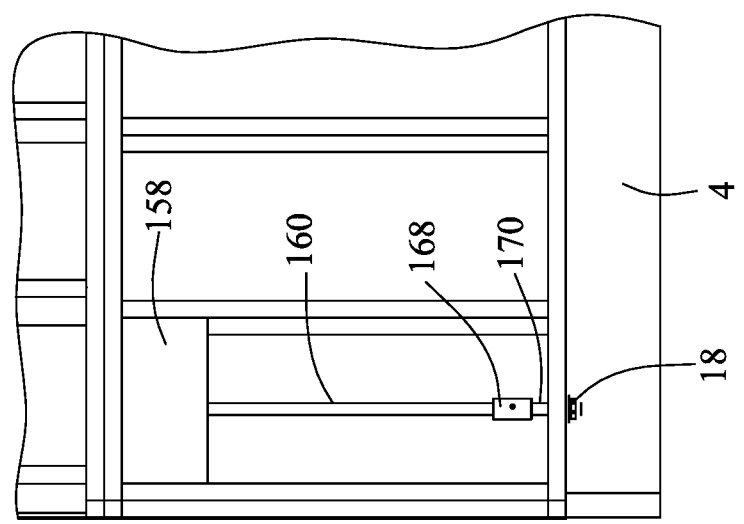

Referring to FIGS. 103 and 104, an unthreaded coupling 168 connects the rod post 160 with the anchor rod 170. The coupling 168 is fixedly attached to either the bottom end of the rod post 160 or the upper end of the anchor rod 170 to hold the coupling 168 in place. The bottom surface 172 of the rod 160 engages the top surface 174 of anchor rod 170 so that compression forces from the rod post 160 are transferred directly to the anchor rod 170 without passing through the coupling 168. The coupling 168 merely holds and aligns the rod post 160 with the anchor rod 170.

Figure 106:
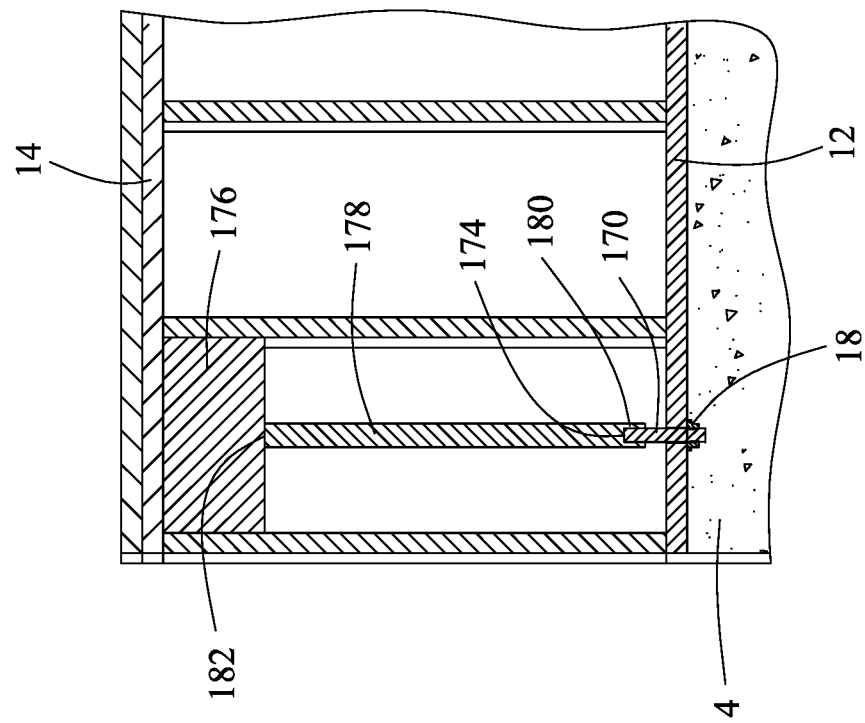
Figure 105:
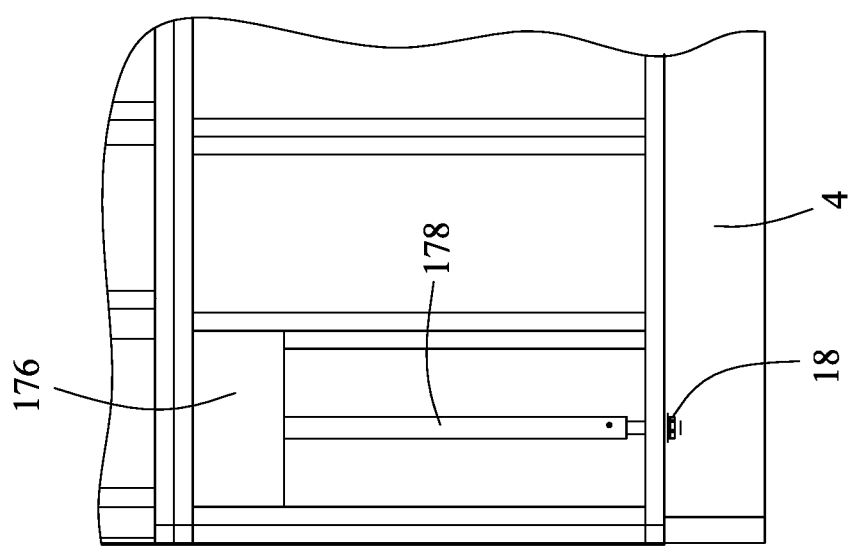

Referring to FIGS. 105 and 106, a rod post 178 supports a compression bridge member 176. The top surface 182 of the upper end of the rod post 178 engages the bottom exterior surface of the bridge member 176. The rod post 178 does not penetrate the bridge member 176. The bottom end of the rod post 178 includes an unthreaded blind hole 180 that received an upper end of the anchor rod 170. Compression forces from the bridge member 176 are transferred to the rod post 178 through contact with the top surface 182. Contact between the top surface of the upper end of the anchor rod 170 and the bottom of the blind hole 180 transfers the compression forces from the rod post 178 to the anchor rod 170 and thence to the anchor 18 and the foundation 4.

Figure 108:
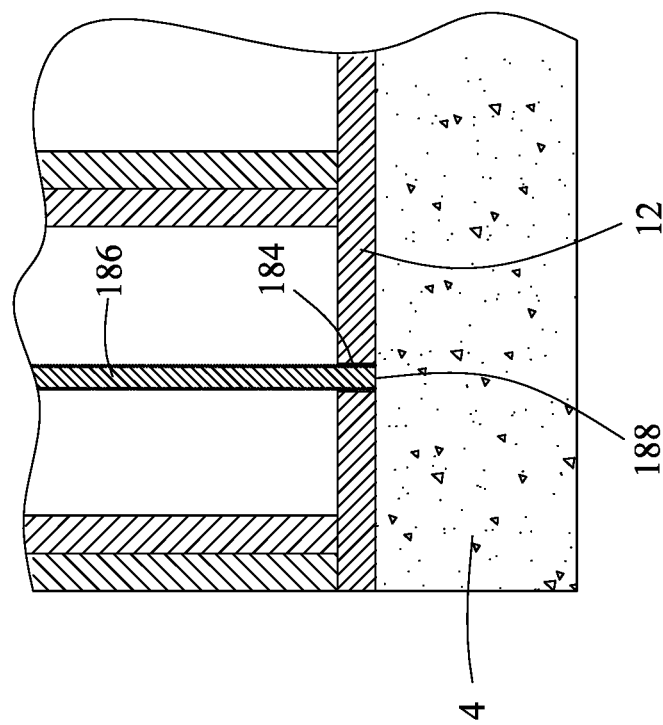
Figure 107:
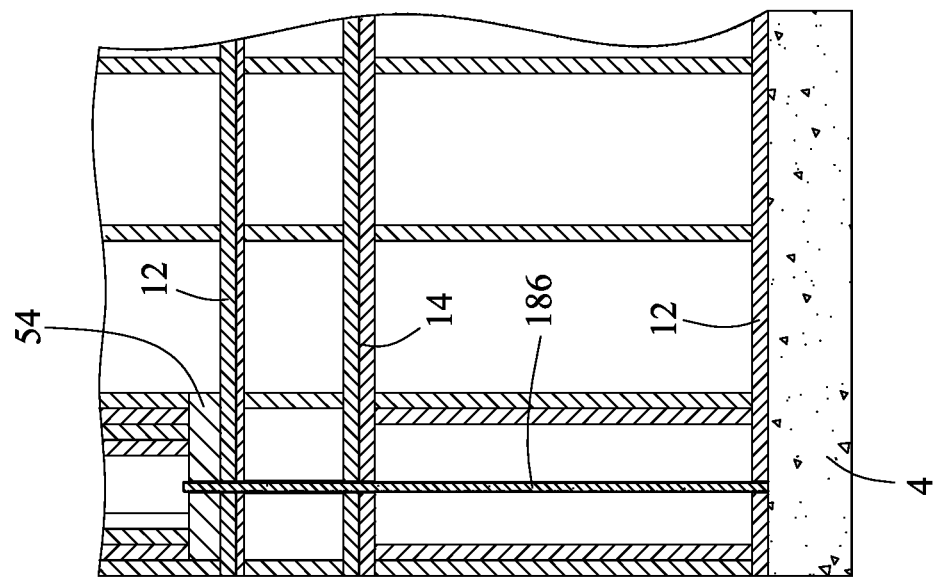

Referring to FIGS. 107 and 108, a single threaded rod post 186 is threaded to the compression plate 54. The threaded rod post 186 is larger in diameter than a normal tie rod used to hold a wall against tension forces and thereby provides the function of a post. The bottom end of the rod post 186 extends through an opening 184 in the bottom plate 12 and bears directly on the top surface of the foundation 4 via the bottom surface 188 of the rod post 186. Compression forces from the compression plate 54 are transferred to the rod 186 and thence to the foundation via the bottom surface 188 bearing on the top surface of the foundation 4.

Figure 110:
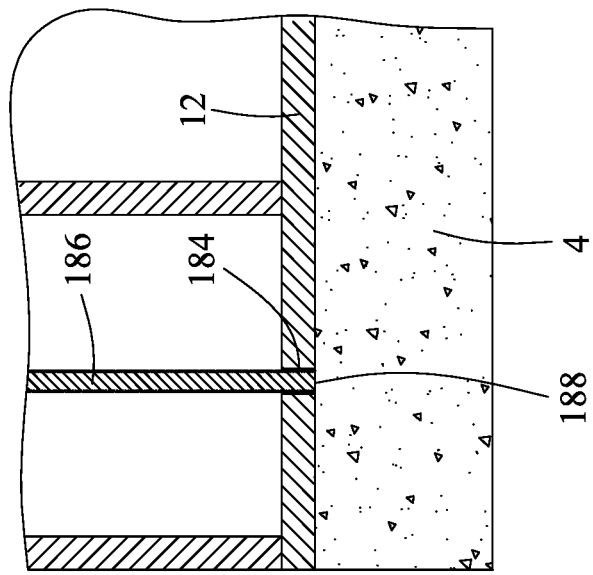
Figure 109:
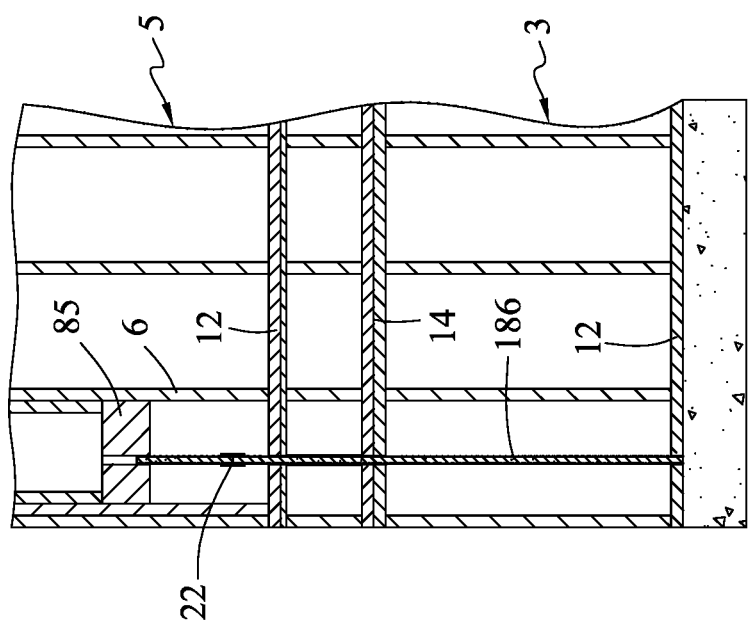

Referring to FIGS. 109 and 110, the threaded rod post 186 is threaded to the compression bridge member 85. The bottom end of the rod post 186 extends through an opening 184 in the bottom plate 12 and bears directly on the top surface of the foundation 4 via the bottom surface 188 of the threaded rod post 186. Compression forces from the bridge member 85 are transferred to the rod post 186 and thence to the foundation via the bottom surface 188 bearing on the top surface of the foundation 4. The threaded rod post 186 may be in two pieces, joined together by the coupling 22.

Figure 112:
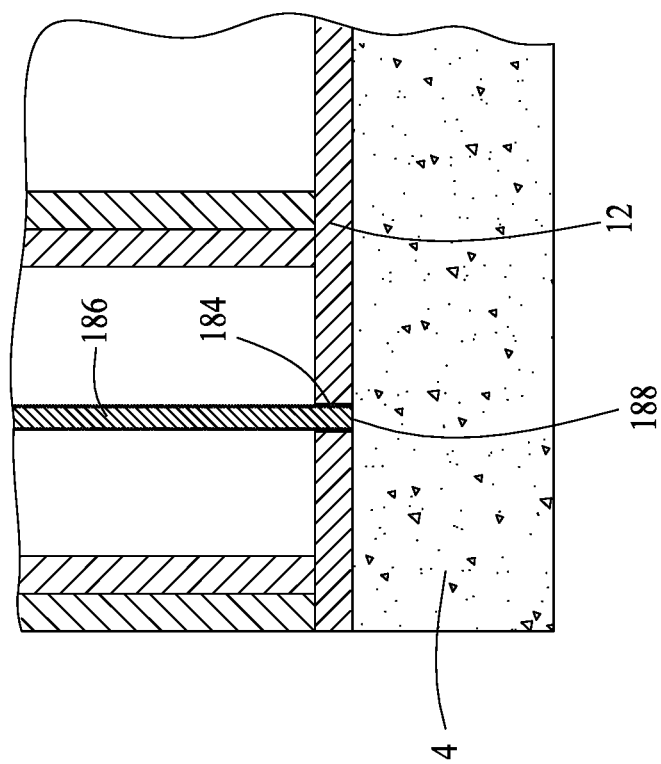
Figure 111:
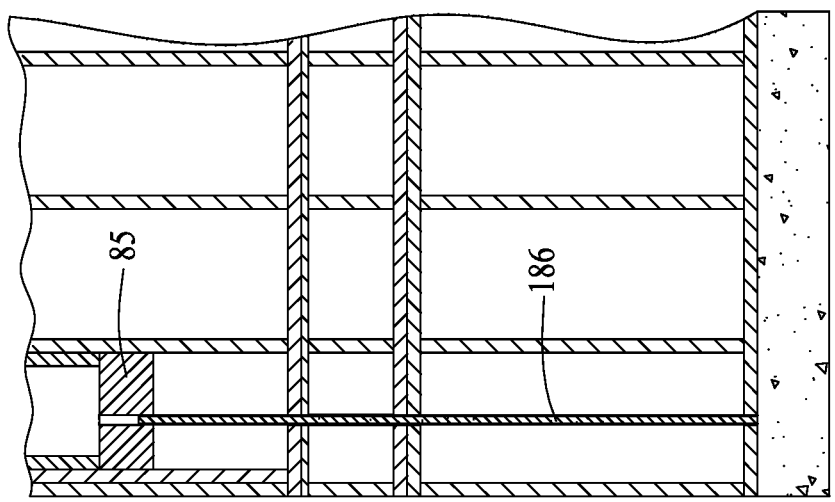

Referring to FIGS. 111 and 112, the rod post 186 is a single piece extending from the foundation to the bridge member 85.

Figure 113:
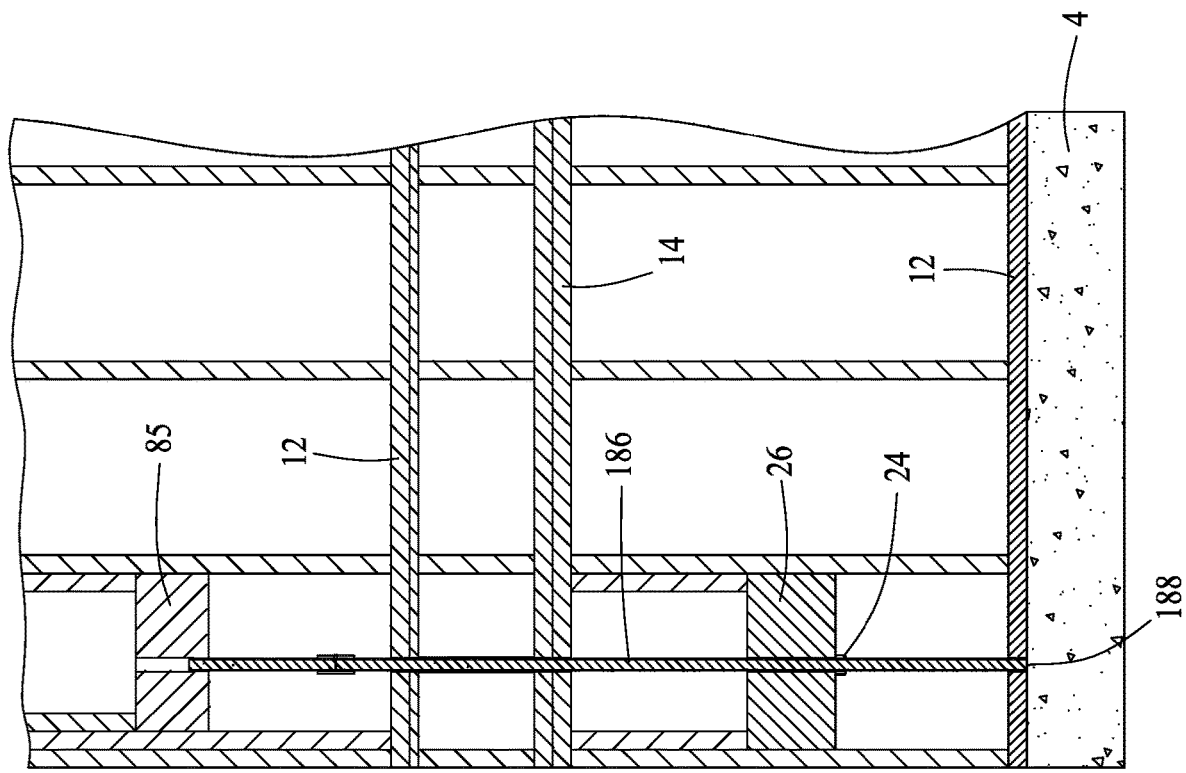

Referring to FIG. 113, the compression bridge member 85 is threaded to the threaded rod post 186 for transferring compression and tension forces from the bridge member 85 to the rod post 20. The compression bridge member 26 is not threaded to the rod post 186. The rod post 186 merely extends through an unthreaded opening in the bridge member 26. The nut 24 transfers compression forces from the bridge member 26 to the rod post 186. The bottom surface 188 of the rod post 186 bears on the foundation 14 to transfer compression forces to the foundation.

Figure 115:
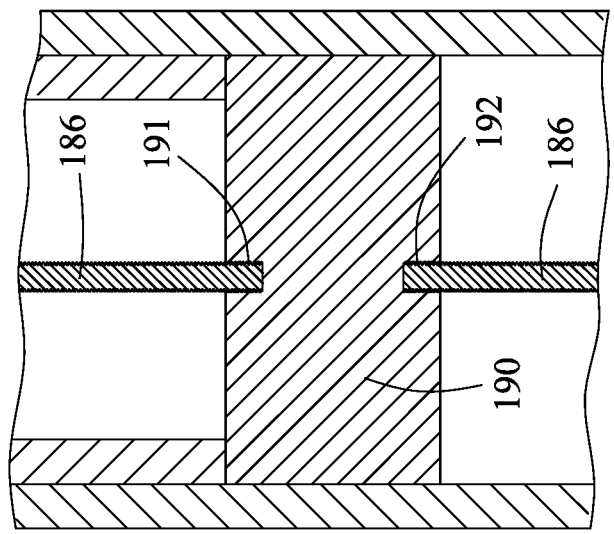
Figure 114:
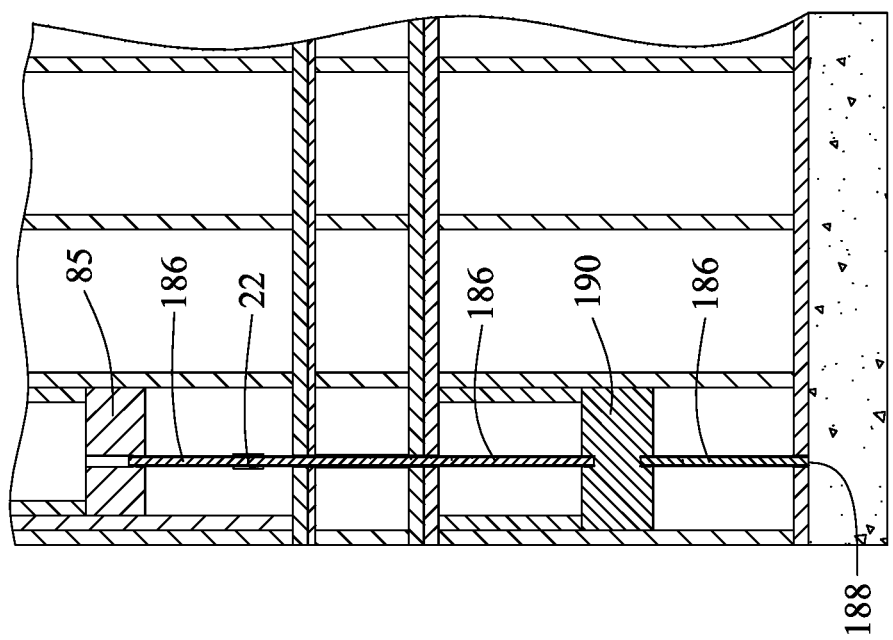

Referring to FIGS. 114 and 115, a compression bridge member 190 is used to join two sections of the rod post 186. The bridge member 190 includes an upper threaded blind hole 191 and a lower threaded blind hole 192 to which the upper and lower sections of the rod post 186 are threaded, respectively.

Referring to FIG. 116, a nonthreaded rod post 198 is used to transfer compression forces from a compression bridge member 194 to the foundation 4. An upper end of the rod post 198 is disposed inside an unthreaded blind hole 196 in the bottom of the bridge member 196. A bottom surface of the rod post 200 bears directly on the foundation 4.

Figure 118:
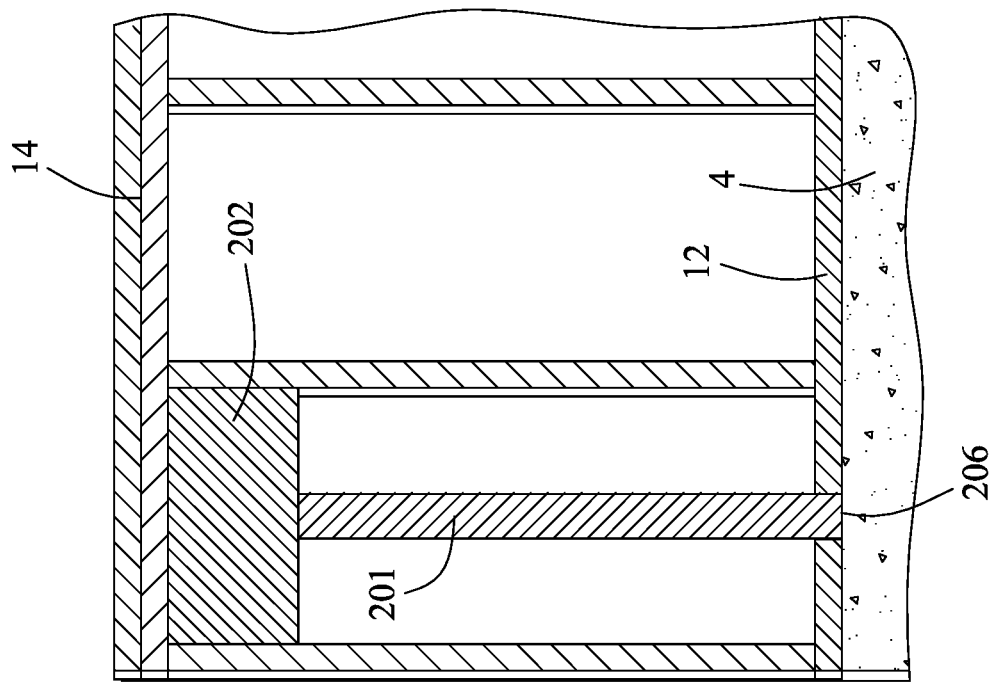
Figure 117:
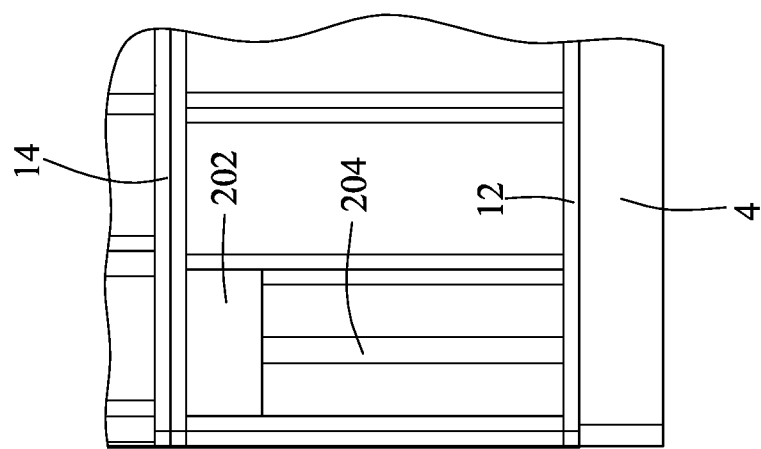

Referring to FIGS. 117 and 118, a cylindrical metal post 204 supports a compression bridge member 202 and bears directly on the foundation 4. A bottom exterior surface of the bridge member 202 bears on a top surface 201 of the post 204. Compression forces from the bridge member 202 are transferred to the post 204 via the top surface 201 and to the foundation via the bottom surface 206 of the post 204.

Figure 119:
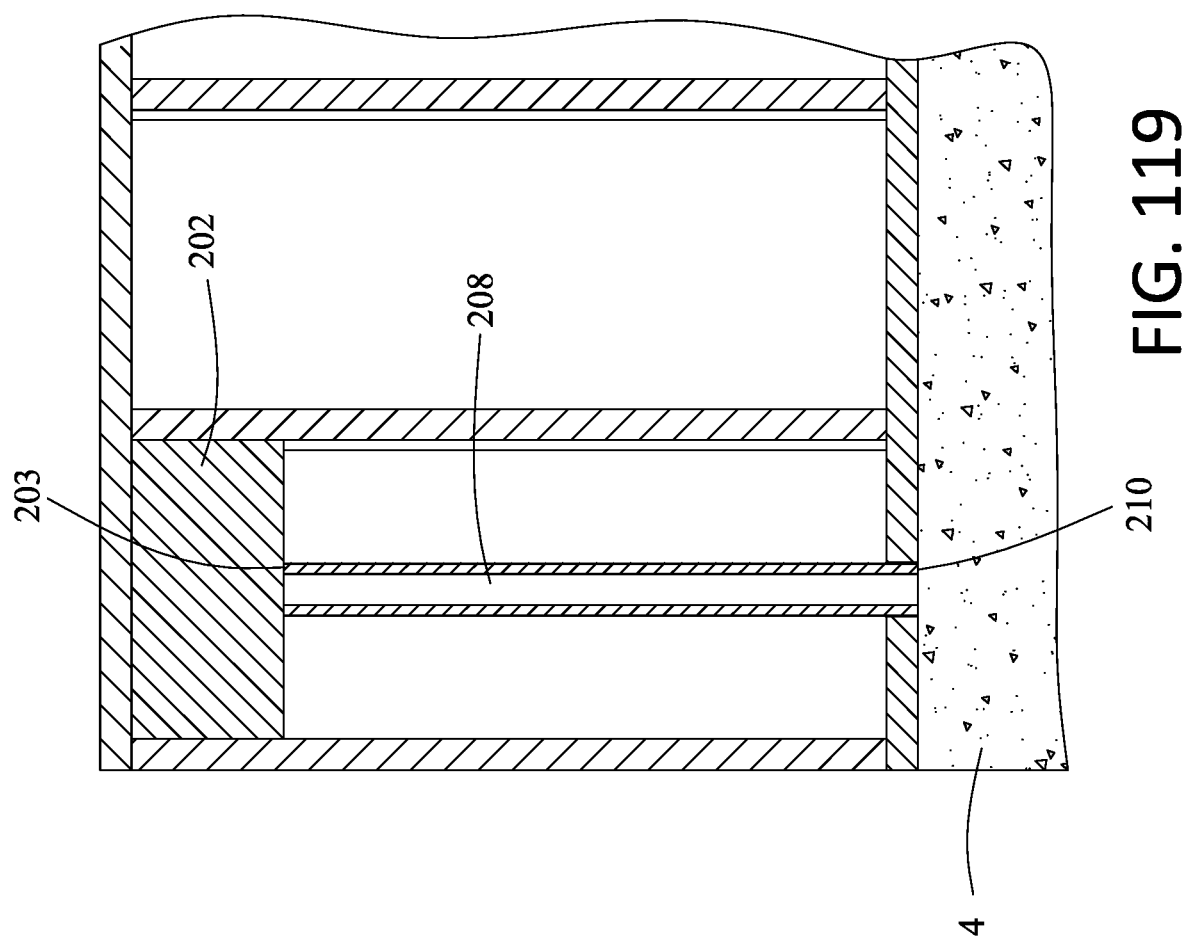

Referring to FIG. 119, the post 204 may be a hollow or tubular metal post 208. The bottom surface of the compression bridge member 202 bears on the top edge surface 203 of the post 208. The bottom edge surface of the post 210 bears directly on the foundation 4 in transferring compression forces from the bridge member 202 to the post 208 and thence to the foundation 4.

Figure 121:
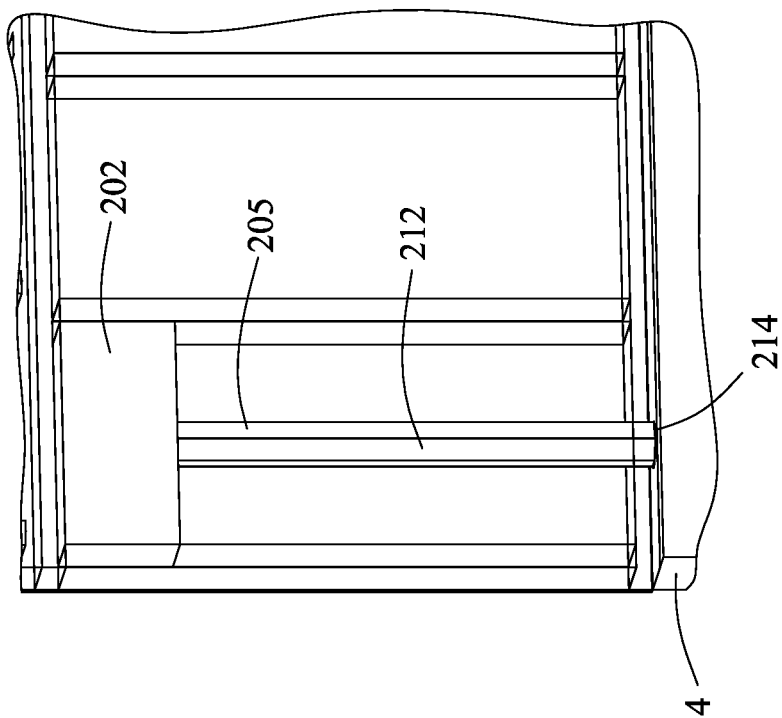
Figure 120:
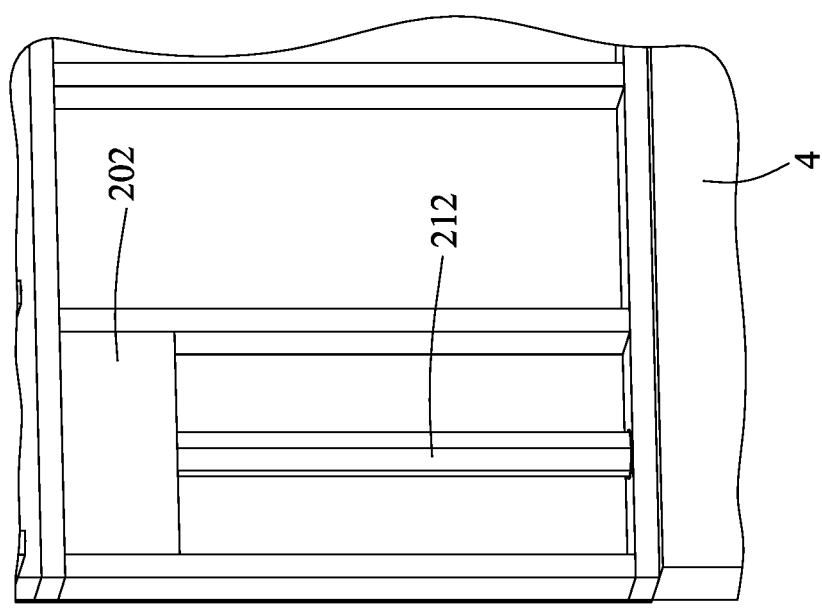

Referring to FIGS. 120 and 121, the post 204 may be a metal post 212 with a multi-sided cross-section, such as a hexagonal cross-section. The bottom surface of the compression bridge member 202 bears on the top surface 205 of the post 208. The bottom surface 214 of the post 212 bears directly on the foundation 4 in transferring compression forces from the bridge member 202 to the post 212 and thence to the foundation 4.

Figure 123:
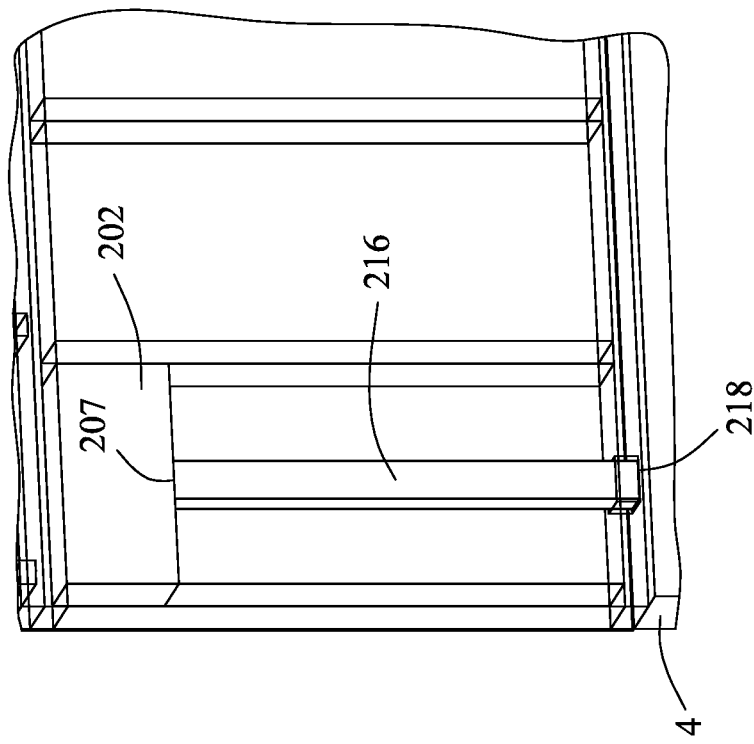
Figure 122:
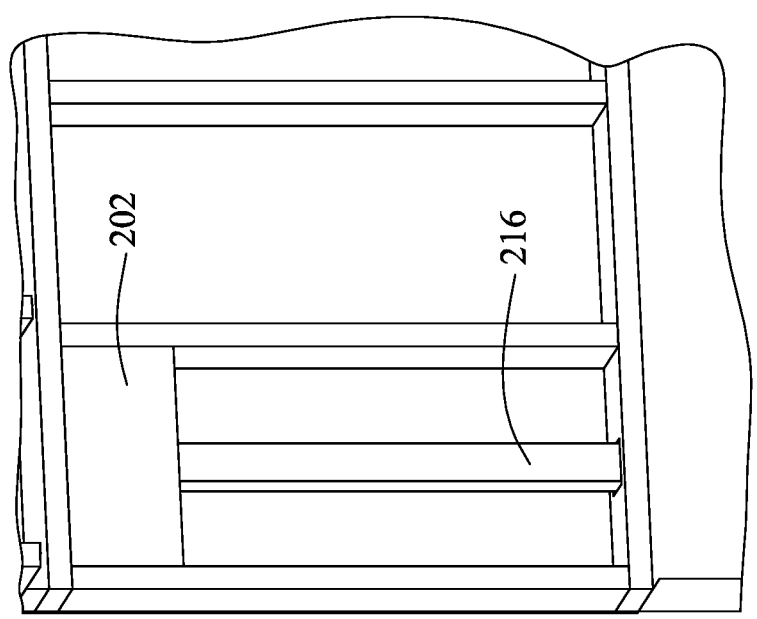

Referring to FIGS. 122 and 123, the post 204 may be a metal post 216 with a square or rectangular cross-section. The bottom surface of the compression bridge member 202 bears on the top surface 207 of the post 208. The bottom edge surface 218 of the post 216 bears directly on the foundation 4 in transferring compression forces from the bridge member 202 to the post 216 and thence to the foundation 4.

Figure 124:
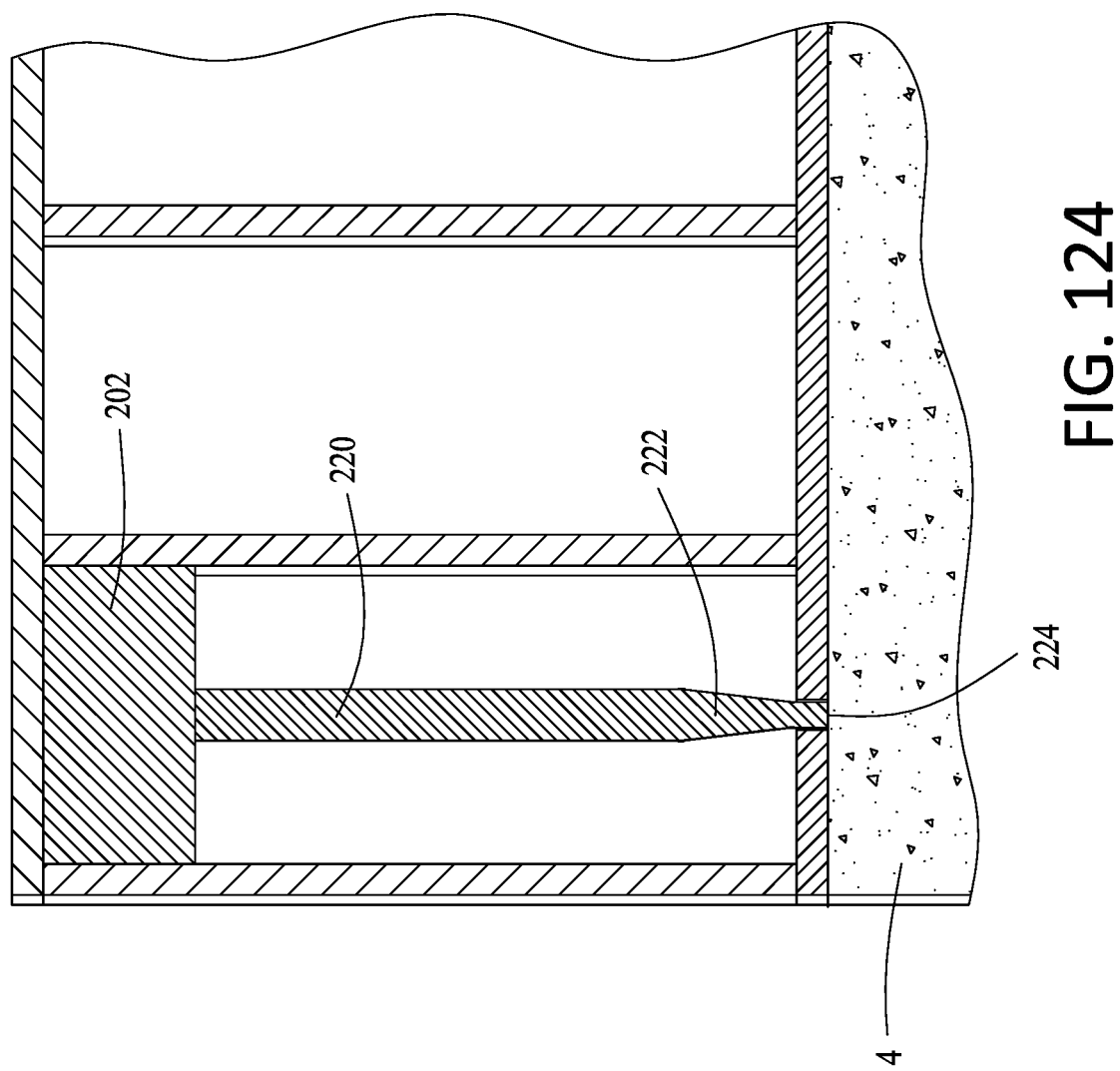

Referring to FIG. 124, the post 204 may be a metal post 220 with a tapered bottom end portion 222 with a bottom surface 224 that bears directly on the foundation 4 in transferring compression forces from the bridge member 202 to the post 220 and thence to the foundation 4.

Figure 126:
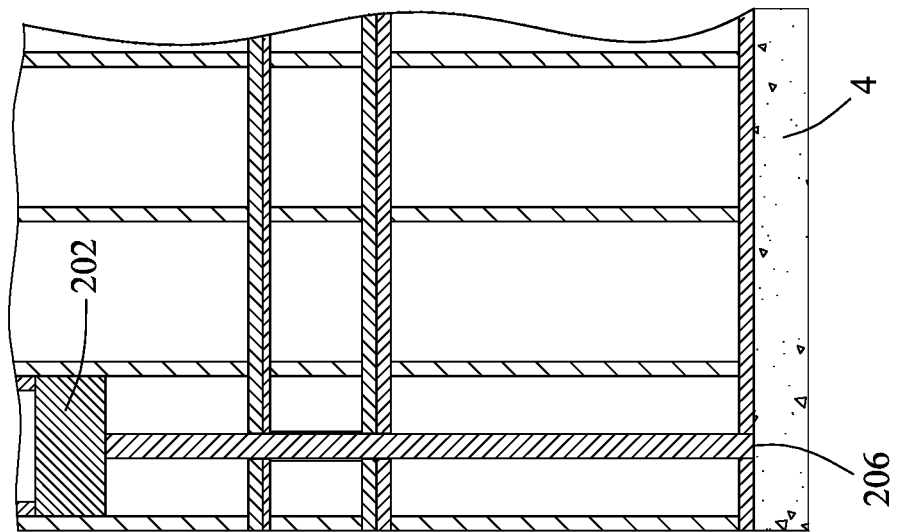
Figure 125:
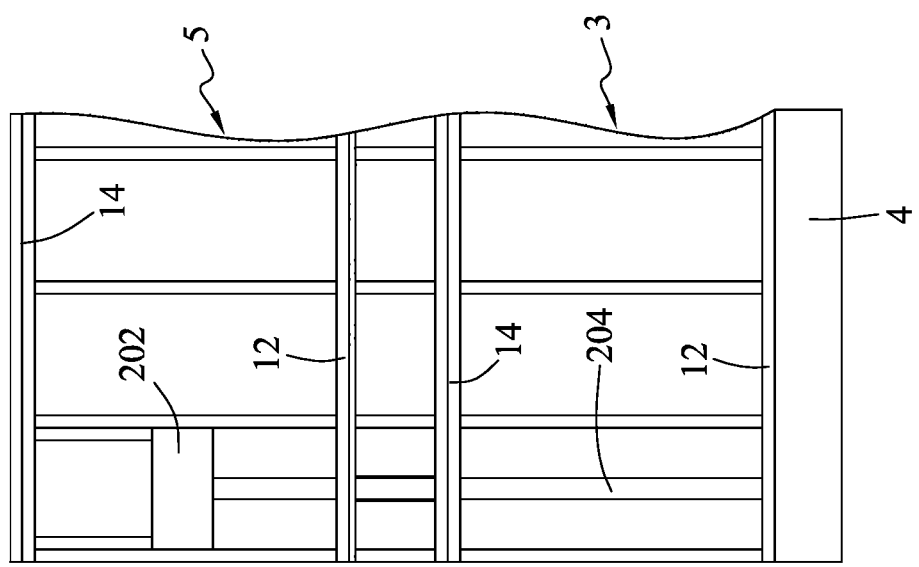

Referring to FIGS. 125 and 126, the post 204 may extend to an upper wall, such as the wall 5. The post 204 extends through the top plate 14 of wall 3 and through the bottom plate 12 of wall 5.

Figure 128:
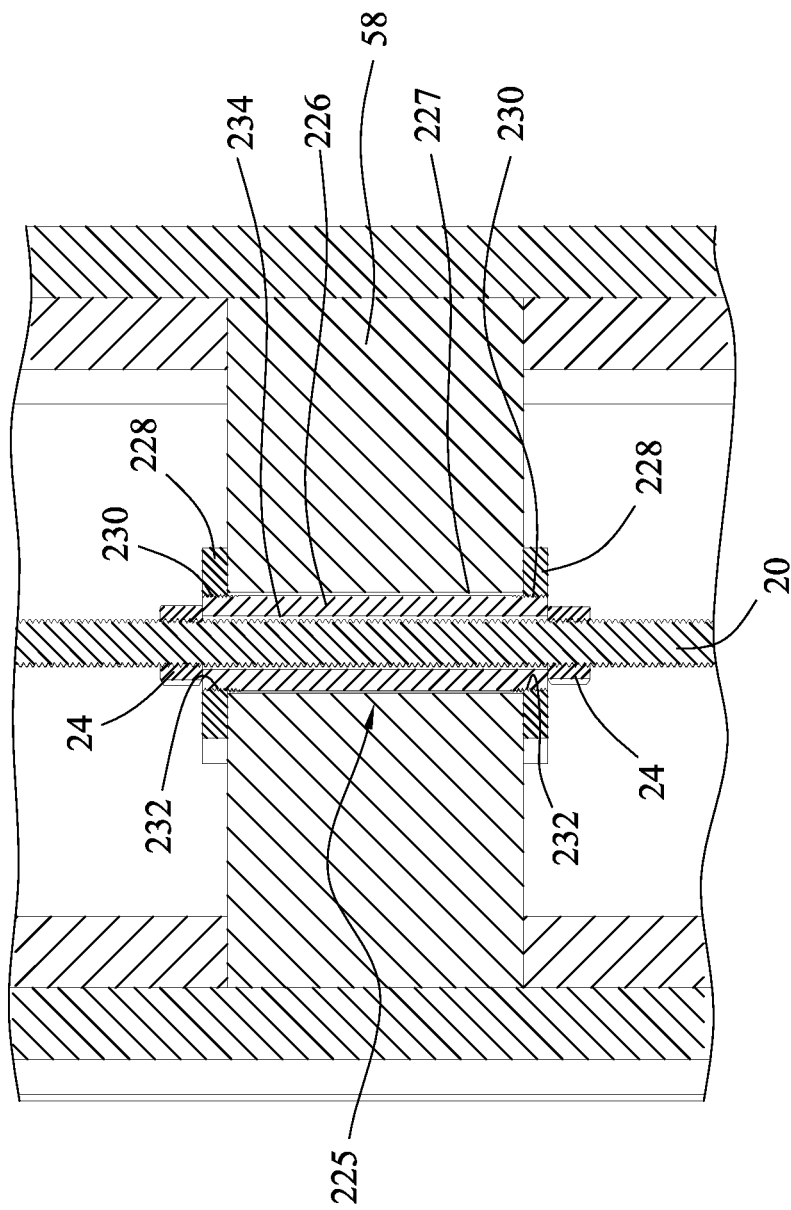

Referring to FIGS. 127 and 128, the bridge member 58 is attached to the rod post 20 with a sleeve assembly 225 for transferring compression and tension forces from the bridge member 58 to the rod post 20. The sleeve assembly 225 includes a cylindrical body 226 with an axial unthreaded opening 234 through which the rod post 20 extends. The cylindrical body 226 is disposed inside an opening 227 in the bridge member 58. Threaded end portions 232 extend beyond the respective opposite sides of the bridge member 58 and are threaded to respective bearing plates 228, holding the cylindrical body 226 in place. The bearing plates 228 bear on the respective opposite sides of the bridge member 58. Nuts 24 attach the rod post 20 to the cylindrical body 226 and hence the bridge member 58. Compression and tension forces are transferred from the bridge member 58 to the rod post 20 via the lower nut 24 and the upper nut 24, respectively.

Figure 129:
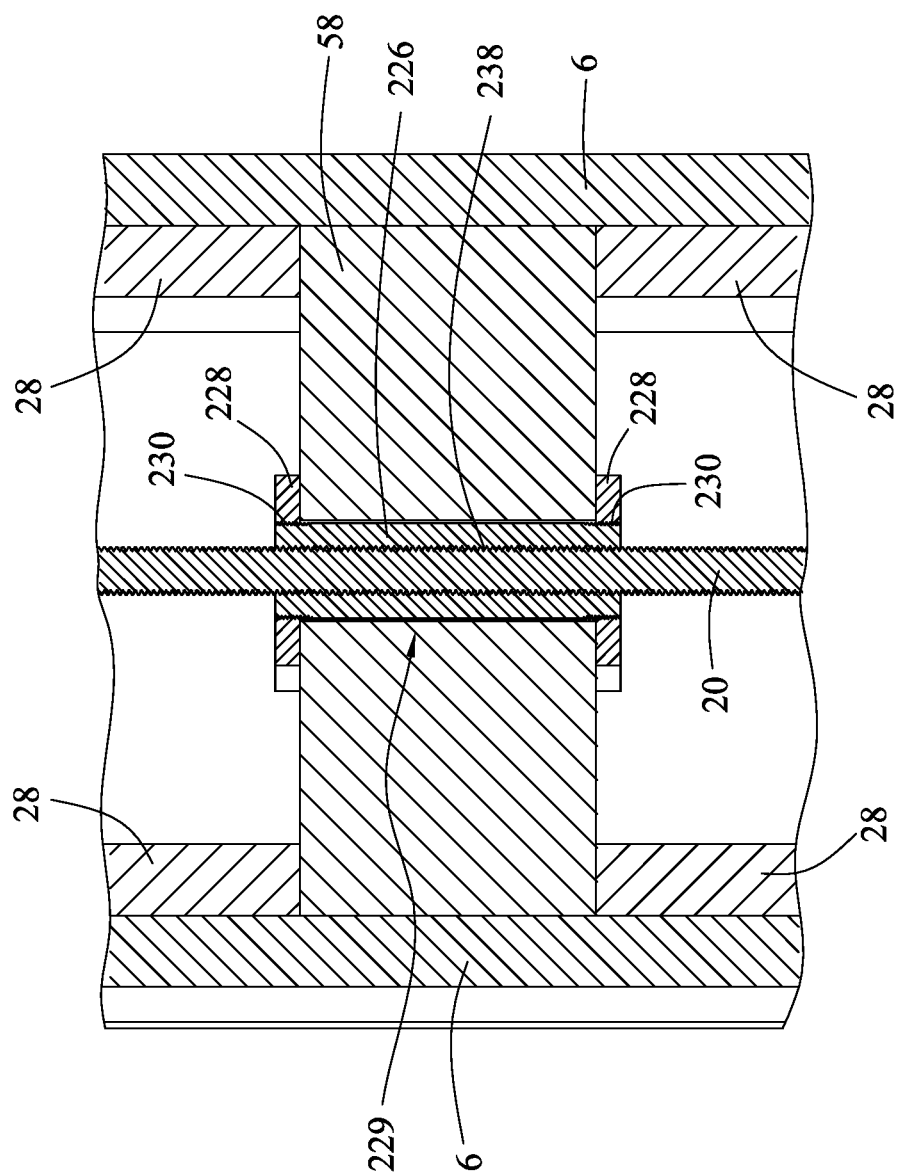

Referring to FIG. 129, the sleeve assembly 225 is modified as sleeve assembly 229 where the cylindrical body 226 is provided with a threaded axial opening 238 for threading with the rod post 20. The threaded opening 238 replaces the nuts 24 shown in FIG. 128.

Figure 130:
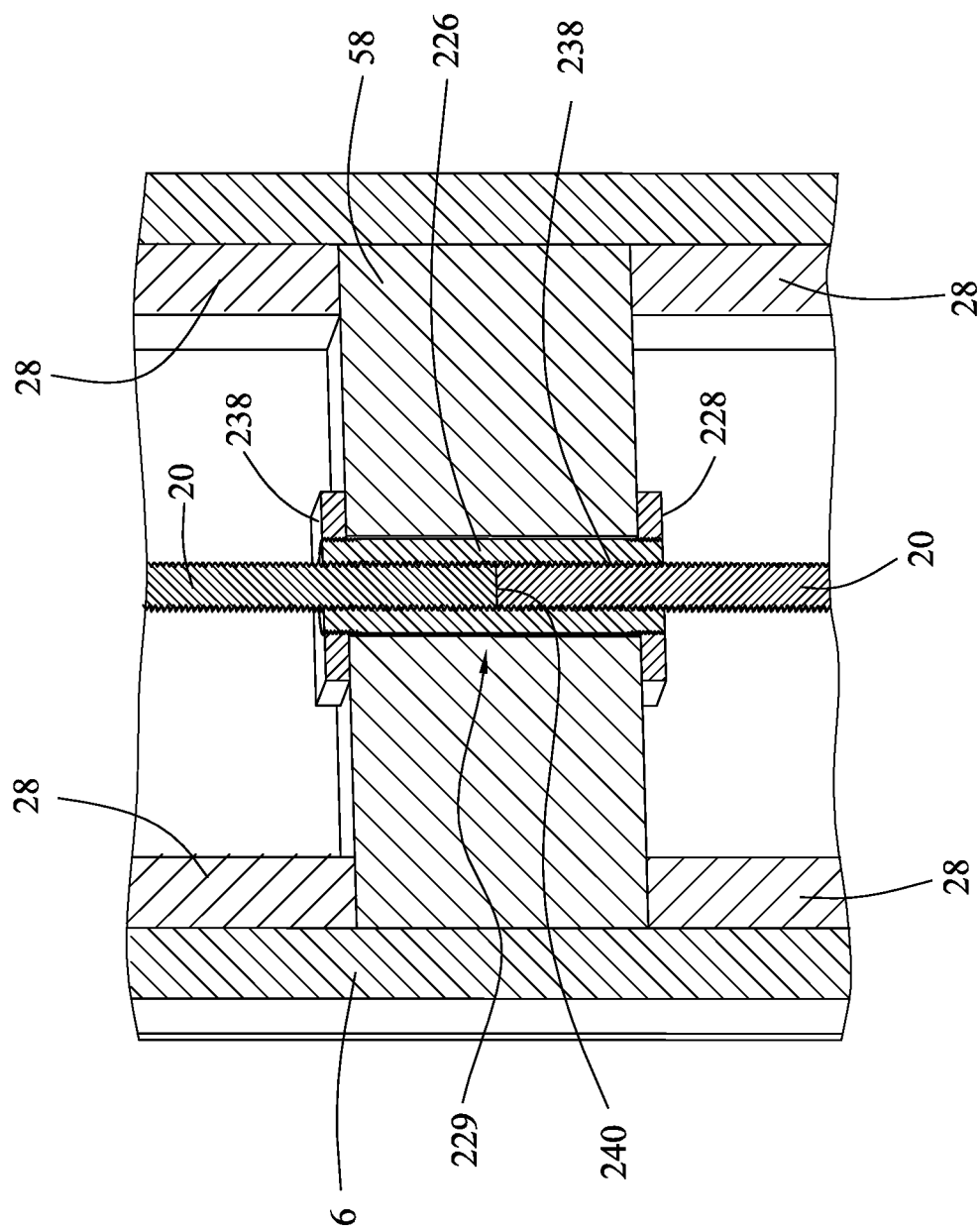

Referring to FIG. 130, the sleeve assembly 229 is used as a coupling to join together two sections of the rod post 20 with their respective ends 240 bearing against each other. In this manner, compression forces from the upper rod post 20 are advantageously transferred directly to the lower rod post 20.

Figure 131:
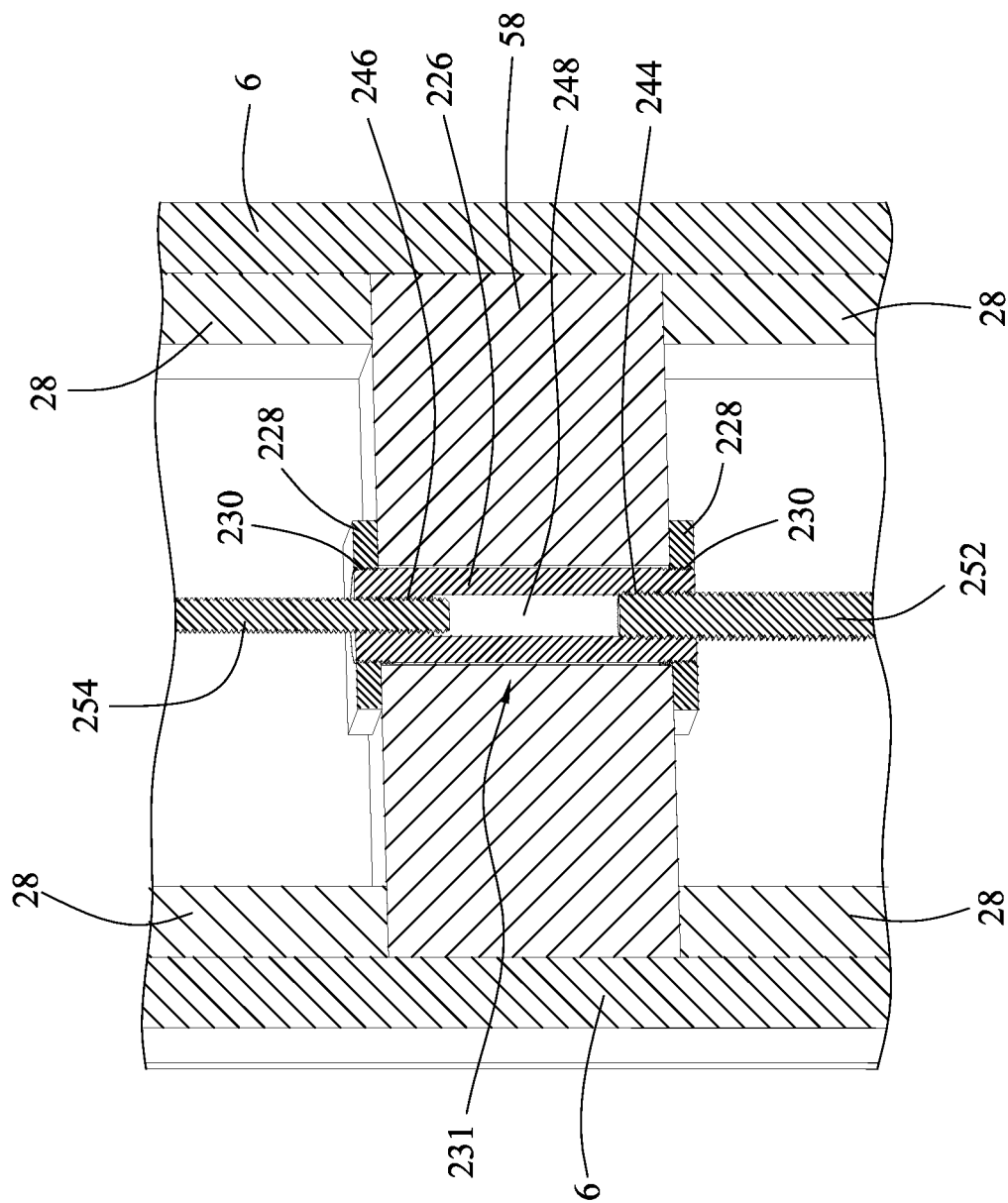

Referring to FIG. 131, the sleeve assembly 229 is modified as sleeve assembly 231 where the cylindrical body 226 is provided with coaxial openings 246, 248 and 244. The openings 246 and 244 are threaded and disposed at opposite ends of the cylindrical body 226. The opening 248 is unthreaded and has diameter larger than the diameter of the opening 246 but smaller than the diameter of the opening 244. The sleeve assembly 231 is used as a coupling to join together a smaller diameter threaded rod or tie rod 254 and a larger diameter threaded rod 252. The sleeve assembly is able to transfer compression and tension forces from the bridge member 58 to the threaded rods 254 and 252.

The larger diameter rod 252 is sized not for what is required to handle the expected tension load for the lower wall 3 but for the expected compression load to allow the rod 252 to function as a post, allowing a lesser number of studs to be used. The rod 254 may be designed only to handle tension loads, which typically require a smaller diameter rod than for compression loads.

Figure 132:
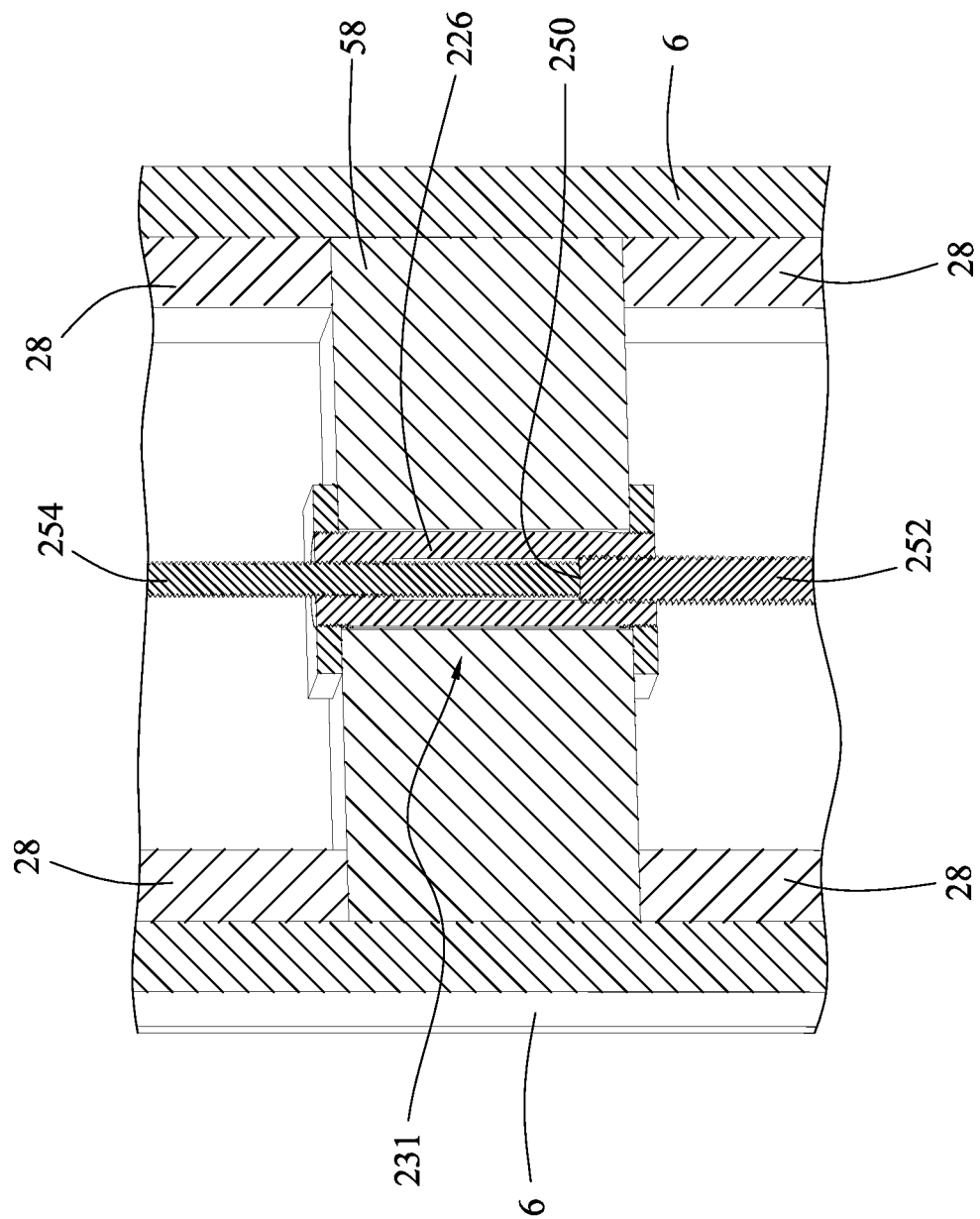

Referring to FIG. 132, the ends of the threaded rods 254 and 252 may engage each other inside the cylindrical body 226 at their respective ends 250. In this manner, compression forces from the rod 254 are advantageously transferred directly to the rod 252.

Figure 133:
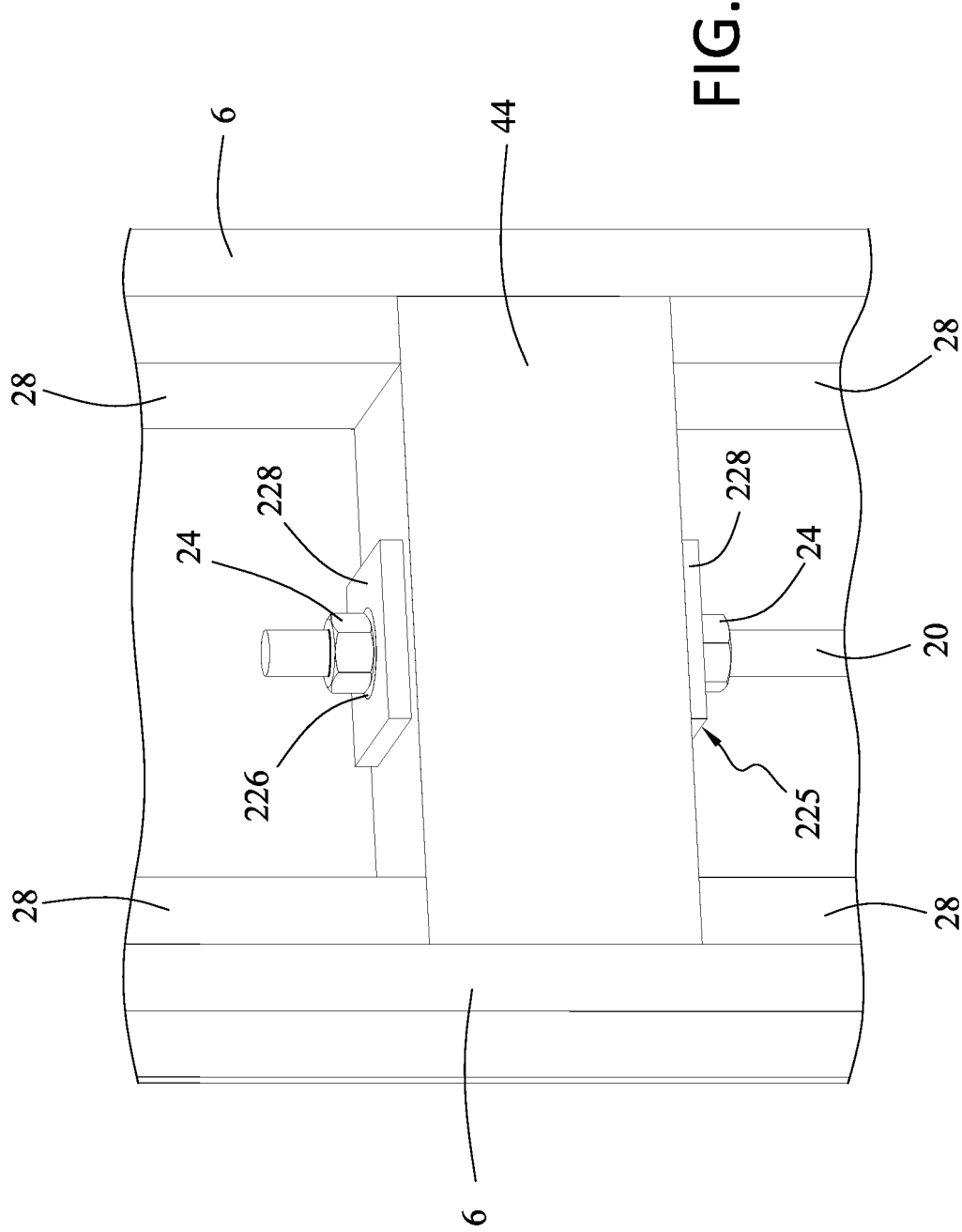

Referring to FIG. 133, the sleeve assembly 255 may also be used for the bridge member 44, which is made of engineered wood. The bearing plates 228 advantageously spread the compression and tension over a larger area over the underlying or overlying bridge member surface.

Figure 134:
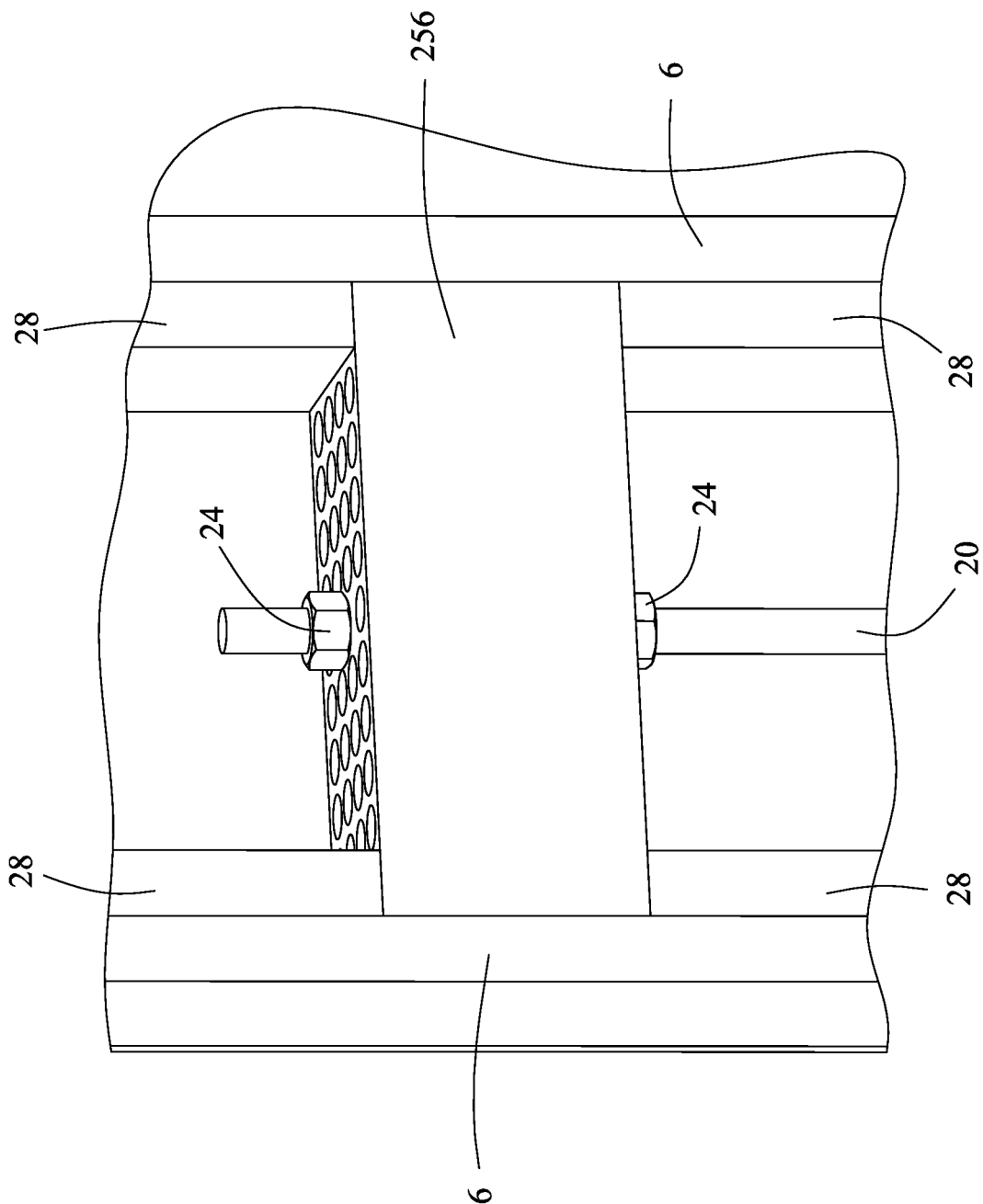

Referring to FIG. 134, the bridge member 256 is the same as the bridge member 94 (FIG. 59), except that the opening 96 is unthreaded. Nuts 24 attach the bridge member 256 to the rod post 20 for compression and tension forces transmitted by the trimmer studs 28 and the studs 6.

Figure 135:
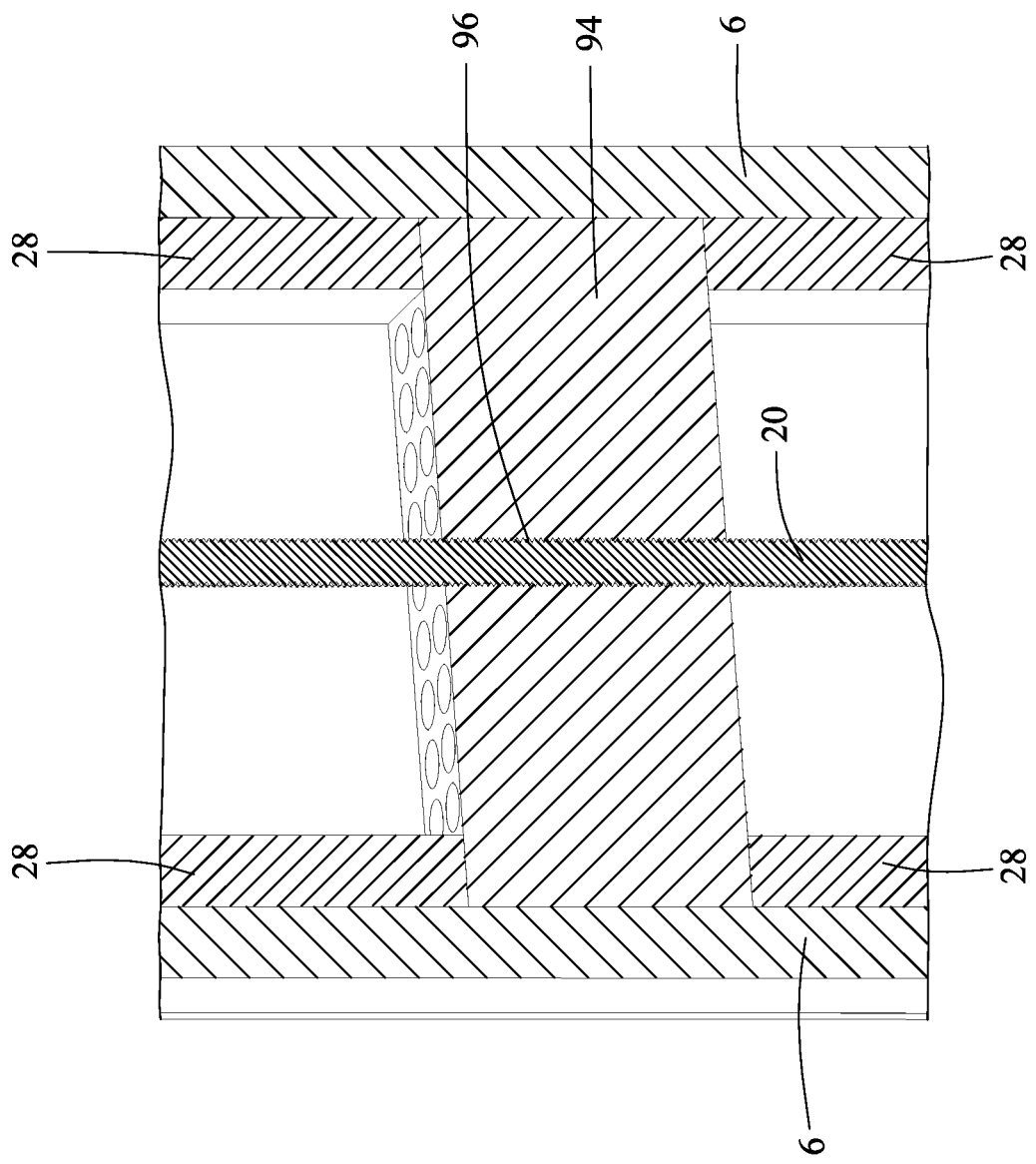

Referring to FIG. 135, the bridge member 94 is shown attached to the rod post 20 through the threaded opening 96. Compression and tension forces are transferred from the bridge member 94 to the rod post 20 through the threaded connection of the rod post 20 to the bridge member 94 at the threaded opening 96.

Figure 136:
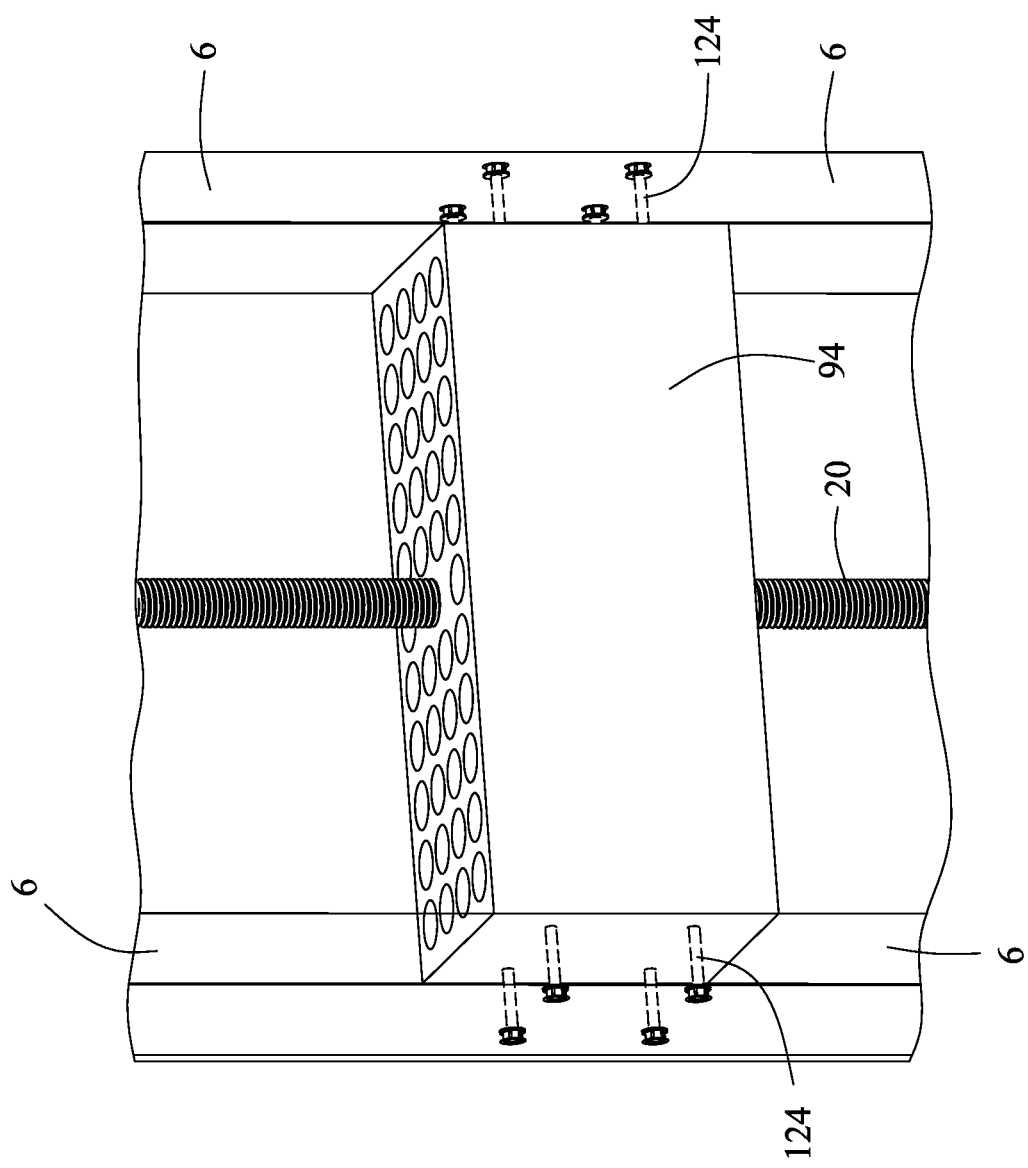

Referring to FIG. 136, the bridge member 94 is attached to the studs 6 with screws 124. Compression and tension forces from the wall are transferred to the bridge member 94 via the screws 124.

Figure 138:
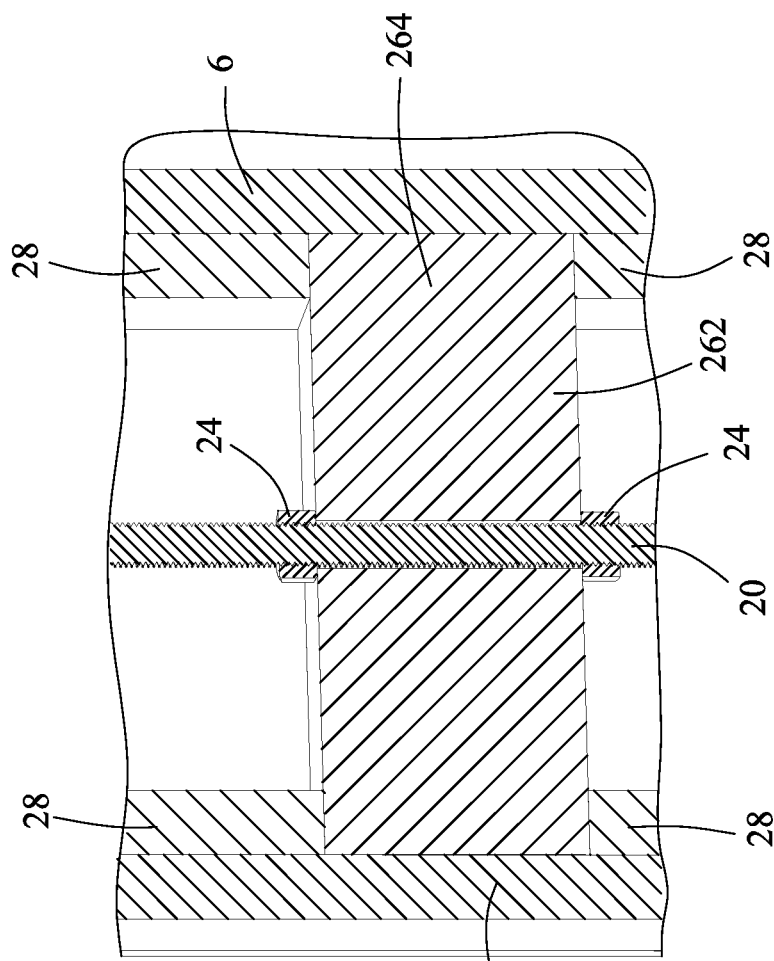
Figure 137:
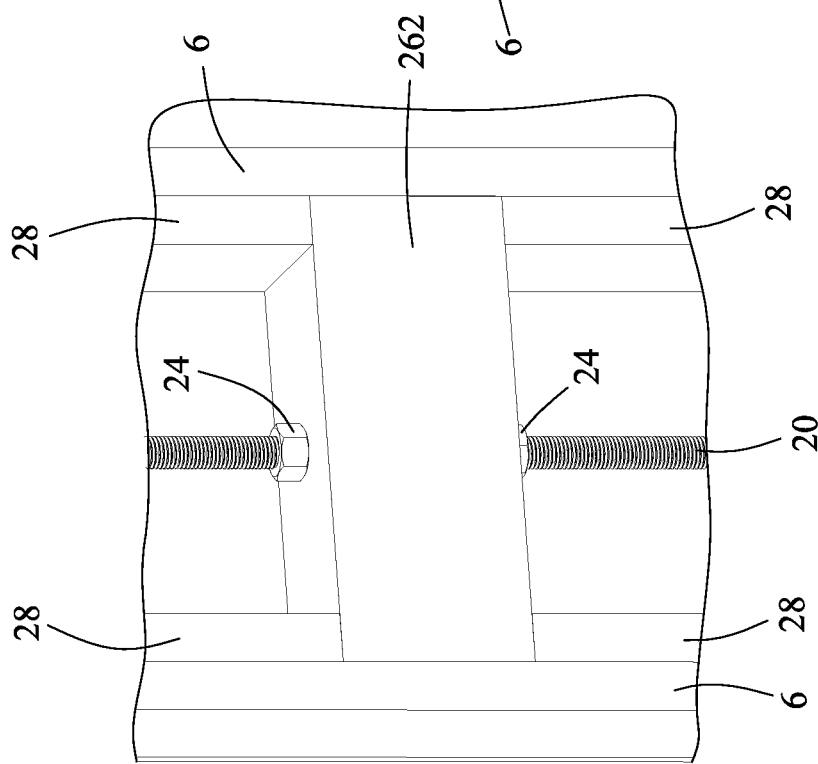

Referring to FIGS. 137 and 138, a solid metal bridge member 262 is shown attached to the rod post 20 with the nuts 24. The bridge member 262 extends through an unthreaded opening 264. The trimmer studs 28 hold the bridge member 262 to the wall.

Figure 140:
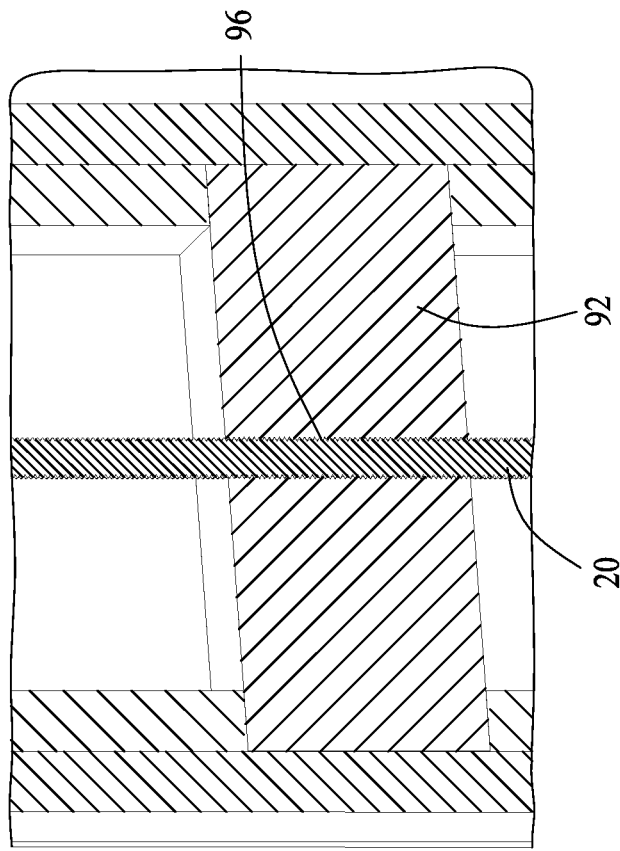
Figure 139:
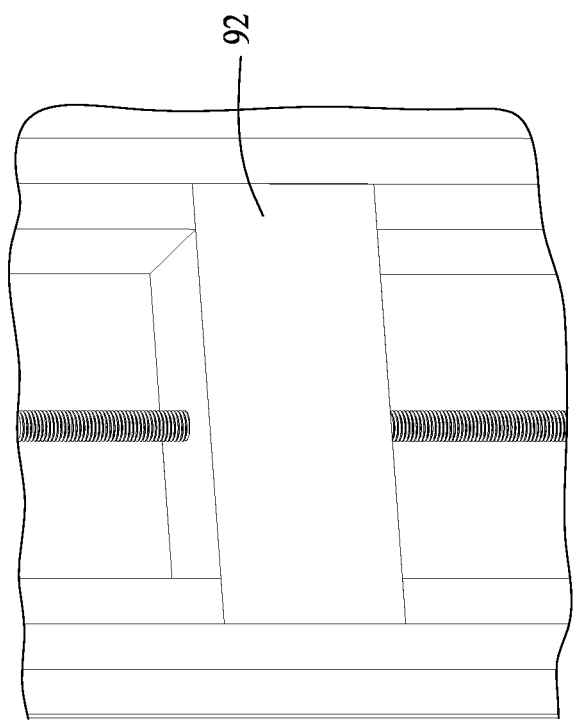

Referring to FIGS. 139 and 140, the bridge member 58 (FIG. 58) made of solid metal is shown attached to the trimmer studs 28 and the studs 6. The rod post 20 is threaded to the threaded opening 96 for transfer of compression and tension forces from the bridge member 92 to the rod post 20.

Figure 141:
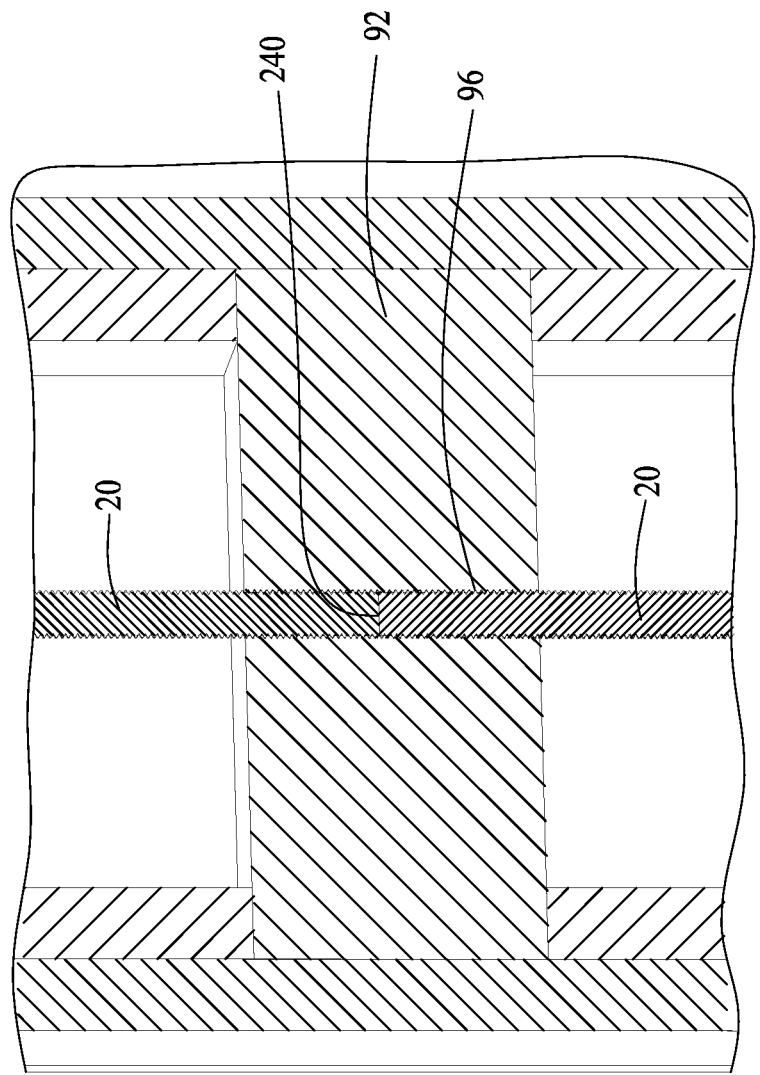

Referring to FIG. 141, the bridge member 92 is used to join together two sections of the rod post 20. The ends of the rod posts 20 abut each other inside the opening 96 at 240. In this manner, compression forces from the upper rod post 20 are advantageously transferred directly to the lower rod post 20.

Figure 142:
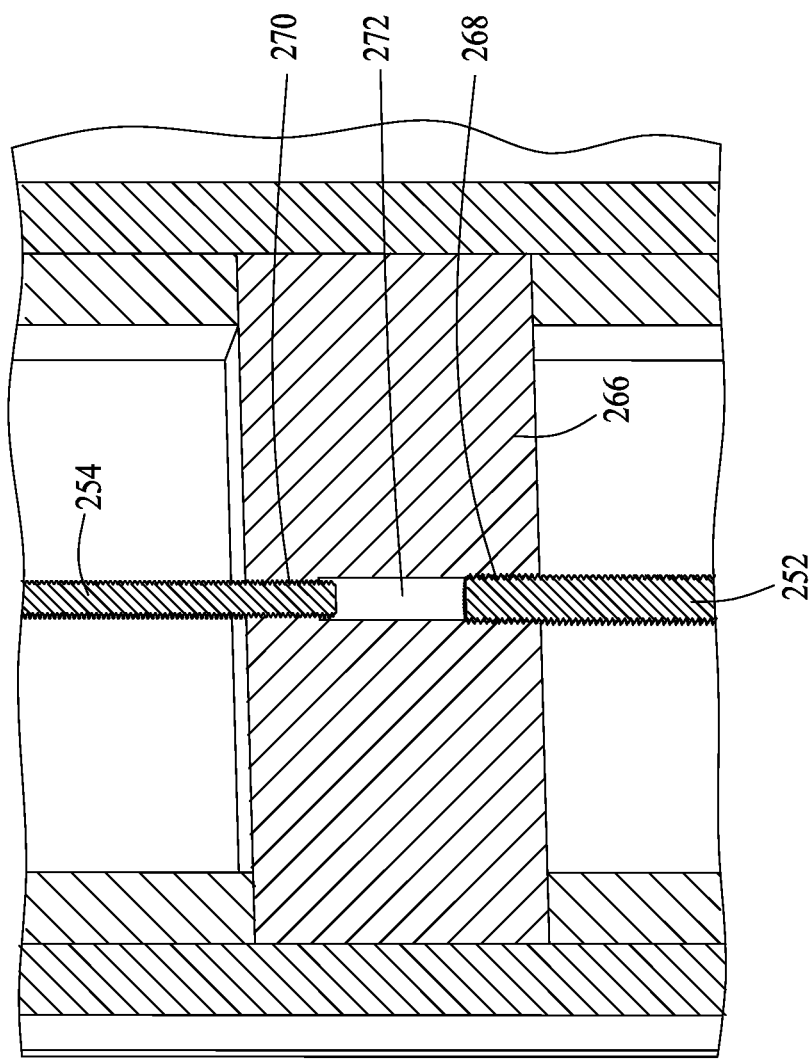

Referring to FIG. 142, the bridge member 92 is modified as bridge member 266 with coaxial openings 270, 272 and 268. The openings 270 and 268 are threaded and disposed at opposite top and bottom of the bridge member 266. The opening 272 is unthreaded and has diameter larger than the diameter of the opening 268 but smaller than the diameter of the opening 270. The bridge member 266 is used as a coupling to join together a smaller diameter threaded rod 254 and a larger diameter threaded rod 252. The bridge member 266 is able to transfer compression and tension forces the wall to the threaded rods 254 and 252.

Figure 143:
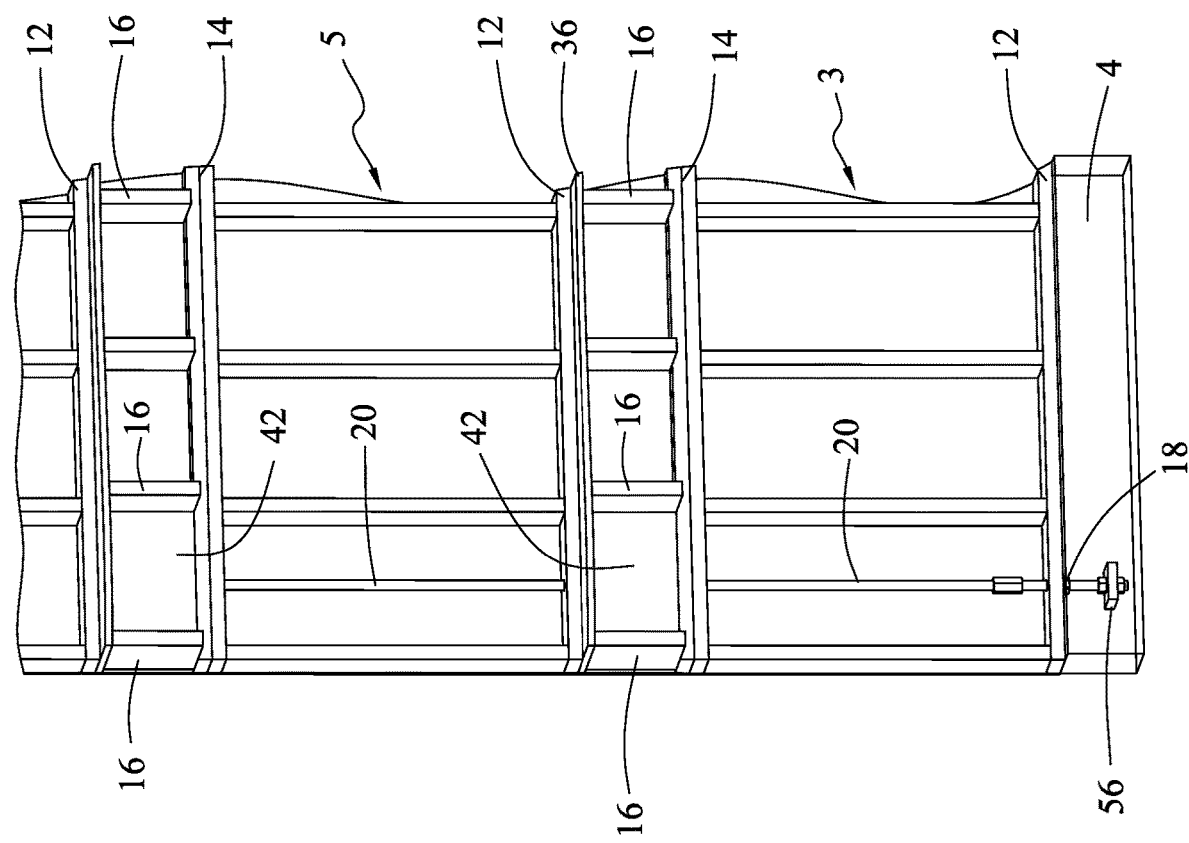
Figure 145:
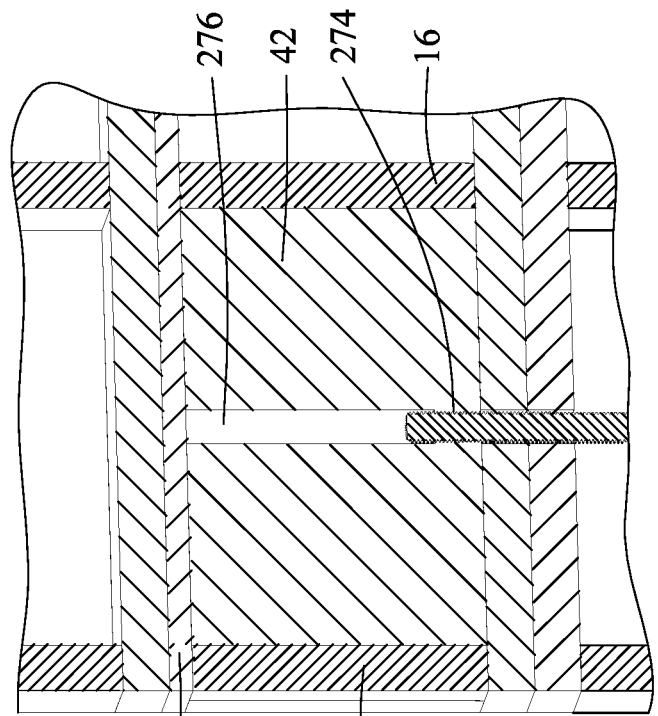
Figure 144:
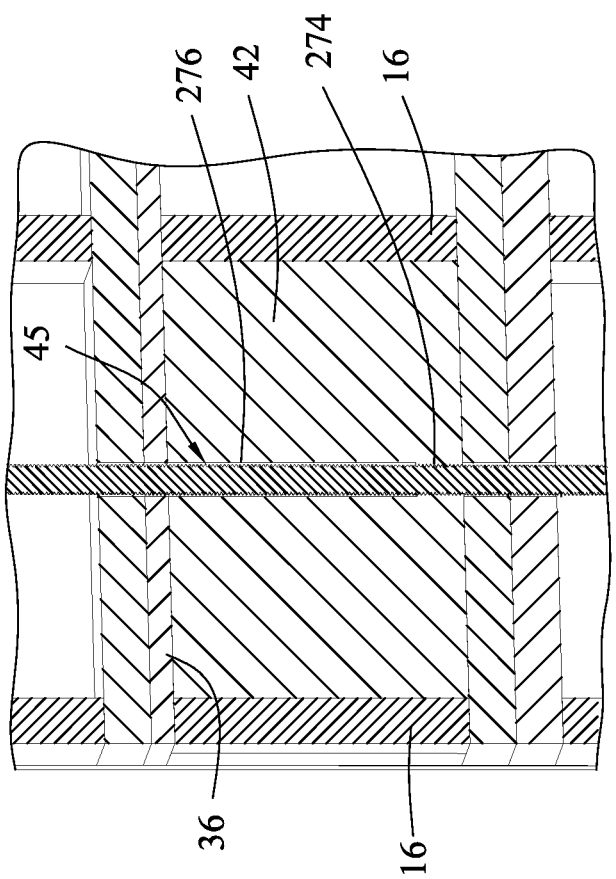

Referring to FIGS. 143, 144 and 145, the bridge member 42 (FIG. 37) is shown installed inside the floor joist space between the top plate 14 of the wall below and the subfloor 36 of the wall above. The partly threaded hole 45 includes an unthreaded portion 276 and a threaded portion 274. The rod post 20 is threaded to the lower bridge member 42 and the upper bridge member 42 for compression and tension forces. The lower bridge member 42 is disposed on top of the top plate 14 of the lower wall 3 with the rod post 20 extending through the lower bridge member 42. The end of the rod post 20 extends partway into the upper bridge member 42.

Figure 158:
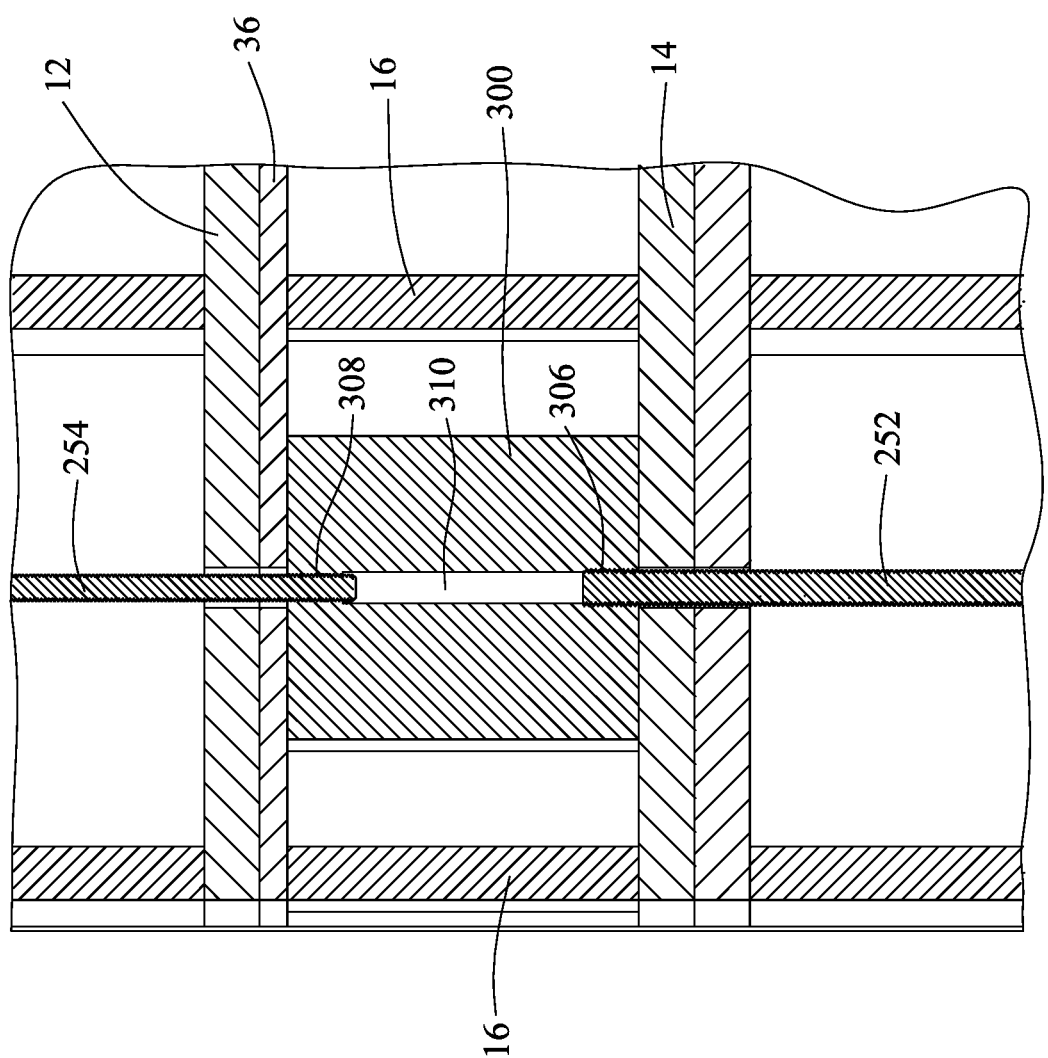

Although the rod post 20 is shown as one piece, it should be understood that it can be of two pieces, joined together inside the bridge member 42 with the hole 45 provided with additional thread opposite the threaded portion 274 or completely threaded, as shown in FIG. 67, 68 or 158.

Figure 146:
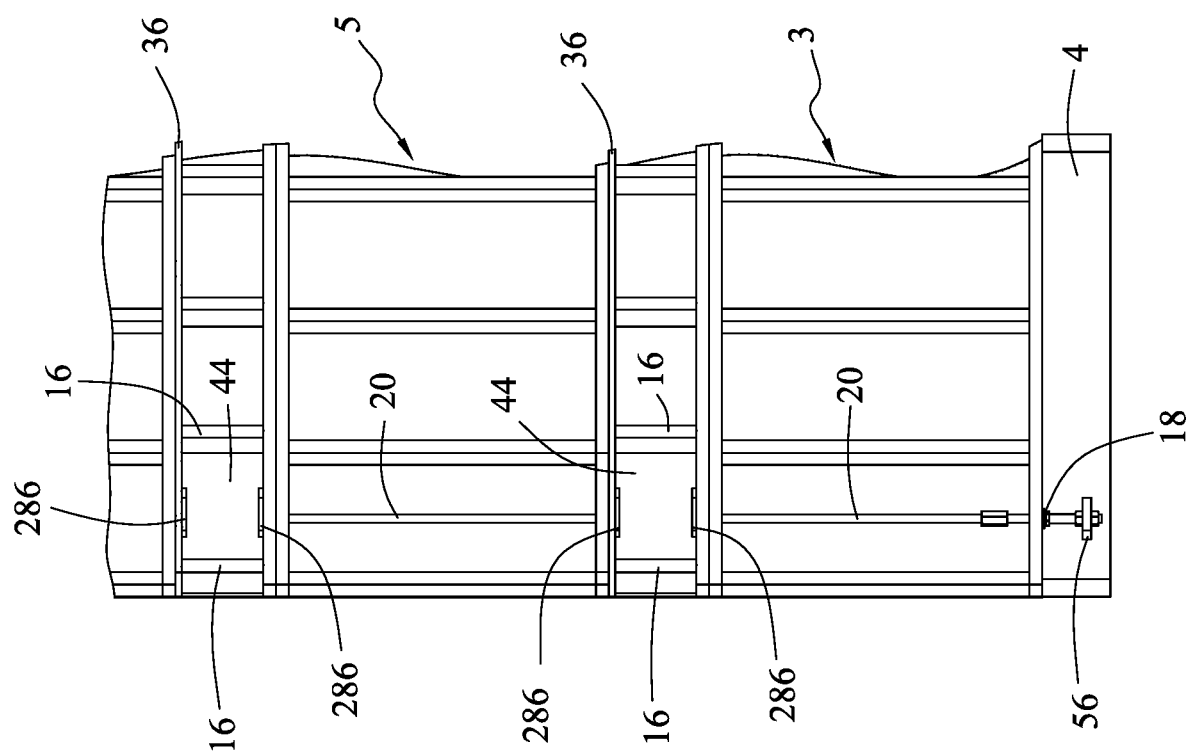
Figure 148:
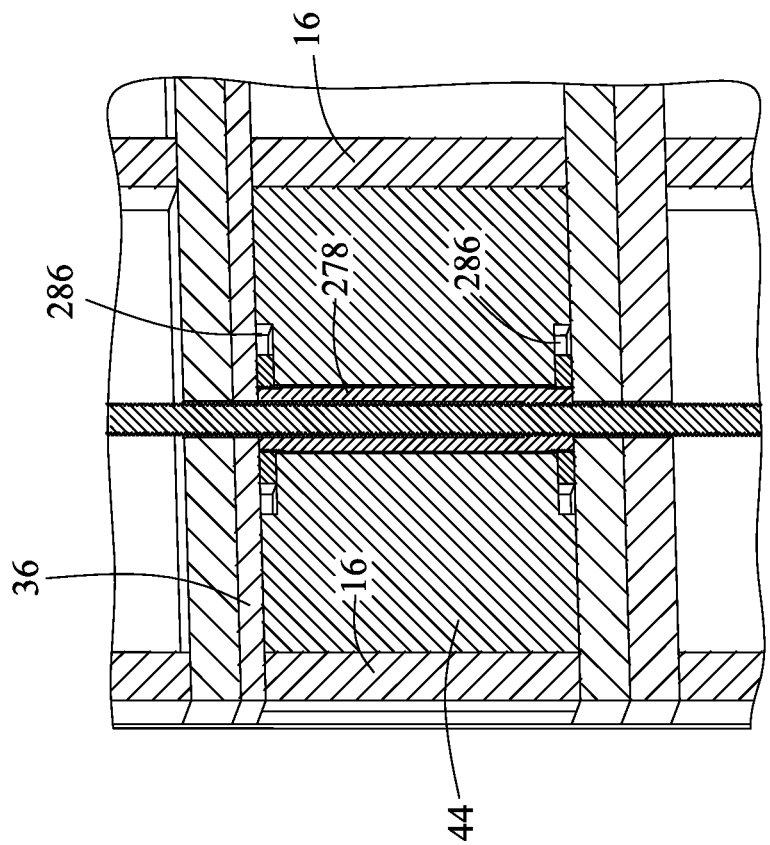
Figure 147:
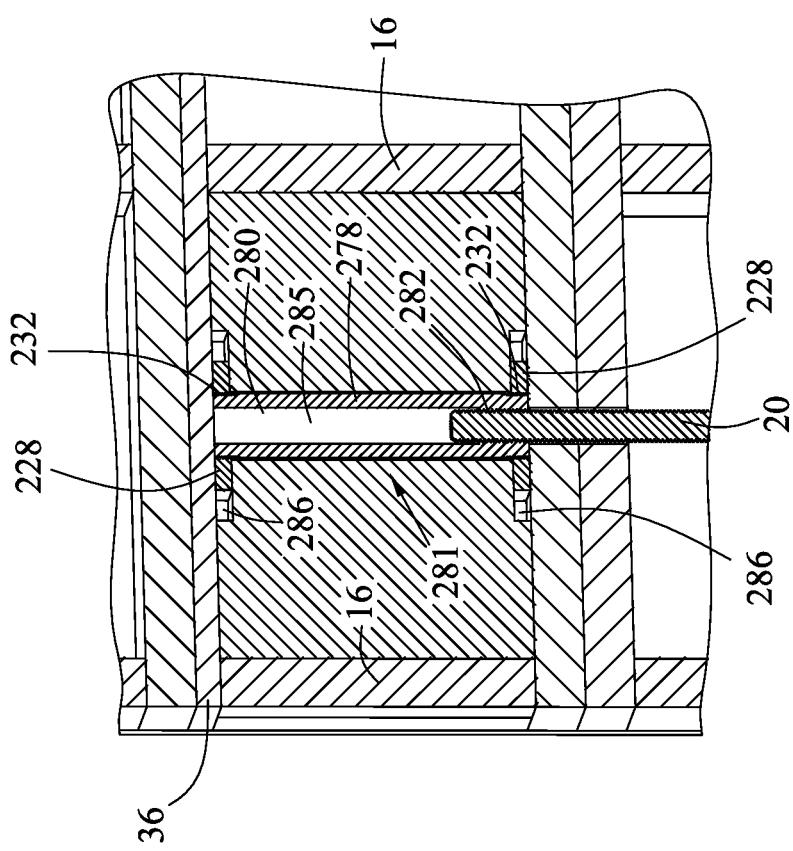

Referring to FIGS. 146, 147 and 148, the bridge members 42 shown in FIG. 143 are replaced with the bridge members 44 made of engineered wood. Each bridge members 44 is attached to the wall by a modified sleeve assembly 281, similar to the sleeve assembly 225 shown in FIG. 128, with a modified cylindrical body 278 and an axial opening 285. The opening 285 has an unthreaded portion 280 and a threaded portion 282. The diameter of the unthreaded portion 280 is preferably larger than the diameter of the threaded portion 282 to allow the rod post 20 to extend past the threaded portion 282 as shown in FIG. 148. Recesses 286 are cut into the upper and lower edges of the bridge members 44 for receiving the respective bearing plates 228 to make them flush with the rest of the edges.

Figure 149:
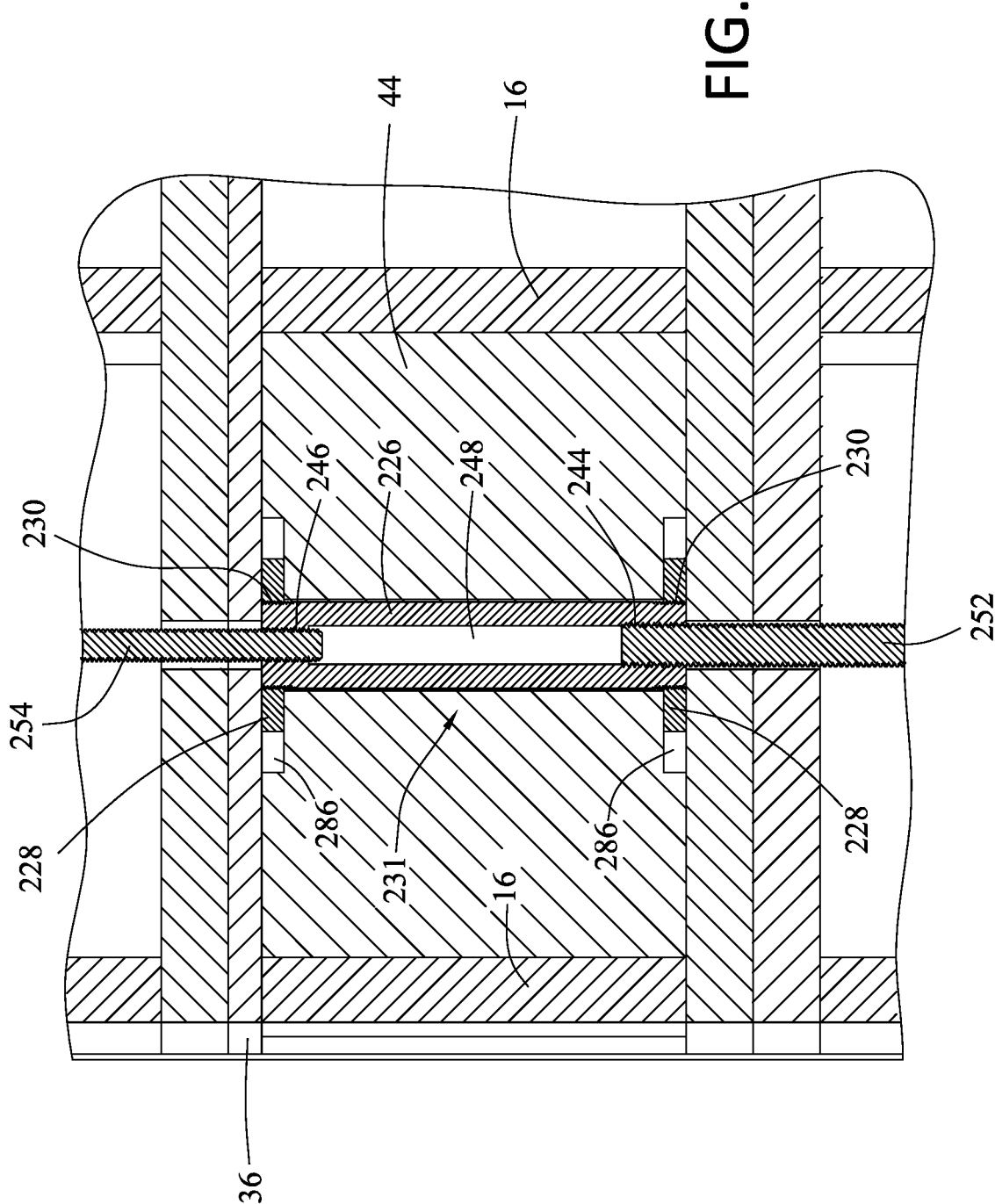

Referring to FIG. 149, the sleeve assembly 231 shown in FIG. 131 may be used instead of the sleeve assembly 281 shown in FIG. 147. This is to allow the use of the larger diameter rod 252 as a post in the lower wall 3. The larger diameter rod 252 is sized not for what is required to handle the expected tension load for the lower wall 3 but for the expected compression load to allow the rod 252 to function as a post, allowing a lesser number of studs to be used.

Figure 150:
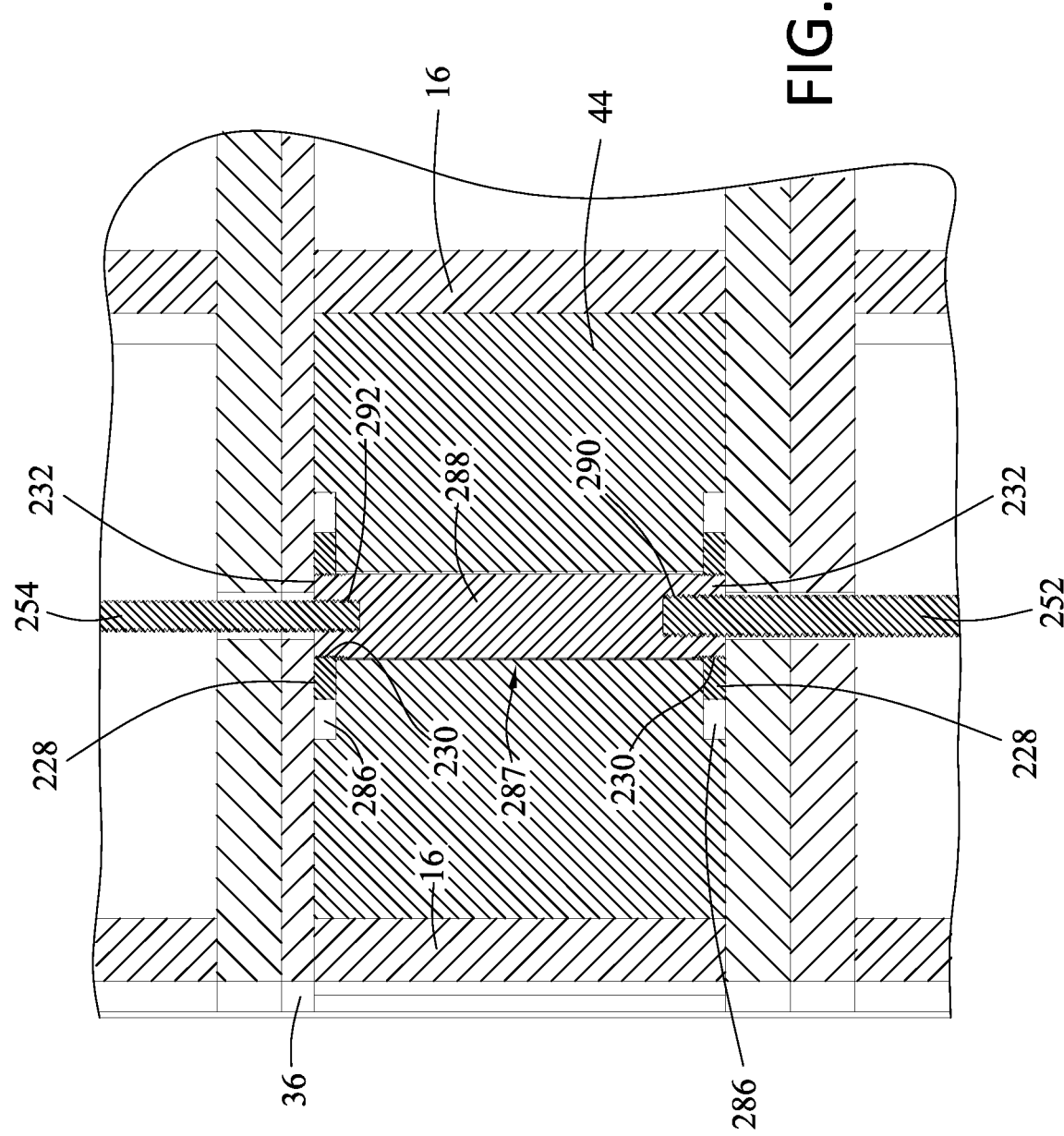
Figure 151:
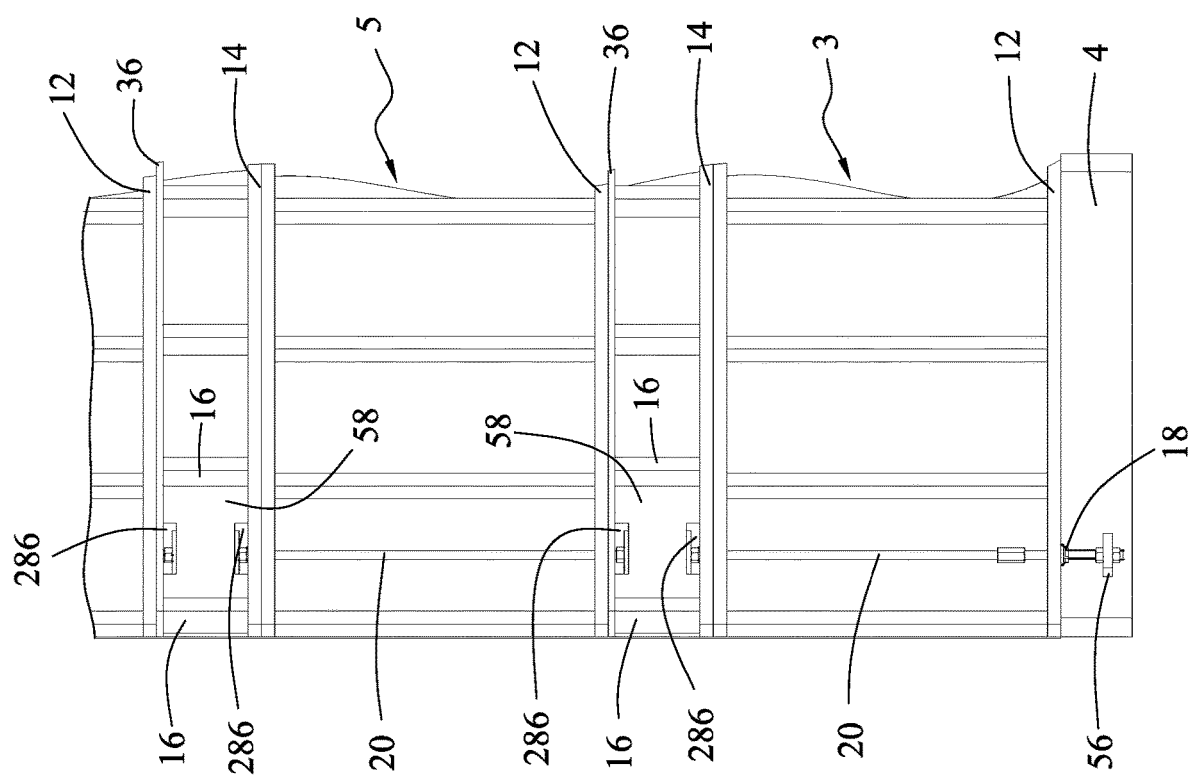
Figure 153:
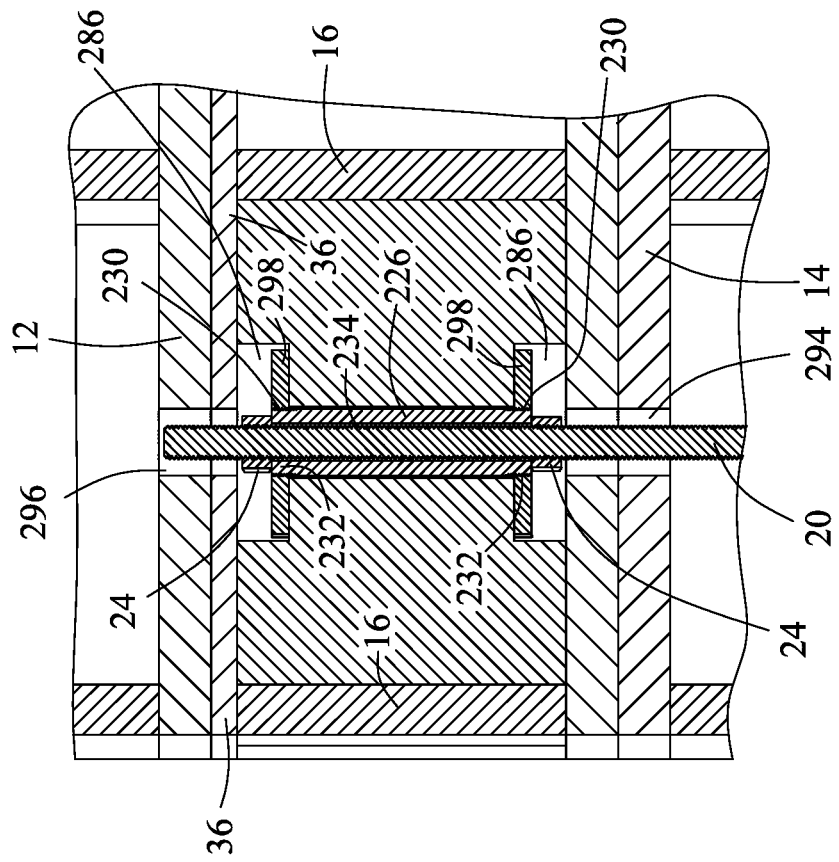
Figure 152:
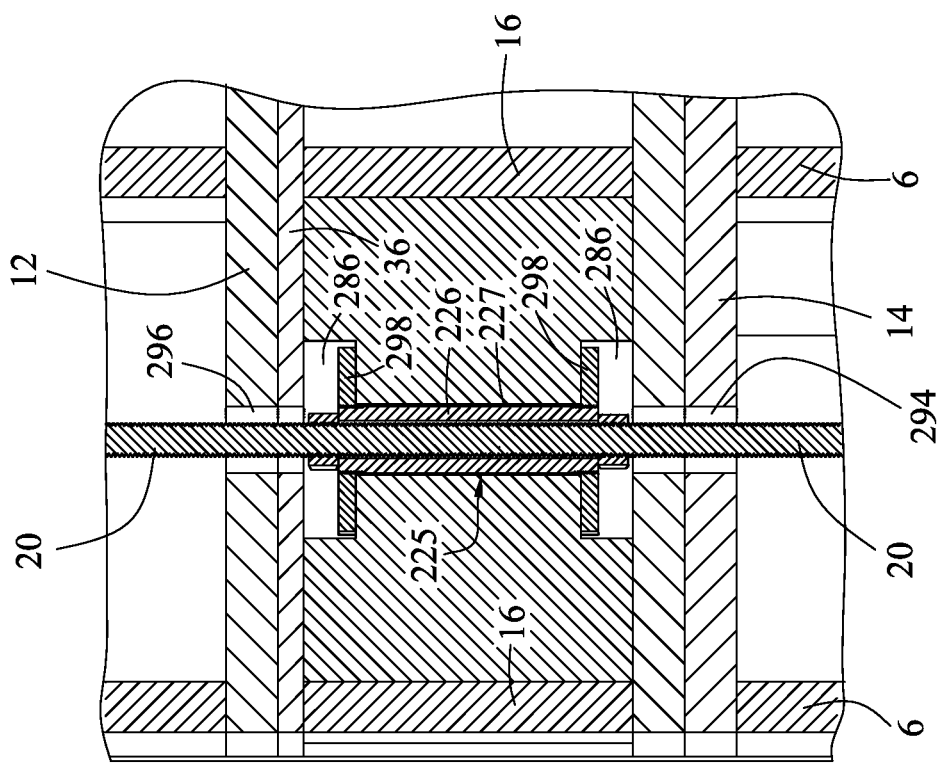

Referring to FIG. 150 the sleeve assembly 231 shown in FIG. 149 is modified as coupling 284 having a solid cylindrical body 288. Threaded blind holes 292 and 290 are provided at respective ends of the cylindrical body. The diameter of the threaded blind hole 292 is preferably smaller than the diameter of the threaded blind hole 290 to allow the use of a smaller diameter rod 254 or the larger diameter rod 252. The use of the larger diameter rod 252 advantageously allows for sizing of the rod 252 to handle compression forces as a post and lessen the number of studs to be used.

Referring to FIGS. 151, 152, 153 and 154, the bridge members 44 shown in FIG. 146 are replaced with the bridge members 58. Each bridge member 58 is attached to the wall by the sleeve assembly 225. To accommodate the use of the nuts 24, oversize openings 293 around the rods 20 are provided in the top plate 14 and the bottom plate 12 above. The bearing plates 228 may be modified as round bearing plates 298 to provide a uniform distribution of the bearing area around the rod posts 20. Since the bridge members 58 are made of sawn wood, they have less compressive strength than engineered wood. Accordingly, providing a larger bearing area underneath the round bearing plates 298 will reduce the chance of crushing the bridge members 58 due to compression and tension forces. The slots or recesses 286 allow the bearing plates 298 and the nuts 24 to be disposed above the top plate 14 and below the bottom plate 12.

Figure 155:
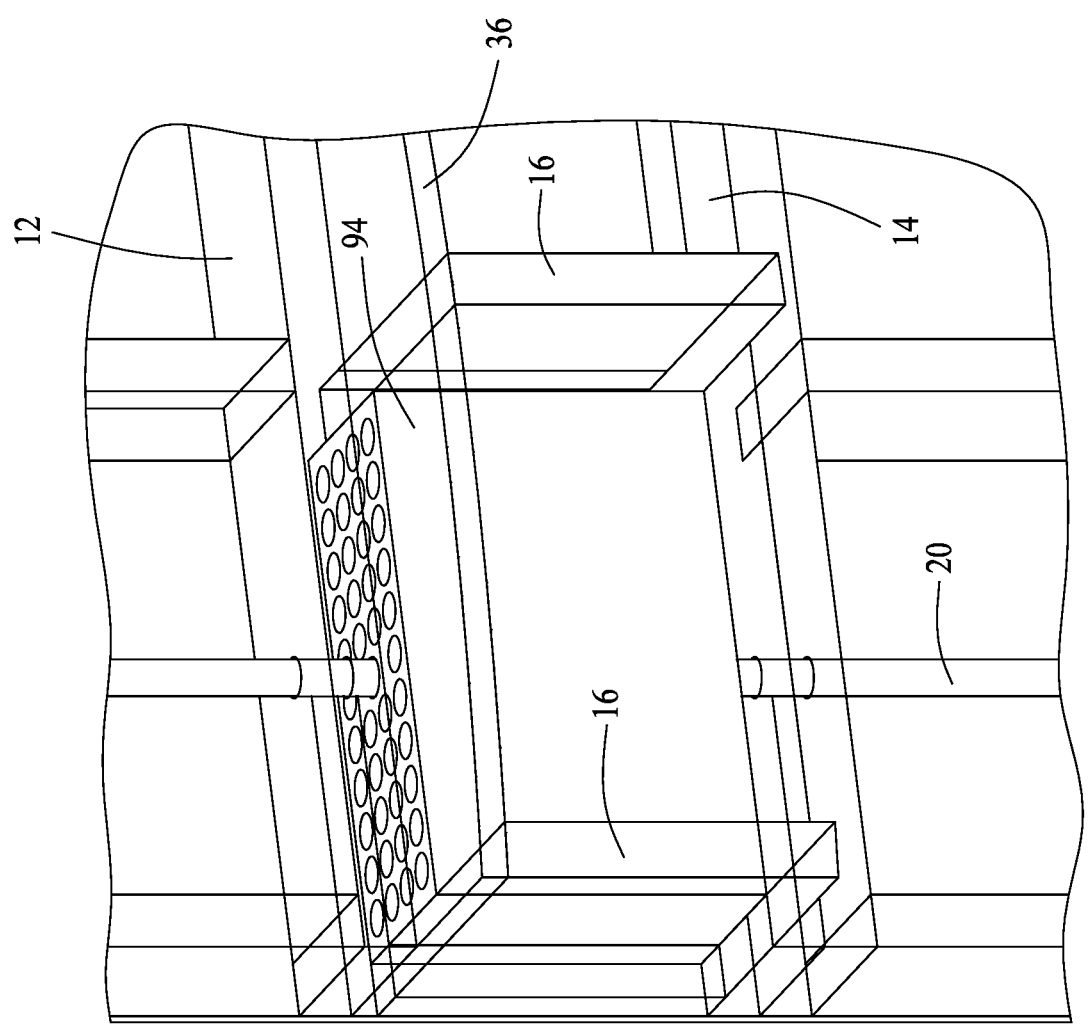

Referring to FIG. 155, the bridge members 42 shown in FIG. 143 may be replaced with the bridge members 94 (FIG. 59).

Figure 156:
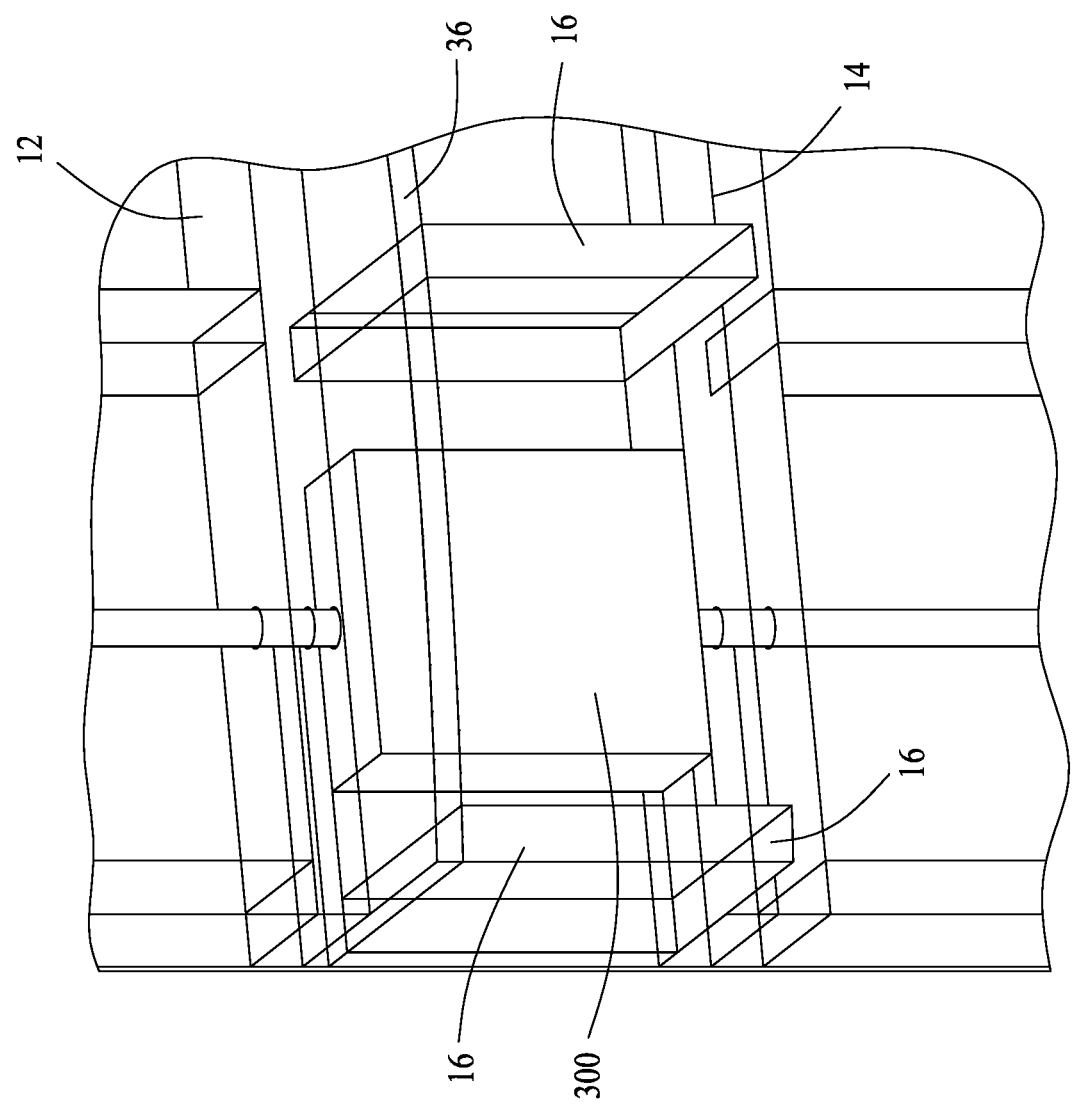
Figure 157:
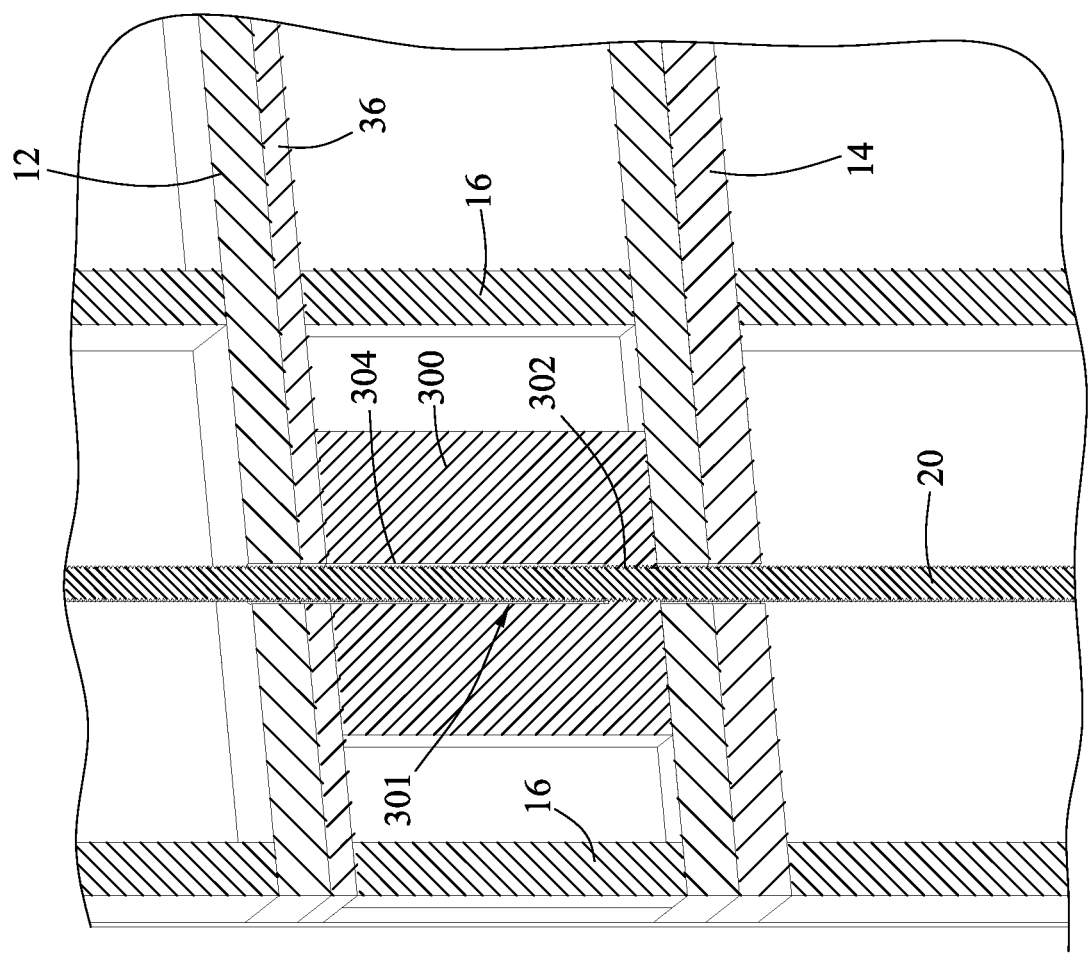

Referring to FIGS. 156, 157 and 158, the bridge members 42 may be replaced with bridge members 300 preferably made of solid metal. Each bridge member 300 is shorter than the width of the stud bay to accommodate smaller compression and tension forces. The rod post 20 extends through an opening 301 with an unthreaded portion 304 and a threaded portion 302. The rod post 20 is threaded to the threaded portion 302. The bridge member 300 has coaxial openings 308, 310 and 306. The openings 308 and 306 are threaded and disposed at opposite top and bottom of the bridge member 300. The opening 310 is unthreaded and has diameter larger than the diameter of the opening 308 but smaller than the diameter of the opening 306. The bridge member 300 is used as a coupling to join together a smaller diameter threaded rod 254 and a larger diameter threaded rod 252.

Figure 160:
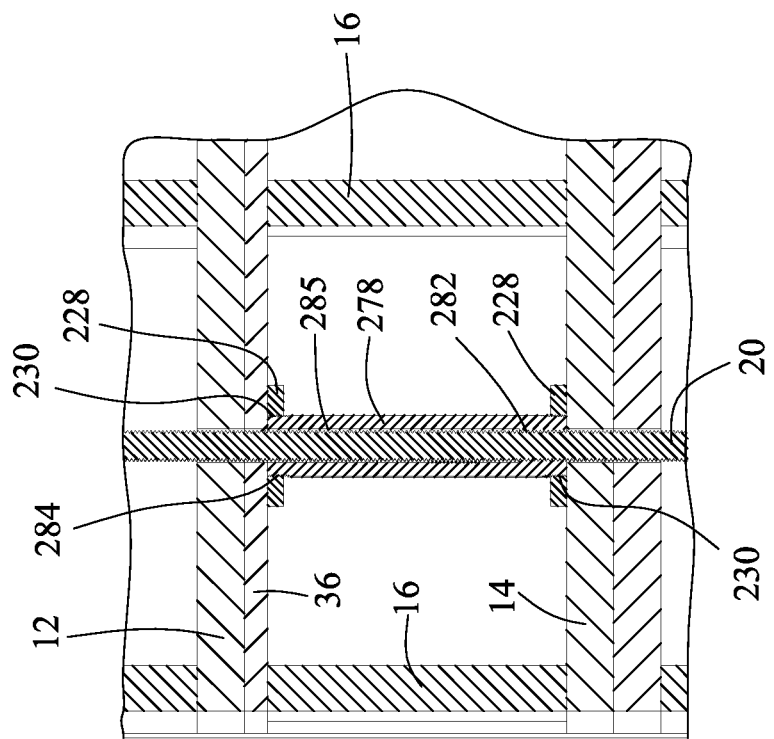
Figure 159:
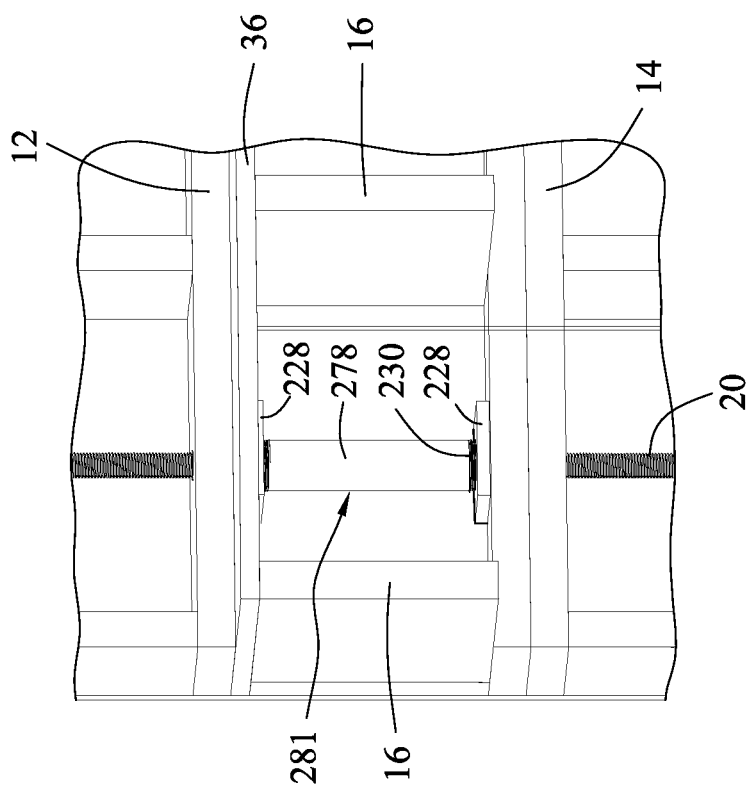

Referring to FIGS. 159 and 160, the sleeve assembly 281 (FIG. 147) may be used outside a bridge member, depending on the expected compression and tension load for the wall. The sleeve assembly 281 is disposed within the floor joist space between the top plate 14 of the wall below and the subfloor 36 of the wall above. Since the rod post 20 is threaded to the cylindrical body 278, the sleeve assembly 281 is able to transfer compression and tension forces from the wall to the rod post 20 via the bearing plates 228 and cylindrical body 278. The bearing plates 228 advantageously spread the forces over the top plate 14 and subfloor 36 to reduce crushing of the wood structures.

Figure 161:
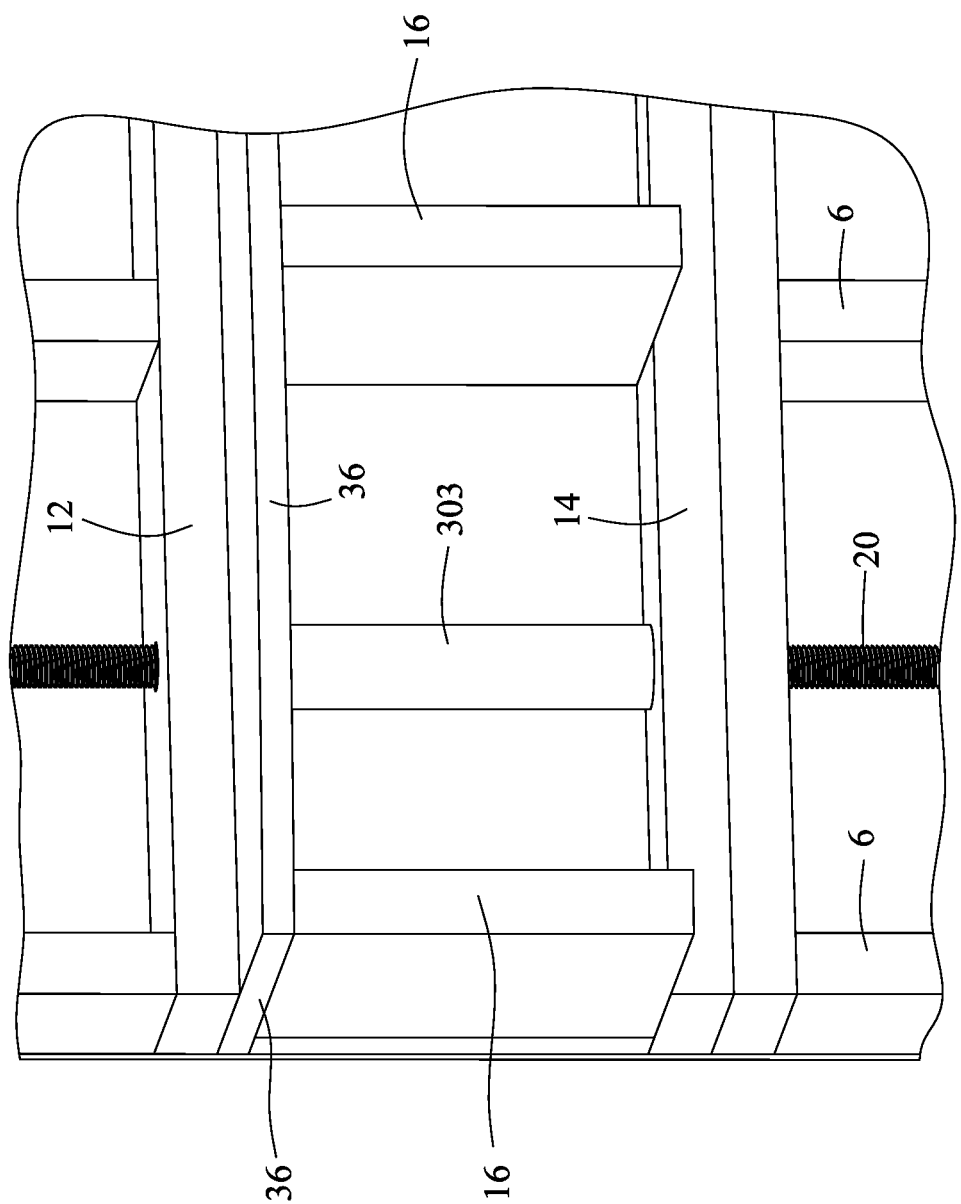
Figure 162:
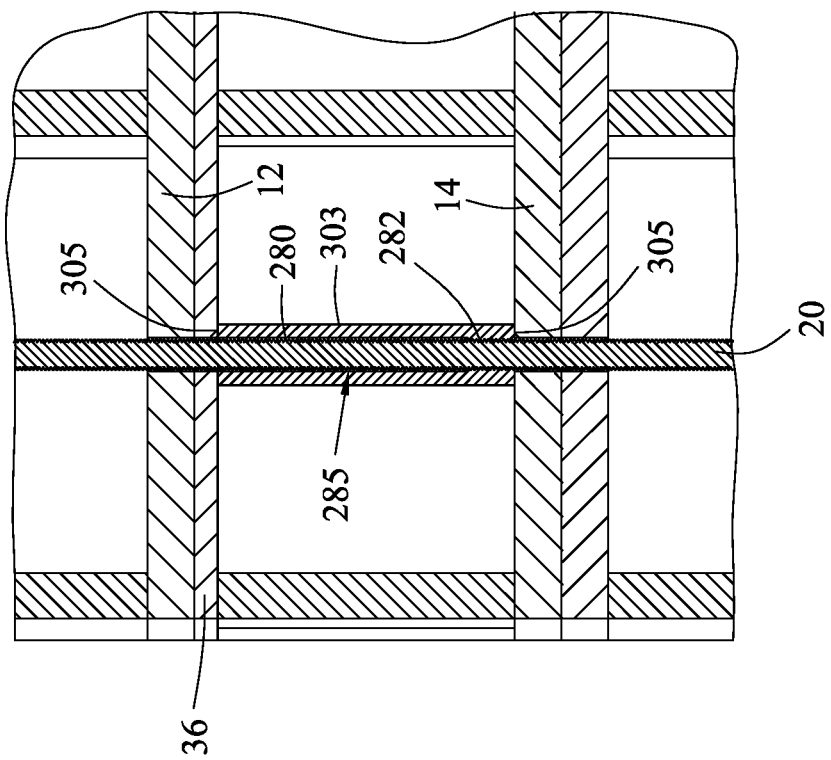

Referring to FIGS. 161 and 162, a cylindrical body 303 is disposed inside the floor joist space between the top plate 14 of the wall below and the subfloor 36 of the wall above. The cylindrical body 303 has an axial opening 285 with an unthreaded portion 280 and a threaded portion 282. The diameter of the unthreaded portion 280 is preferably larger than the diameter of the threaded portion 282 to allow the rod post 20 to extend past the threaded portion 282 as shown in FIG. 162. The top and bottom ends 305 of the cylindrical body 303 bear on the respective top plate 14 and the subfloor 36. Since the rod post 20 is threaded to the cylindrical body 303, the cylindrical body 303 is able to transfer compression and tension forces from the wall to the rod post 20. Use of the cylindrical body 303 will depend on the expected compression and tension forces that will crushing of the wood structures by the bottom and top ends 305.

Figure 163:
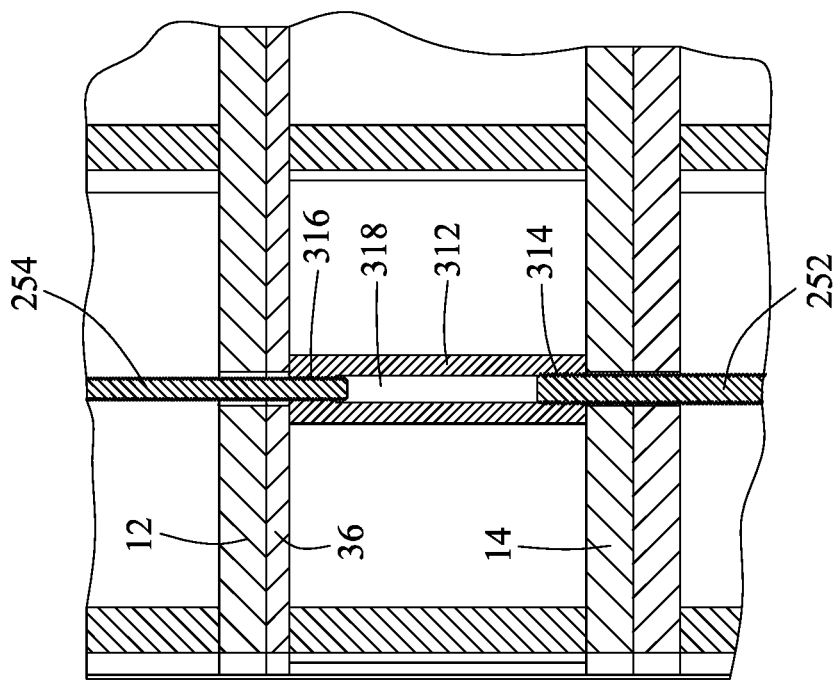

Referring to FIG. 163, the cylindrical body 303 is modified as cylindrical body 312 with coaxial openings 316, 318 and 314. The openings 316 and 314 are threaded and disposed at opposite ends of the cylindrical body 312. The opening 318 is unthreaded and has diameter larger than the diameter of the opening 316 but smaller than the diameter of the opening 314. The cylindrical body 312 is used as a coupling to join together a smaller diameter threaded rod 254 and a larger diameter threaded rod 252. The cylindrical body 312 is able to transfer compression and tension forces from top plate 14 and subfloor 36 to the threaded rods 254 and 252.

Figure 164:
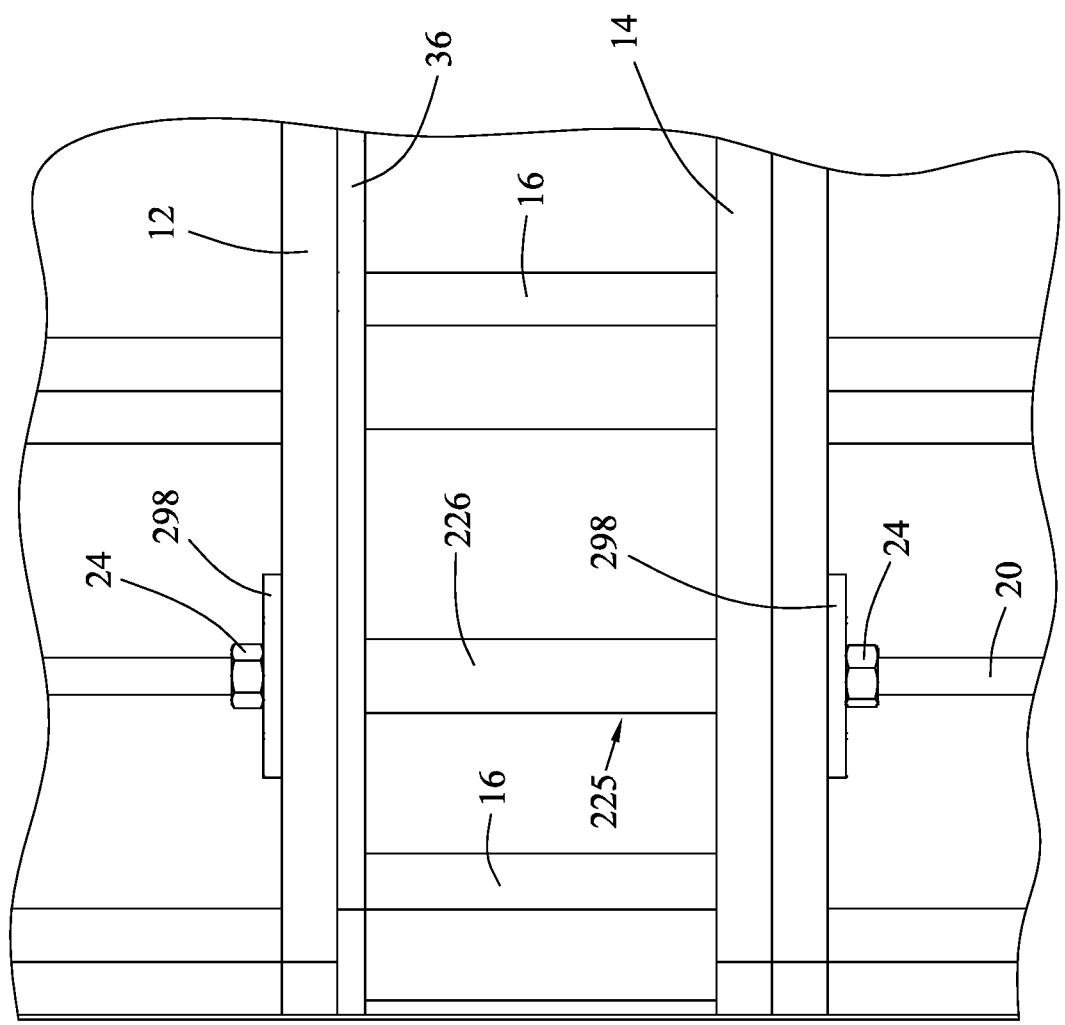
Figure 165:
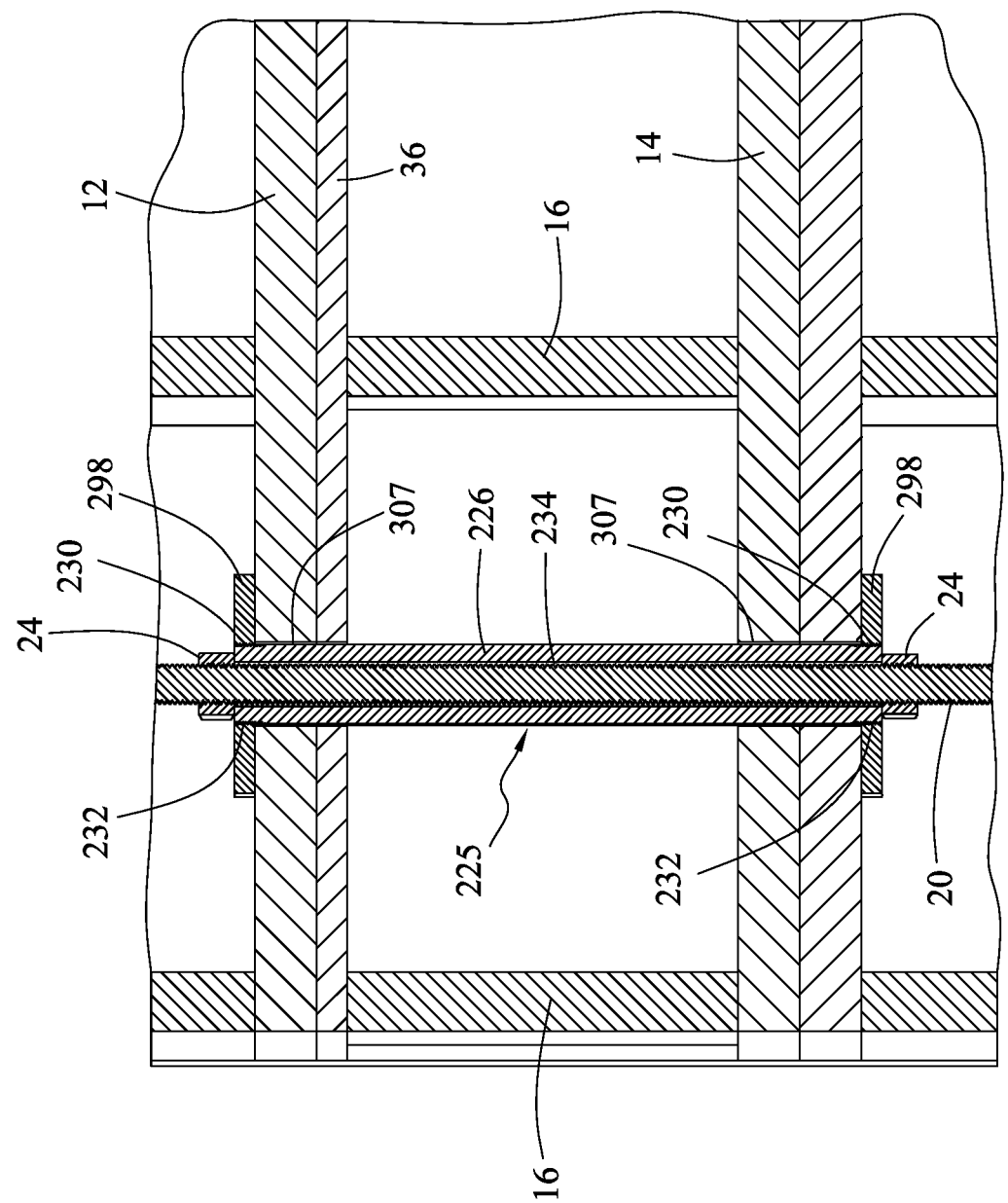

Referring to FIGS. 164 and 165, the cylindrical body 226 of the sleeve assembly 225 extends across the floor joist space through openings 307 in the top plate 14, the subfloor 36 and the bottom plate 12. The cylindrical body 226 is attached to the top plate 14 and the bottom plate 12 with the respective bearing plates 298 threaded to the respective threaded ends 232. The rod post 20 extends through the opening 234 and attached to the cylindrical body 226 with the nuts 24. Compression and tension forces are transferred from the top plate 14 and the bottom plate 12 to the rod post 20 via the lower nut 24 and the upper nut 24, respectively.

Figure 166:
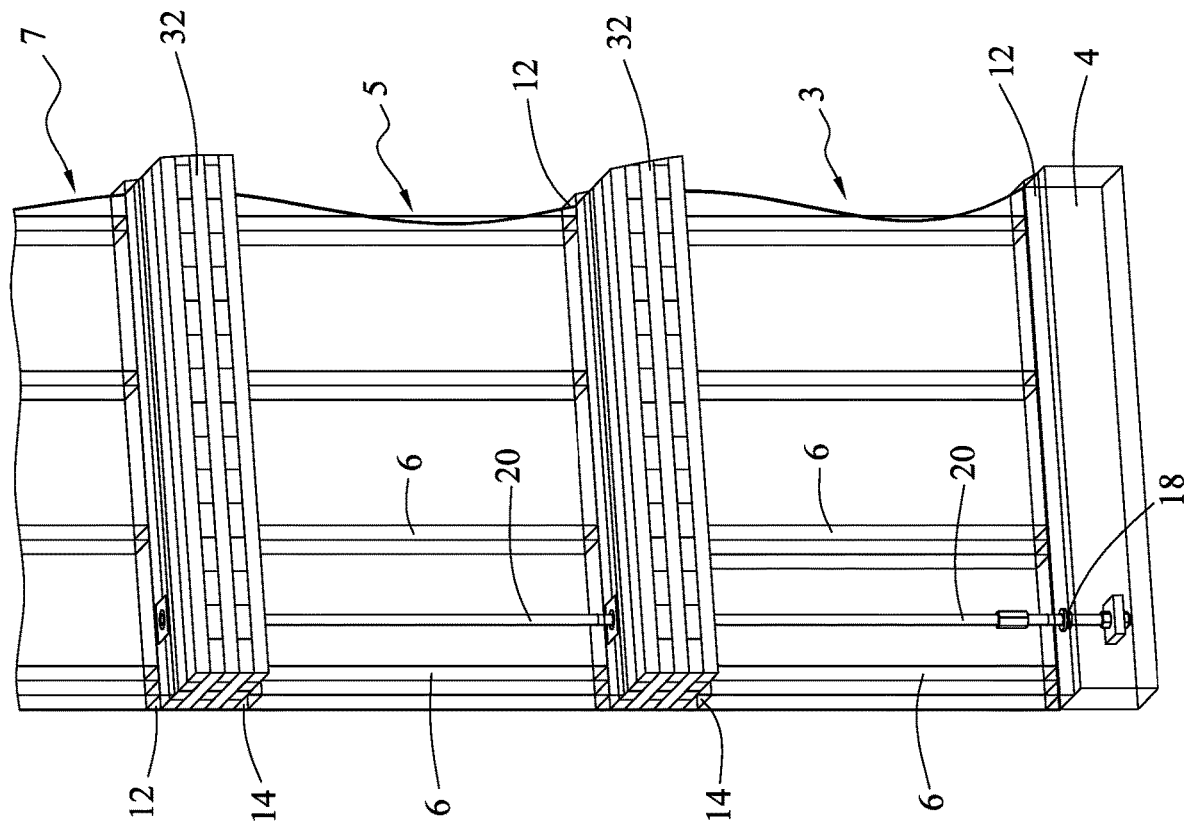
Figure 167:
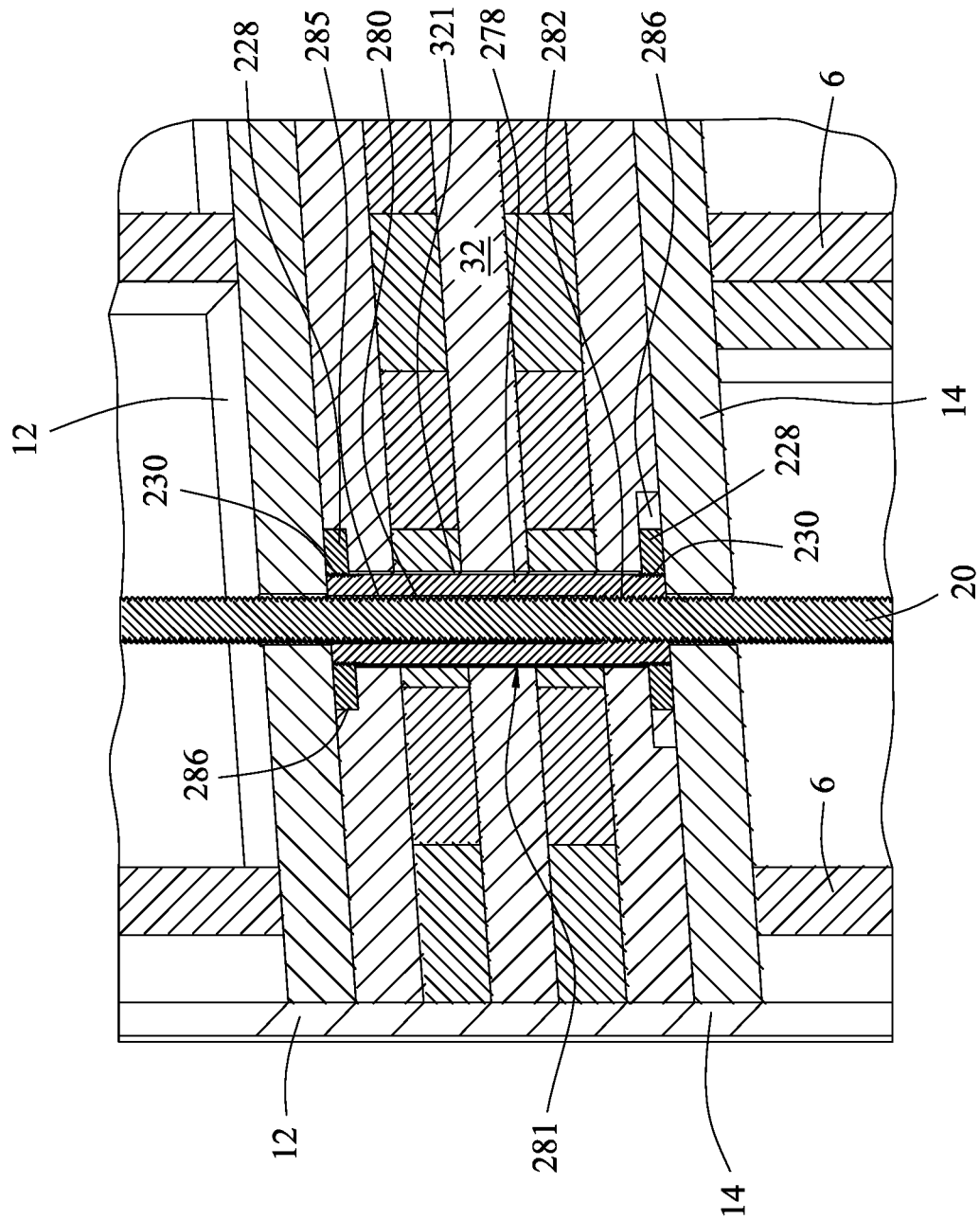

Referring to FIGS. 166 and 167, CLT floor panels 32 are disposed between respective top plates 14 and bottom plates 12. The rod post 20 is attached to the CLT floor panels 32 with the sleeve assembly 281 (see FIG. 147). The cylindrical body 278 is disposed across the thickness of the CLT floor panel 32 in an opening 321. Recesses 286 are cut into the upper and lower surfaces of the floor panel 32 for receiving the respective bearing plates 228 to make them flush with the rest of the surfaces. The lower recess 286 is larger than the actual size of the bearing plate 228 to provide room when screwing the bearing plate 228 to the threaded into the lower threaded end portion 232. The opening 285 has an unthreaded portion 280 and a threaded portion 282. The diameter of the unthreaded portion 280 is preferably larger than the diameter of the threaded portion 282 to allow the rod post 20 to extend into the next sleeve assembly 281 disposed in the upper CLT floor panel 32 in the upper wall 7 where the end of the rod post 20 is threaded to the threaded portion 282 of the opening 285, similar to what is shown in FIG. 147. The sleeve assembly 281 is able to transfer compression and tension forces from the floor panels 32 to the rod posts 20.

Figure 168:
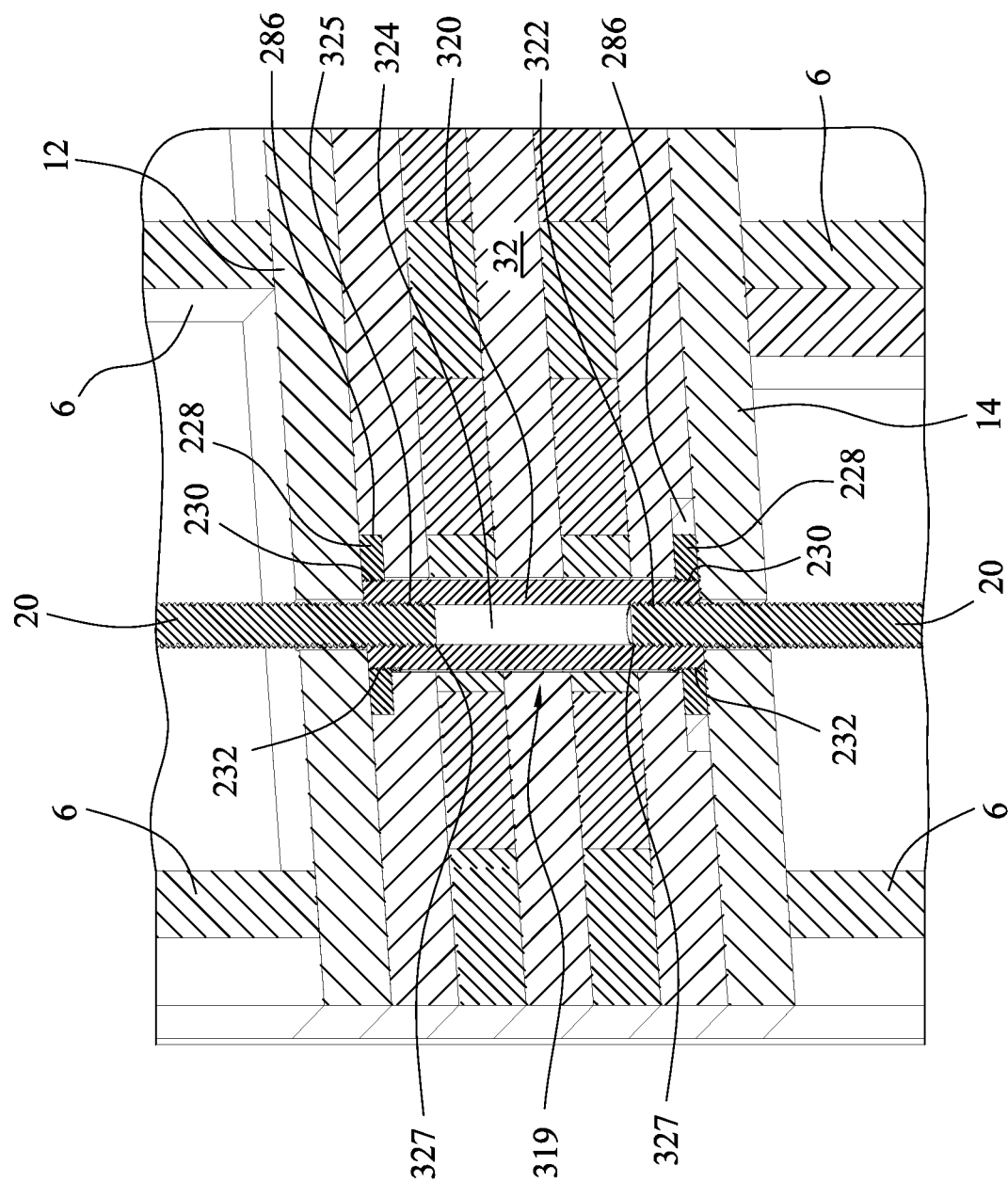

Referring to FIG. 168, the sleeve assembly 281 is modified as sleeve assembly 319 where the cylindrical body 320 is provided with coaxial openings 322, 324 and 325. The openings 322 and 325 are threaded and disposed at opposite ends of the cylindrical body 320. The opening 324 is unthreaded and has a diameter smaller than the diameter of the openings 322 and 325 so that a shoulder 327 provides a stop for the ends of the rod posts 20. The diameters of the openings 322 and 325 are preferably the same. The sleeve assembly 319 is used as a coupling to join together two sections of rod posts 20. The sleeve assembly 319 is able to transfer compression and tension forces from the floor panel 32 to the rod posts 20.

Figure 169:
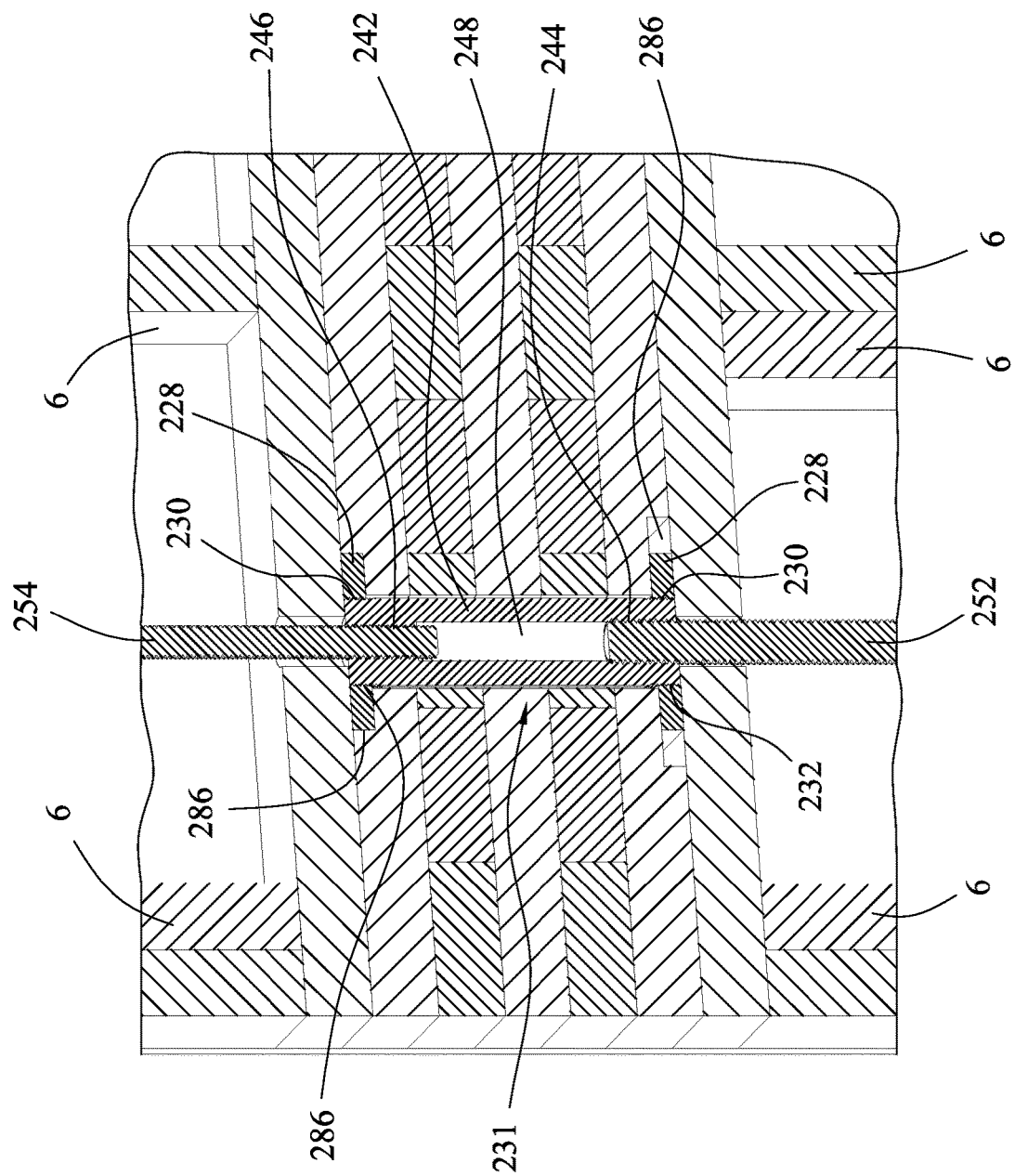

Referring to FIG. 169, the sleeve assembly 231 (see FIG. 149) may also be used. The sleeve assembly 231 allows for connecting a smaller diameter tie rod 254 for loading situations where the expected compression forces can be handled by the smaller diameter tie rod 254. The sleeve assembly 231 is used as a coupling to join together the rod 254 to the rod post 252. The sleeve assembly 231 is able to transfer compression and tension forces from the floor panel 32 to the rods 254 and 252.

Figure 171:
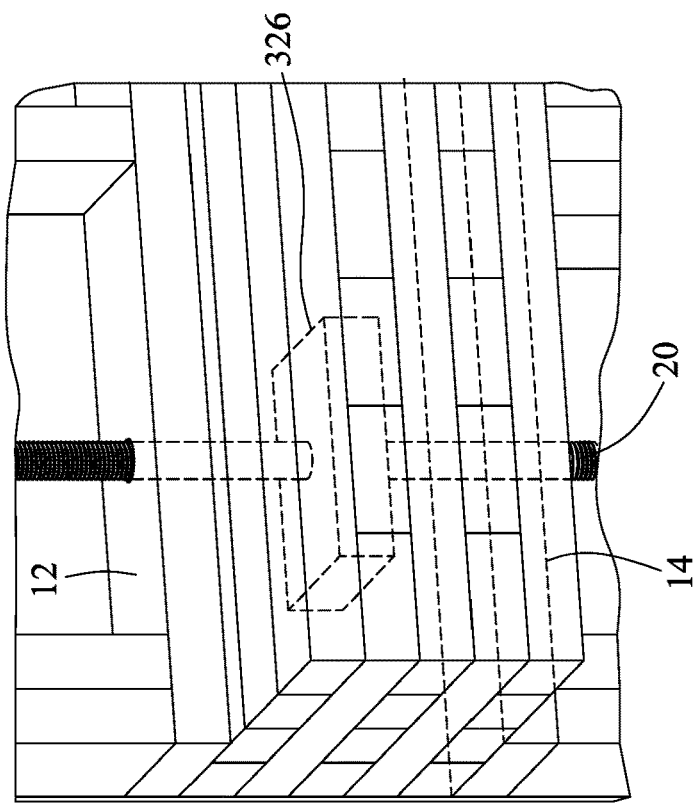
Figure 170:
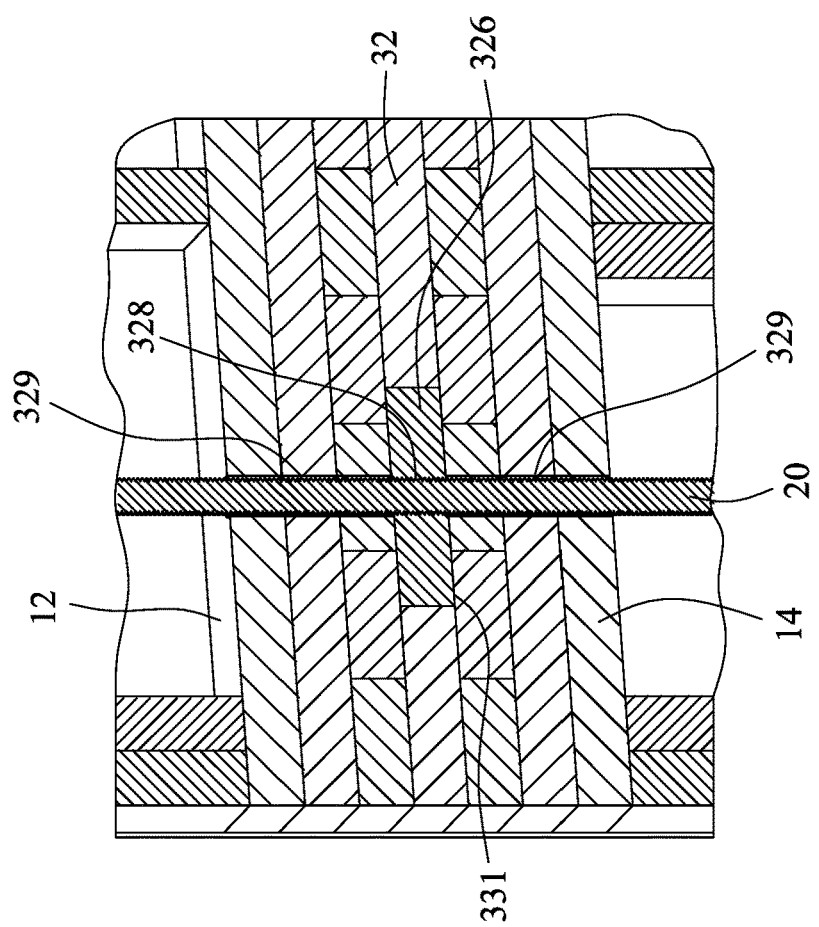

Referring to FIGS. 170 and 171, a metal body such as a bearing plate 326 is used to connect the CLT floor panel 32 to the rod post 20. The bearing plate 326 is preferably embedded in a cavity in the CLT floor panel 32 during manufacture. A threaded opening 328 is aligned with an opening 329 through the thickness of the panel 32 to allow the rod post 20 to be threaded to the bearing plate 326 to connect the rod post 20 to the bearing plate 326. The bearing plate 326 is able to transfer compression and tension forces from the floor panel 32 to the rod post 20.

Figure 173:
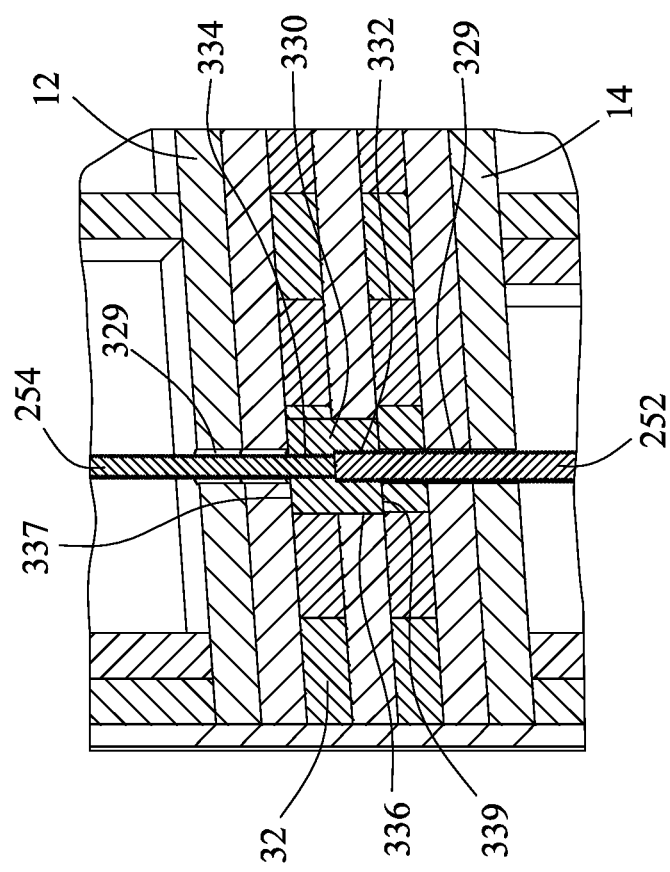
Figure 172:
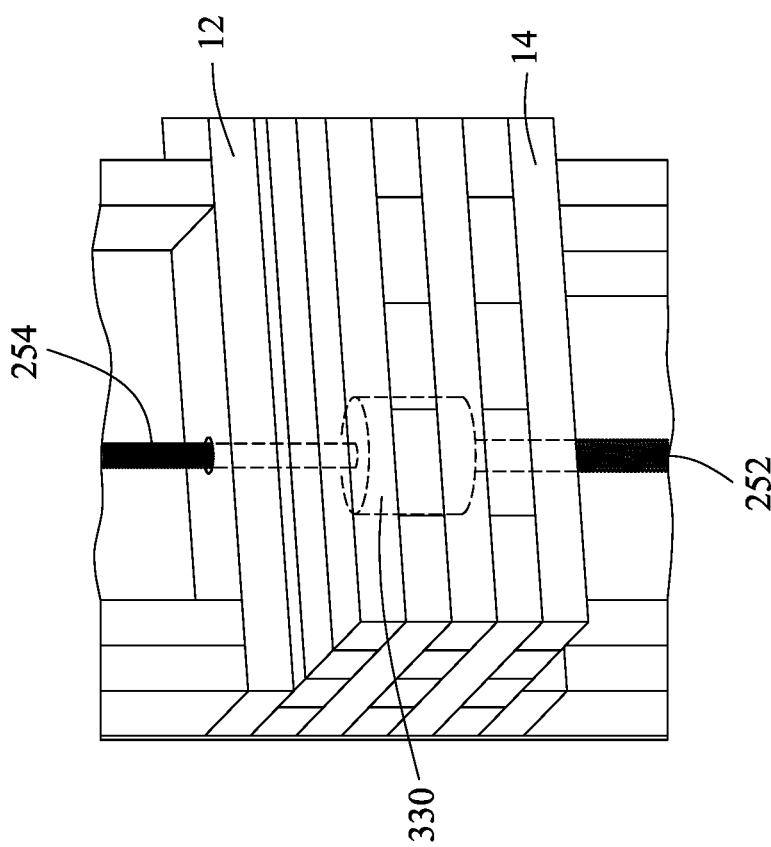

Referring to FIGS. 172 and 173, a metal body such as a cylindrical coupling 330 is disposed inside a cavity 336 in the CLT floor panel 32. The coupling 330 has a smaller diameter threaded opening 334 and a coaxial larger diameter threaded opening 332. The openings 329 in the floor panel 32 allow the smaller diameter rod 254 to be threaded to the threaded opening 334 and the larger diameter rod 252 to the larger diameter threaded opening 332. The cylindrical coupling 330 is embedded in the CLT floor panel 32 during manufacture. The cylindrical coupling 330 has opposite top 337 and bottom surface 339 that provide bearing surfaces for resisting compression and tension forces and transferring the same to the rods 254 and 252 through the threaded connections.

Figure 174:
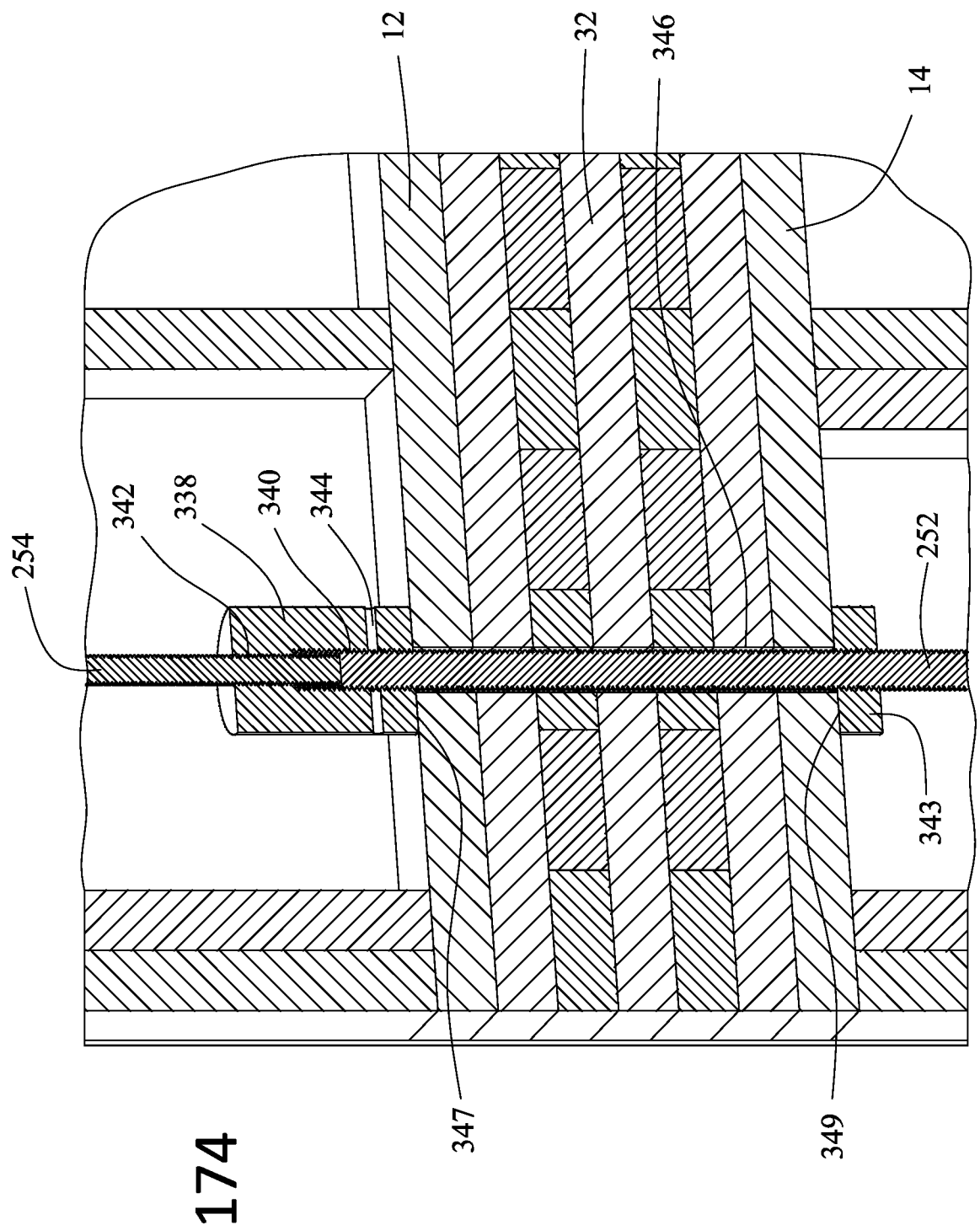

Referring to FIG. 174, a body such as a cylindrical coupling 338 is disposed on the top plate 12. The coupling 338 has a smaller diameter threaded opening 342 and a coaxial larger diameter threaded opening 340. An opening 346 through the top plate 14, the CLT floor panel 32 and the top plate 12 allow the larger diameter rod 252 to be threaded to the threaded opening 340 and the smaller diameter rod 254 to the smaller diameter threaded opening 342. A sight hole 344 communicating with the threaded opening 340 provides a visual check on the penetration of the rod 252 into the threaded opening 340 to insure maximum thread engagement. A threaded body 343 is threaded to the rod 252 to bear against the bottom of the top plate 14. The threaded body 343 may be a circular plate 298 such as shown in FIG. 154 or a rectangular bearing plate 228 such as shown in FIG. 160. The cylindrical coupling 338 has a bottom surface 347 and the threaded body a top surface 349 that provide bearing surfaces for resisting compression and tension forces and transferring the same to the rods 254 and 252 through the threaded connections.

Figure 175:
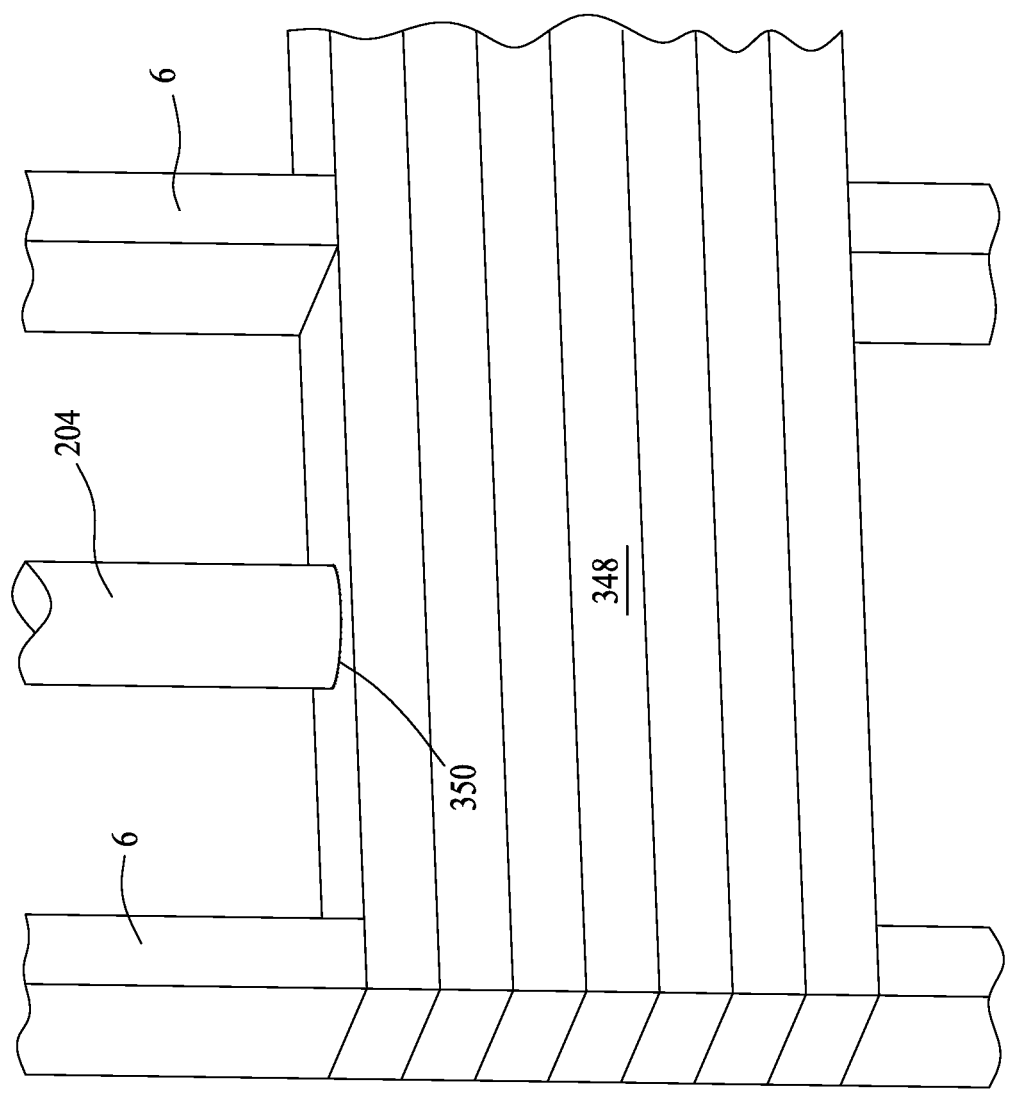

Referring to FIG. 175, a round solid metal post 204 bears on a foundation made of a wood beam 348. Compression forces are transferred from the post 204 to the wood beam 348 via the bottom surface 350 of the post 204.

Referring to FIGS. 176 and 177, a metal bearing plate 352 is disposed on the wood beam 348 for transferring compression forces from the rod post 20 to the wood beam 348. The bearing plate 352 has a threaded opening 354 for attaching to the rod post.

Figure 179:
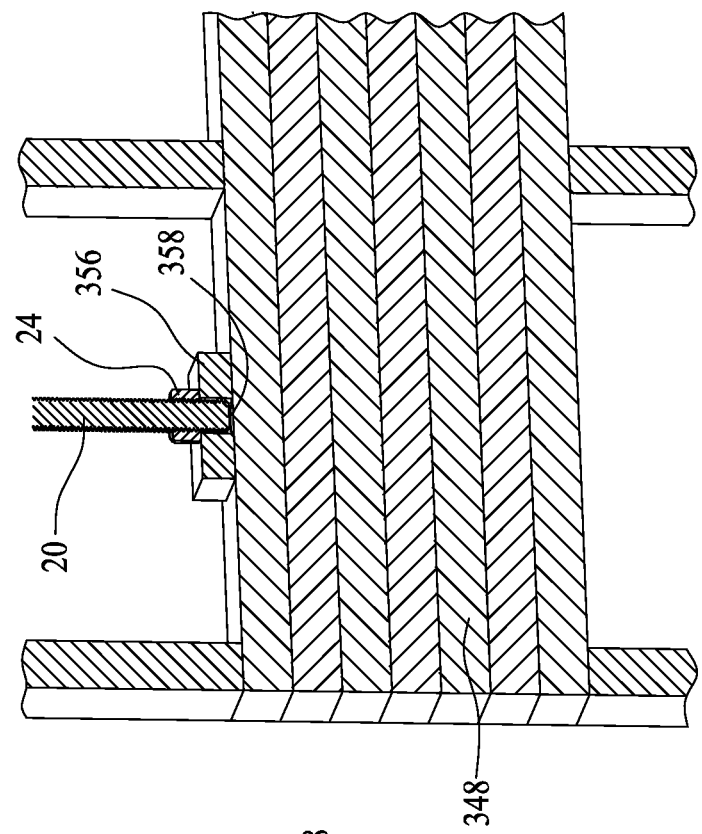
Figure 178:
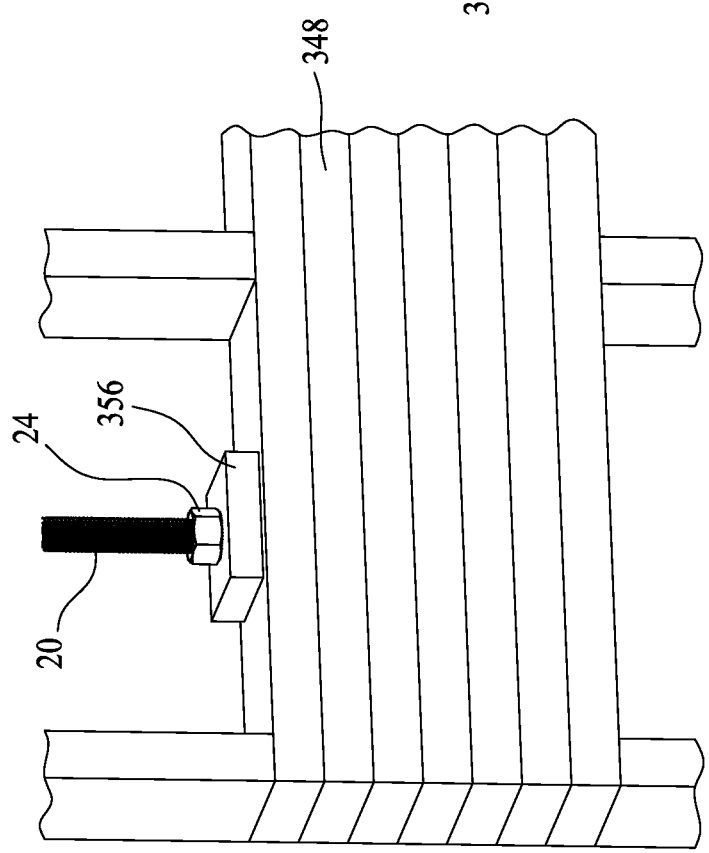

Referring to FIGS. 178 and 179, a metal bearing plate 356 is disposed on the wood beam 348 for transferring compression forces from the rod post 20 to the wood beam 348. The bearing plate 356 has an unthreaded opening 358 for receiving an end portion of the rod post 20. A nut 24 is attached to the end portion of the rod post 20 to hold the rod post 20 in place from compression forces. The bottom of the rod post 20 is above the wood beam 348.

Figure 180:
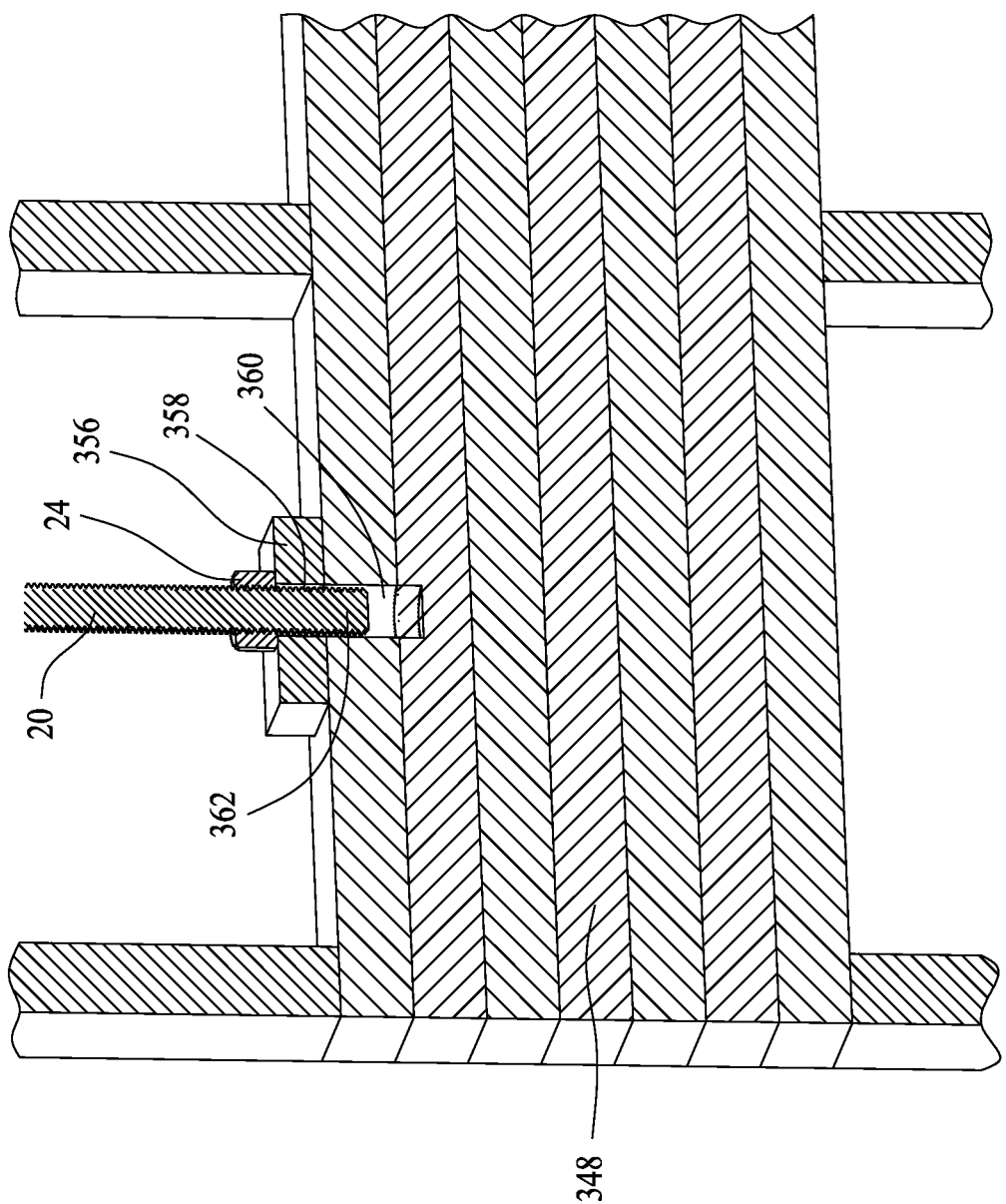

Referring to FIG. 180, a blind hole 360 in the wood beam is provided. The end portion 362 of the rod post 20 extends into the hole 360.

Figure 181:
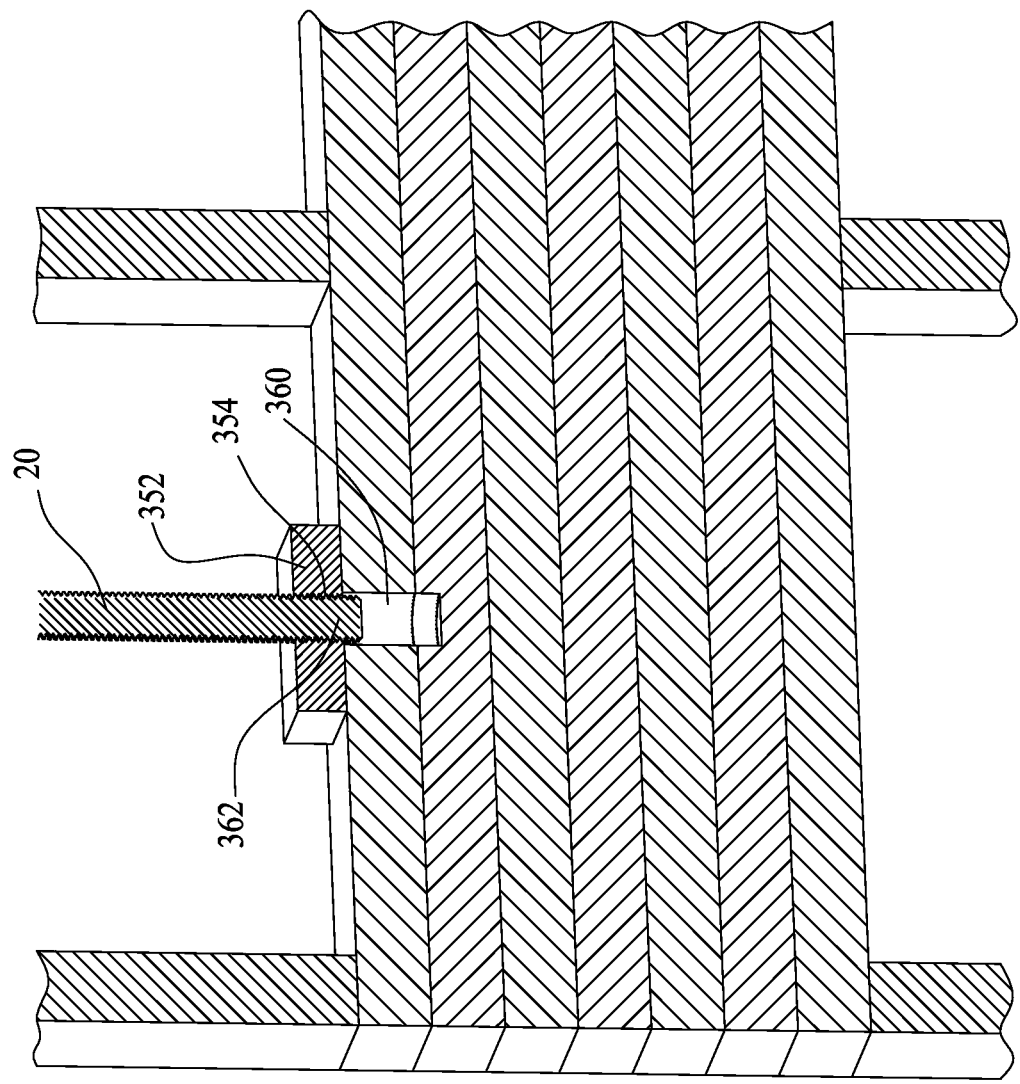

Referring to FIG. 181, the bearing plate 352 is used. The end portion 362 of the rod post 20 extends into the blind hole 360. The rod post 20 is threaded to the bearing plate 352 for transferring compression forces from the rod post 20 to the wood beam 348 via the bearing plate 352.

Figure 183:
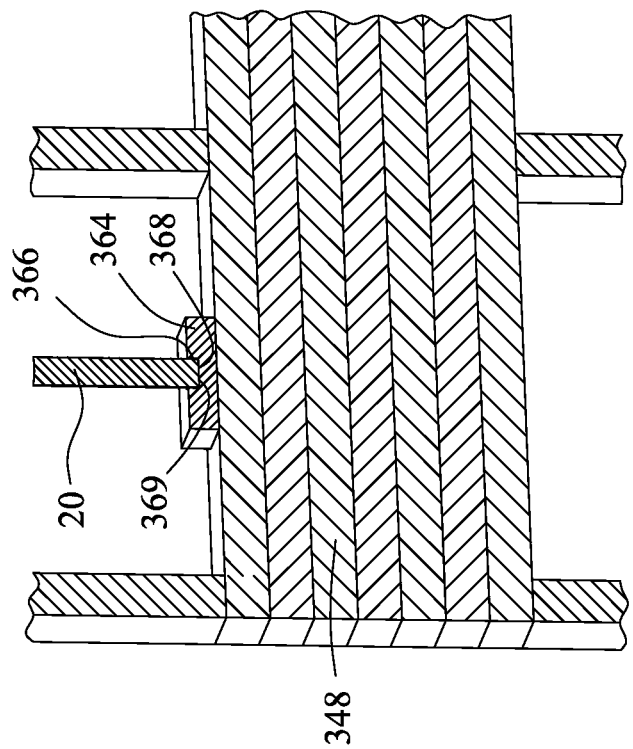
Figure 182:
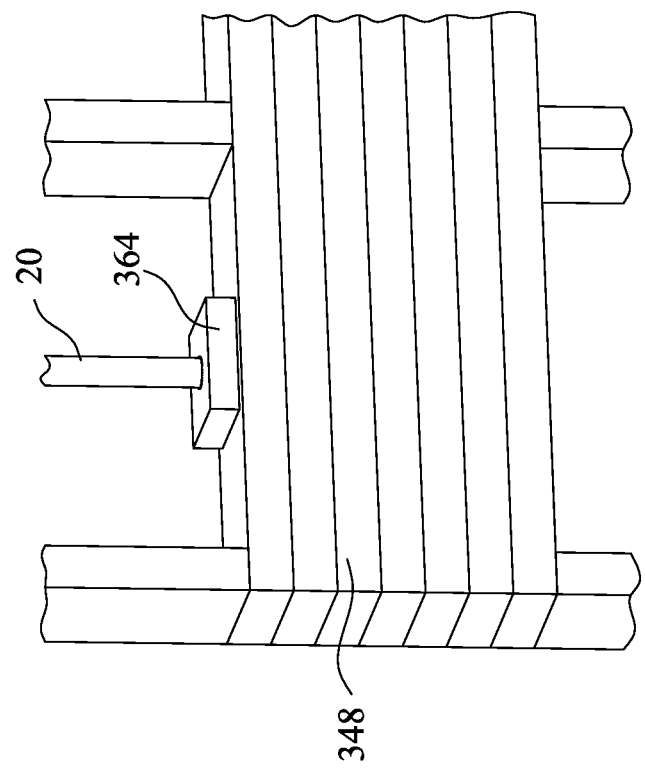

Referring to FIGS. 182 and 183, a metal bearing plate 364 is disposed on the wood beam 348 for transferring compressing forces from the rod post 20 to the wood beam 348. The bearing plate 364 has an unthreaded blind hole 366 for receiving an end portion of the rod post. The bottom of the rod post 20 bears on the floor 369 of the blind hole 366 to transfer compression forces from the rod post 20 to the wood beam 348 via the bearing plate 364.

Figure 184:
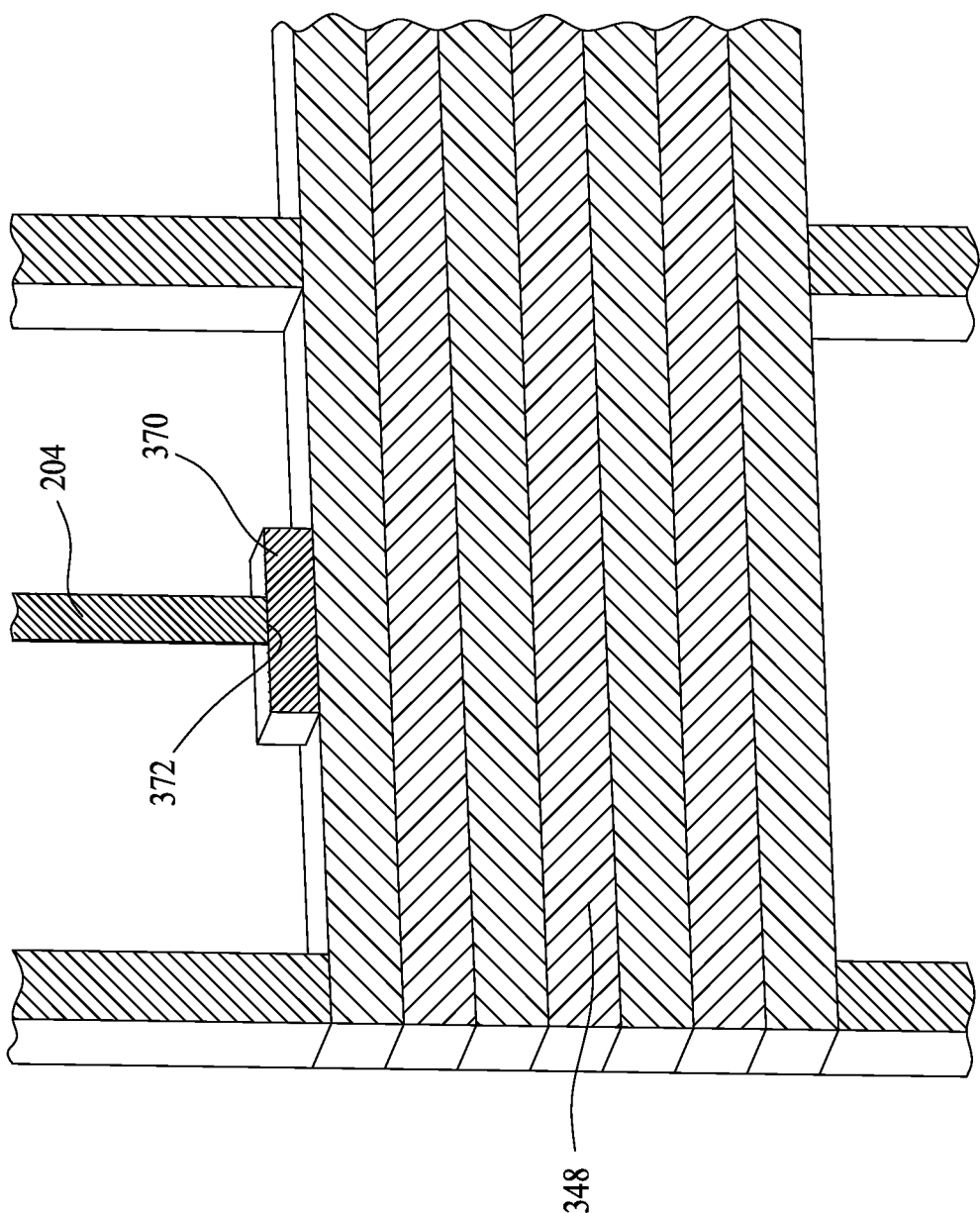

Referring to FIG. 184, a metal bearing plate 370 is disposed on the wood beam 348 for transferring compressing forces from the metal round post 204 to the wood beam 348. The bottom surface 372 of the post 204 bears on the bearing plate 370. The bearing plate 370 advantageously spreads the compression forces over a larger surface area of the wood beam 348 than the bottom surface 372 of the post without the bearing plate 370.

Figure 186:
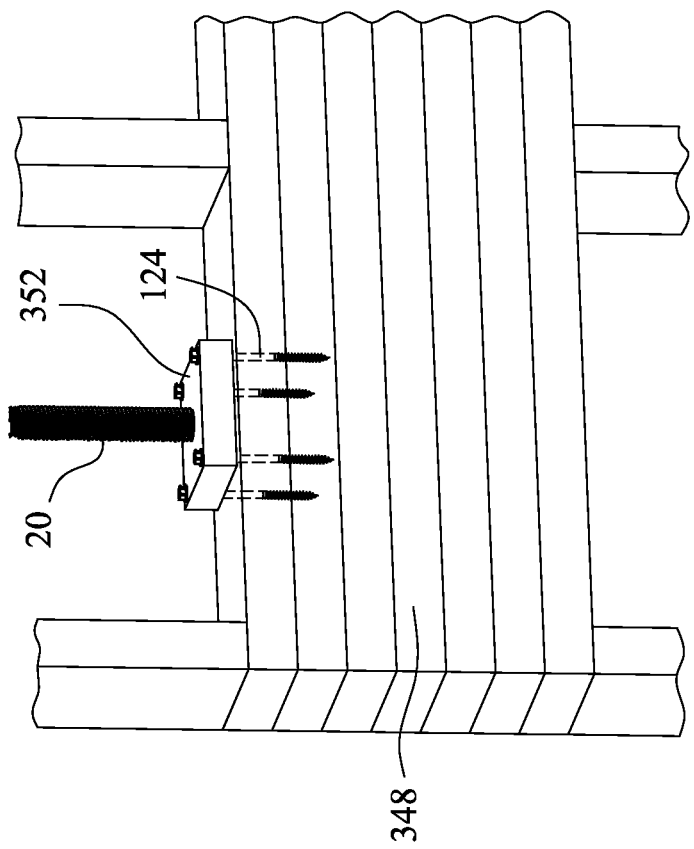
Figure 185:
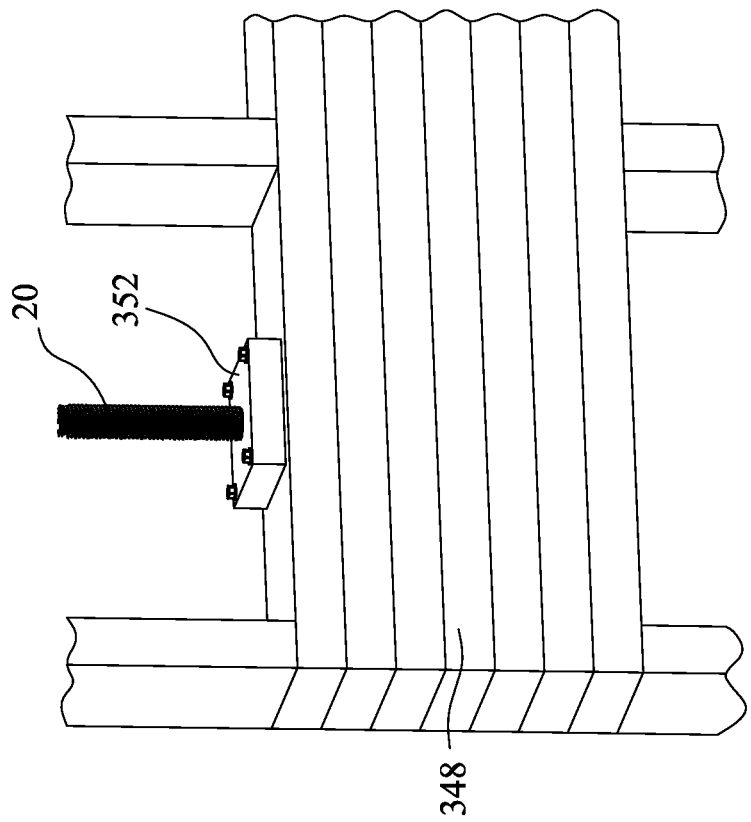

Referring to FIGS. 185 and 186, the bearing plate 352, which is threaded to the rod post 20, is attached to the wood beam 348 with screws 124 to advantageously allow the rod post 20 to also handle tension forces in addition to compression forces.

Figure 187:
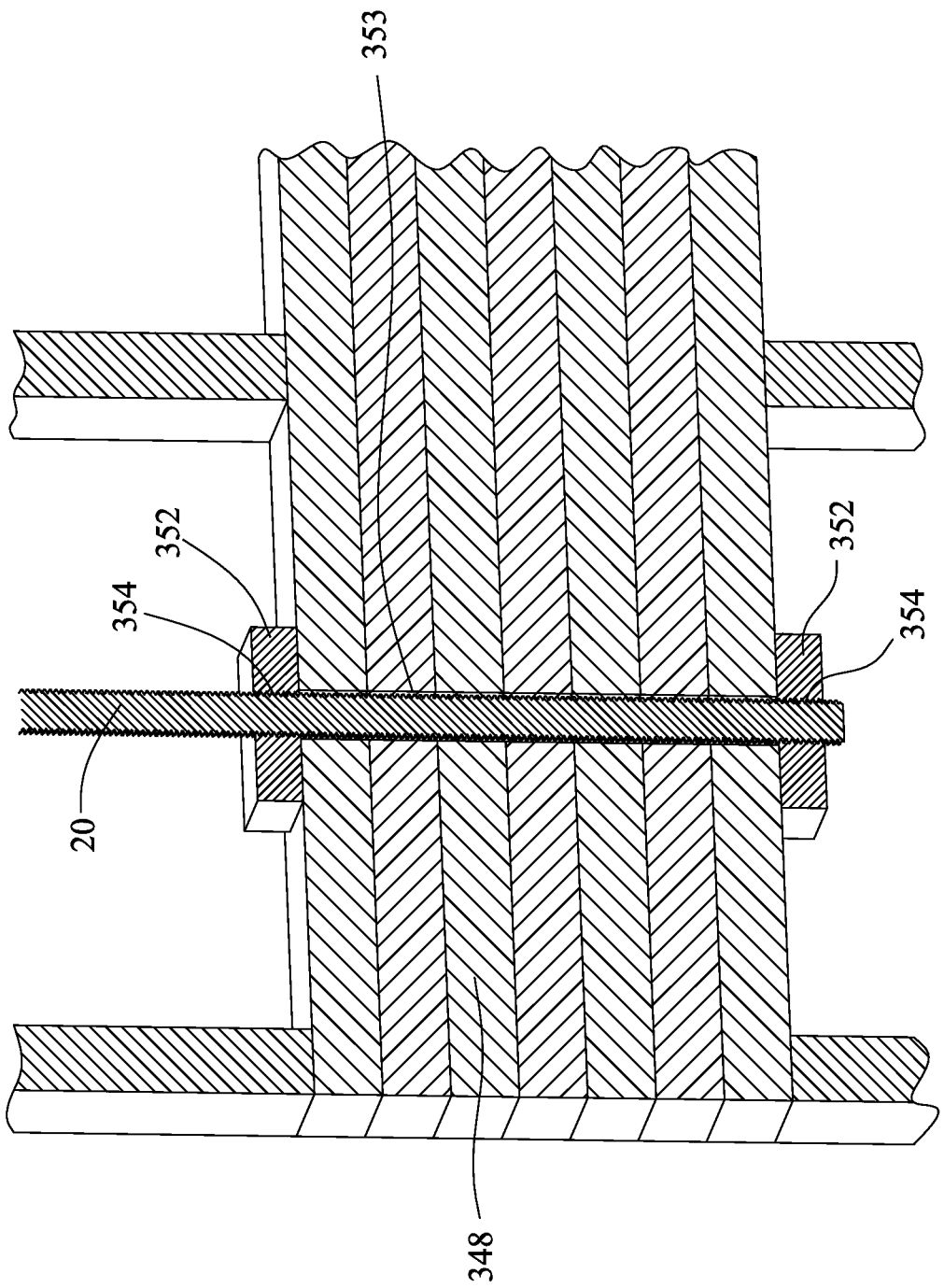

Referring to FIG. 187, metal bearing plates 352 with threaded openings 354 are disposed respectively on the top surface and bottom surface of the wood beam 348. The rod post 20 extends through an opening 353 through the wood beam 348 from the top surface to the bottom surface. The bearing plates 352 are threaded to the rod post 20 and bear on the respective top and bottom surfaces of the wood beam 348 to securely attach the rod post 20 to the wood beam 348. The bearing plates 352 advantageously spread the compression and tension forces over a larger surface area of the wood beam 348. The rod post 20 is threaded to the bearing plates 352 for transferring compression and tension forces from the rod post 20 to the wood beam 348 via the bearing plates 352.

Figure 188:
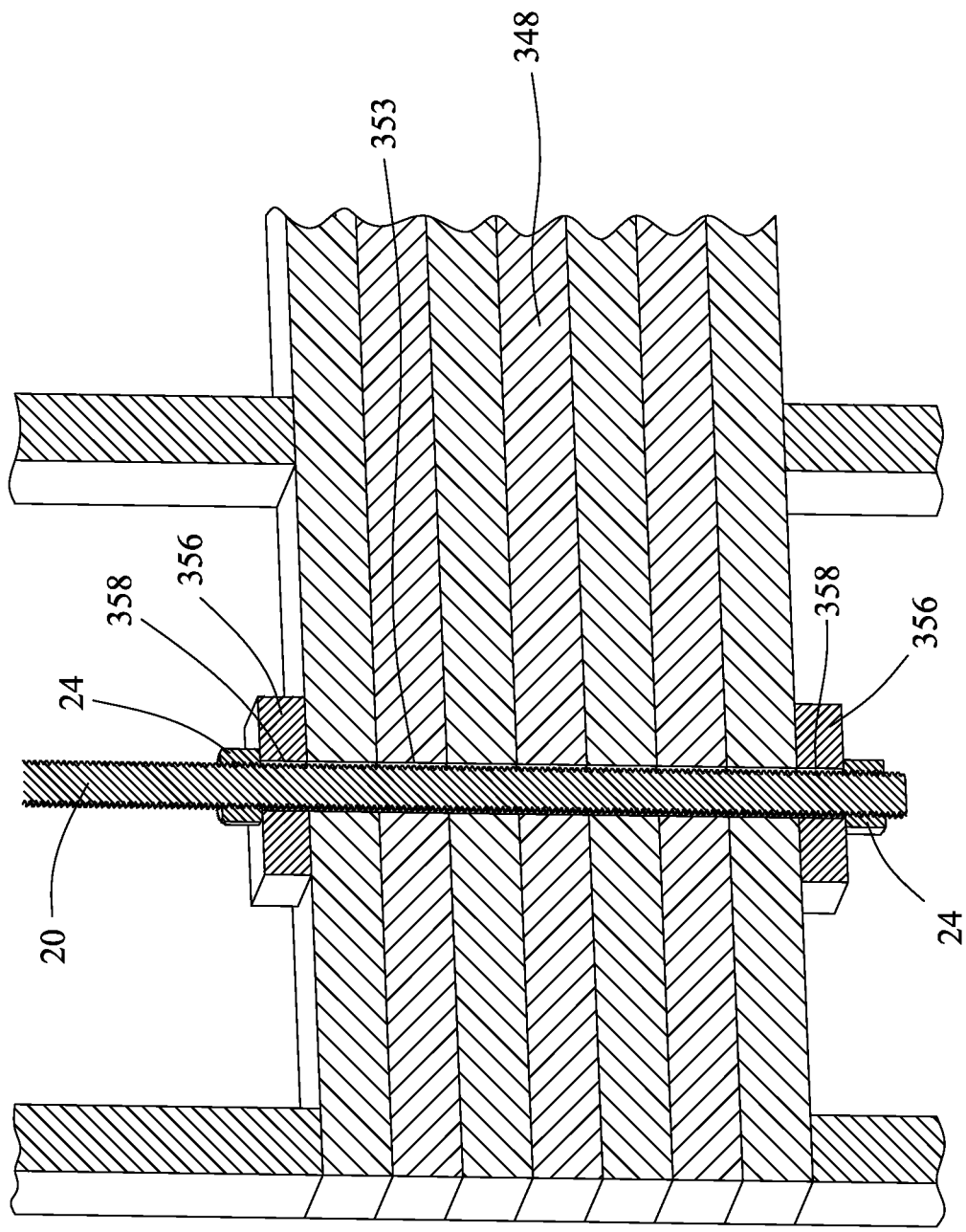

Referring to FIG. 188, metal bearing plates 356 with unthreaded openings 358 are disposed respectively on the top and bottom of the wood beam 348. The rod post 20 extends through an opening 353 through the wood beam 348. The bearing plates 356 are attached to the rod post 20 with the nuts 24 and bear on the respective top and bottom surfaces of the wood beam 348 to securely attach the rod post 20 to the wood beam 348. The bearing plates 356 advantageously spread the compression and tension forces over a larger surface area of the wood beam 348. The nuts 24 are threaded to the rod post 20 to transfer compression and tension forces from the rod post 20 to the wood beam 348 via the bearing plates 356.

Figure 190:
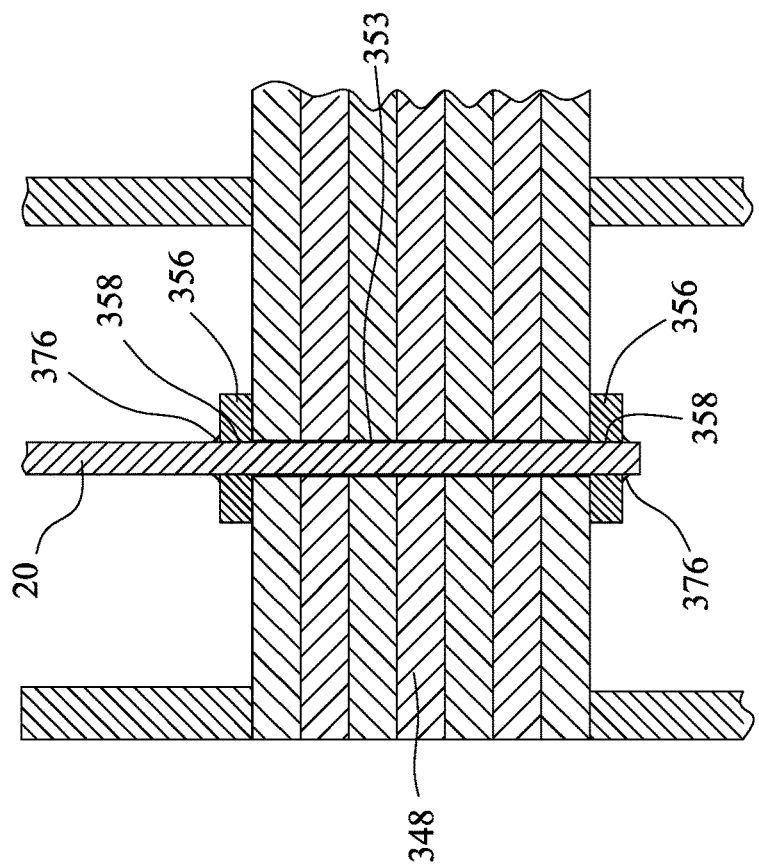
Figure 189:
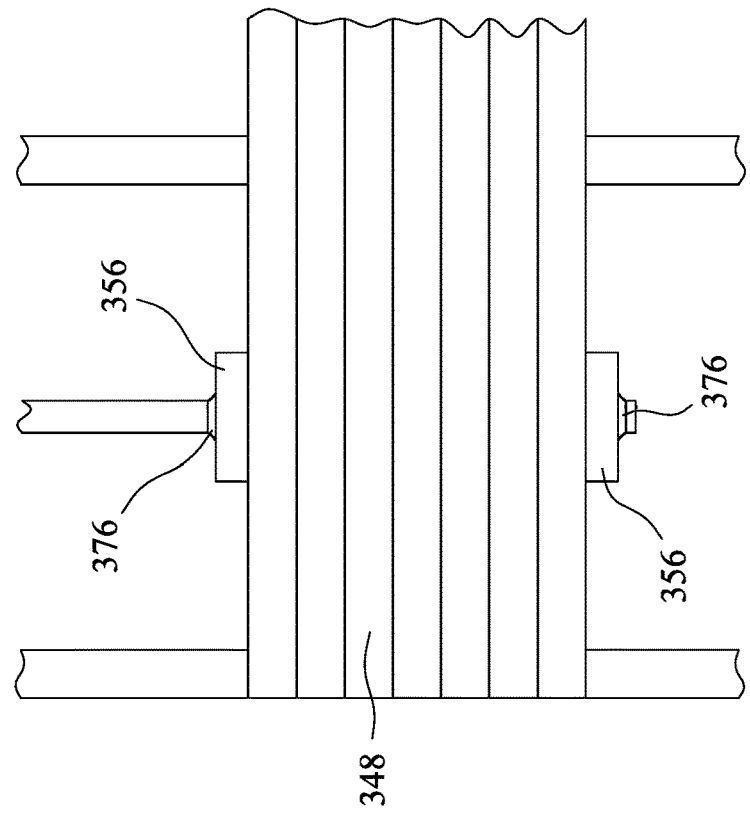

Referring to FIGS. 189 and 190, the nuts 24 shown in FIG. 188 may be replaced with welding 376 to attach the rod post 20 to the bearing plates 356.

Figure 191:
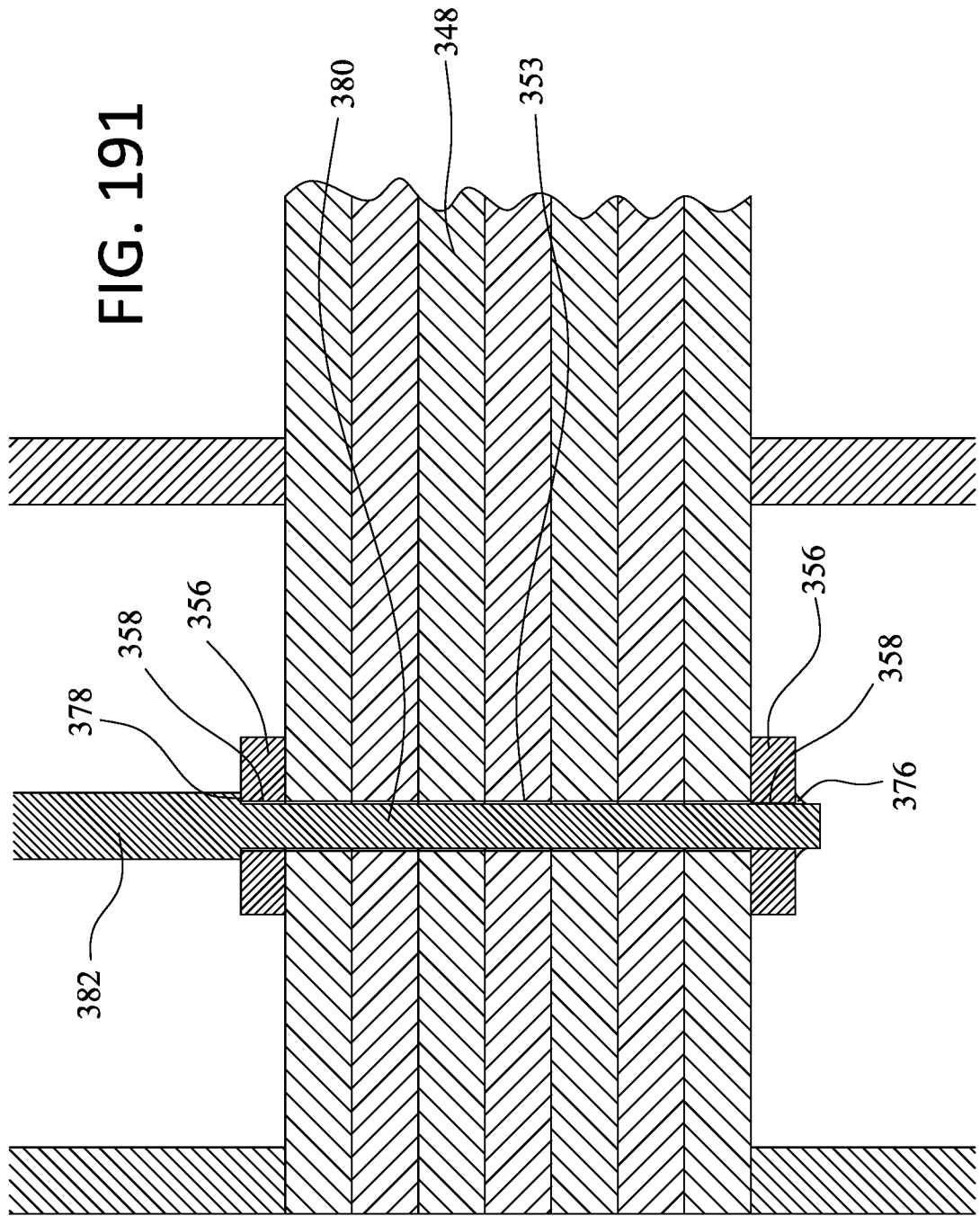

Referring to FIG. 191, a rod post 382 includes a smaller diameter end portion 380 that extends the wood beam 348. A circumferential shoulder 378 bears on the upper bearing plate 356. Welding 376 attaches the lower bearing plate 356 to the end portion 380. Compression forces on the rod post 382 are transferred to the wood beam 348 through contact between the shoulder 378 and the upper bearing plate 356. Tension forces on the rod post 382 are transferred to the wood beam 348 through the welding 376 between the end portion 380 and the lower bearing plate 356.

Figure 192:
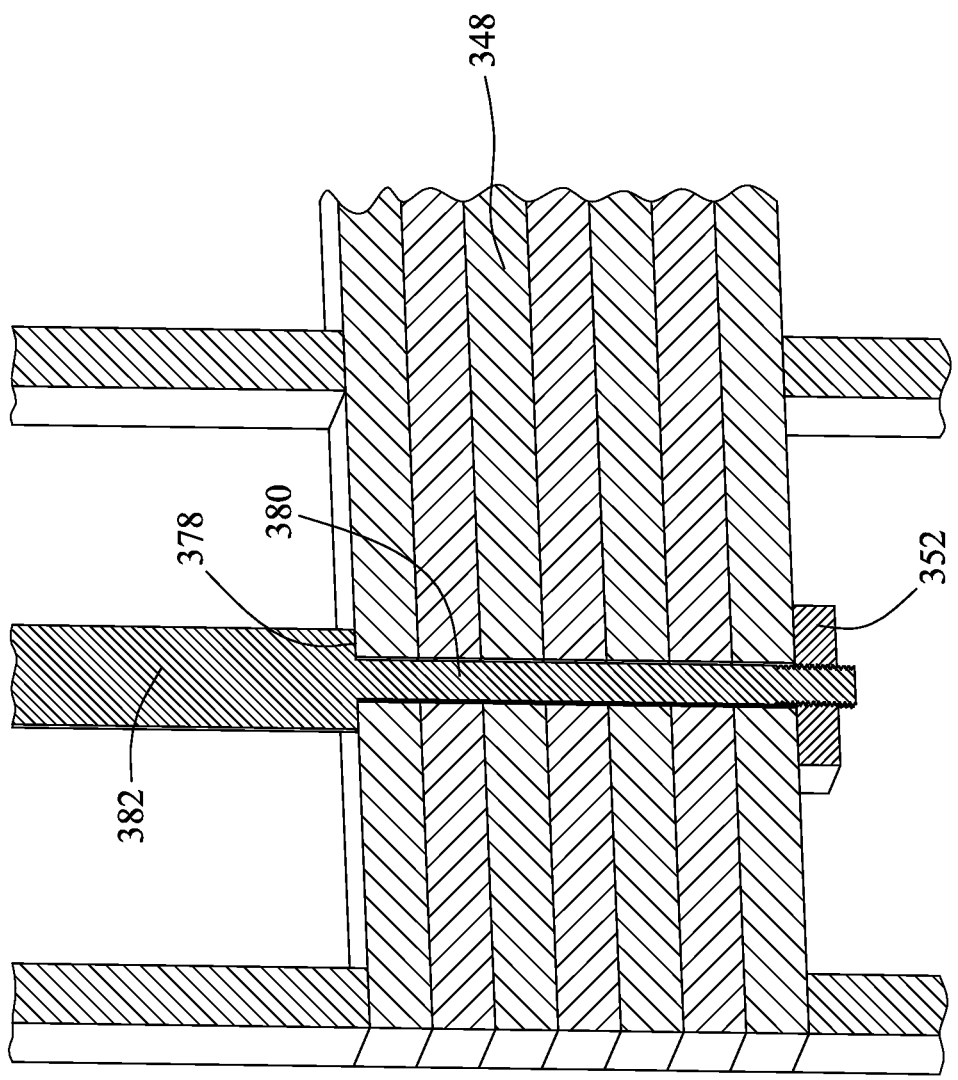

Referring to FIG. 192, the shoulder 378 bears directly on the wood beam 348. The smaller diameter end portion 380 is threaded to the bearing plate 352, which bears on the bottom surface of the wood beam 348. Compression forces on the rod post 382 are transferred to the wood beam 348 through contact between the shoulder 378 and the wood beam 348. Tension forces on the rod post 382 are transferred to the wood beam 348 through the lower bearing plate 356 and to the wood beam 348.

Referring to FIGS. 193, 194, 195 and 196, solid metal rod post 20 extends through an opening 392 and bears on a foundation made of a steel I-beam 386 with upper and lower flanges 390 connected with web 391. The bottom of the rod post 20 bears on the upper flange 390, preferably centered over the web 391. Compression forces are transferred from the post 20 to the steel I-beam 386 via the bottom surface 388 of the post 20. The rod post 20 is unthreaded or threaded.

Figure 198:
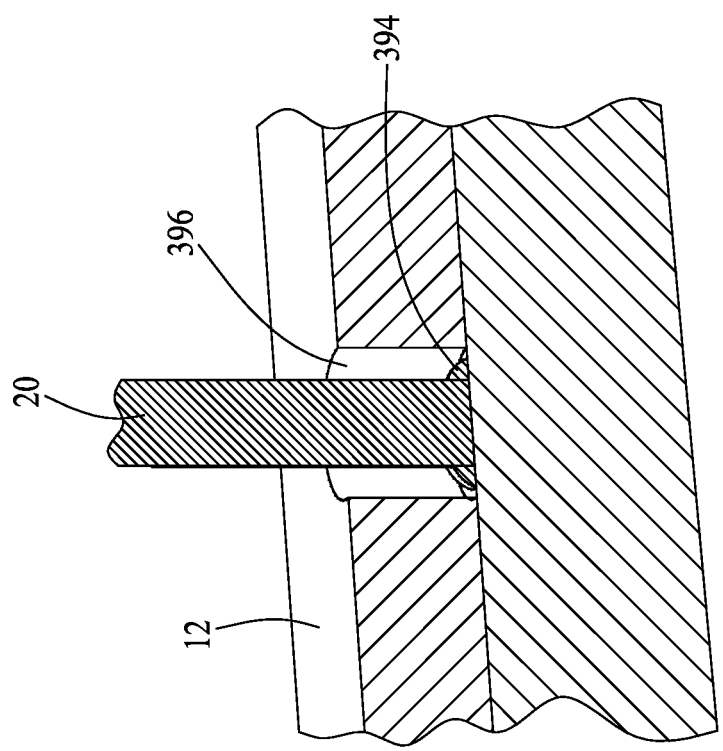
Figure 197:
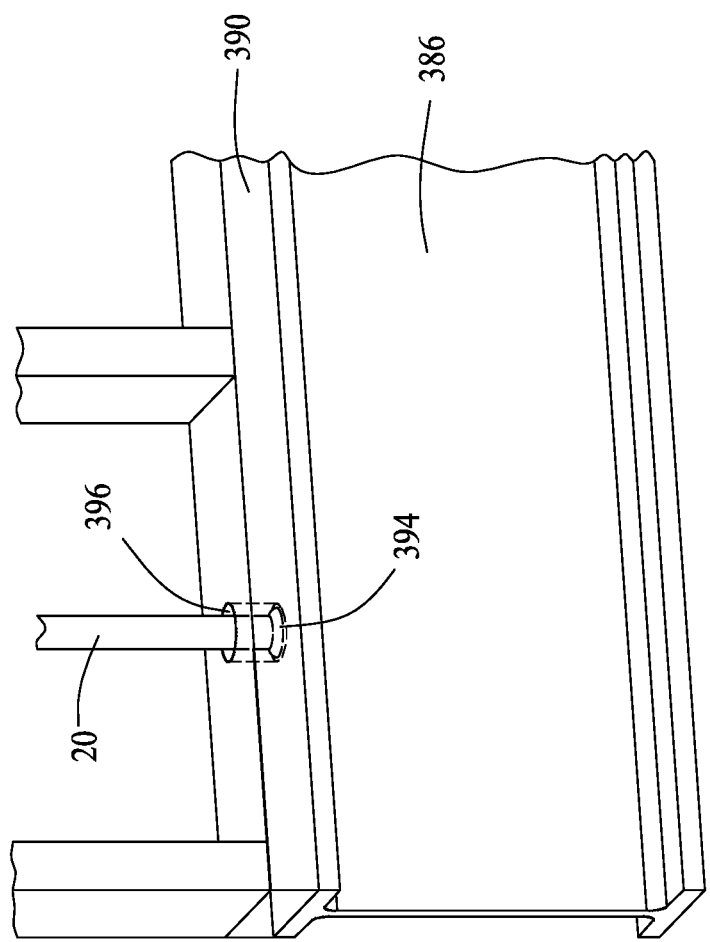
Figure 199:
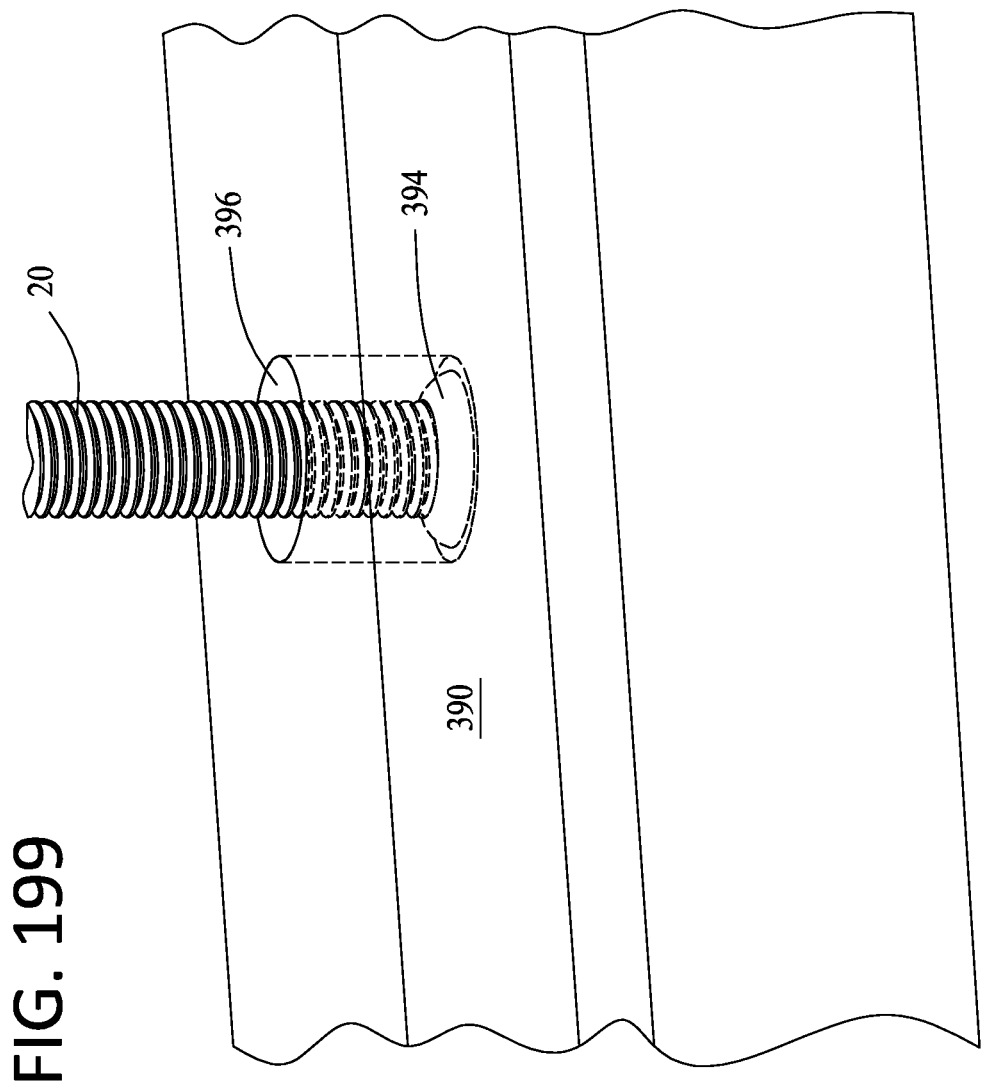

Referring to FIGS. 197, 198 and 199, the rod post 20 is attached to the flange 390 with welding 394. An oversize opening 396 in the bottom plate 12 allows access to the bottom end of the rod post 20 during welding. Compression forces on the rod post 20 are transferred to the steel I-beam 386 through contact with the bottom surface of the rod post 20 and welding. Tension forces on the rod post 382 are transferred to the steel I-beam 386 through the welding 394 between the rod post 20 and the steel I-beam 386. The rod post 20 is unthreaded or threaded.

Figure 200:
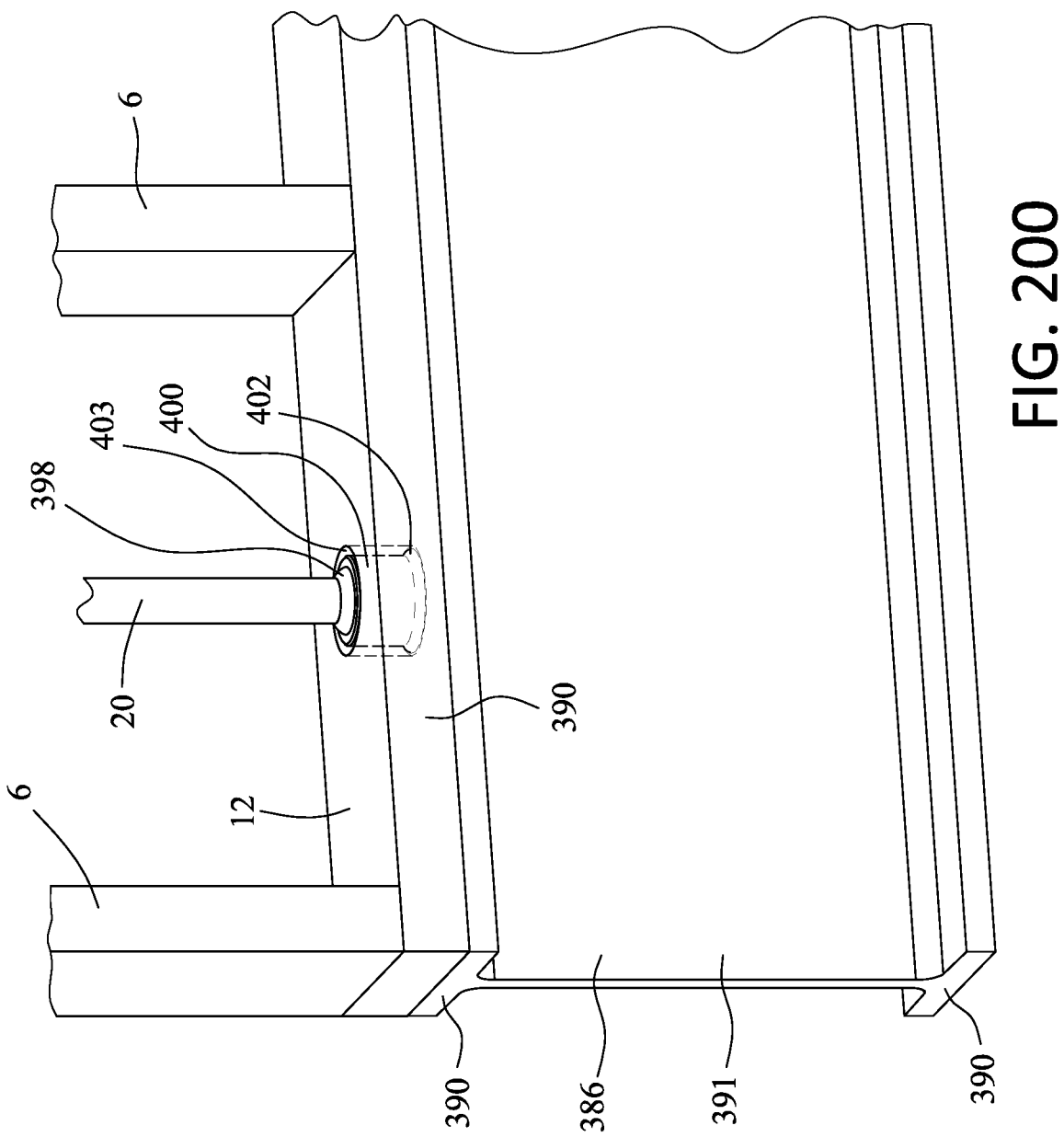

Referring to FIGS. 200, 201 and 202, a cylindrical body 400 with an axial opening 401 is disposed in an opening 403 in the top plate 12. The cylindrical body 400 receives an end portion of the rod post 20. The cylindrical body is attached to the rod post 20 with welding 398 around the opening 401. The cylindrical body 400 is attached to the flange 390 with welding 402 at the bottom of the cylindrical body 400. The bottom 404 of the rod post 20 may bear on the flange 390 (FIG. 201) or be spaced a distance 406 above the flange 390 (FIG. 202).

Figure 203:
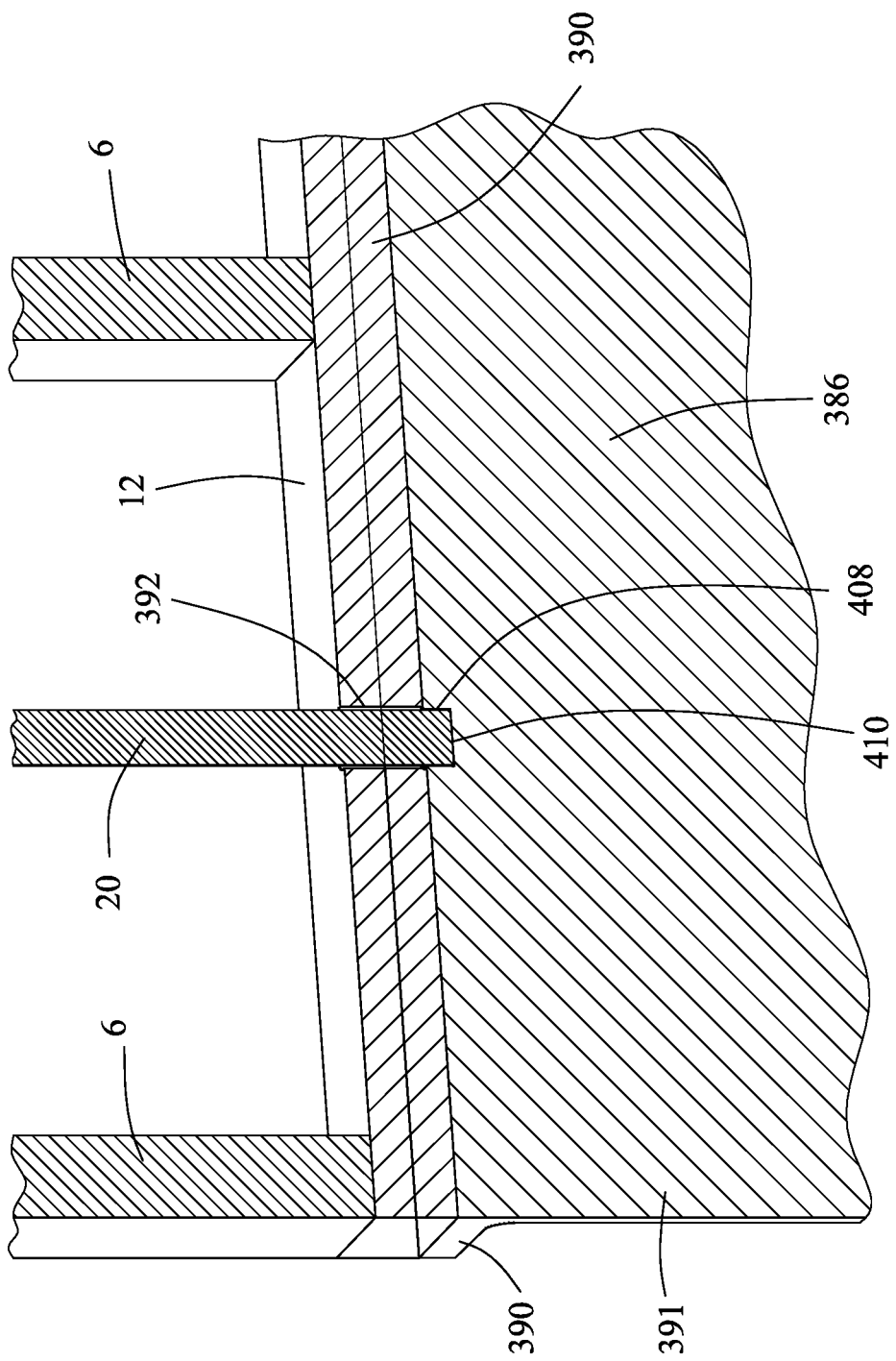
Figure 204:
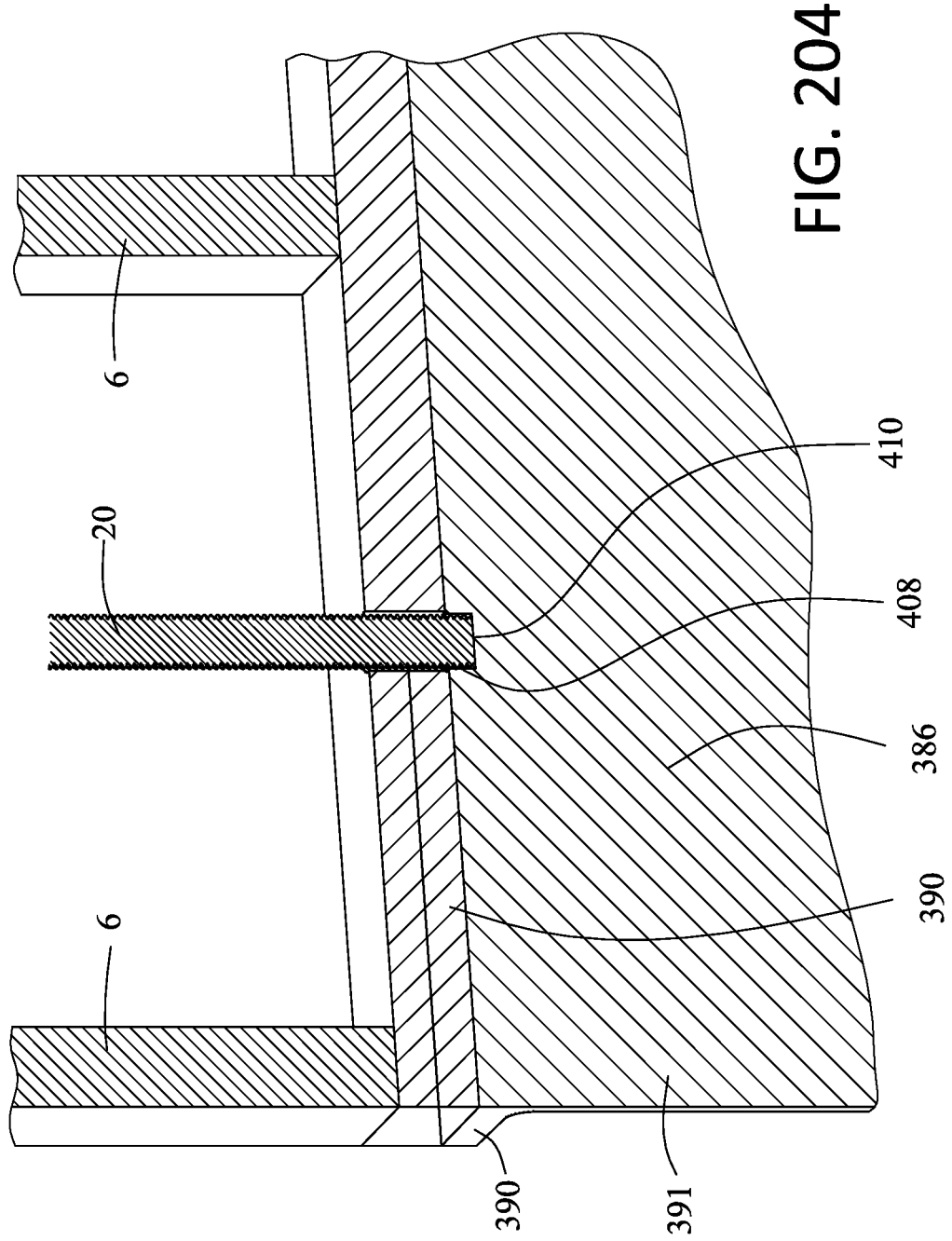
Figure 205:
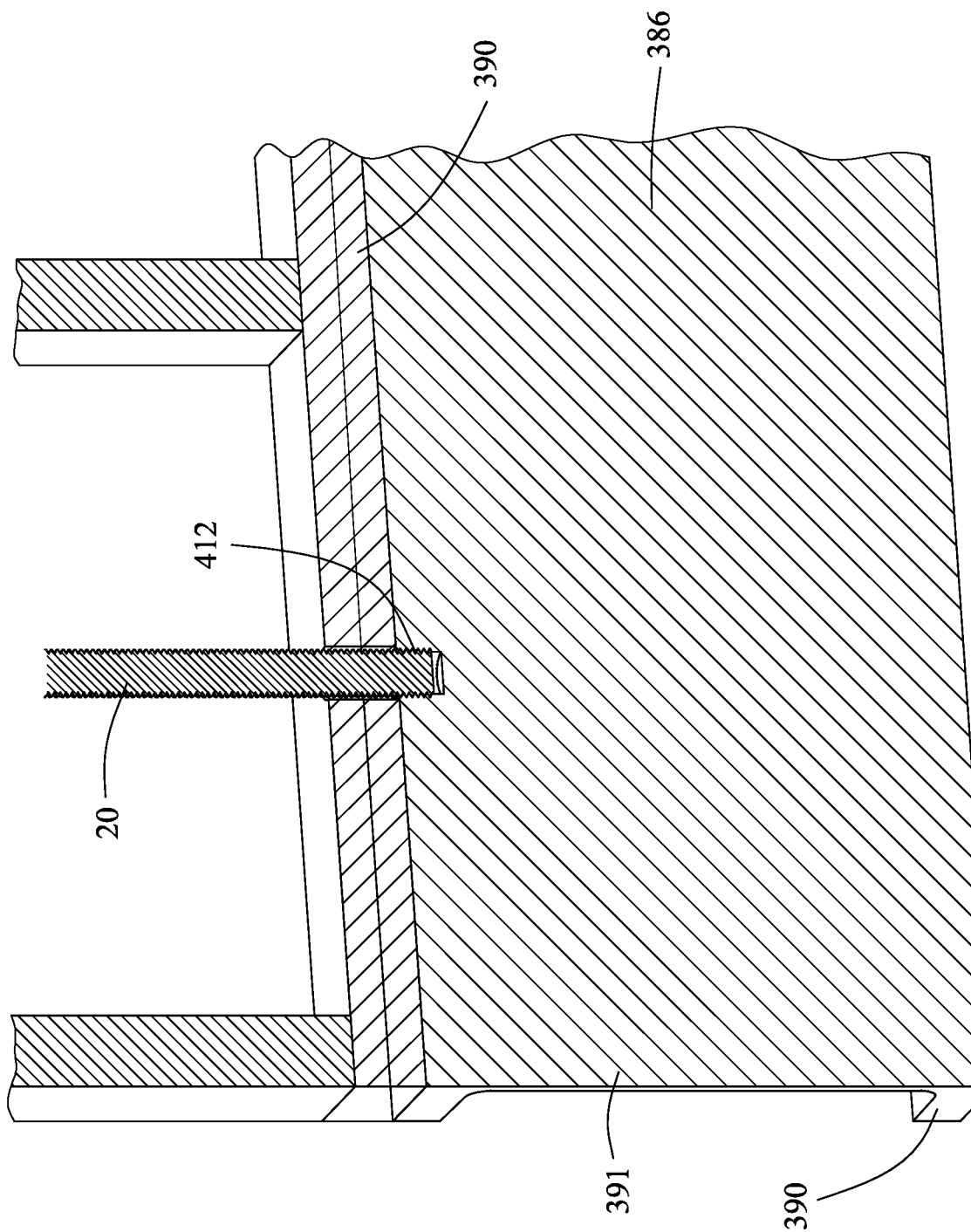

Referring to FIGS. 203, 204 and 205, the rod post 20 extends through the opening 392 into an unthreaded opening 408 in the top flange 390. The opening 408 is preferably centered over the web 391. The bottom surface 410 of the rod post 20 bears on the bottom of the opening 408. The rod post 20 may be threaded (FIG. 203) or unthreaded (FIG. 204). The opening 408 may be a threaded opening 412 to which the threaded rod 20 is screwed (FIG. 205) to also allow tension forces in addition to compression forces to be transferred to the steel I-beam 386.

Figure 206:
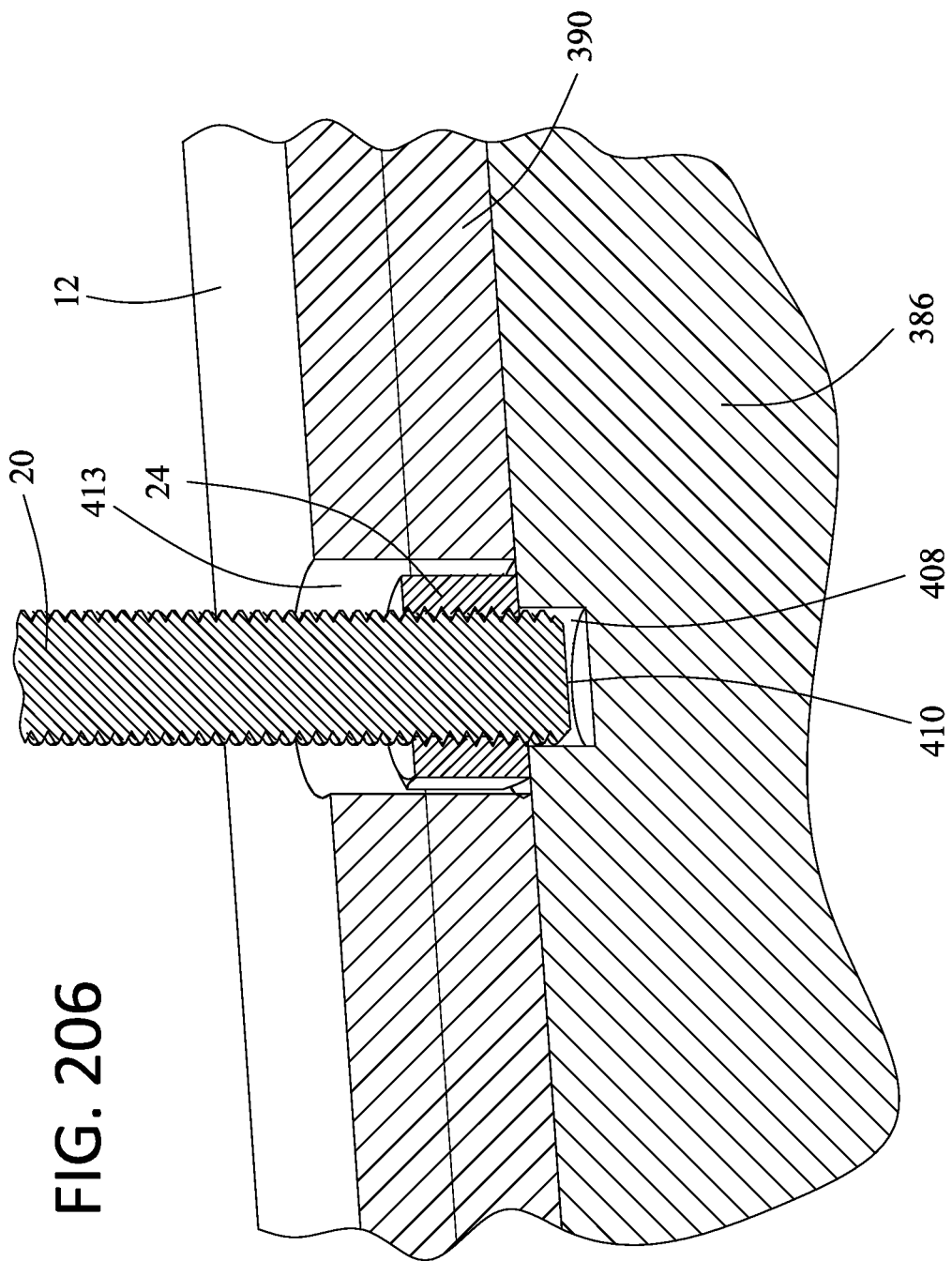
Figure 207:
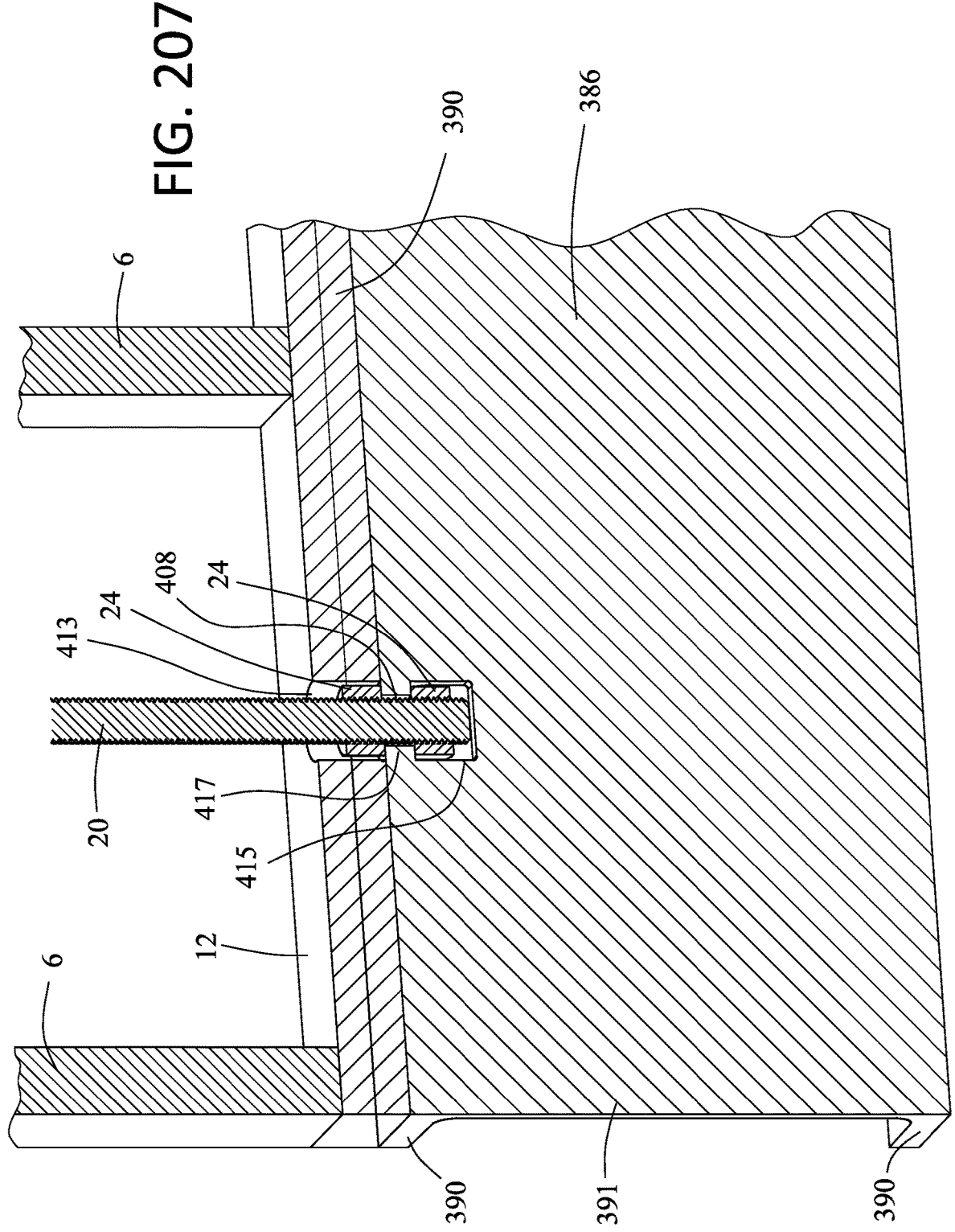

Referring to FIG. 206, an oversize opening 413 allows the nut 24 to bear on the upper flange 390. The nut 24 is threaded to the end portion of the rod post 20. The end portion of the rod post 20 extends through the opening 413 and into the opening 408. The bottom surface of the rod post 20 is spaced from the bottom of the opening 408. Compression forces from the rod post 20 are transferred to the steel I-beam 386 through contact of the nut 24 with the upper flange 390 of the steel I-beam 386.

Referring 207, an opening or cutout 415 is provided in the web 391 below the opening 408 to accommodate the lower nut 24. The cutout 415 communicates with the opening 408. The cutout 415 is wider than the diameter of the opening 408 to provide a flange 417 around the opening 408. The rod post 20 is attached to the steel I-beam 386 with the upper nut 24 and the lower nut 24 bearing on the upper flange 390. Compression forces from the rod post 20 are transferred to the steel I-beam 386 through contact of the nut 24 with the upper flange 390 of the steel I-beam 386. Tension forces on the rod post 20 are transferred to the steel I-beam 386 through the lower nut 24 bearing on the underside of the upper flange 390.

Figure 208:
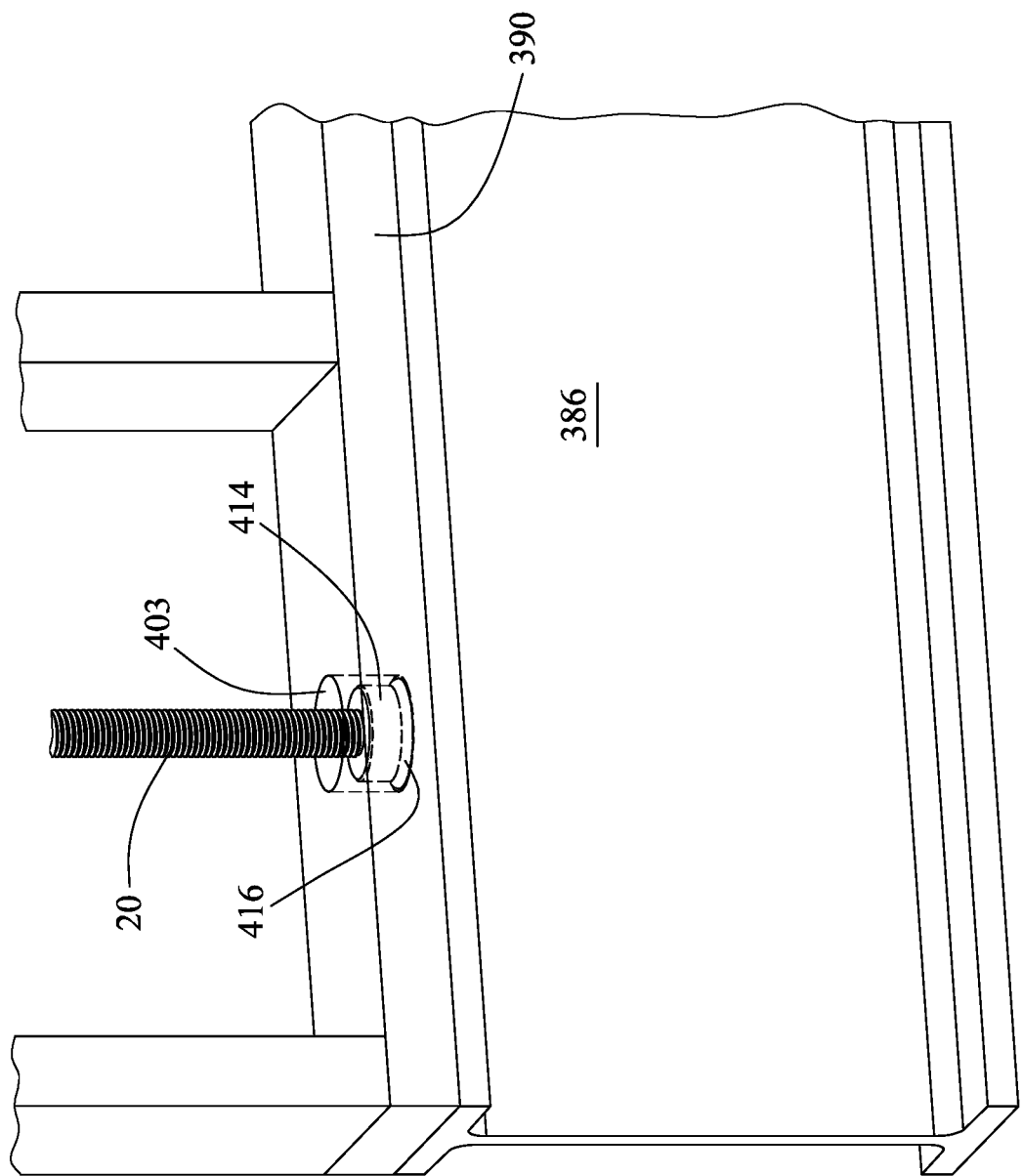
Figure 209:
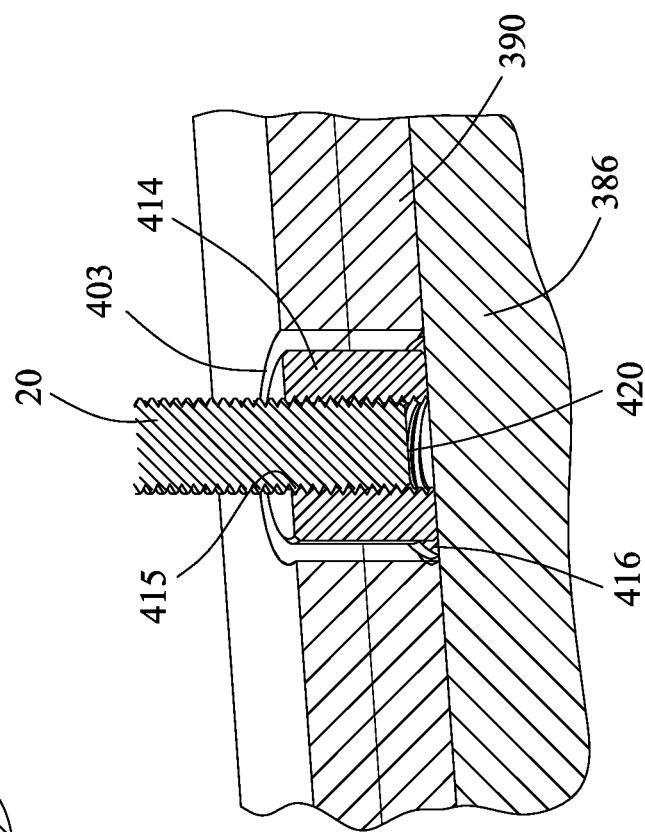
Figure 210:
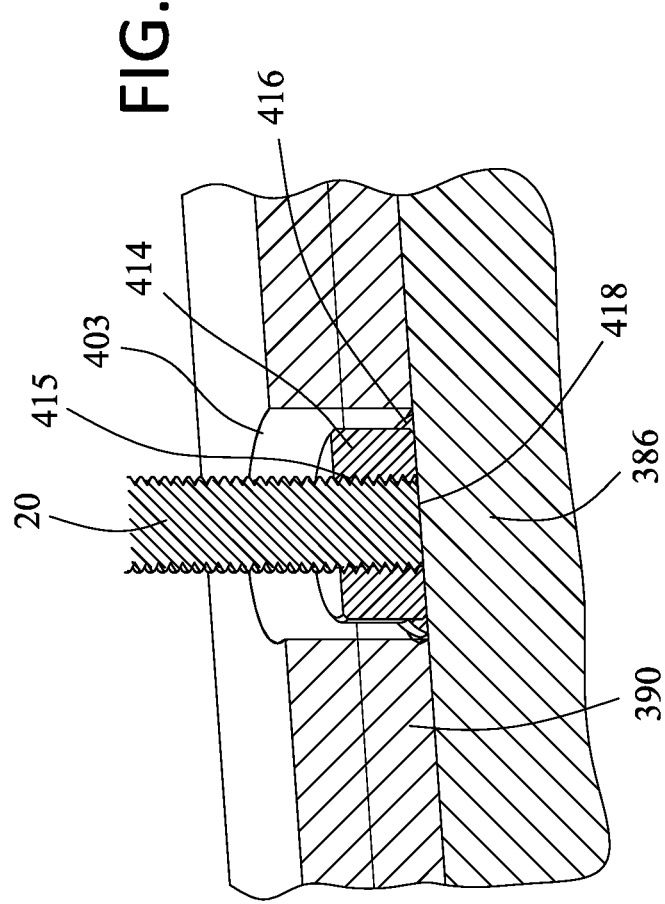

Referring to FIGS. 208, 209 and 210, a cylindrical body 414 with an axial threaded opening 415 is disposed in the opening 403 in the top plate 12. The cylindrical body 414 receives an end portion of the rod post 20. The cylindrical body 414 is attached to the rod post 20 through the threaded opening 415. The cylindrical body 414 is attached to the flange 390 with welding 416 at the bottom of the cylindrical body 414. The bottom 418 of the rod post 20 may bear on the flange 390 (FIG. 209) or be spaced a distance 420 above the flange 390 (FIG. 210). Compression forces from the rod post 20 are transferred to the steel I-beam 386 through contact of the cylindrical body 414 with the upper flange 390 of the steel I-beam 386. Tension forces on the rod post 20 are transferred to the steel I-beam 386 through the welding 416 between the cylindrical body 414 and the upper flange 390.

It should be understood that compression plates and bridge members are provide the same function of transferring tension or compression forces from the wall to the rod post. They only differ by their thickness. Bearing plates are thinner and may be shorter than the compression plates and may be used with bridge members made of sawn lumber to spread the forces over a larger area than the bearing area of a fastener, such as a nut to connect the bridge member to the rod post, to reduce crushing the sawn lumber with the nut.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A reinforced building wall, comprising:
   a) a foundation and an anchor rod anchored to the foundation;
   b) a first stud wall disposed above the foundation;
   c) a cross-laminated timber (CLT) floor panel supported by the first stud wall;
   d) a second stud wall disposed above the first stud wall and supported by the CLT floor panel; and
   e) a rod post operably connected to the anchor rod and the CLT floor panel to transfer downward forces from the CLT floor panel to the rod post and the anchor rod to put the rod post and the anchor rod in compression.

2. The reinforced building wall as in claim 1, wherein the rod post is operably attached to a body disposed inside the CLT floor panel.

3. The reinforced building wall as in claim 2, wherein:
   a) the body includes a central threaded opening;
   b) the rod post terminates inside a first end portion of the central threaded opening; and
   c) a rod is threaded to a second end portion opposite to the first end portion of the central threaded opening.

4. The reinforced building wall as in claim 3, wherein the threaded central opening includes a larger diameter at the first end portion than at the second end portion.

5. The reinforced building wall as in claim 2, wherein the body includes a bearing plate.

6. The reinforced building wall as in claim 2, wherein the body includes a cylindrical body.

7. The reinforced building as in claim 2, wherein:
   a) a first bearing plate is attached to one end of the body to bear on a lower portion of the CLT floor panel;
   b) a second bearing plate is attached to another end opposite to the one end of the body, the second bearing plate to bear on an upper portion of the CLT floor panel; and
   c) the rod post is threaded to the body.

8. The reinforced building wall as in claim 2, wherein the rod post extends through the body.

9. The reinforced building wall as in claim 2, wherein the body is below a top surface and above a bottom surface of the CLT floor panel.

10. The reinforced building wall as in claim 9, wherein the body includes a threaded opening and the rod post is threaded to the threaded opening.

11. The reinforced building wall as in claim 10, wherein the body includes cylindrical body.

12. The reinforced building wall as in claim 10, wherein the body includes a bearing plate.

13. The reinforced building wall as in claim 10, wherein:
a) the rod post terminates inside one end the body; and
b) a rod is threaded to another end opposite to the one end of the body.

14. The reinforced building wall as in claim 1, wherein:
a) the first stud wall includes a first top plate supporting the CLT floor panel;
b) the second stud wall includes a second bottom plate supported on the CLT floor panel;
c) a first body bearing on an underside of the first top plate, the first body including a first threaded opening;
d) a second body bearing on the second bottom plate, the second body including a second threaded opening; and
e) the rod post extends through the top plate, the CLT floor panel and the second bottom plate, the rod post is threaded to the first body and the second body.

15. The reinforced building wall as in claim 14, wherein the first body includes a bearing plate.

16. The reinforced building wall as in claim 14, wherein the second body includes a coupler.

17. The reinforced building wall as in claim 16, wherein the coupler includes a sight hole.

18. The reinforced building wall as in claim 16, wherein the second threaded opening is multi-diameter.

* * * * *